US012578296B2

(12) United States Patent
Hatakeyama

(10) Patent No.: US 12,578,296 B2
(45) Date of Patent: Mar. 17, 2026

(54) BIO-ELECTRODE, AND METHOD FOR MANUFACTURING THE SAME

(71) Applicant: SHIN-ETSU CHEMICAL CO., LTD., Tokyo (JP)

(72) Inventor: Jun Hatakeyama, Joetsu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 120 days.

(21) Appl. No.: 18/420,015

(22) Filed: Jan. 23, 2024

(65) Prior Publication Data

US 2024/0272112 A1 Aug. 15, 2024

(30) Foreign Application Priority Data

Jan. 25, 2023 (JP) .................................... 2023-9467

(51) Int. Cl.
*G01N 27/327* (2006.01)
*H01M 4/36* (2006.01)

(52) U.S. Cl.
CPC ............ *G01N 27/327* (2013.01); *H01M 4/36* (2013.01)

(58) Field of Classification Search
None
See application file for complete search history.

(56) References Cited

U.S. PATENT DOCUMENTS 10,076,025 B2 9/2018 Iwase
2018/0072930 A1 3/2018 Hatakeyama et al.
2018/0086948 A1 3/2018 Hatakeyama et al.
2018/0168470 A1 6/2018 Hatakeyama et al.
2018/0193632 A1 7/2018 Hatakeyama et al.
2018/0229023 A1 8/2018 Hatakeyama et al.
2018/0229024 A1 8/2018 Hatakeyama et al.
2020/0190275 A1 6/2020 Hatakeyama et al.
2020/0207952 A1 7/2020 Hatakeyama
2021/0371663 A1 12/2021 Hatakeyama et al.
(Continued)

FOREIGN PATENT DOCUMENTS

CN 216602889 U 5/2022
CN 114981354 A 8/2022
(Continued)

OTHER PUBLICATIONS

C. Zhang, et al., "Fabrication of flexible silver nanowire conductive films and transmittance improvement based on moth-eye nanostructure array", Journal of Micromechanics and Microengineering, 27, paper 075010, 9 pp. (Year: 2017).*
(Continued)

*Primary Examiner* — J. Christopher Ball

(57) ABSTRACT

The present invention is a bio-electrode including: a substrate having anti-reflective structure for light on at least one side; and (A) an electro-conductive layer having electro-conductive wiring on the opposite side from the side having the anti-reflective structure of the substrate. This provides: a bio-electrode that allows thin, highly transparent, highly sensitive to biological signals, excellent in biocompatibility, light-weight, manufacturable at low cost, capable of preventing significant reduction in sensitivity to biological signals even when attached on the skin for a long time and when wetted with water or dried, and comfortable without itching, reddening, nor rash of the skin.

11 Claims, 7 Drawing Sheets

(56) References Cited

U.S. PATENT DOCUMENTS

| | | | |
|---|---|---|---|
| 2022/0110569 | A1 | 4/2022 | Hatakeyama et al. |
| 2022/0157484 | A1 | 5/2022 | Nonaka et al. |
| 2022/0220313 | A1 | 7/2022 | Ikeda et al. |

FOREIGN PATENT DOCUMENTS

| | | | |
|---|---|---|---|
| JP | 2009-230045 | A | 10/2009 |
| JP | 2015100673 | A | 6/2015 |
| JP | 2017-152687 | A | 8/2017 |
| JP | 2017-189415 | A | 10/2017 |
| JP | 2018044147 | A | 3/2018 |
| JP | 2018059050 | A | 4/2018 |
| JP | 2018059052 | A | 4/2018 |
| JP | 2018099504 | A | 6/2018 |
| JP | 2018110845 | A | 7/2018 |
| JP | 2018130533 | A | 8/2018 |
| JP | 2018130534 | A | 8/2018 |
| JP | 2020097214 | A | 6/2020 |
| JP | 2020107875 | A | 7/2020 |
| JP | 2021115458 | A | 8/2021 |
| JP | 2021164630 | A | 10/2021 |
| JP | 2022078861 | A | 5/2022 |
| JP | 2022-144230 | A | 10/2022 |
| KR | 10-2022-0099904 | A | 7/2022 |
| WO | 2013039151 | A1 | 3/2013 |
| WO | 2021076054 | A1 | 4/2021 |

OTHER PUBLICATIONS

Taiwanese Office Action and Search Report in application No. 113102368 issued on Sep. 6, 2024.

Araki, et al.; Non-contact Laser Printing of Ag Nanowire-based Electrode with Photodegradable Polymers; Journal of Photopolymer Science and Technology, vol. 32, No. 3 (2019) 429-434; published Jun. 24, 2019.

Trulove, et al.; Ionic Liquids in Synthesis, Chapter 3.6; Electrochemical Properties of lonic Liquids; published Feb. 26, 2023.

Yang, et al.; Facile fabrication of stretchable Ag nanowire/polyurethane electrodes using high intensity pulsed light; Nano Research 2016, 9(2):401-414, DOI 10.1007/s12274-015-0921-9; published Jan. 7, 2016.

Korean Office Action in application No. 10-2024-0008721 issued on Oct. 30, 2025.

Zhang, Chengpeng, et al., Fabrication of flexible silver nanowire conductive films and transmittance improvement based on moth-eye nanostructure array, Journal of Micromechanics and Microengineering, 2017, 27.7: 075010.

* cited by examiner

[FIG. 1]
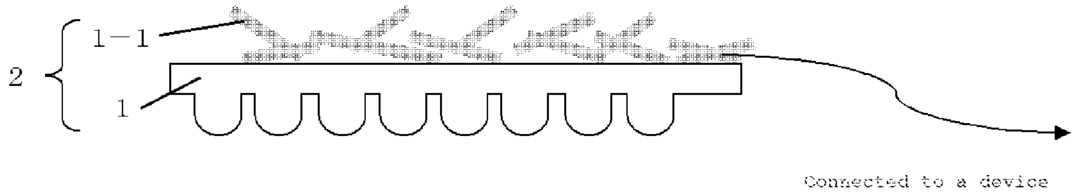
[FIG. 2]
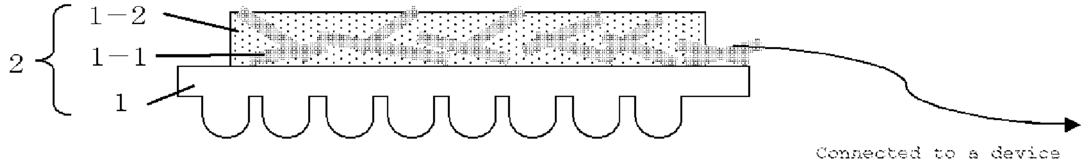
[FIG. 3]
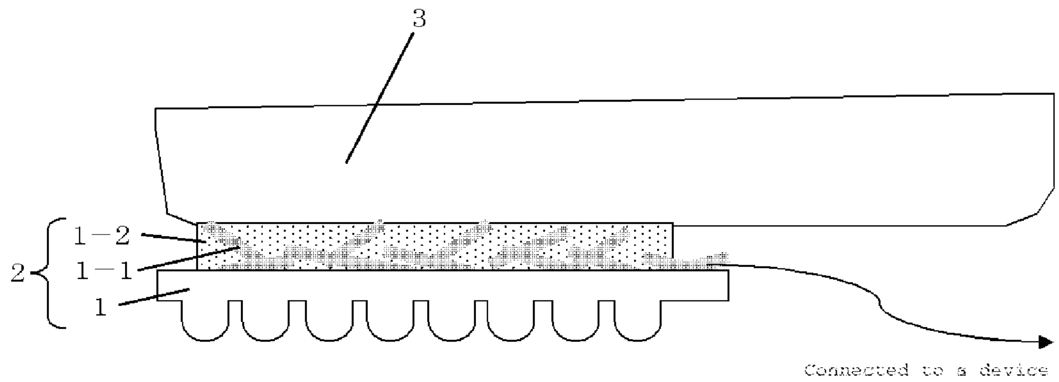
[FIG. 4]
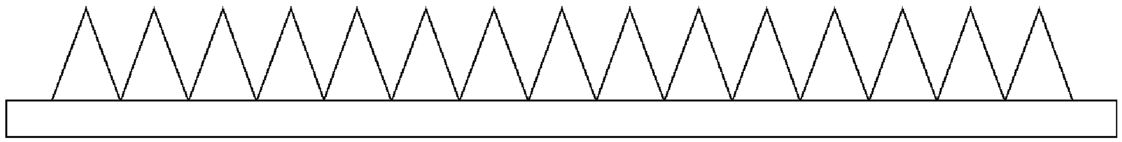
[FIG. 5]
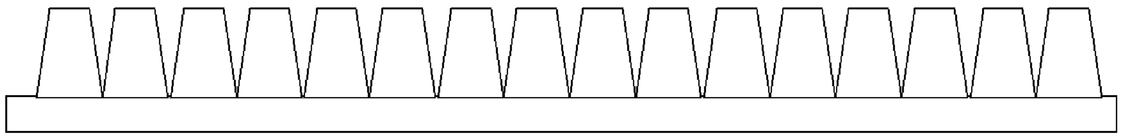
[FIG. 6]
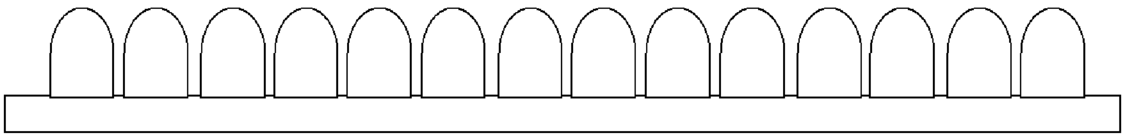

[FIG. 7]
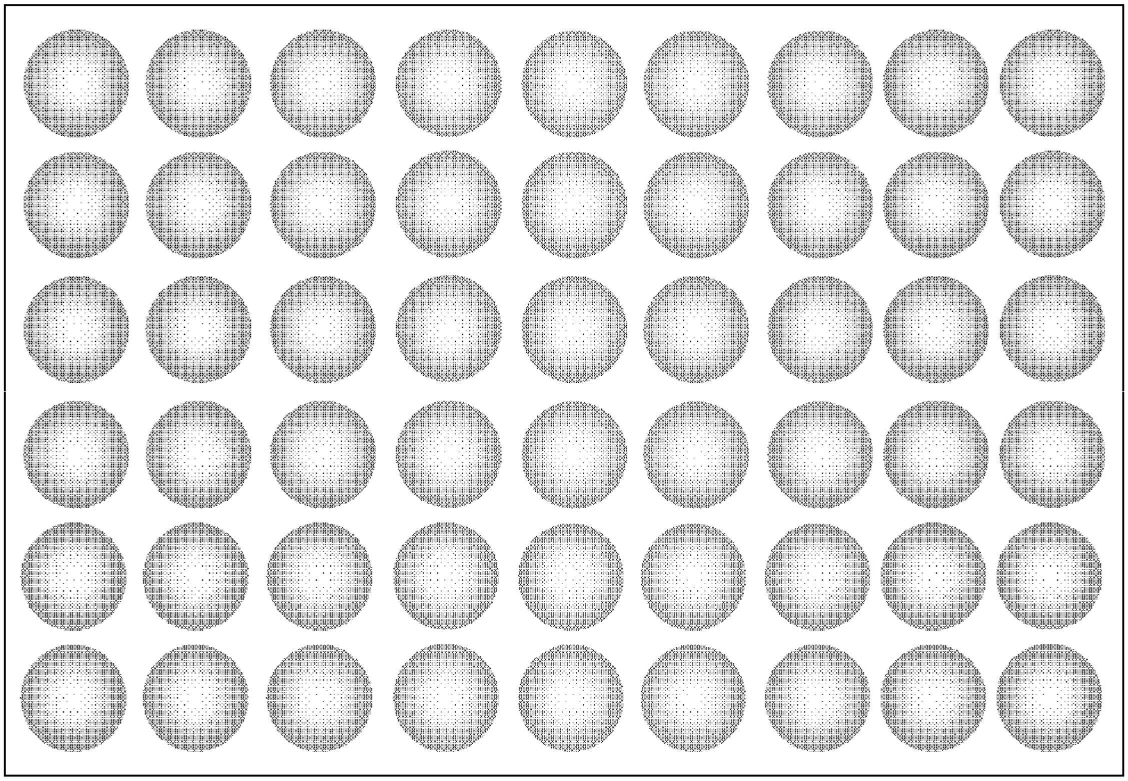
[FIG. 8]
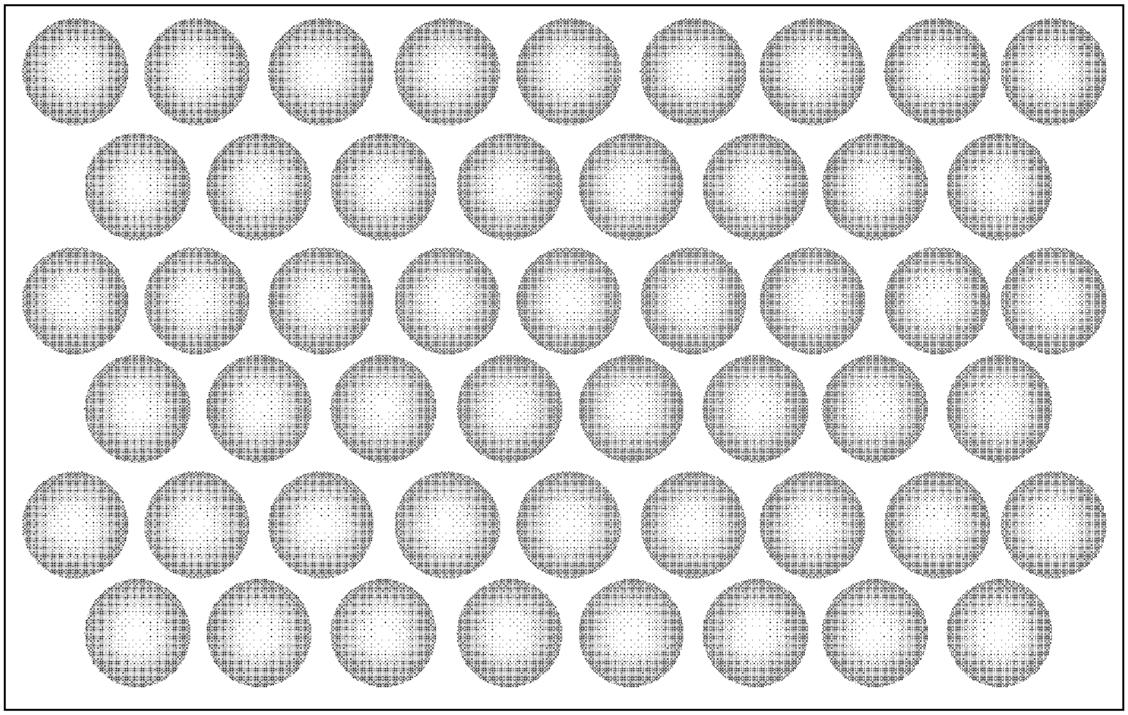

[FIG. 9]
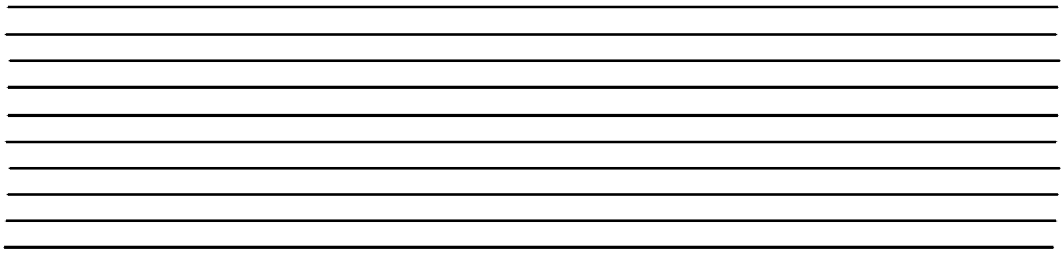
[FIG. 10]
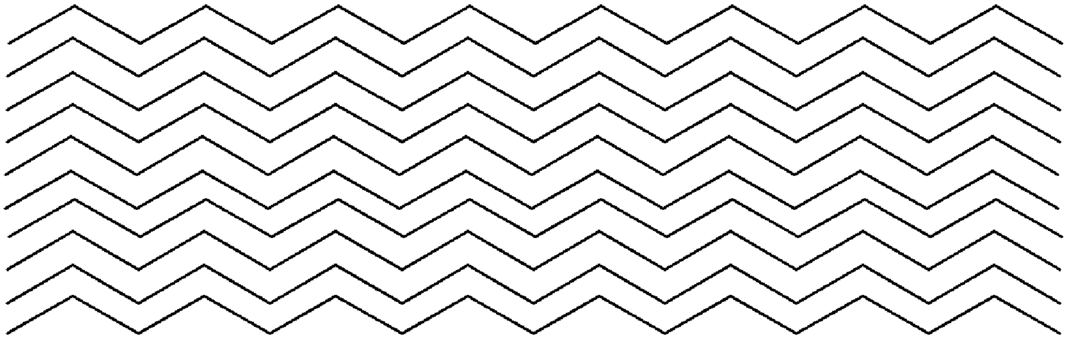
[FIG. 11]
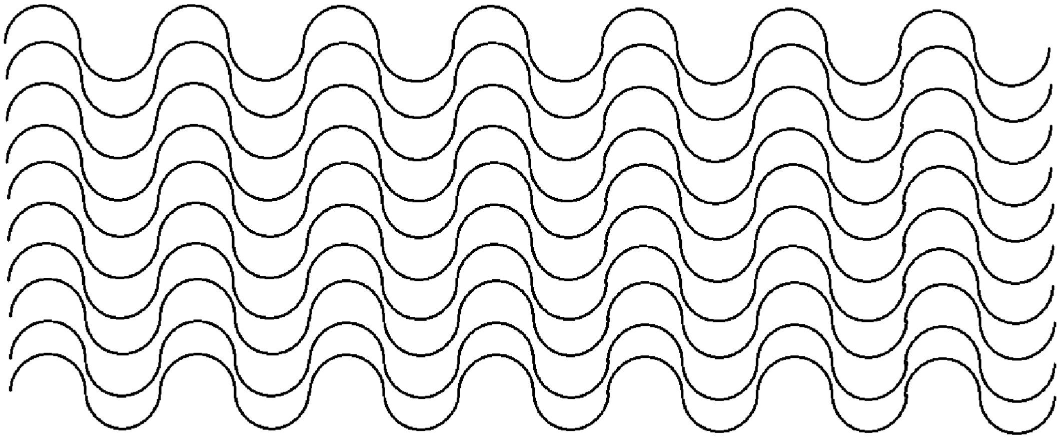
[FIG. 12]
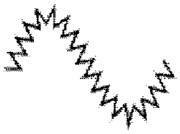

[FIG. 13]
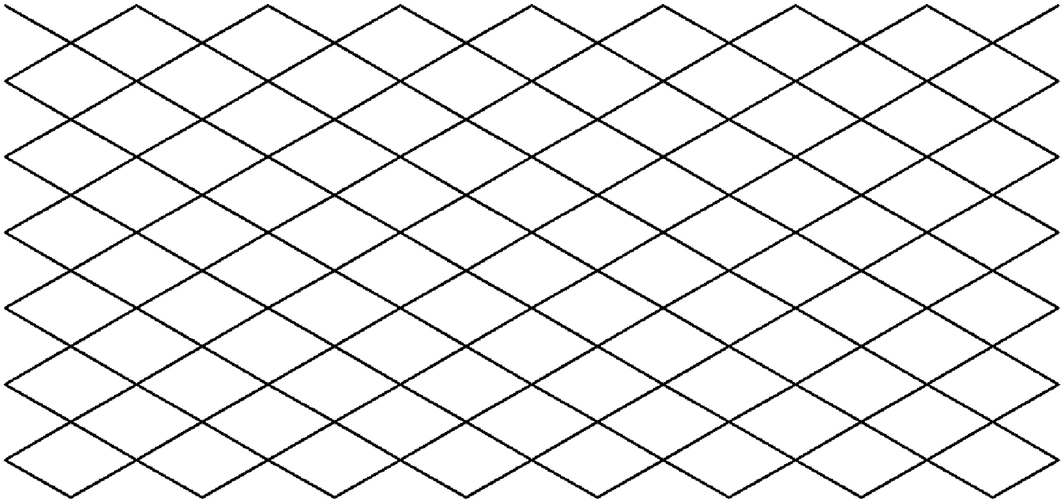
[FIG. 14]
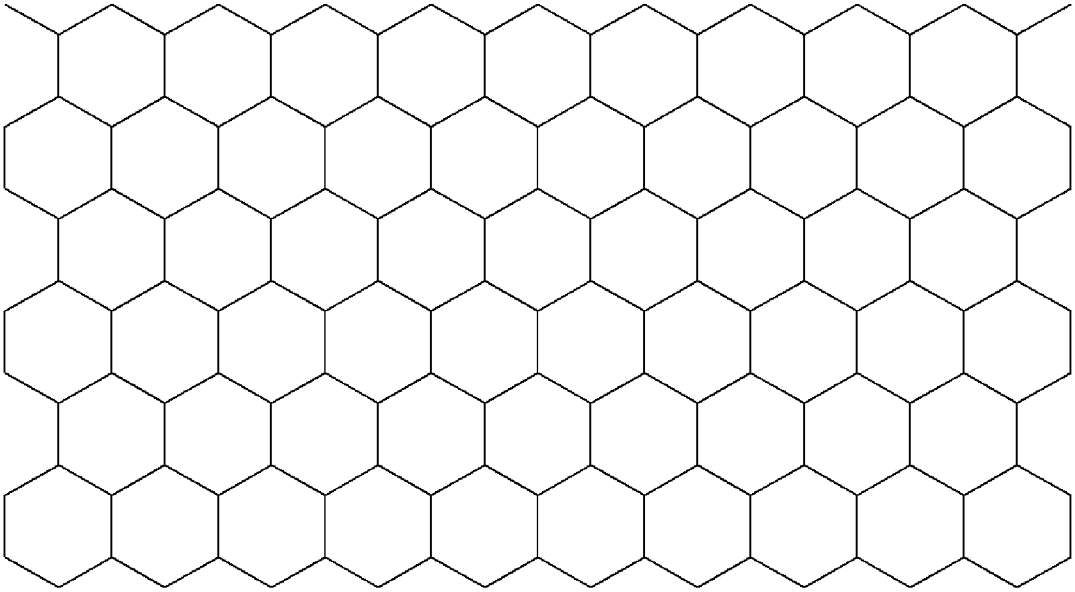

[FIG. 15]
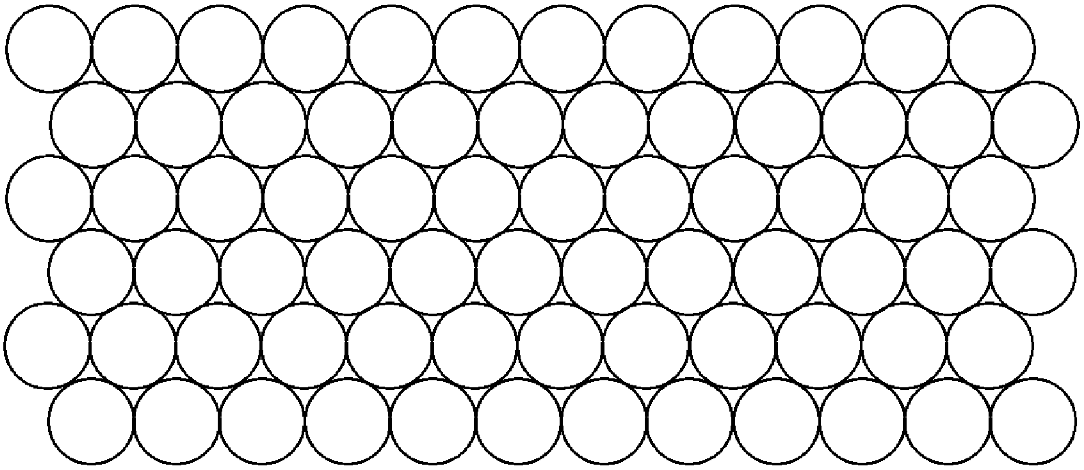
[FIG. 16]
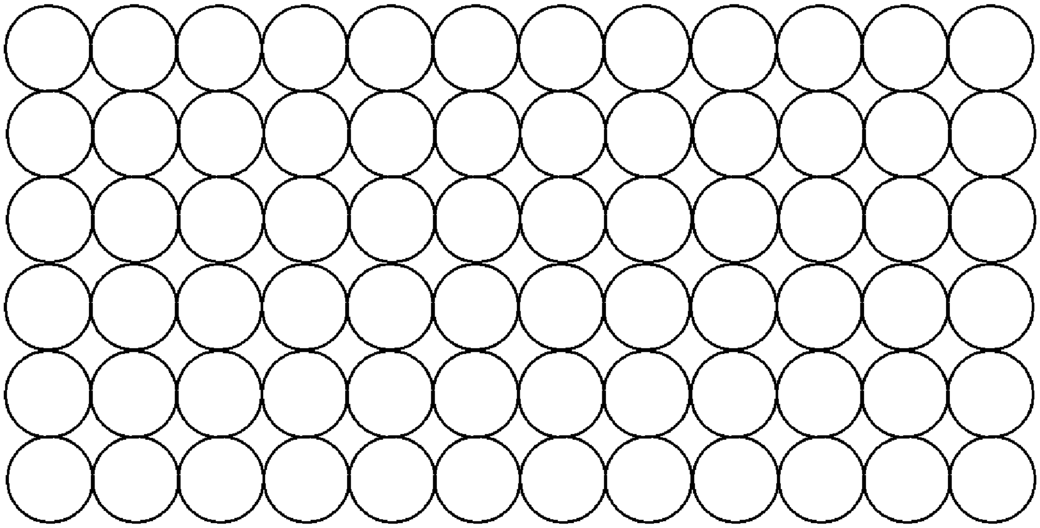

[FIG. 17]
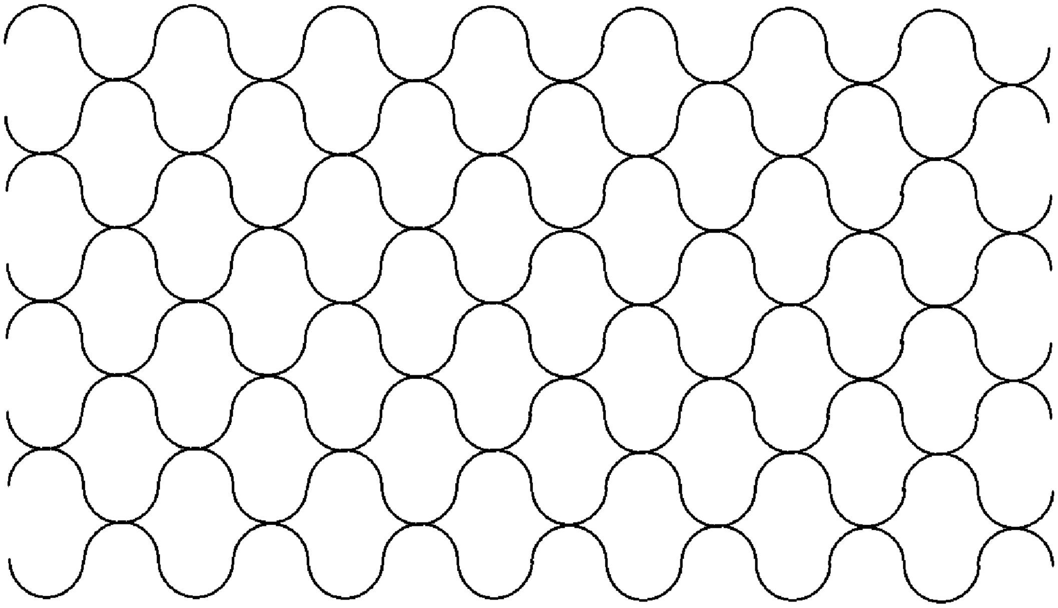
[FIG. 18]
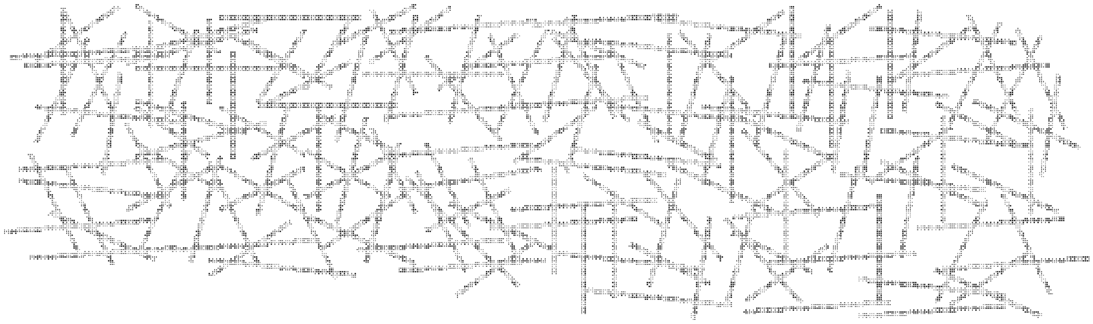
[FIG. 19]
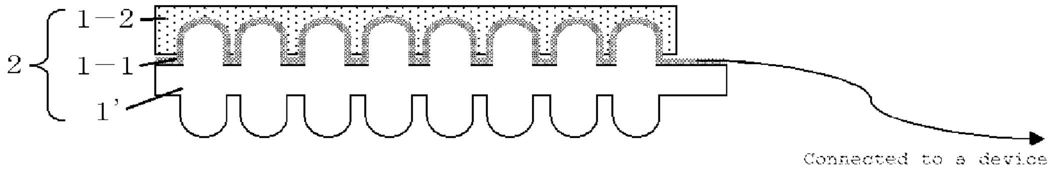

[FIG. 20]
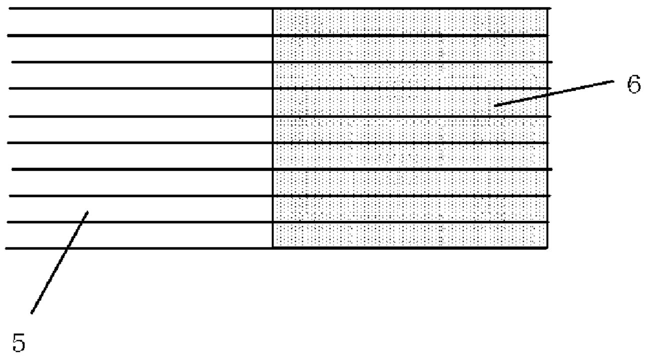
[FIG. 21]
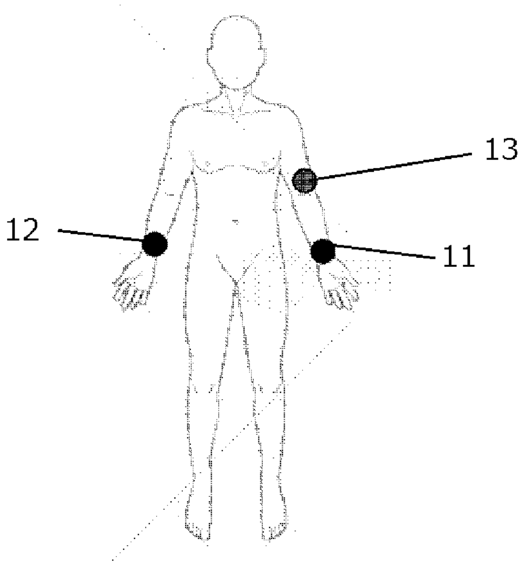

BIO-ELECTRODE, AND METHOD FOR MANUFACTURING THE SAME

TECHNICAL FIELD

The present invention relates to a bio-electrode that is used in contact with the skin of a living body and capable of detecting physical conditions such as heart rate by an electric signal transmitted from the skin, and a method for manufacturing the bio-electrode.

BACKGROUND ART

A recent growing popularity of Internet of Things (IoT) has accelerated the development of wearable devices. In the fields of medicine and sports, wearable devices for constantly monitoring the user's physical state are demanded, and such technological development is expected to be further encouraged. In particular, because the global spread of the new coronavirus (COVID-19) causes a serious burden on medical care, home medical care for people who are not infected with the virus are strongly needed and its accelerated development is desired.

In the field of medicine, wearable devices for monitoring the state of human organs by sensing extremely weak current are sold, for example, like electrocardiogram measuring which detects the motion of the heart by electric signals. The electrocardiogram measurement is conducted by attaching electrodes coated with a hydrated gel to a body, but this is a single, short-time measurement. In contrast to this, development of the above medical wearable device is aimed at devices for continuously monitoring the health condition for a few weeks. Accordingly, the bio-electrode used for the medical wearable device is required to be able to collect biological signals, not to cause an itchiness nor a skin allergy, and to be used comfortably, even over extended periods of use in daily life which involves showering, bathing, sweating, etc. In addition to these, the bio-electrode is also required to be so lightweight and thin to give no feeling when attached, and can be produced with a good productivity at low cost.

It is possible to measure an electrocardiogram by using a watch-type device represented by Apple Watch or by non-contact sensing using Rader. However, accurate electrocardiogram measuring for a medical use needs an electrocardiographic monitor which requires to apply bio-electrodes onto several parts on a body.

Medical wearable devices are classified into two types: one type is attached on the body, and another type is incorporated into clothing. For the attached type, for example, the bio-electrode using a hydrated gel such as hydrophilic gel containing water and electrolytes disclosed in patent document 1 is widely used. The hydrophilic gel contains sodium, potassium, and calcium as electrolytes in a hydrophilic polymer for retaining water, and converts a change in ion concentration from the skin into an electric signal by a reductive reaction of silver chloride in contact with the hydrophilic gel. When the gel gets dry, the bio-electrode has problems: the bio-electrode loses electric conductivity and a function as electrode, and it swells during bathing or showering and falls off.

Meanwhile, for the electrode incorporated into closing, a method to use fabric as an electrode is proposed in patent document 2, wherein electro-conductive polymer such as PEDOT-PSS (Poly-3,4-ethylenedioxythiophene-Polystyrenesulfonate) or silver paste are incorporated in fibers.

A bio-electrode sheet with a stretchability and high electric conductivity is under development (non patent document 1). In the development, silver nanowires are coated on a polyurethane film, and are heated to 500° C. or higher on its surface instantaneously by a flash lamp anneal treatment to be made into fusion splicing with each other. Decreasing a density of the nanowires in a silver nanowire layer makes the bio-electrode more transparent.

A bio-electrode consisting of metal thin film of gold, silver, stainless, etc., or a fiber coated with a metal or a conductive polymer is not transparent. If a transparent bio-electrode which can observe the skin in a see-through manner is developed, it produces an advantage of not visually disconcerting when attached to the skin.

For a transparent electro-conductive film for organic EL as an alternative for ITO, PEDOT-PSS has been studied. Non patent document 2 combines a silver nanowire and PEDOT-PSS. The combination of a silver nanowire and PEDOT-PSS can be applied for a bio-electrode. However, PEDOT-PS is colored in blue, and not transparent.

Patent documents 3-5 propose a bio-electrode having, as a base material, a polymer containing a repeating unit having fluorosulfonic acid, fluorosulfonimide, and N-carbonyl-fluorosulfonamide. Such a polymer has a high polarizability and high electric conductivity of an ion released from the skin, and is transparent in itself. In Examples of these applications, a bio-electrode having the aforementioned polymer as a base material is formed on a highly conductive substrate, and the bio-electrode itself is not transparent.

According to heartbeats, changes in electrical potential and ion are released from the skin. In order to enhance the sensitivity to signals, it is preferable to detect the change not only in electrical potential but also in ion.

An anti-reflective film of a moth-eye type, having a microscopic concave and convex surface, which mimics the spider's eye, is proposed (patent document 6). In order to show an image clearly by suppressing light reflection, a display sheet having moth-eye structure on the surface, is sold.

CITATION LIST

Patent Literature

Patent Document 1: WO 2013/039151 A1
Patent Document 2: JP 2015-100673 A
Patent Document 3: JP 2018-099504 A
Patent Document 4: JP 2018-110845 A
Patent Document 5: JP 2018-130533 A
Patent Document 6: JP 2009-230045 A

Non Patent Literature

Non Patent Document 1: Nano Res. 9, 401(2016)
Non Patent Document 2: J. Photopolymer Sci. and Tech. Vol. 32 No. 3 p 429(2019)

SUMMARY OF INVENTION

Technical Problem

The present invention has been made to solve the problems, and has an object to provide a bio-electrode which is thin, highly transparent, highly sensitive to biological signals, excellent in biocompatibility, light-weight, manufacturable at low cost, capable of preventing significant reduction in the sensitivity to biological signals even when attached on the skin for a long time and when wetted with water or dried, and comfortable without itching, reddening, nor rash of the skin; and a method for manufacturing the bio-electrode.

Solution to Problem

The present invention has been made in view of the above-described problems. An object of the present invention is to provide a bio-electrode including: a substrate having anti-reflective structure for light on at least one side; and (A) an electro-conductive layer having an electro-conductive wiring on the opposite side from the side having the anti-reflective structure of the substrate.

Such a bio-electrode can be thin, highly transparent, highly sensitive to biological signals, excellent in biocompatibility, light-weight, manufacturable at low cost, capable of preventing significant reduction in sensitivity to biological signals even when attached on the skin for a long time and when wetted with water or dried, and comfortable without itching, reddening, nor rash of the skin.

Further, in the present invention, anti-reflective structure for light is preferable based on the moth-eye structure.

Such a bio-electrode is further transparent and preferable.

In this event, the moth-eye structure preferably has a pitch of 1000 nm or less and a depth of 10 nm or more.

The anti-reflective structure can be such a moth-eye structure.

Further, in the present invention, it is preferable that an ion polymer containing layer (B) is on the electro-conductive layer (A).

Such a bio-electrode is highly sensitive to biological signals and preferable.

In this event, the electro-conductive wiring preferably has a width of 200 μm or less, and a laminate film, which is a combination of the layer (A) and the layer (B), preferably has a visible light transmittance of 50% or more.

Such a bio-electrode makes the skin visible thorough the bio-electrode and is preferable.

In this event, the electro-conductive wiring having a width of 200 μm or less is preferably: a printed pattern using an electro-conductive paste including a particle of gold, silver, copper, or nickel; or a fusion layer of metal nanowires including gold, silver, copper, nickel, or alloy thereof.

Such electro-conductive wiring can be used preferably.

In this event, the ion polymer containing layer preferably includes a polymer which has: a repeating unit-a having at least one selected from the group consisting of fluorosulfonic acid, fluorosulfonimide, and N-carbonyl-fluorosulfonamide; and the weight-average molecular weight in a range of 1,000 to 500,000.

Such a bio-electrode is further highly sensitive and preferable.

In this event, the repeating unit-a preferably has a partial structure shown by any of the following general formulae (1)-1 to (1)-4, (1)-1

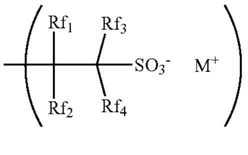

-continued (1)-2

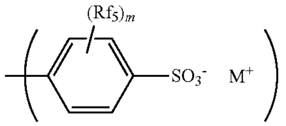

(1)-3

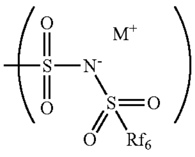

(1)-4

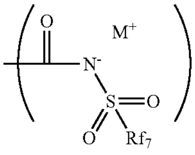

wherein $Rf_1$ and $Rf_2$ each represent a hydrogen atom, a fluorine atom, an oxygen atom, a methyl group, or a trifluoromethyl group, provided that when $Rf_1$ and $Rf_2$ represent an oxygen atom, the single oxygen atom represented by $Rf_1$ and $Rf_2$ bonds to a single carbon atom to form a carbonyl group; $Rf_3$ and $Rf_4$ each represent a hydrogen atom, a fluorine atom, or a trifluoromethyl group, and at least one of $Rf_1$ to $Rf_4$ is a fluorine atom or a trifluoromethyl group; $Rf_5$, $Rf_6$, and $Rf_7$ each represent a fluorine atom, a trifluoromethyl group, a linear or branched alkyl group having 1 to 4 carbon atoms, or an aryl group having 6 to 10 carbon atoms, and have at least one fluorine atom or trifluoromethyl group; and $M^+$ represents an ion selected from the group consisting of an ammonium ion, a sodium ion, and a potassium ion; "m" represents an integer of 1 to 4.

When the repeating unit-a has such structure, the bio-electrode is further excellent in the electric conductivity and the biocompatibility.

In this event, the repeating unit-a preferably includes at least one selected from the group consisting of repeating units-A1 to -A7 shown by the following general formulae (2), (2)

A1

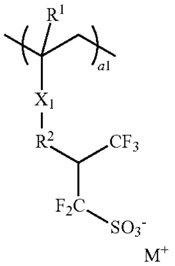

-continued

A2

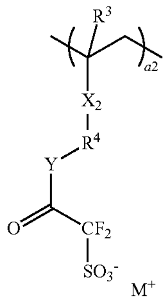

A3

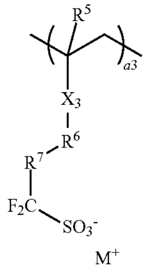

A4

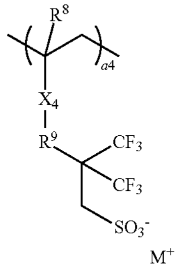

A5

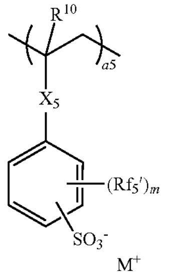

A6

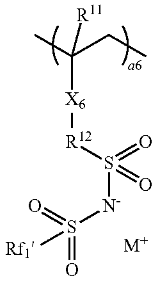

-continued

A7

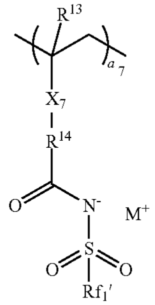

wherein, $R^1$, $R^3$, $R^5$, $R^8$, $R^{10}$, $R^{11}$, and $R^{13}$ each independently represent a hydrogen atom or a methyl group; $R^2$, $R^4$, $R^6$, $R^9$, $R^{12}$, and $R^{14}$ each independently represent a single bond or a linear, branched, or cyclic hydrocarbon group having 1 to 13 carbon atoms, the hydrocarbon group optionally having either or both of an ester group and an ether group; $R^7$ represents a linear or branched alkylene group having 1 to 4 carbon atoms, and one or two hydrogen atoms in $R^7$ are optionally substituted with a fluorine atom; $X_1$, $X_2$, $X_3$, $X_4$, $X_6$, and $X_7$ each independently represent any of a single bond, a phenylene group, a naphthylene group, an ether group, an ester group, and an amide group; $X_5$ represents any of a single bond, an ether group, and an ester group; Y represents an oxygen atom or a —$NR^{19}$— group; $R^{19}$ represents any of a hydrogen atom, a linear, branched, or cyclic alkyl group having 1 to 12 carbon atoms, and phenyl group, optionally includes one or more group selected from the group consisting of ether group, carbonyl group, ester group, and amide group; and Y forms a ring together with $R^4$; $Rf_1'$ and $Rf_5'$ each represent a fluorine atom, a trifluoromethyl group, or a linear or branched alkyl group having 1 to 4 carbon atoms, and have at least one fluorine atom; "m" represents an integer of 1 to 4; a1, a2, a3, a4, a5, a6, and a7 satisfy $0 \leq a1 \leq 1.0$, $0 \leq a2 \leq 1.0$, $0 \leq a3 \leq 1.0$, $0 \leq a4 \leq 1.0$, $0 \leq a5 \leq 1.0$, $0 \leq a6 \leq 1.0$, $0 \leq a7 \leq 1.0$, and $0 < a1+a2+a3+a4+a5+a6+a7 \leq 1.0$; and $M^+$ represents an ion selected from the group consisting of an ammonium ion, a sodium ion, and a potassium ion.

When the repeating unit-a has such structure, the bio-electrode is further excellent in the electric conductivity and the biocompatibility.

In this event, the repeating unit-a preferably includes an ammonium ion shown by the following general formula (3) as an ammonium ion for forming an ammonium salt, (3)

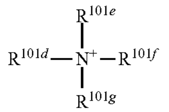

wherein, $R^{101d}$, $R^{101e}$, $R^{101f}$, and $R^{101g}$ each represent a hydrogen atom, a linear, branched, or cyclic alkyl group having 1 to 15 carbon atoms, a linear, branched, or cyclic alkenyl group or alkynyl group having 2 to 12 carbon atoms, or an aromatic group having 4 to 20 carbon atoms, and optionally have one or more selected from the group consisting of an ether group, a carbonyl group, an ester group, a hydroxy group, a carboxy group, an amino group, a nitro group, a sulfonyl group, a sulfinyl group, a halogen atom, and a sulfur atom; and $R^{101d}$ and $R^{101e}$, or $R^{101d}$, $R^{101e}$, and $R^{101f}$, are optionally bonded to each other together with a nitrogen atom bonded therewith to form a ring in which $R^{101d}$ and $R^{101e}$, or $R^{101d}$, $R^{101e}$, and $R^{101f}$, represent an alkylene group having 3 to 10 carbon atoms, or to form a heteroaromatic ring having the nitrogen atom in the general formula (3) within the ring.

With a polymer including such an ammonium ion, the bio-electrode is further excellent in the electric conductivity and the biocompatibility.

In this event, the bio-electrode preferably includes one or more resin (C) selected from the group consisting of (meth) acrylate resin, (meth)acrylamide resin, urethane resin, polyurethane (meth)acrylate, polyvinyl alcohol, polyvinylpyrrolidone, polyoxazoline, polyglycerin, polyglycerin-modified silicone, polyglycerin(meth)acrylate, cellulose, polyethylene glycol, and polypropylene glycol, as a component of the layer (B).

Layer (B) can contain such resin (C).

Further, the present invention provides a method for manufacturing the bio-electrode described above. Based on the method, the layer (A) is formed on the opposite side from the side having the anti-reflective structure of the substrate having the anti-reflective structure for light on at least one side, by applying a solution containing the metal nanowires, or by printing the electro-conductive paste containing the conductive particles.

According to such a manufacturing method, it is possible to manufacture the bio-electrode which is thin, highly transparent, highly sensitive to biological signals, excellent in the biocompatibility, light-weight, manufacturable at low cost, capable of preventing significant reduction in the sensitivity to biological signals even when attached on the skin for a long time and when wetted with water or dried, and comfortable without itching, reddening, nor rash of the skin.

Advantageous Effects of Invention

As described above, the inventive bio-electrode and the inventive method for manufacturing the bio-electrode make it possible to provide: a bio-electrode which is highly sensitive to biological signals, excellent in the biocompatibility, thin, light-weight, highly transparent, manufacturable at low cost, capable of preventing significant reduction in the sensitivity to biological signals even when wetted with water or dried and when attached on the skin for a long time, and comfortable without itching, reddening, nor rash of the skin; and a method for manufacturing the bio-electrode.

BRIEF DESCRIPTION OF DRAWINGS

FIG. 1 is a schematic sectional view showing the inventive bio-electrode after an electro-conductive layer is formed on a substrate having moth-eye typed anti-reflective structure.

FIG. 2 is a schematic sectional view showing the inventive bio-electrode after an ion polymer containing layer is formed on the electro-conductive layer on the substrate having moth-eye typed anti-reflective structure.

FIG. 3 is a schematic sectional view showing the inventive bio-electrode attached on a human skin to measure a biological signal.

FIG. 4 is a schematic sectional view showing an example of a substrate having moth-eye typed anti-reflective structure.

FIG. 5 is a schematic sectional view showing another example of a substrate having moth-eye typed anti-reflective structure.

FIG. 6 is a schematic sectional view showing yet another example of a substrate having moth-eye typed anti-reflective structure.

FIG. 7 is a schematic top plan view showing moth-eye typed anti-reflective structure.

FIG. 8 is another schematic top plan view showing moth-eye typed anti-reflective structure.

FIG. 9 is a schematic top view showing the electro-conductive wiring having a width of 200 μm or less of the inventive bio-electrode, which is formed in the shape of a straight line by printing.

FIG. 10 is a schematic top view showing the electro-conductive wiring having a width of 200 μm or less of the inventive bio-electrode, which is formed in the shape of a zigzag line by printing.

FIG. 11 is a schematic top view showing the electro-conductive wiring having a width of 200 μm or less of the inventive bio-electrode, which is formed in the shape of a wave line by printing.

FIG. 12 is a schematic top view showing the electro-conductive wiring having a width of 200 μm or less of the inventive bio-electrode, which is formed in the shape of a small zigzag line on a large zigzag line by printing.

FIG. 13 is a schematic top view showing the electro-conductive wiring having a width of 200 μm or less of the inventive bio-electrode, which is formed in an aslant lattice pattern by printing.

FIG. 14 is a schematic top view showing the electro-conductive wiring having a width of 200 μm or less of the inventive bio-electrode, which is formed in a hexagonal pattern by printing.

FIG. 15 is a schematic top view showing the electro-conductive wiring having a width of 200 μm or less of the inventive bio-electrode, which is formed in a pattern of repeating circles by printing.

FIG. 16 is a schematic top view showing the electro-conductive wiring having a width of 200 μm or less of the inventive bio-electrode, which is formed in another pattern of repeating circles by printing.

FIG. 17 is a schematic top view showing the electro-conductive wiring having a width of 200 μm or less of the inventive bio-electrode, which is formed in a mesh pattern by printing.

FIG. 18 is a schematic top view showing the coated nanowires of the inventive bio-electrode.

FIG. 19 is a schematic sectional view showing the inventive bio-electrode after an ion polymer containing layer is formed on an electro-conductive layer formed on a substrate having moth-eye typed anti-reflective structure on both sides.

FIG. 20 shows a bio-electrodes prepared in Examples.

FIG. 21 shows locations where bio-electrodes are attached in measuring biological signals in Examples.

DESCRIPTION OF EMBODIMENTS

As noted above, in order to detect biological signals with high sensitivity and low noise, it has been desired to develop: the bio-electrode which is excellent in the high electric conductivity and the biocompatibility, highly transparent, light-weight, thin, manufacturable at low cost, capable of measuring biological signals even when wetted with water or dried, and causing no skin damage nor rash when attached on the skin for a long time; and a method for manufacturing such a bio-electrode.

As a result of their diligent study of the above problems, the inventor found a bioelectrode of the following configuration and a manufacturing method thereof, and have completed the present invention.

That is, the present invention relates to a bio-electrode have: a substrate having anti-reflective structure for light on at least one side; and (A) an electro-conductive layer having an electro-conductive wiring on the opposite side from the side having the anti-reflective structure of the substrate.

The present invention is described below in detail; however, the present invention is not limited to the examples described below.

<Bio-Electrode>

The present bio-electrode includes a substrate having an anti-reflective effect for light on at least one side, and (A) an electro-conductive layer having an electro-conductive wiring on the opposite side from the side having the anti-reflective structure of the substrate.

The present bio-electrode preferably includes an ion polymer containing layer (B) on the electro-conductive layer (A).

The surface of the skin releases ions of sodium, potassium, and calcium in accordance with heartbeats. The bio-electrode is preferable to convert the increase and decrease of the ions released from the skin to electric signals. Accordingly, the bio-electrode is preferable to be a material that is excellent in ionic conductivity to transmit the increase and decrease of ions. In accordance with heartbeats, electric potential also changes. The change of the electric potential is small, and thus electron conductivity is also required in order to transmit such small current to a device.

A hydrophilic gel containing sodium chloride or potassium chloride has high ionic conductivity, but it loses the ionic conductivity when dried. Further, the ionic conductivity decreases also when sodium chloride or potassium chloride is eluted outside the bio-electrode.

The bio-electrode using metals such as gold or silver detects small current. Carbon has electron conductivity like metals, but its electron conductivity is lower than metals, and its sensitivity as a bio-electrode is lower than metals.

Conductive polymers represented by PEDOT-PSS have both electron conductivity and ionic conductivity, but the ionic conductivity is low due to its low polarization. Further, because a film coated with PEDOT-PSS has absorption in a red region, and it is tinted blue, the complemented color of the red. When used by people with white skin color, blue areas where bio-electrodes are attached is a visually disconcerting.

Salts of fluorosulfonic acid, fluorosulfonimide, and N-carbonyl-fluorosulfonamide have high polarizability and high ionic conductivity. A combination of these polymers and a narrow conductive paste pattern or metal wires having less reduction of transparency, can produce both properties of the high ionic conductivity with high transparency and the high electron conductivity.

A polymer film having salts of fluorosulfonic acid, fluorosulfonimide, and N-carbonyl-fluorosulfonamide is transparent to a visible light. If with high transparency, the bio-electrodes are less visually disconcerting when they are attached on the skin as the bio-electrodes.

The inventive bio-electrode preferably has the electro-conductive wiring having a width of 200 μm or less, and a laminate film, being a combination of the layer (A) and the layer (B), has preferably a visible light transmittance of 50% or more, more preferably 60% or more, and further preferably 70% or more.

When the visible light transmittance is 50% or more, the skin can be observed through the bio-electrode. When the visible light transmittance is 60% or more, difference in color between the bio-electrode and the skin is small. Further, when the visible light transmittance is 70% or more, presence of the bio-electrode disappears when attached on the skin.

For increasing the transmittance, it is important not only increasing the visible light transmittance of the film but also reducing its reflection. For this, the inventive electrode has a substrate having anti-reflective structure for light on at least one side. Further, it is also effective to attach anti-reflective film on the surface of the bio-electrode as the anti-reflective structure. Because the anti-reflective film can suppress reflection from not only the surface but also metal electro-conductive wiring, the electro-conductive wiring becomes less visible.

An example of the anti-reflective film can include multilayer structure which has a layer having a low refraction index on the surface. An example of the low reflection layer can include material containing fluorine.

An example of the anti-reflective film can also include the anti-reflective film having moth-eye structure. That is, the anti-reflective structure for light is preferably based on the moth-eye structure. A part around a tip of the moth-eye structure is mostly air with a refractive index of 1, and a part near the substrate of the moth-eye structure refractive is dominated by a resin having a refractive index of 1.5 or higher. Because the difference in refractive index is big between the surface of moth-eye structure and the surface near the substrate, the effect of anti-reflection is expected to be higher than the multilayer structure.

An example of the moth-eye structure can include those of which schematic sectional views shown in FIGS. 4 to 6 and those of which schematic top views shown in FIGS. 7 and 8. Among the shapes shown in FIGS. 4 to 6, one shown in FIG. 4 has the highest anti-reflective effect, but has a disadvantage of being deformed easily by external stress. For such a case, ones shown FIG. 5 or 6 are used. Shapes or arrangement of the moth-eye structure may be uniform or non-uniform. The moth-eye structure has preferably a pitch of 1000 nm or less and a depth of 10 nm or more, and more preferably a pitch of 600 nm or less and a depth of 20 nm or more.

Air part in the moth-eye typed anti-reflective film can be infilled with resin having a low refractive index. By this, it is possible to prevent deformation or damage due to external stress.

As shown in FIG. 3, the moth-eye typed anti-reflective film is preferably formed on the opposite side from the side having the electro-conductive layer of the substrate, but may be also on the side having the electro-conductive layer of the substrate too. By having the moth-eye typed anti-reflective film on both sides, a high anti-reflection effect can be obtained.

A substrate having the moth-eye typed anti-reflective film can be used, and a film with the moth-eye typed anti-reflective film can be attached to a substrate.

Configuration of highly sensitive bio-electrode requires not only high ionic conductivity, but also high electron conductivity. The electron conductivity is secured by electro-conductive wiring.

The electro-conductive wiring is preferably formed by printing electro-conductive ink. Thickness of a hair is said to 100 to 200 μm, and a line having the same thickness as this or less is not visible by the naked eye. Accordingly, electro-conductive wiring having width of 200 μm or less has good transparency. The width of the electro-conductive wiring is preferably 200 μm or less, more preferably 100 μm or less, further preferably 80 μm or less, and more further preferably 50 μm or less. The electro-conductive wiring may be parallel to the direction of expansion and contraction, but accordion-typed one can prevent wire breaking due to its expansion and contraction and can have an advantage of less reduction in electric conductivity.

The electro-conductive ink is preferably electro-conductive paste having conductive particles including of gold, silver, copper, nickel, or alloy thereof. A size of the particle is preferably in the range of 1 nm to 200 μm in diameter. In addition to the conductive particle and the solvent, a resin may be added. The example of the resin can include poly (meth)acrylate, polyurethane, polystyrene butadiene, polyacrylonitrile, polyvinyl alcohol, polyvinylpyrrolidone, cellulose, or silicone.

Furthermore, the electro-conductive wiring can be a fusion layer of metal nanowires. The metal nanowires preferably include gold, silver, copper, nickel, or alloy thereof. The size of the metal nanowires is preferably in the range of 1 to 200 nm in diameter, and in the range of 0.1 to 500 μm in length. Using metal nanowires enables to form the electro-conductive wiring with higher transparency.

The inventive bio-electrode can be used to measure not only electrocardiogram, but also electromyogram, brain wave, and breathing rate. Additionally, not only by measuring signals released from the skin but also by providing electric signals with the skin, it is possible to send signals to muscles or control brain wave. For example, it is considered to be applied for enhancing performance, stimulating muscles to reduce fatigue during swimming, and enhancing relaxation in bathing.

<Composition of Ion Polymer Containing Layer>

Below, each component to form the ion polymer containing layer of the present invention will be described in further detail.

[Ion Polymer (Salt)]

Ion polymer which is a material to form the ion polymer containing layer used for the inventive bio-electrode can contain, as an ionic material, a polymer having ionic repeating unit-a selected from the group consisting of salts of ammonium, lithium, sodium, and potassium formed with any of fluorosulfonic acid, fluorosulfonimide, and N-carbonyl-fluorosulfonamide.

The repeating unit-a can have a partial structure shown by any of the following general formulae (1)-1 to (1)-4, (1)-1

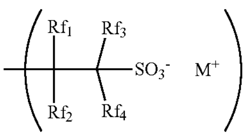

(1)-2

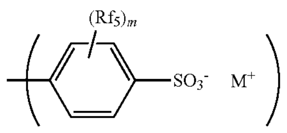

-continued (1)-3

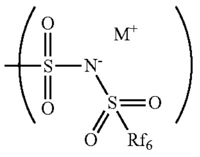

(1)-4

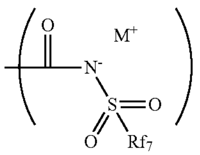

wherein $Rf_1$ and $Rf_2$ each represent a hydrogen atom, a fluorine atom, an oxygen atom, a methyl group, or a trifluoromethyl group, provided that when $Rf_1$ and $Rf_2$ represent an oxygen atom, the single oxygen atom represented by $Rf_1$ and $Rf_2$ bonds to a single carbon atom to form a carbonyl group; $Rf_3$ and $Rf_4$ each represent a hydrogen atom, a fluorine atom, or a trifluoromethyl group, and at least one of $Rf_1$ to $Rf_4$ is a fluorine atom or a trifluoromethyl group; $Rf_5$, $Rf_6$, and $Rf_7$ each represent a fluorine atom, a trifluoromethyl group, a linear or branched alkyl group having 1 to 4 carbon atoms, or an aryl group having 6 to 10 carbon atoms, and have at least one fluorine atom or trifluoromethyl group; and $M^+$ represents an ion selected from the group consisting of an ammonium ion, a sodium ion, and a potassium ion; "m" represents an integer of 1 to 4.

One or more repeating unit-a selected from the group consisting of salts of ammonium, sodium, and potassium formed with any of fluorosulfonic acid shown by the above general formulae (1)-1 and (1)-2, sulfonimide shown by the general formulae (1)-3, or N-carbonyl-fluorosulfonamide shown by the general formulae (1)-4 preferably includes at least one selected from the group consisting of repeating units-A1 to -A7 shown by the following general formulae (2), (2)

A1

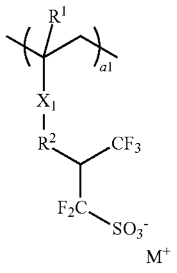

A2

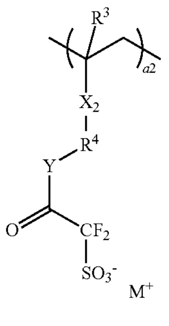

-continued

A3

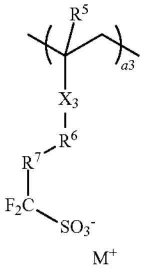

A4

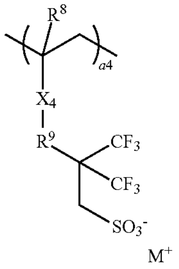

A5

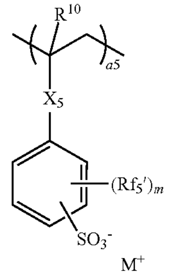

A6

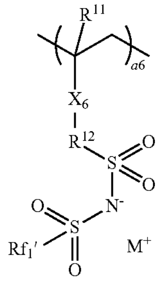

A7

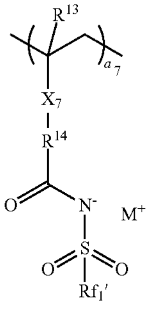

wherein, $R^1$, $R^3$, $R^5$, $R^3$, $R^{10}$, $R^{11}$, and $R^{13}$ each independently represent a hydrogen atom or a methyl group; $R^2$, $R^4$, $R^6$, $R^9$, $R^{12}$, and $R^{14}$ each independently represent a single bond or a linear, branched, or cyclic hydrocarbon group having 1 to 13 carbon atoms, the hydrocarbon group optionally having either or both of an ester group and an ether group; $R^7$ represents a linear or branched alkylene group having 1 to 4 carbon atoms, and one or two hydrogen atoms in $R^7$ are optionally substituted with a fluorine atom; $X_1$, $X_2$, $X_3$, $X_4$, $X_6$, and $X_7$ each independently represent any of a single bond, a phenylene group, a naphthylene group, an ether group, an ester group, and an amide group; $X_5$ represents any of a single bond, an ether group, and an ester group; Y represents an oxygen atom or a —$NR^{19}$— group; $R^{19}$ represents any of a hydrogen atom, a linear, branched, or cyclic alkyl group having 1 to 12 carbon atoms, and phenyl group, optionally include one or more group selected from the group consisting of ether group, carbonyl group, ester group, and amide group; and Y forms a ring together with $R^4$; $Rf_1'$ and $Rf_5'$ each represent a fluorine atom, a trifluoromethyl group, or a linear or branched alkyl group having 1 to 4 carbon atoms, and have at least one fluorine atom; "m" represents an integer of 1 to 4; a1, a2, a3, a4, a5, a6, and a7 satisfy $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, and $0 < a1+a2+a3+a4+a5+a6+a7 \le 1.0$; and $M^+$ represents an ion selected from the group consisting of an ammonium ion, a sodium ion, and a potassium ion.

In the above general formulae (2), a1 to a7 are ratios of repeating units-A1 to -A7 respectively.

(Repeating Unit A)

Among the repeating units-A1 to -A7 shown by the above general formulae (2), the repeating units-A1 to -A5 can be obtained from fluorosulfonic acid salt monomers specifically exemplified below.

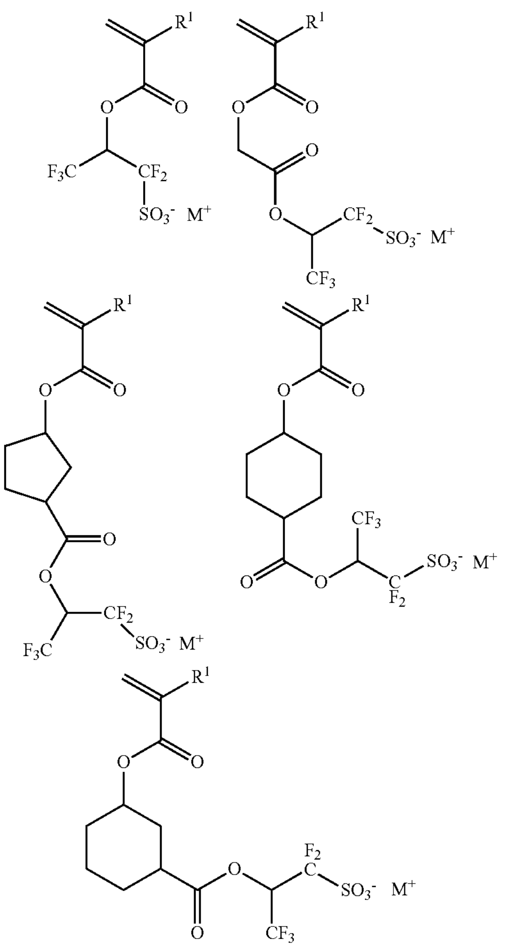

-continued
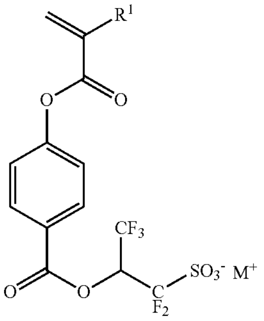
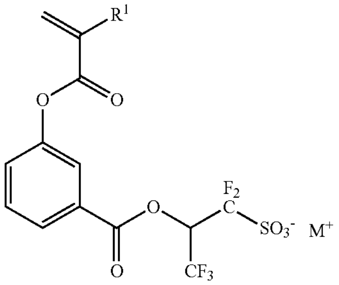
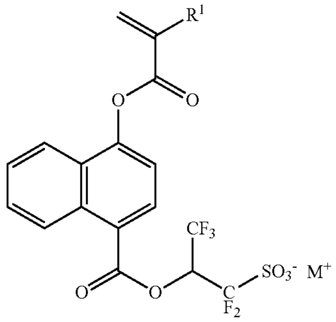
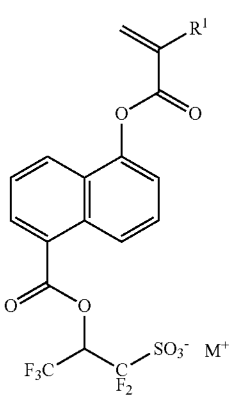
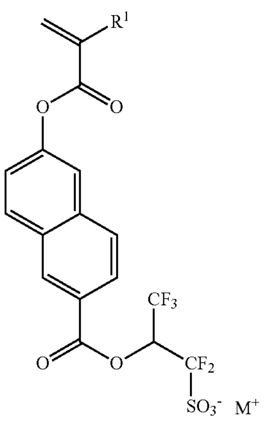
-continued
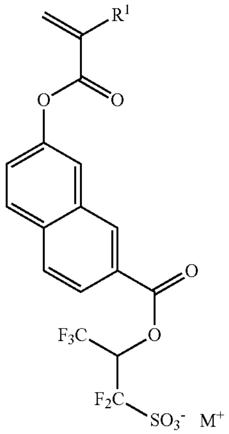
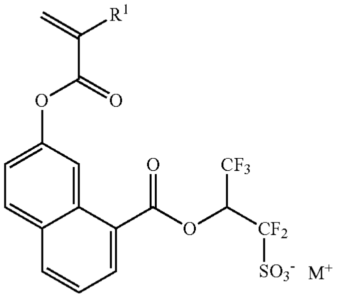
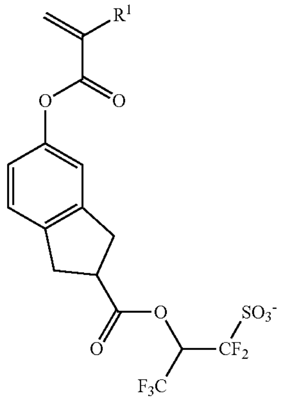
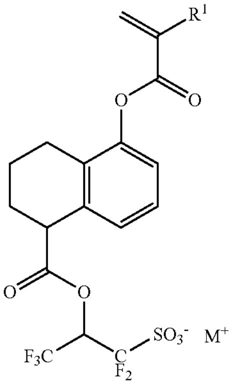
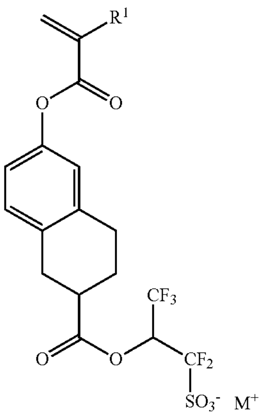
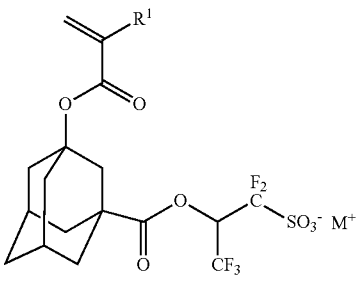

-continued
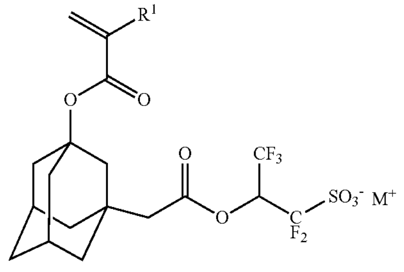
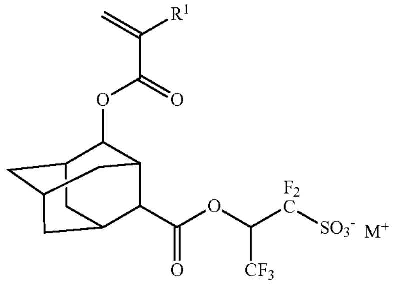
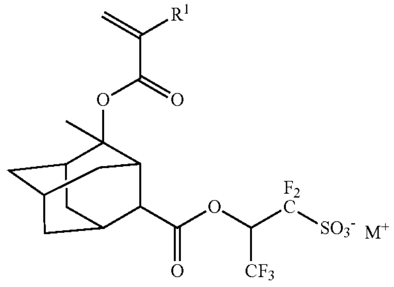
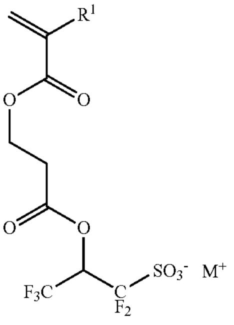
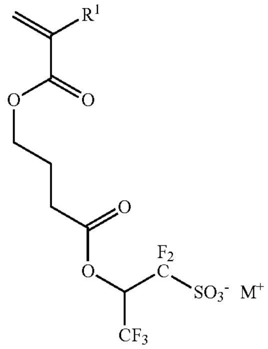
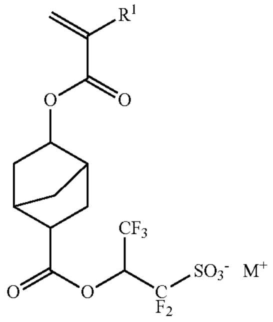
-continued
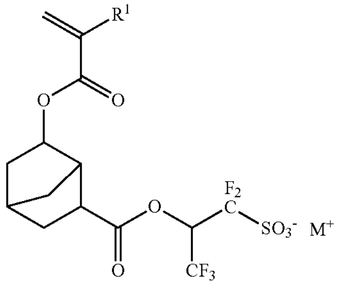
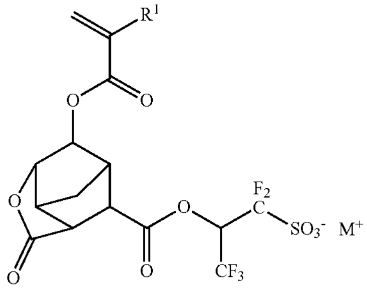
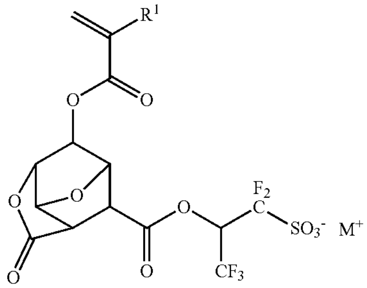
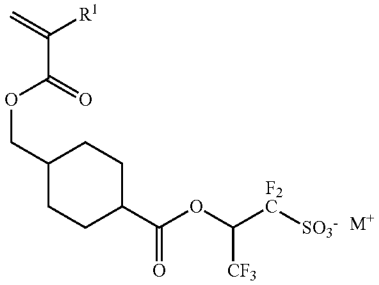
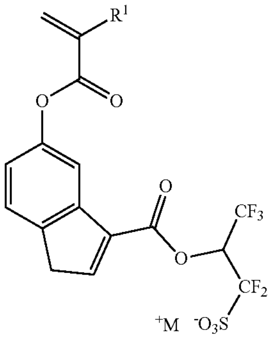

-continued
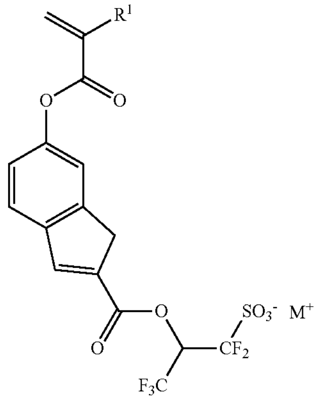
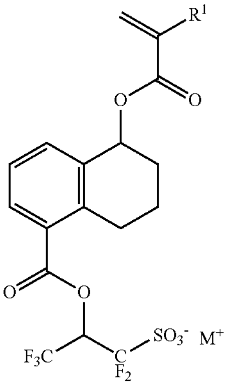
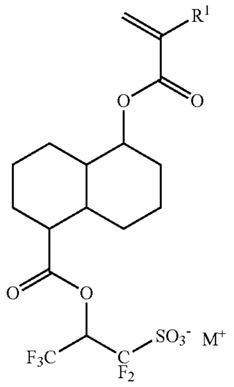
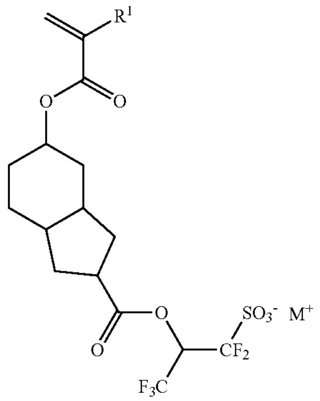
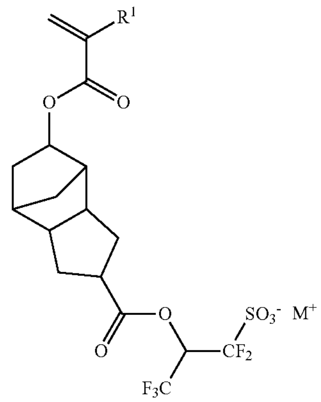
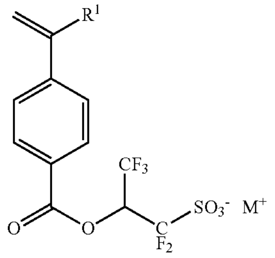
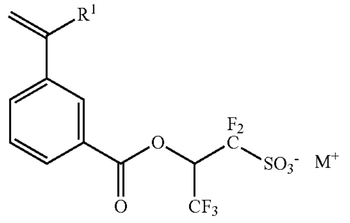
-continued
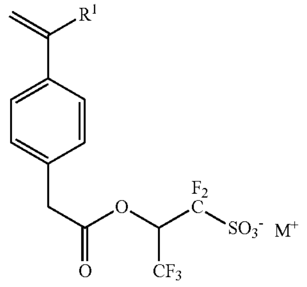
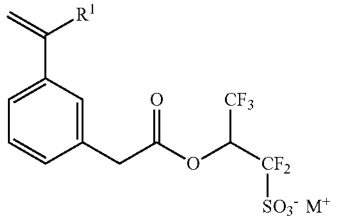
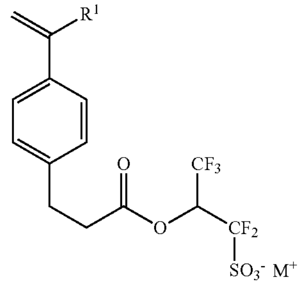
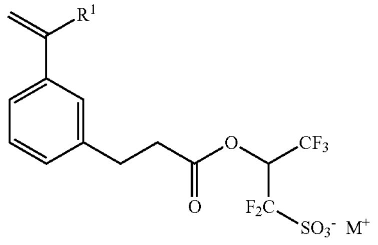
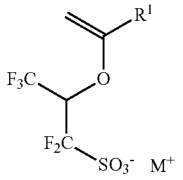
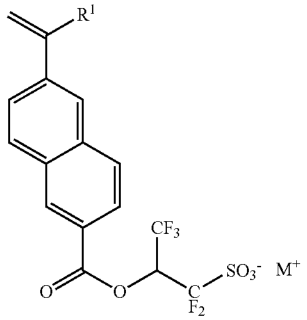
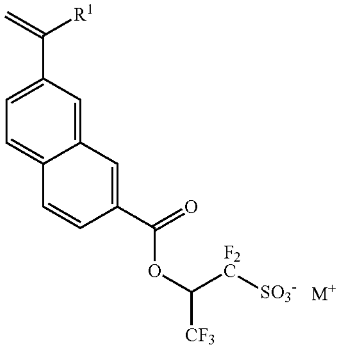

-continued
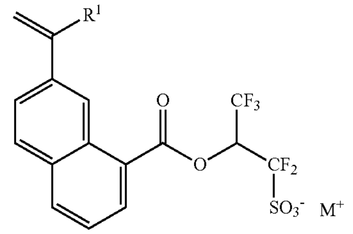
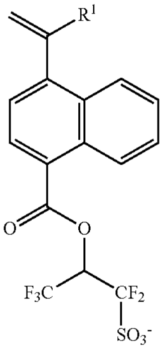
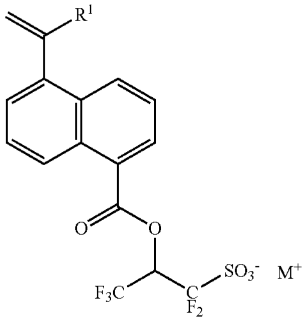
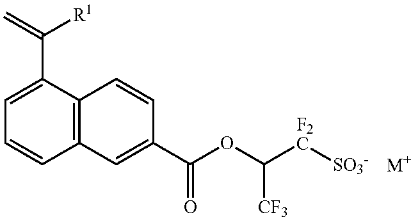
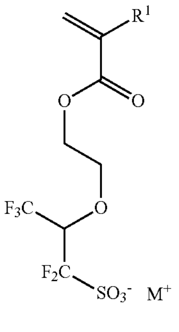
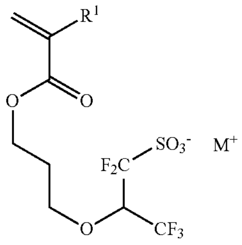
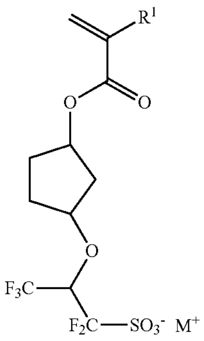
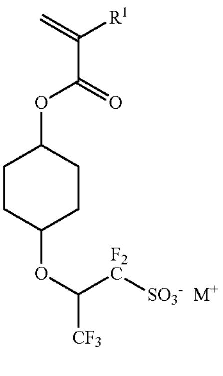
-continued
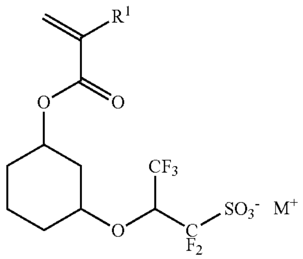
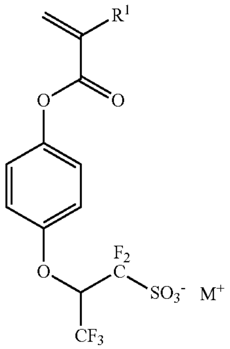
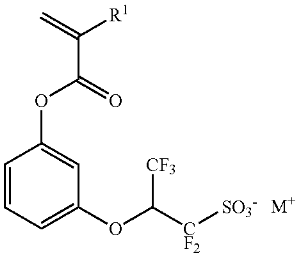
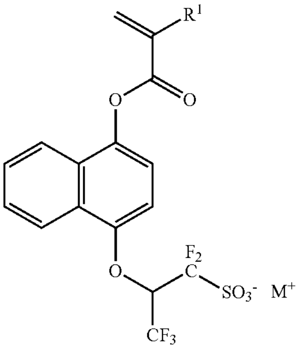
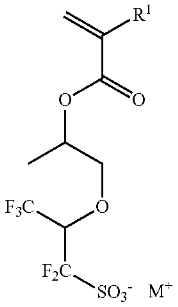
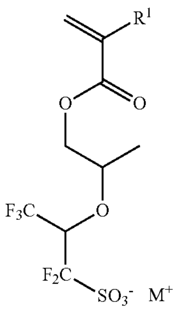
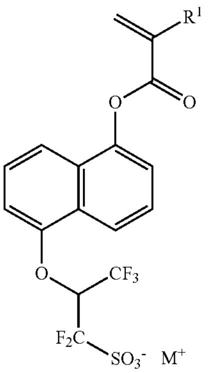

-continued
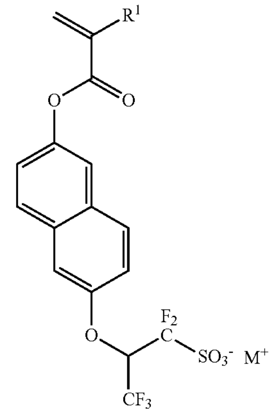
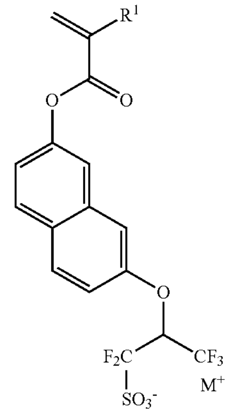
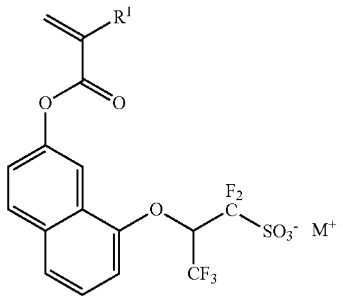
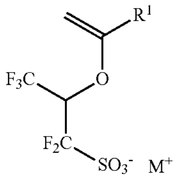
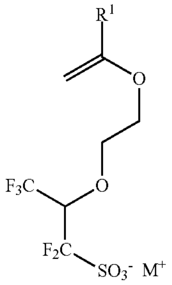
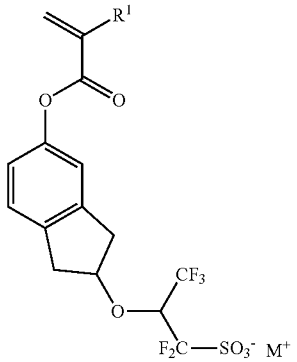
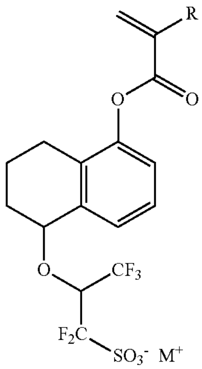
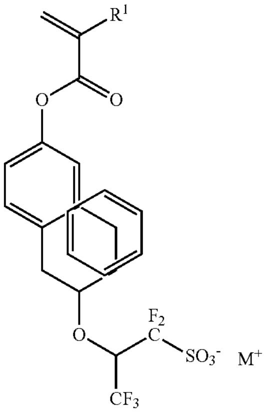
-continued
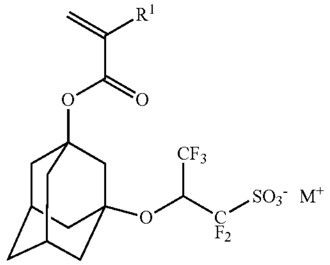
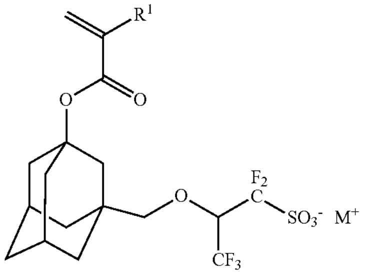
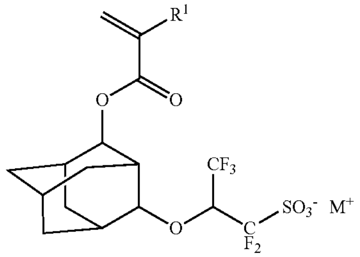
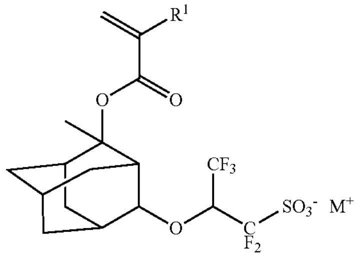
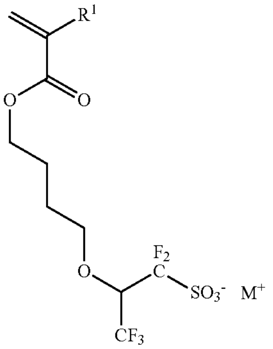
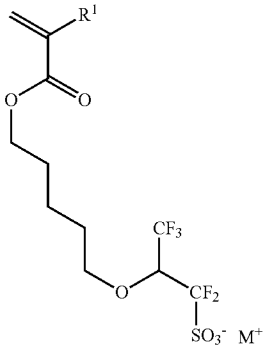

-continued
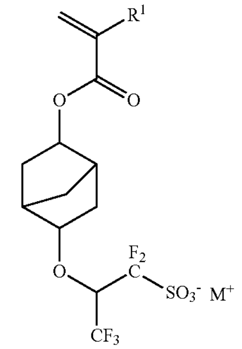
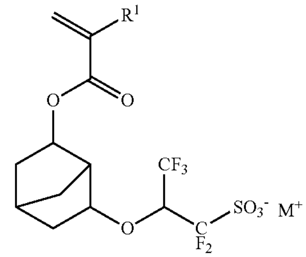
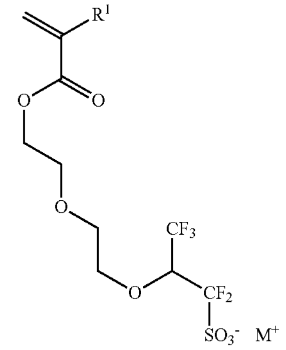
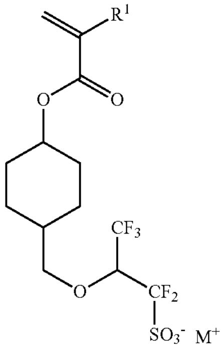
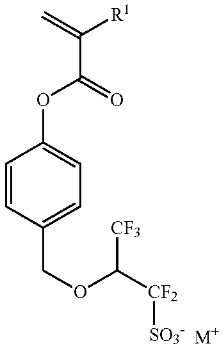
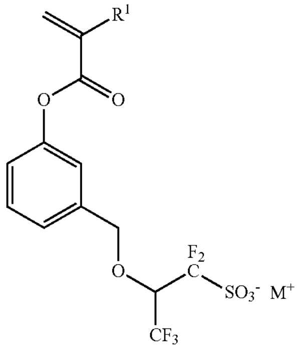
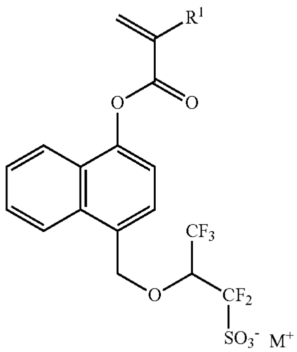
-continued
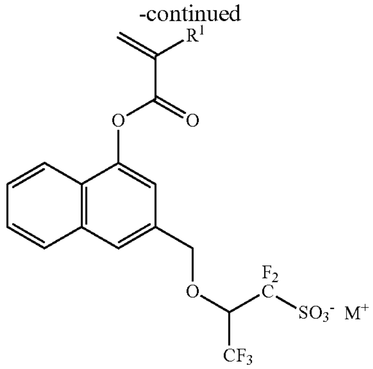
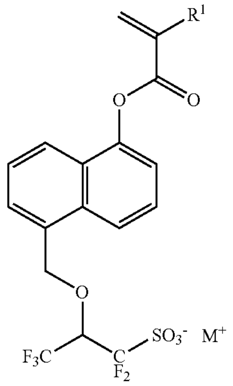
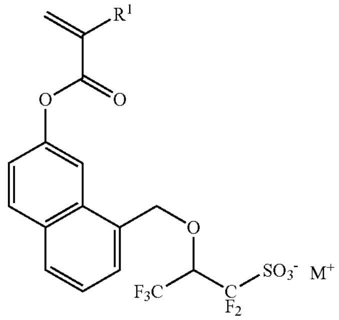
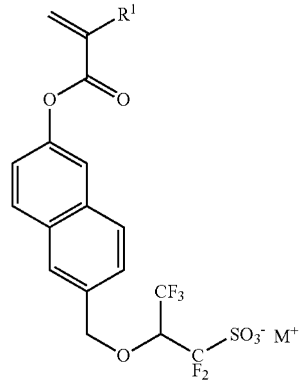
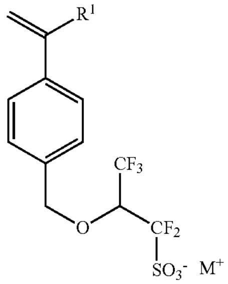
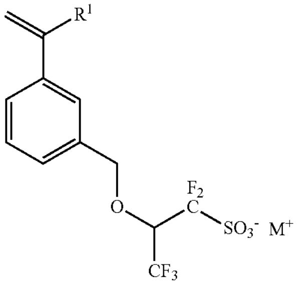
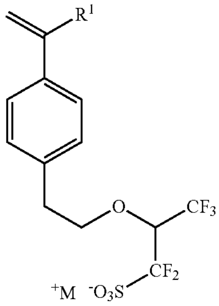
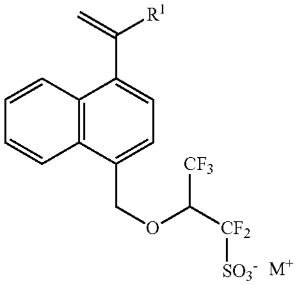

-continued
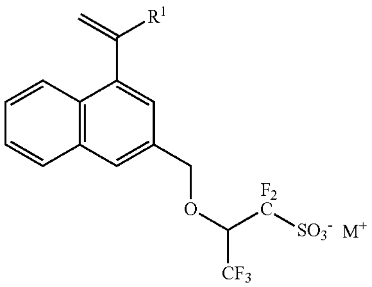
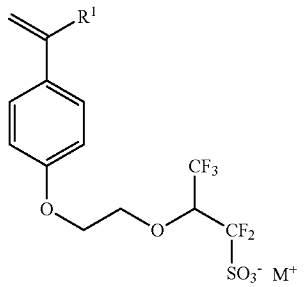
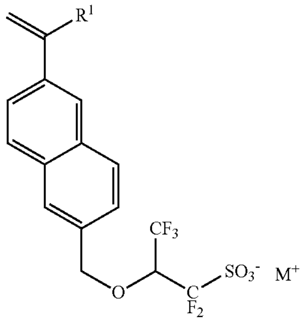
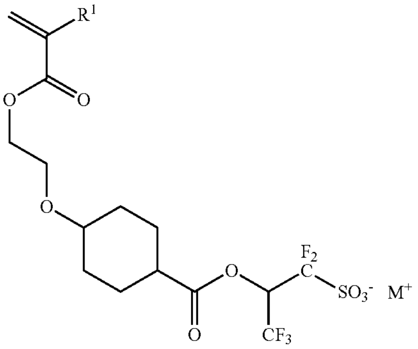
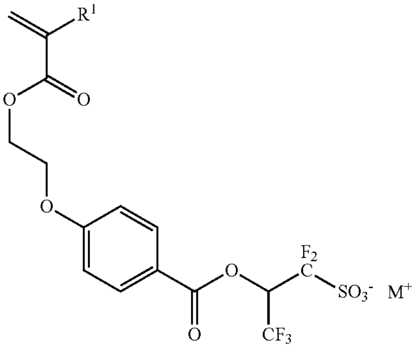
-continued
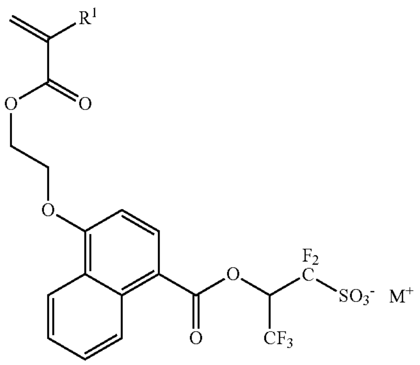
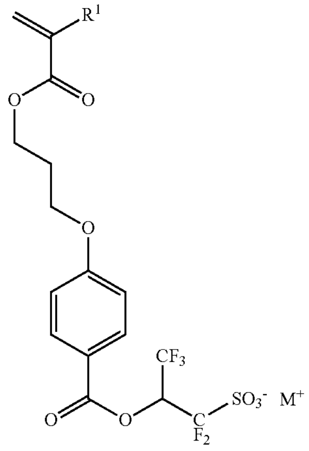
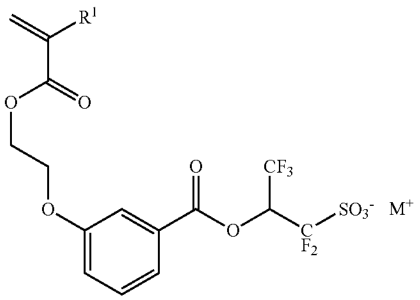
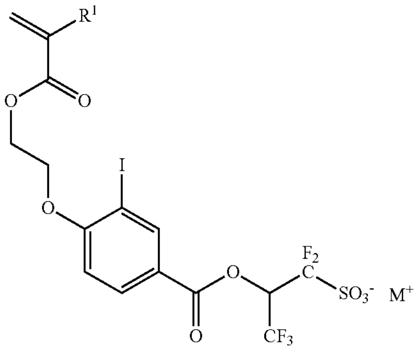

-continued
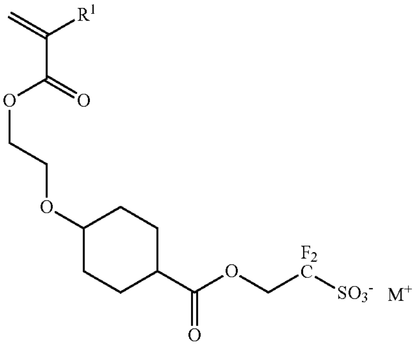
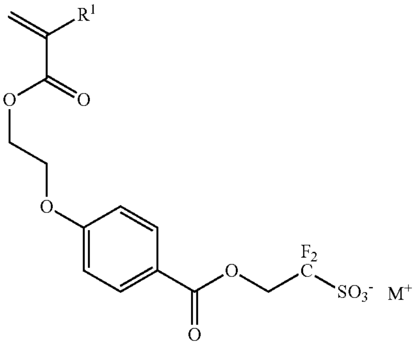
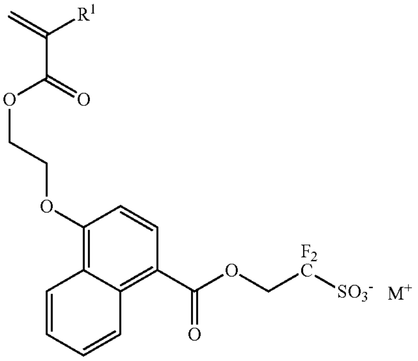
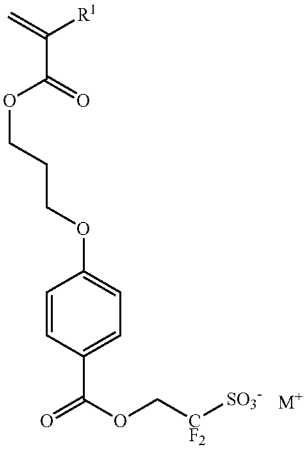
-continued
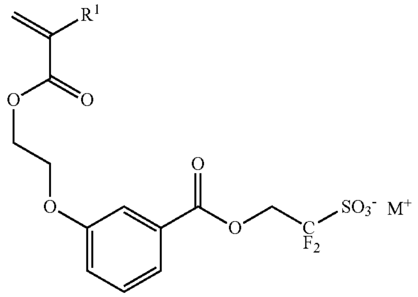
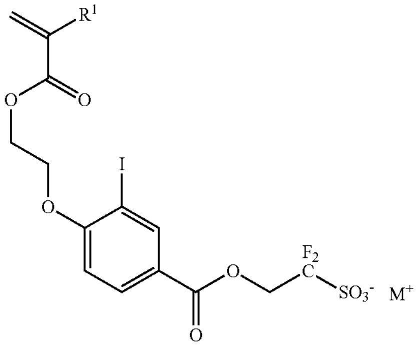
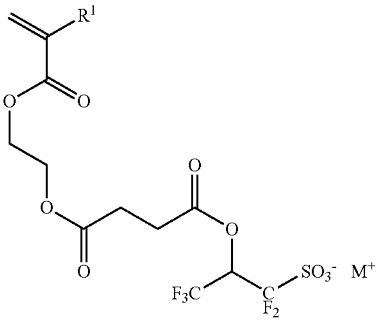
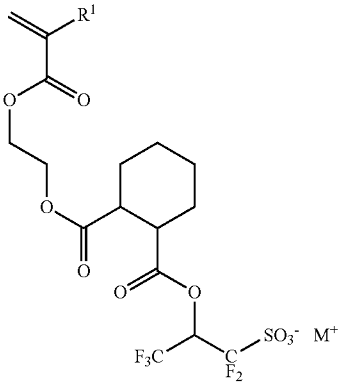

-continued
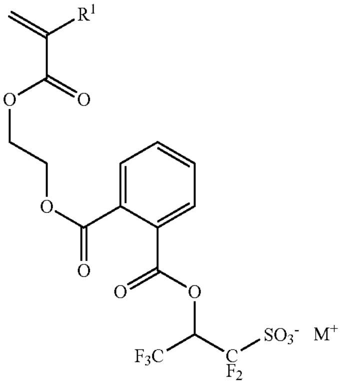
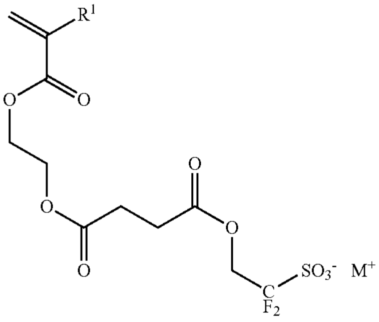
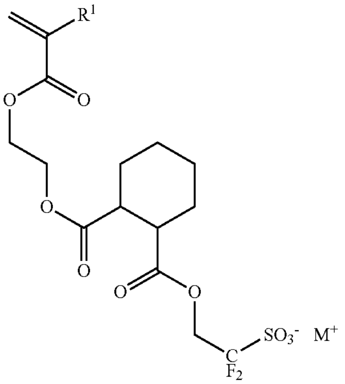
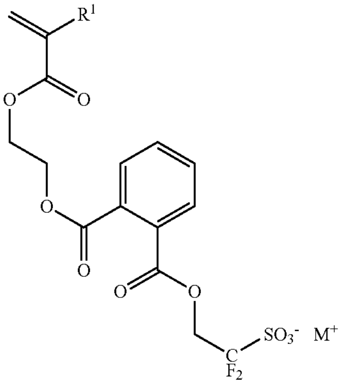
-continued
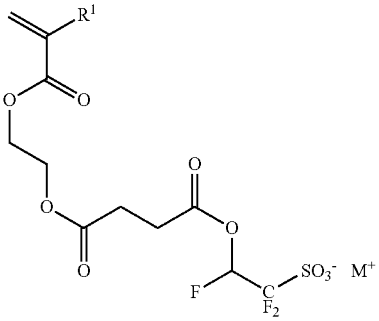
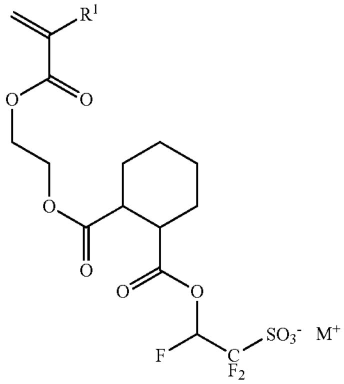
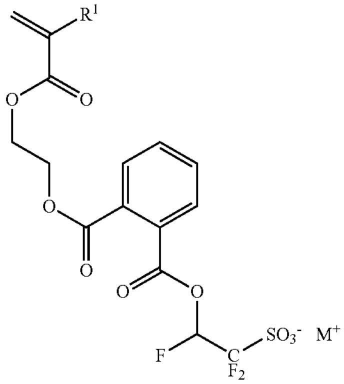
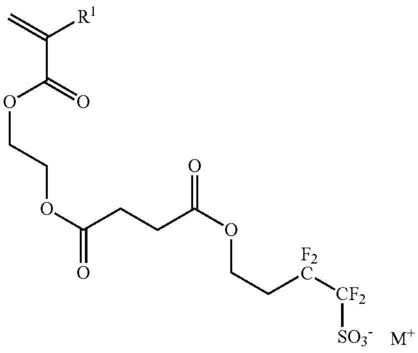

-continued
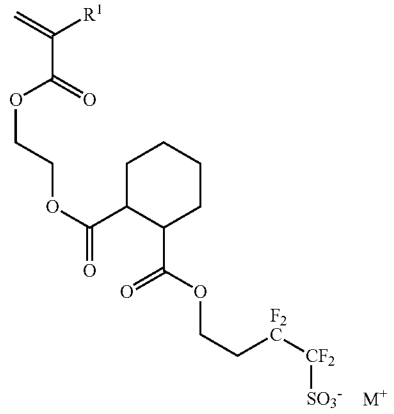
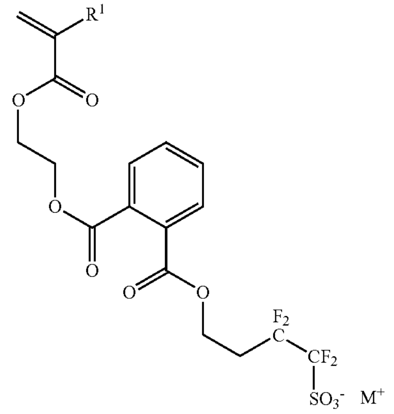
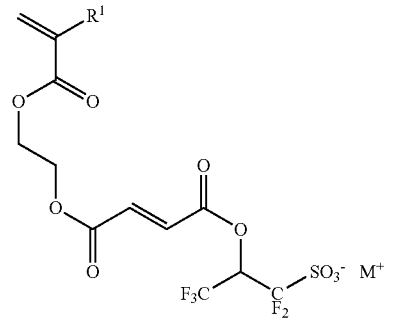
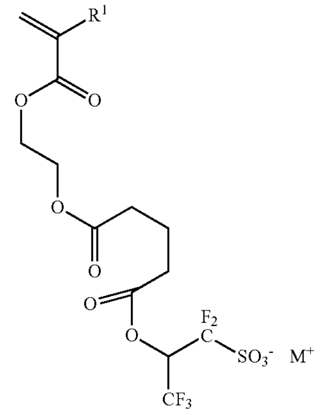
-continued
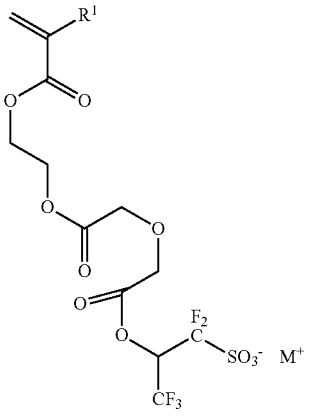
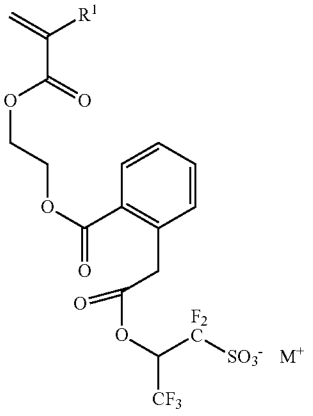
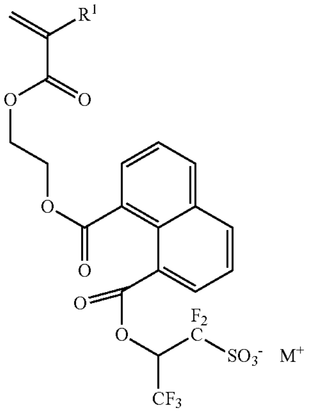
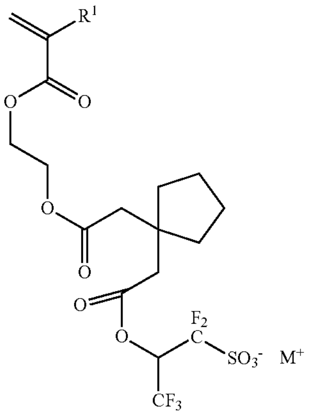

-continued
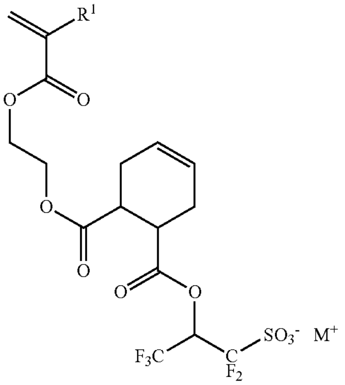
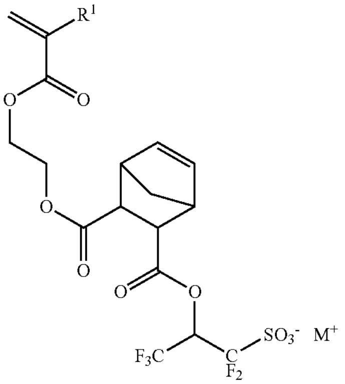
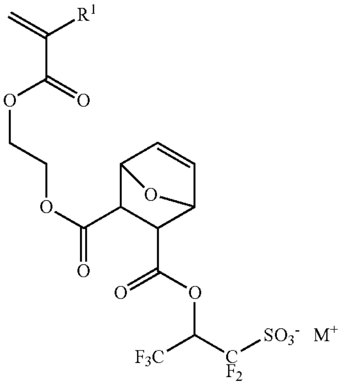
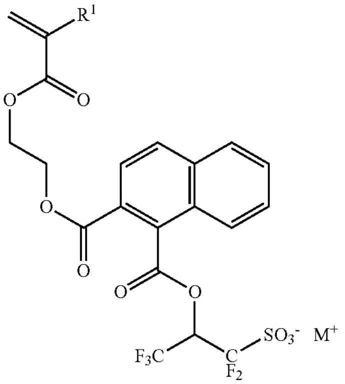
-continued
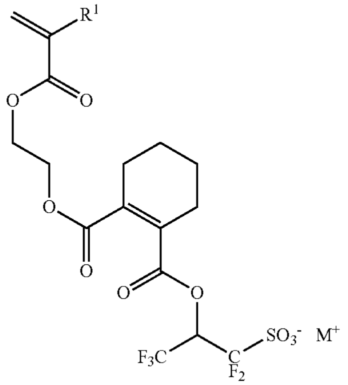
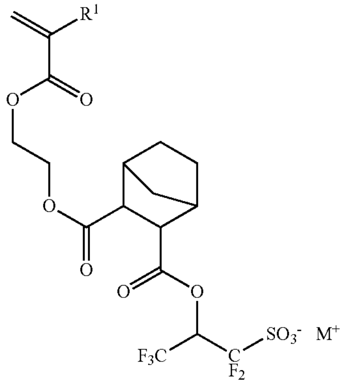
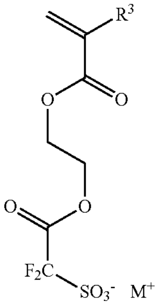
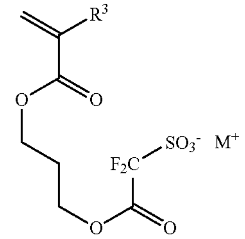
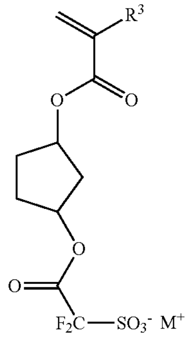
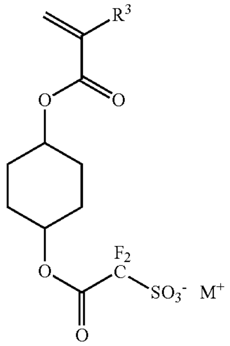

-continued
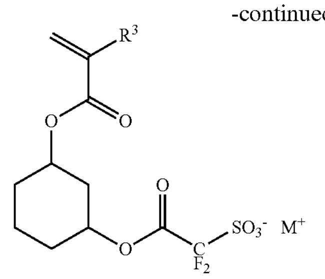
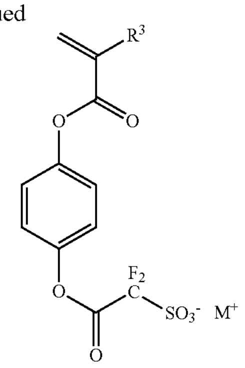
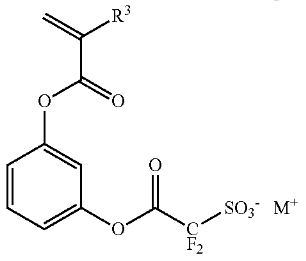
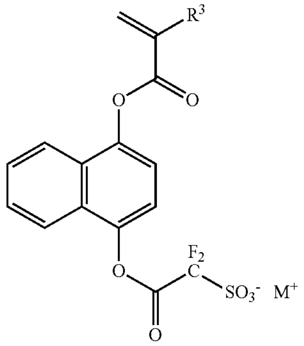
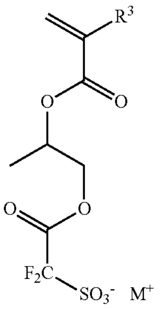
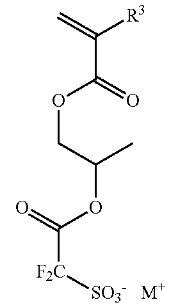
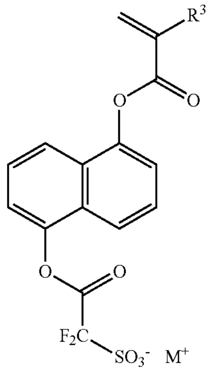
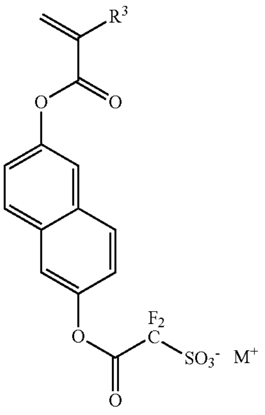
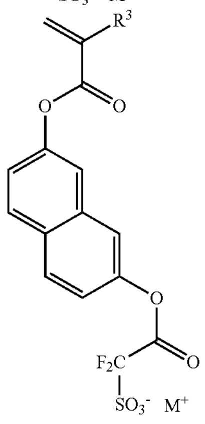
-continued
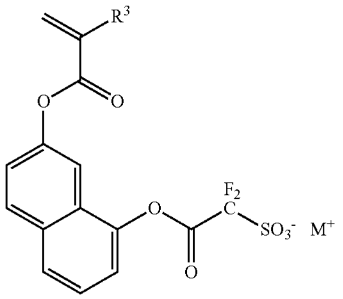
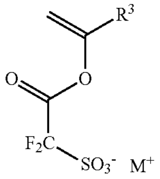
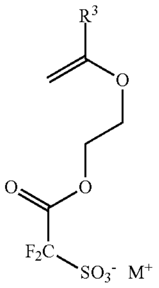
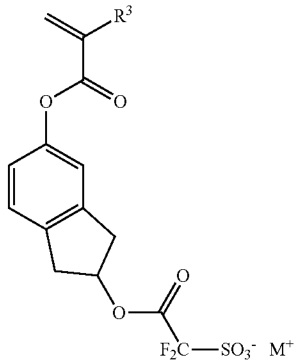
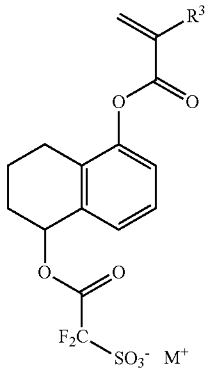
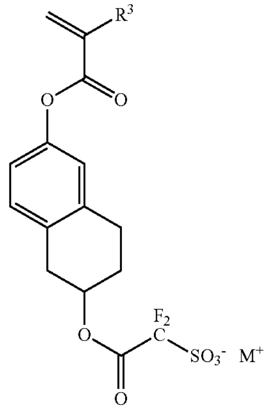
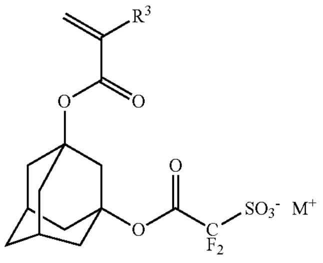

-continued
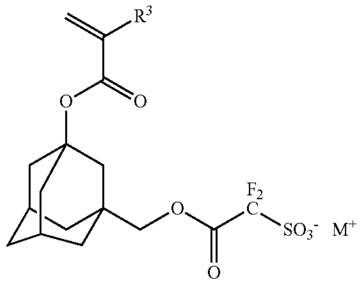
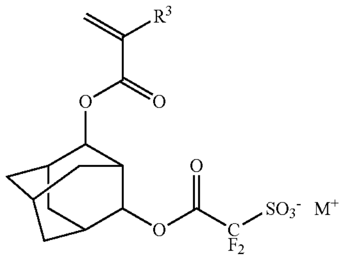
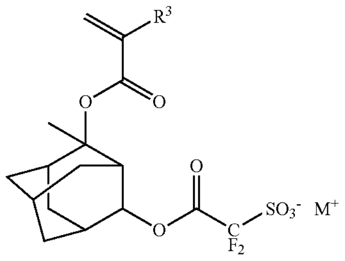
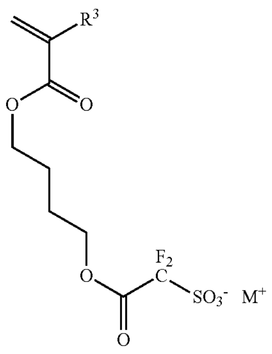
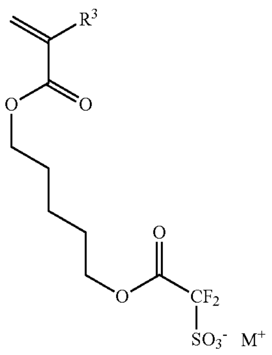
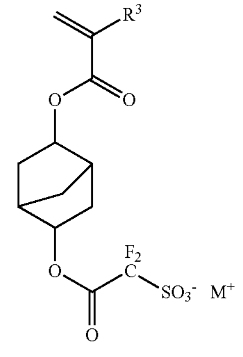
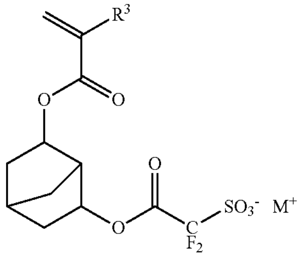
-continued
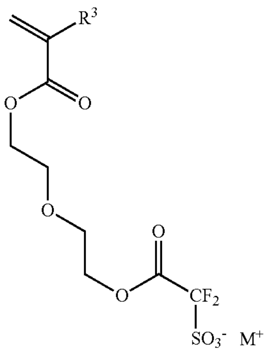
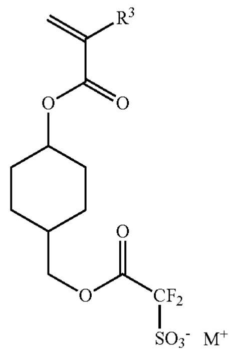
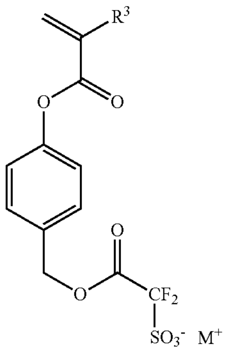
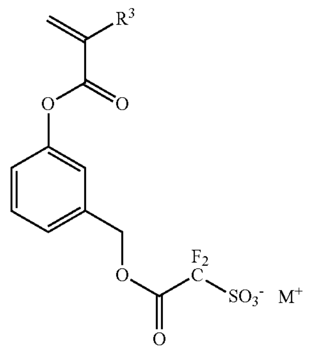
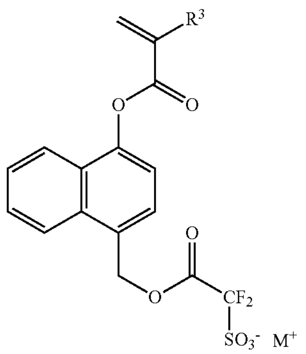
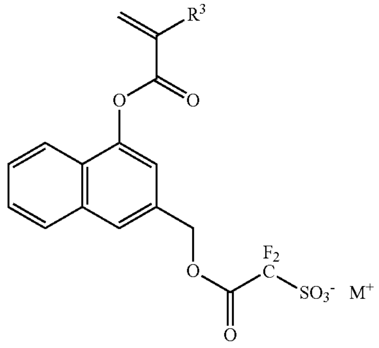

-continued
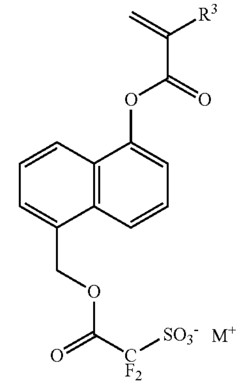
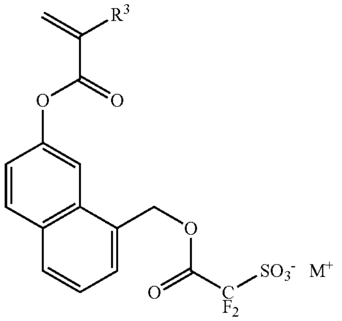
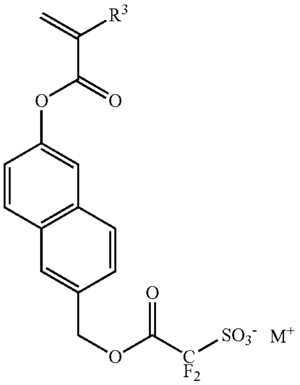
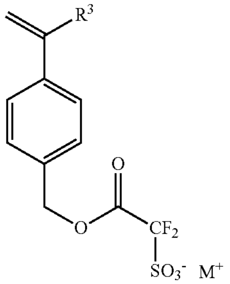
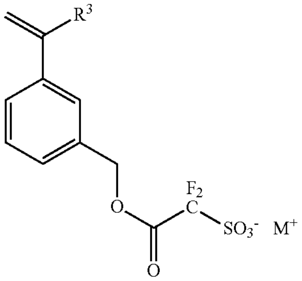
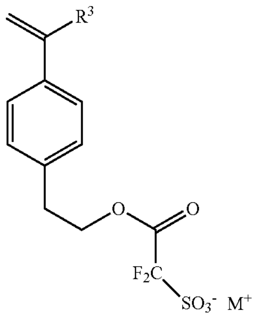
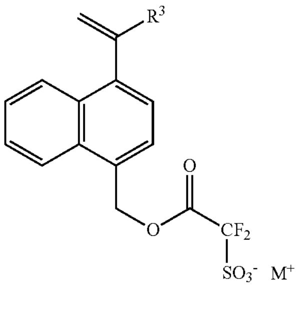
-continued
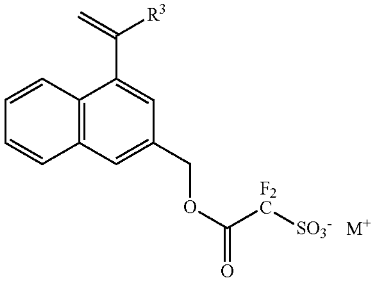
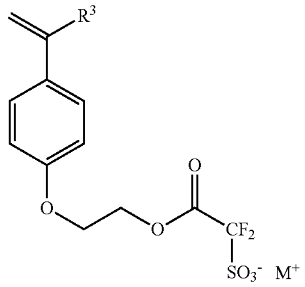
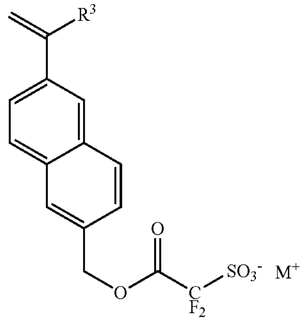
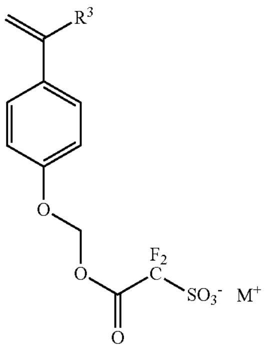
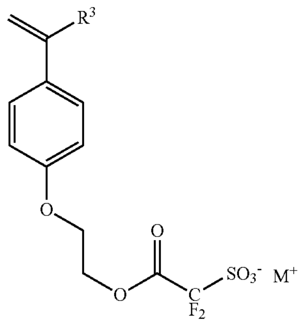
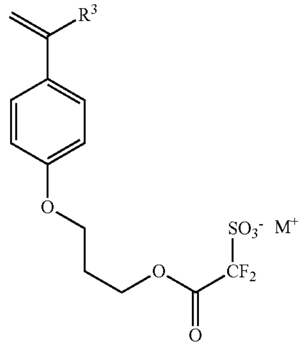

-continued
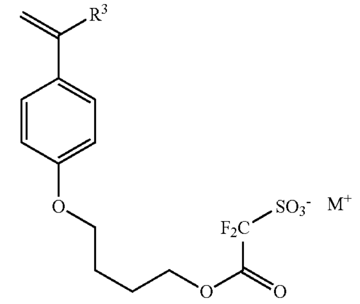
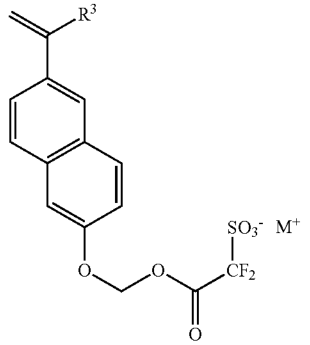
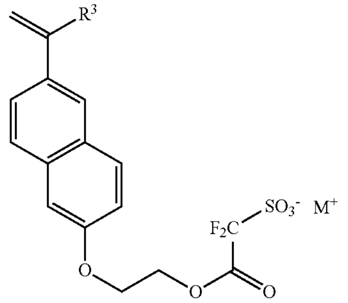
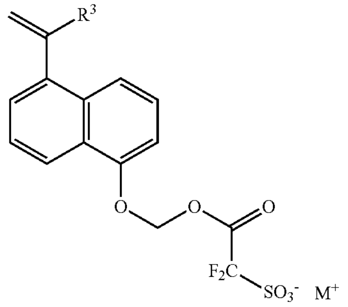
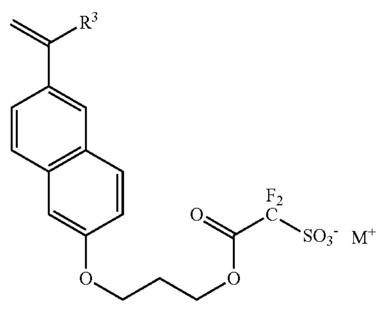
-continued
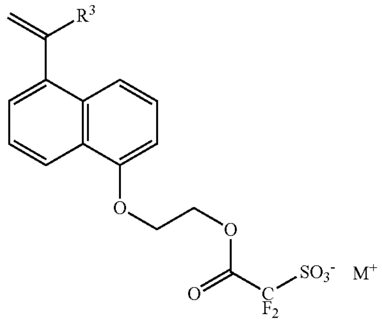
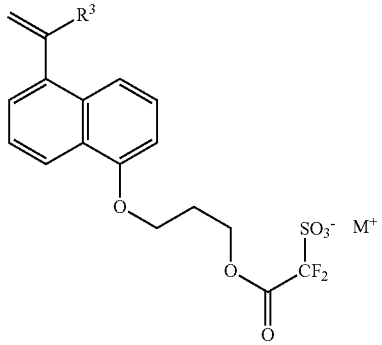
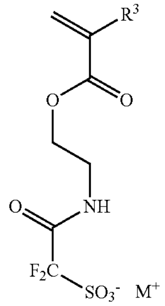
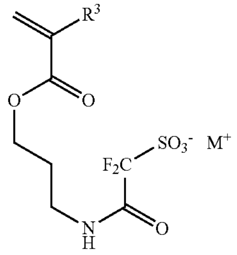
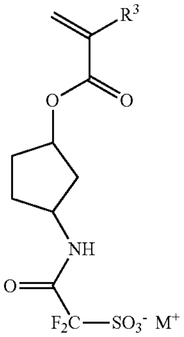
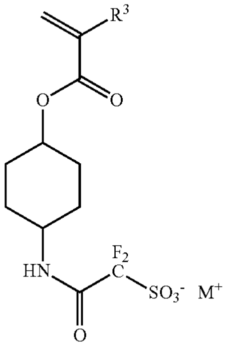
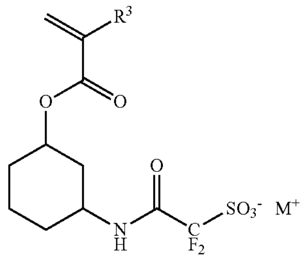
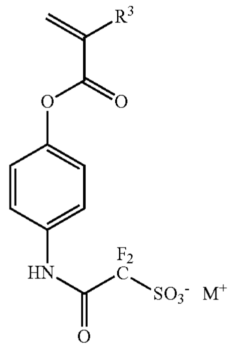

-continued
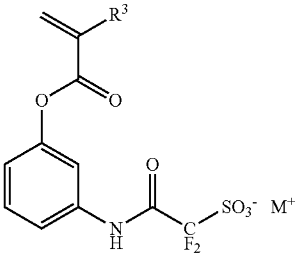
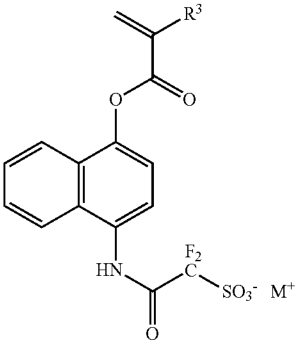
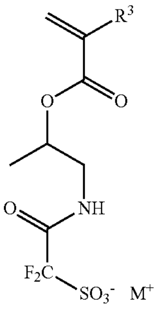
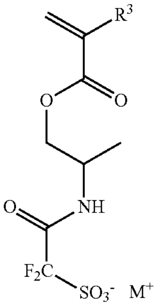
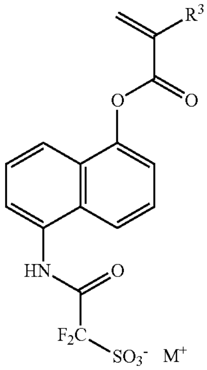
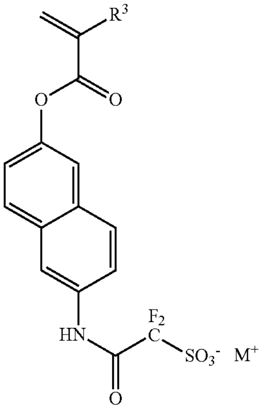
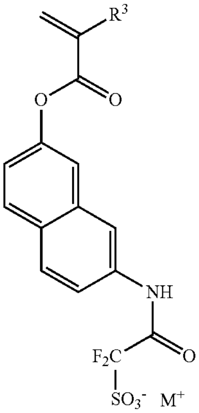
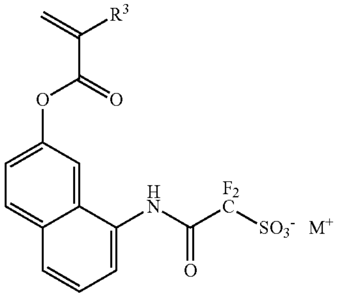
-continued
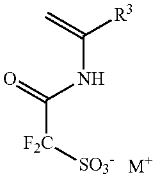
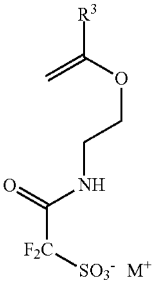
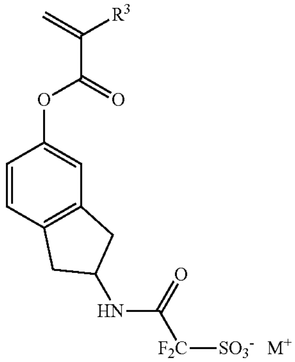
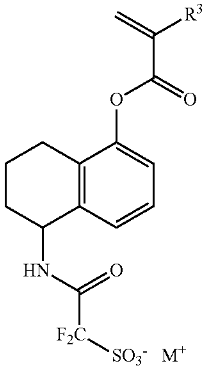
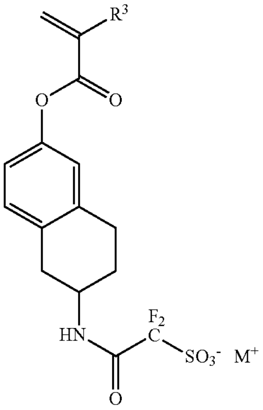
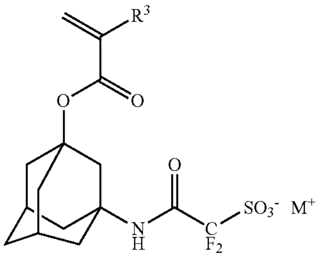
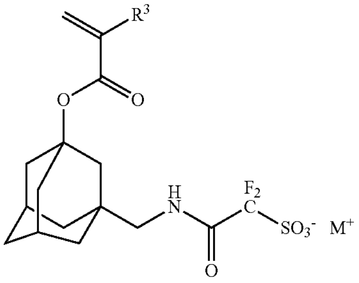

-continued
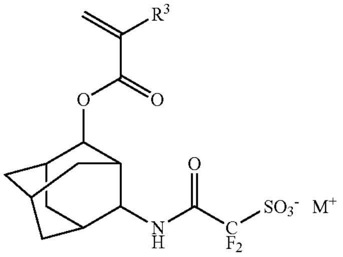
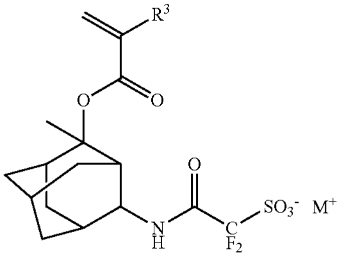
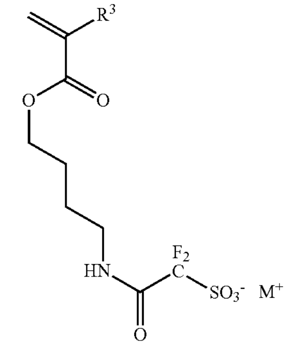
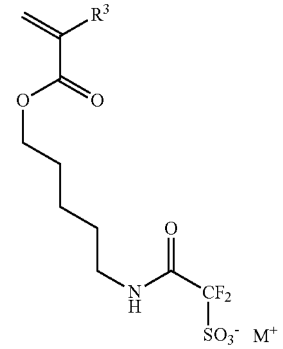
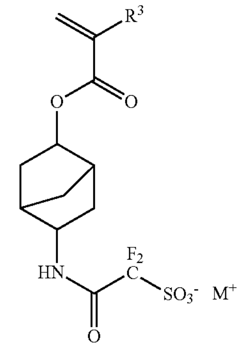
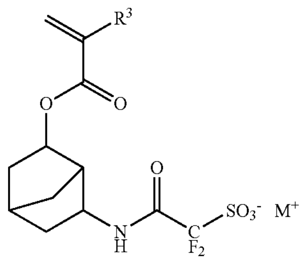
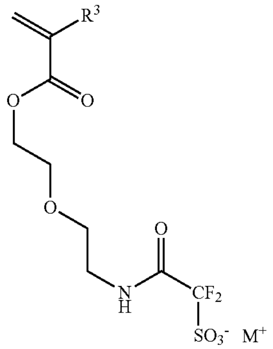
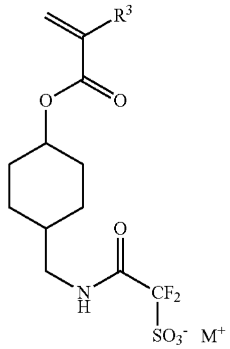
-continued
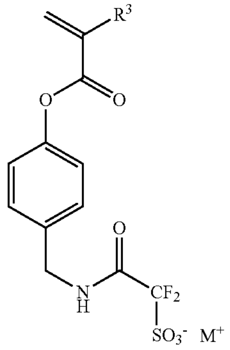
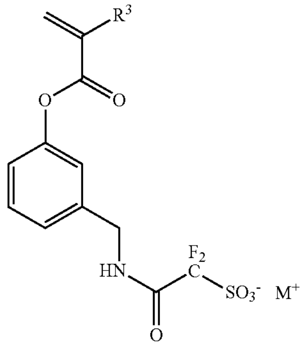
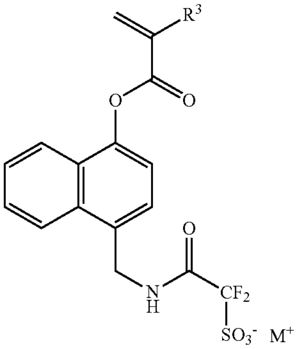
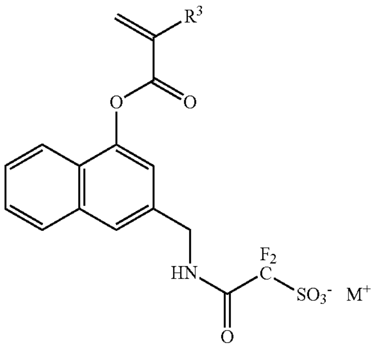
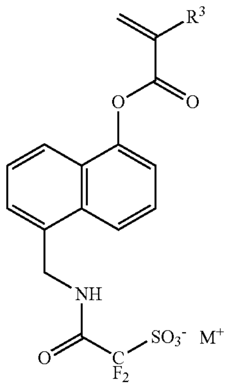

-continued
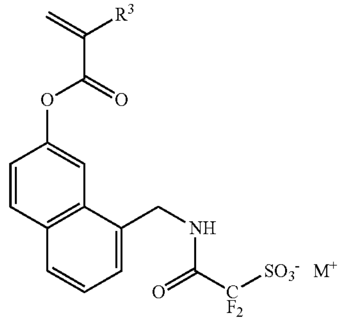
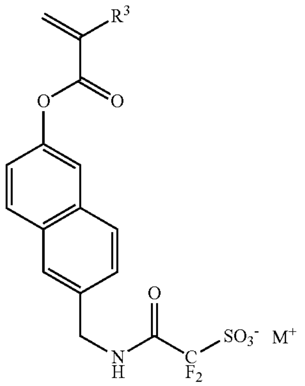
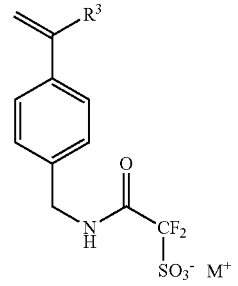
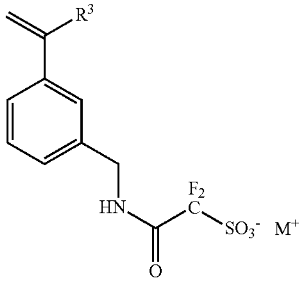
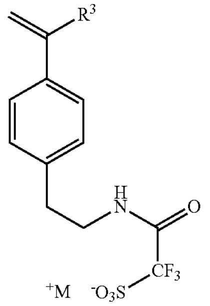
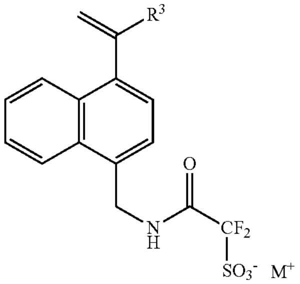
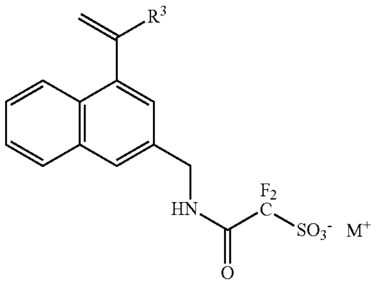
-continued
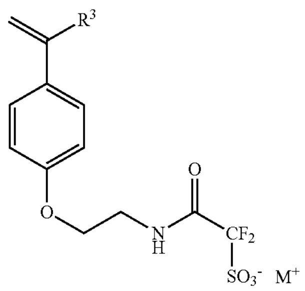
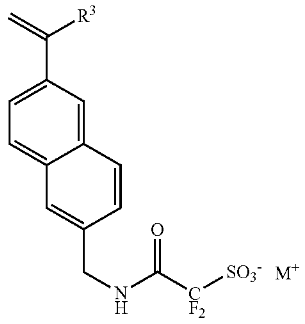
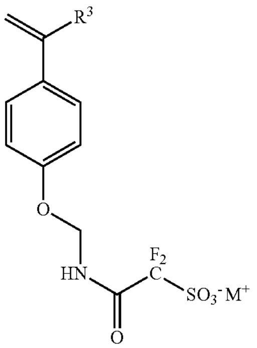
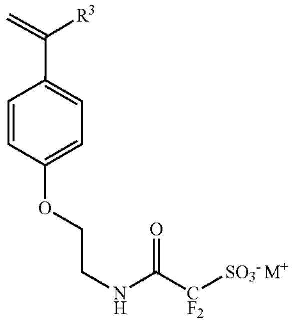
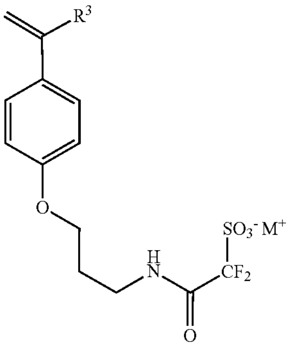
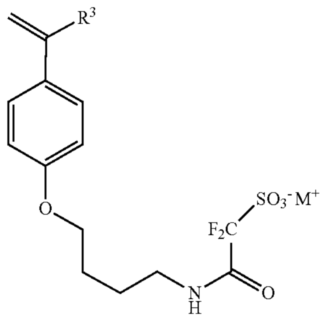

-continued
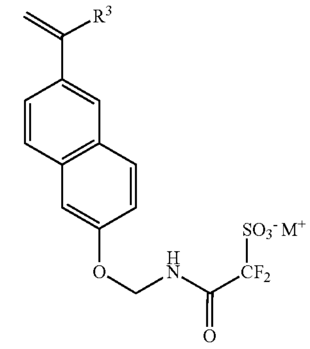
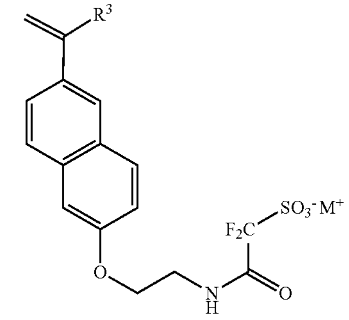
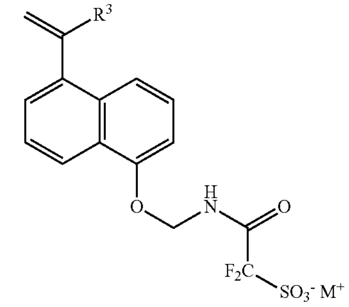
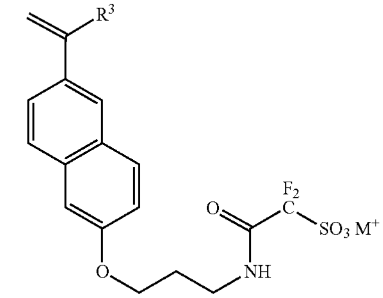
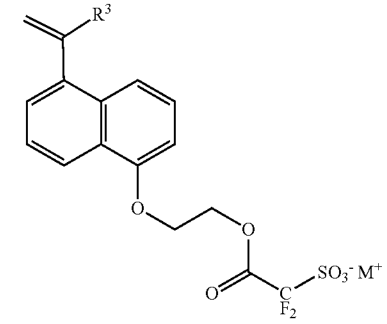
-continued
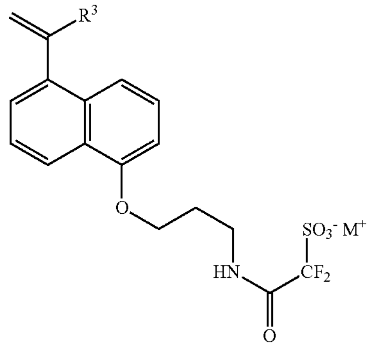
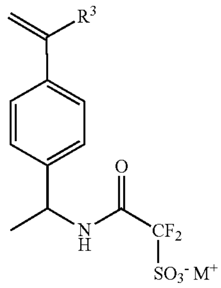
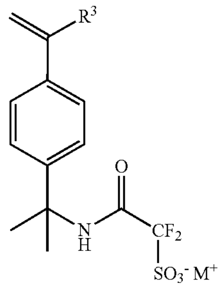
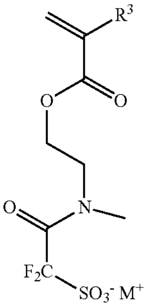
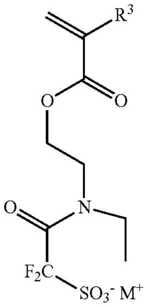
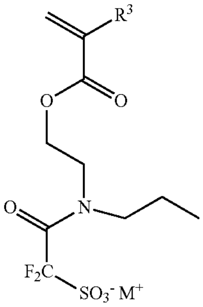
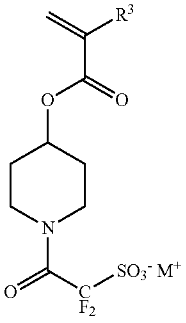
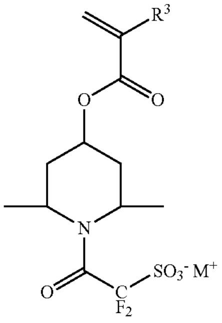
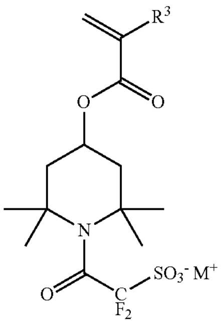
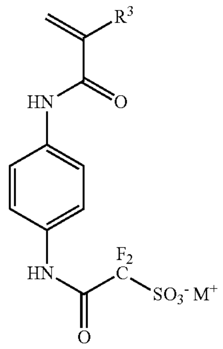

-continued
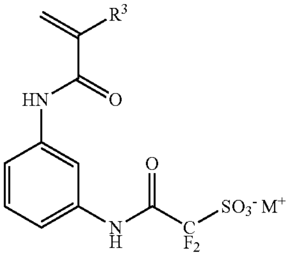
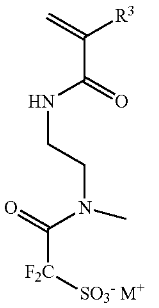
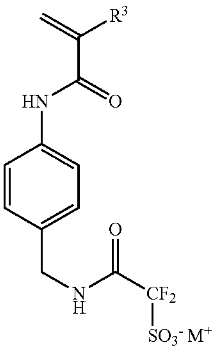
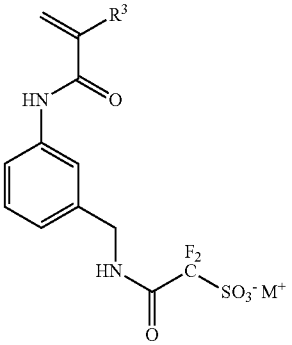
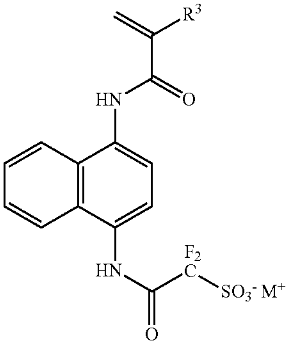
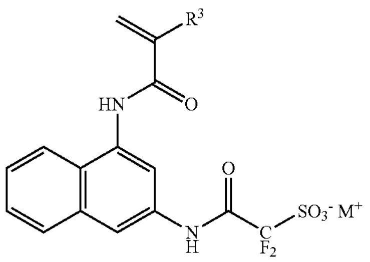
-continued
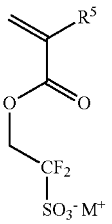
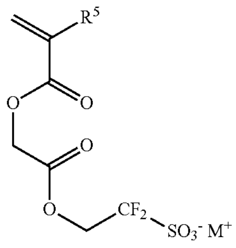
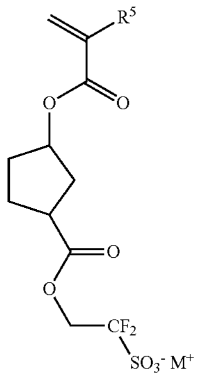
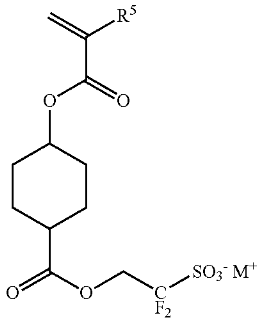
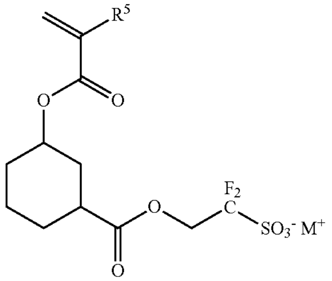
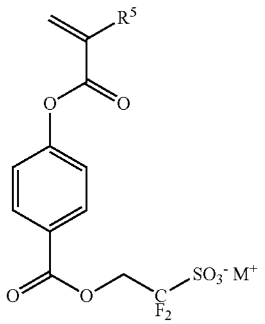
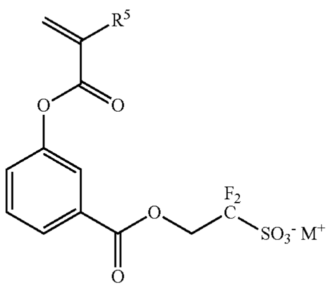

-continued
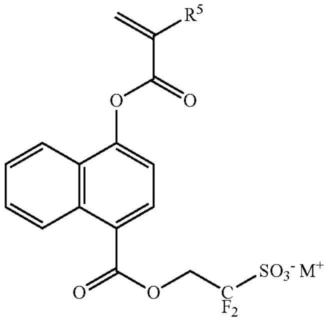
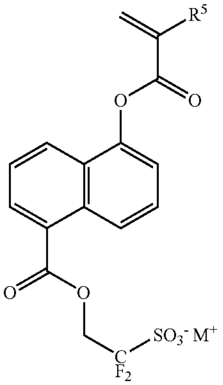
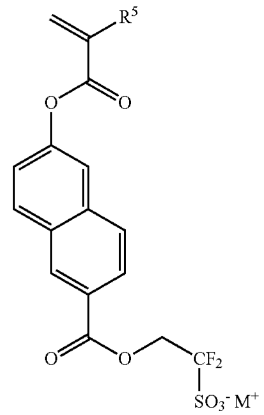
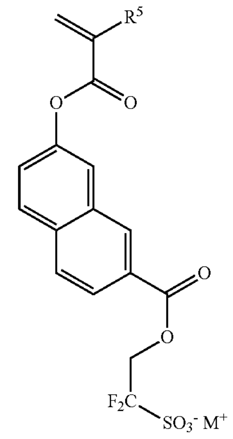
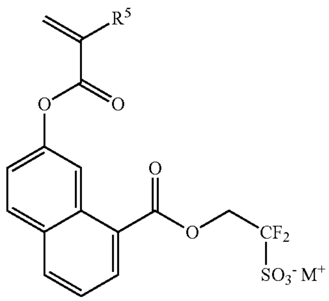
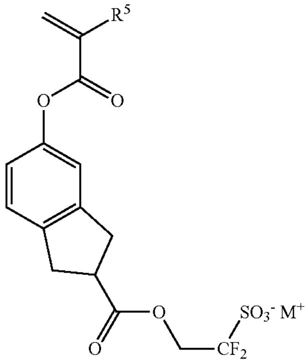
-continued
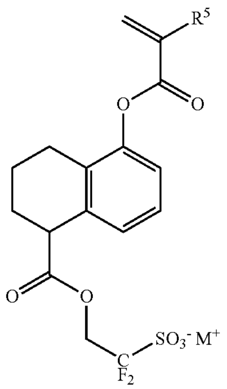
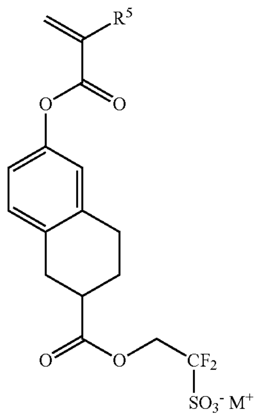
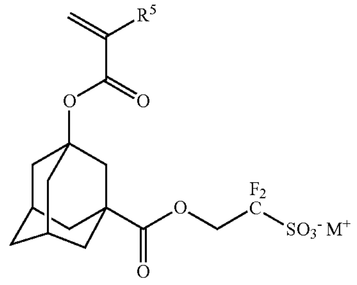
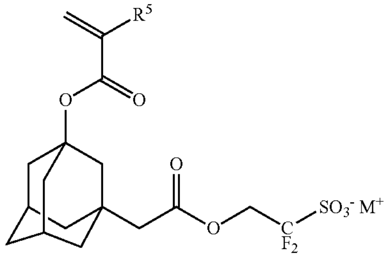
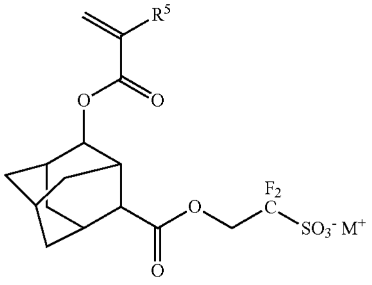
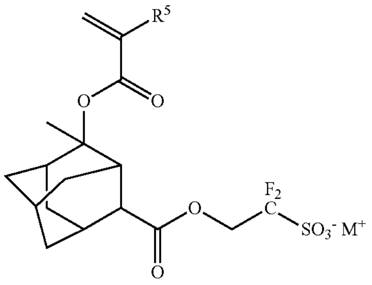

-continued
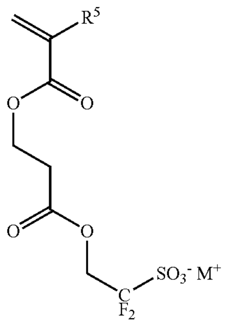
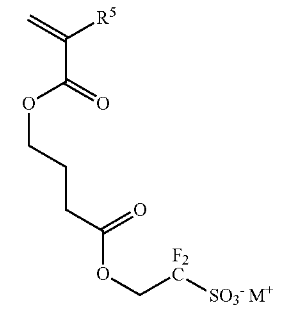
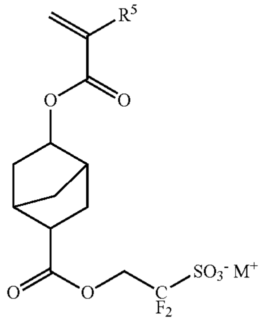
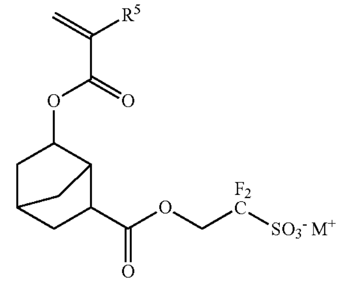
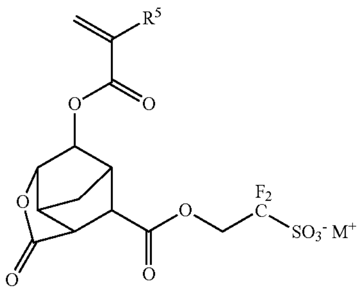
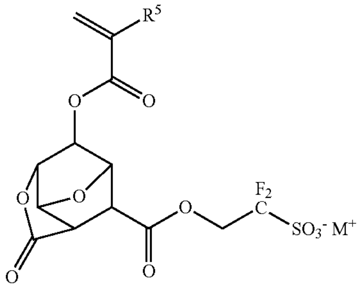
-continued
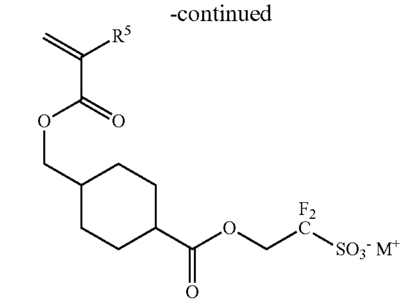
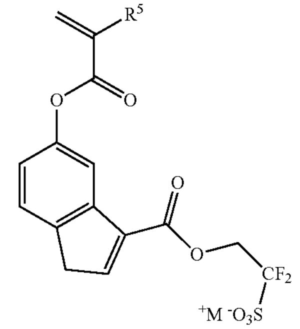
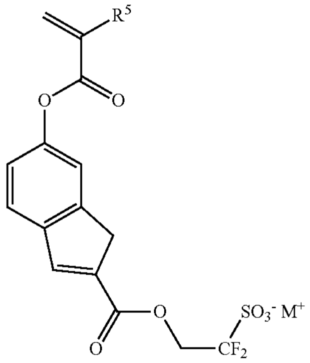
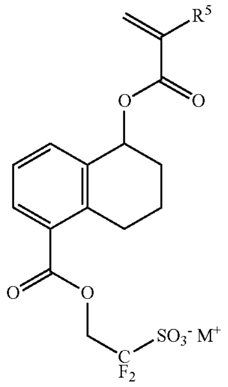
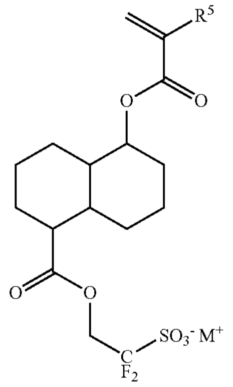
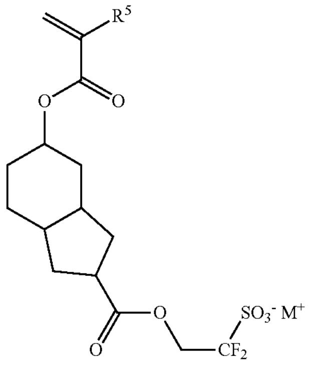

-continued
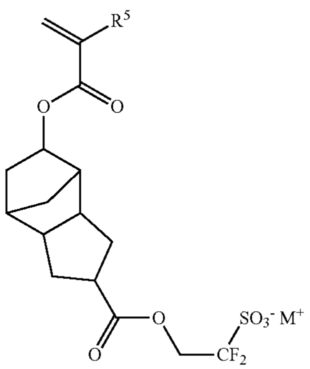
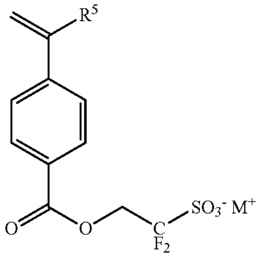
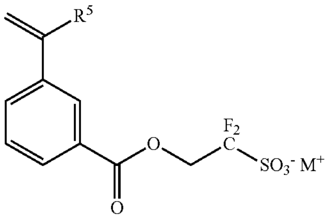
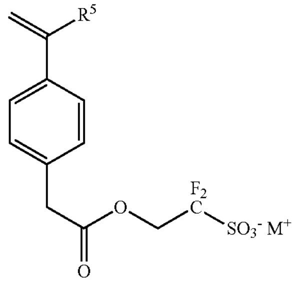
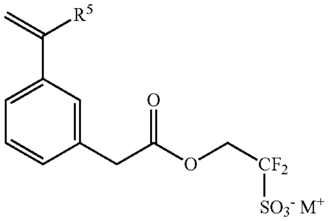
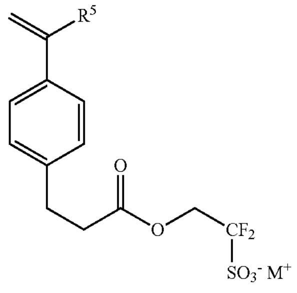
-continued
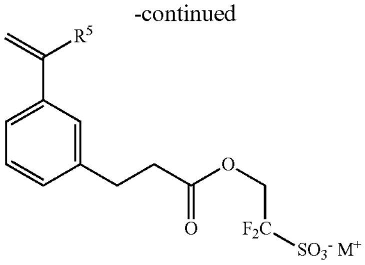
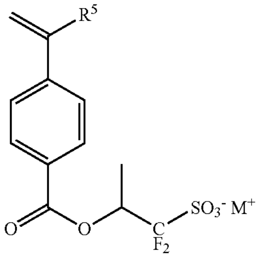
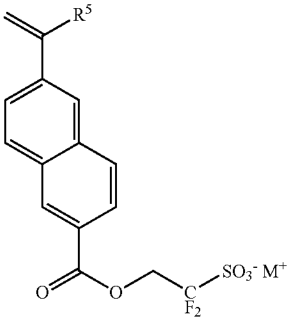
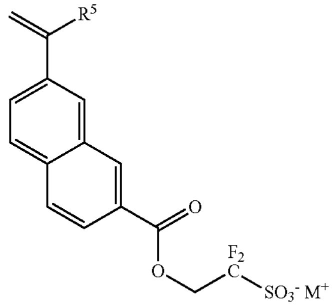
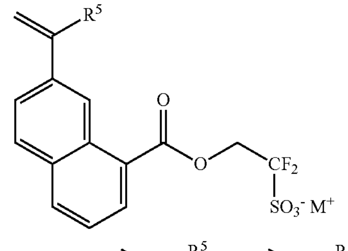
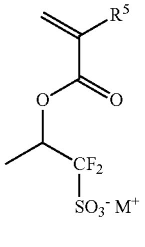
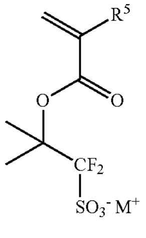
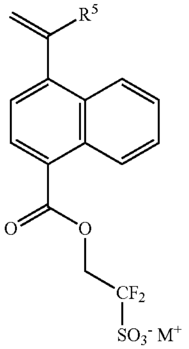

-continued
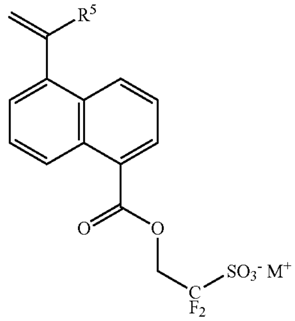
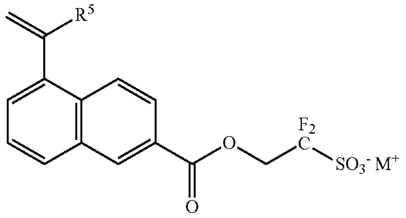
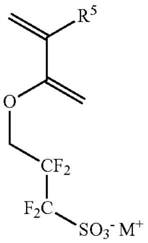
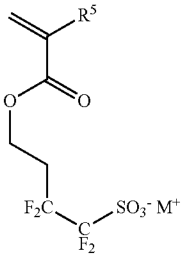
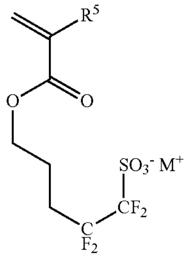
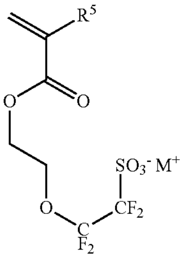
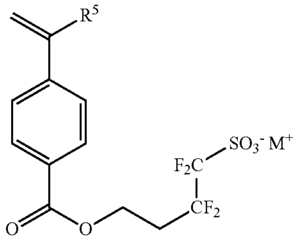
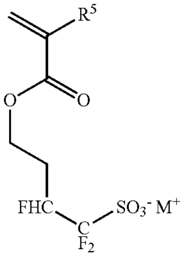
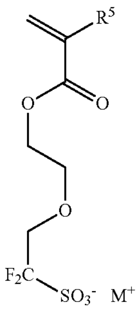
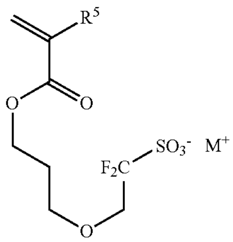
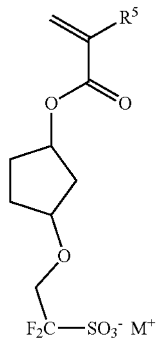
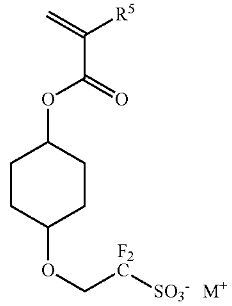
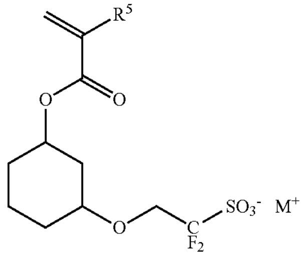
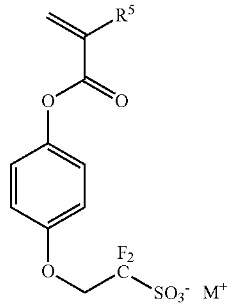
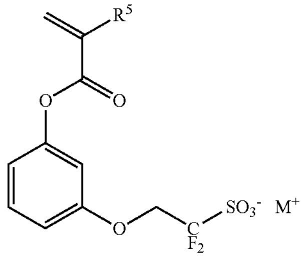
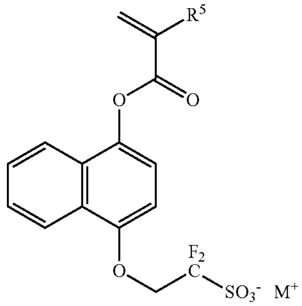
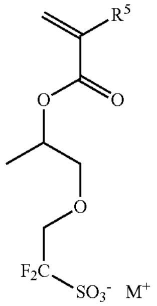
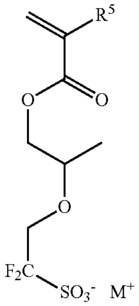
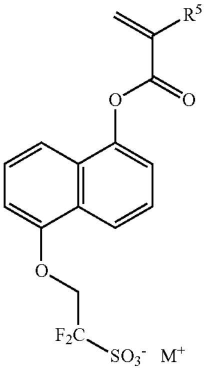

-continued
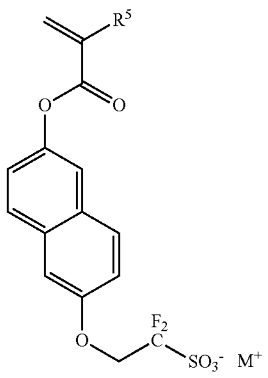
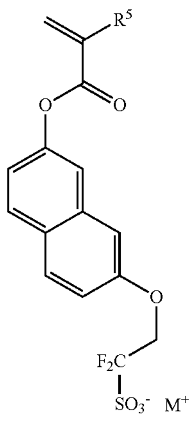
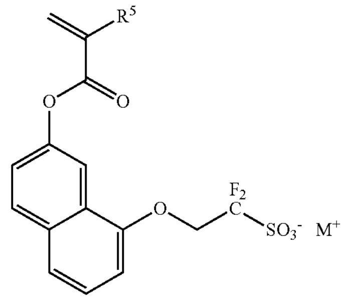
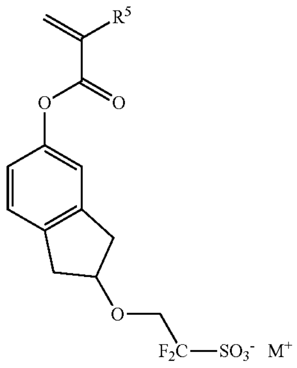
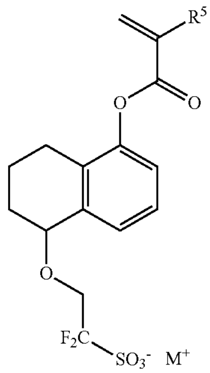
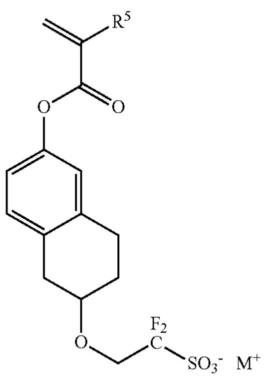
-continued
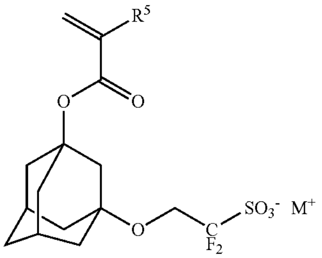
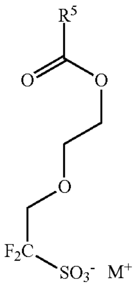
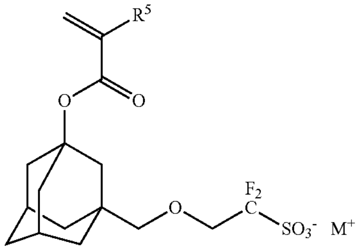
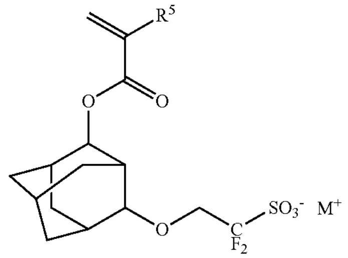
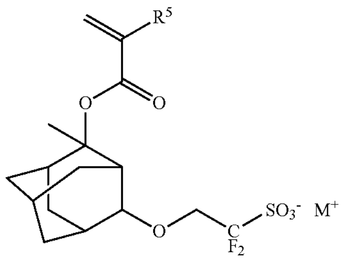
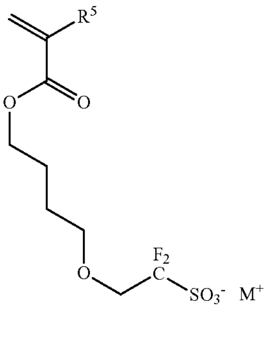
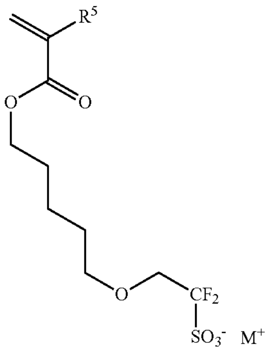
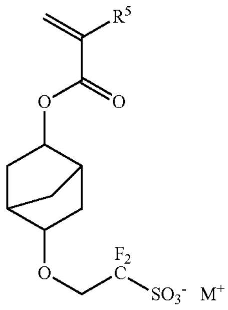
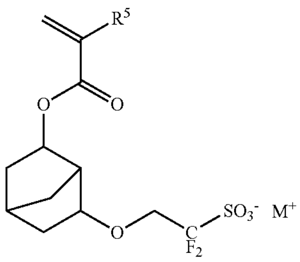

-continued
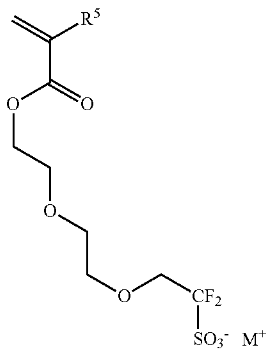
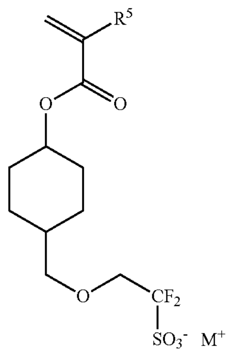
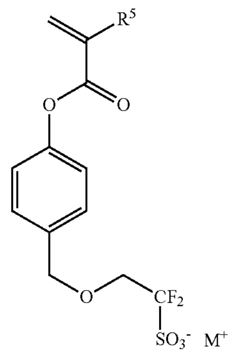
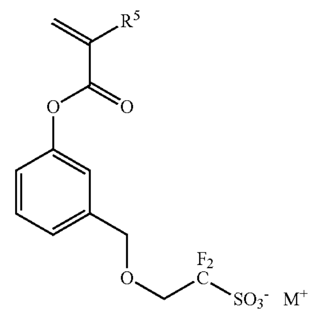
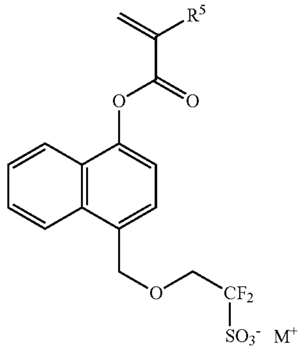
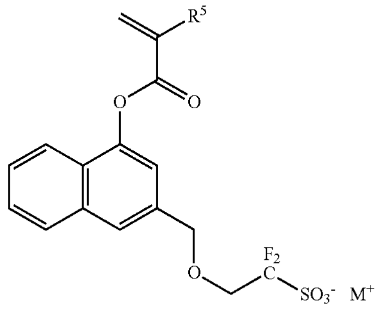
-continued
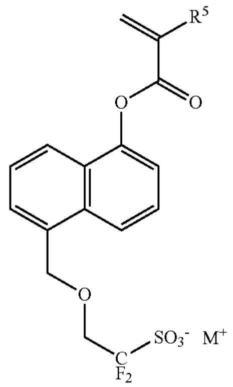
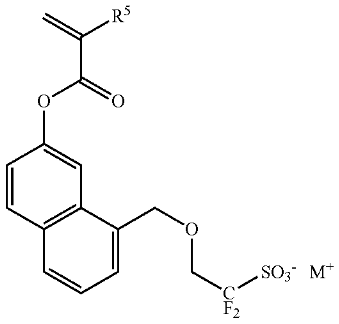
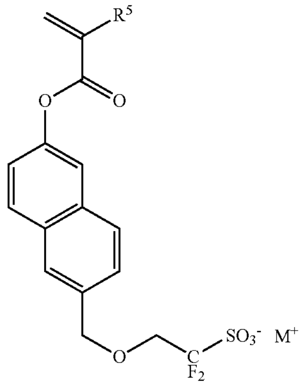
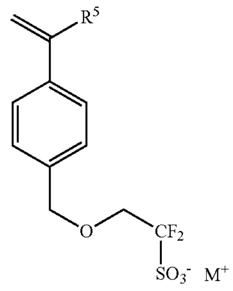
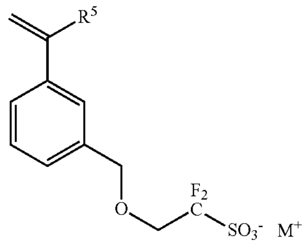
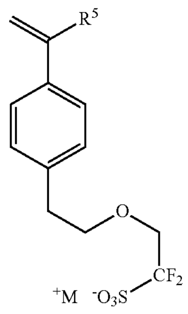
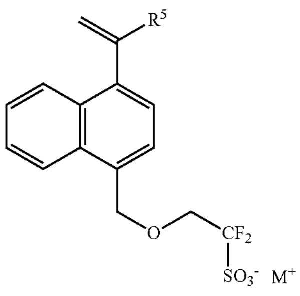

-continued
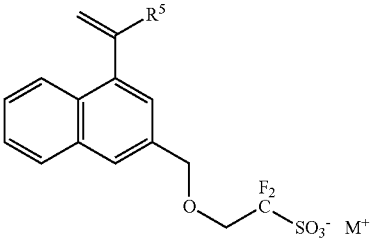
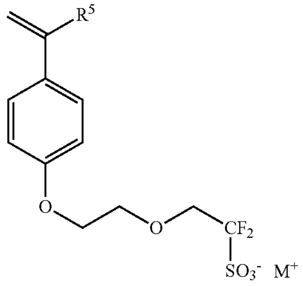
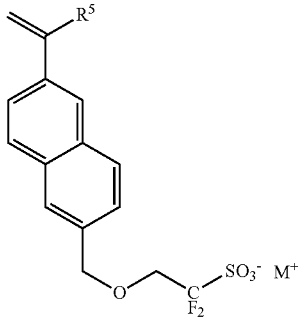
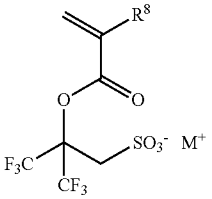
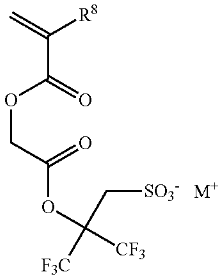
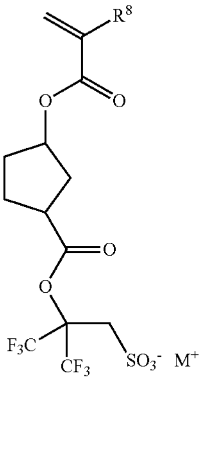
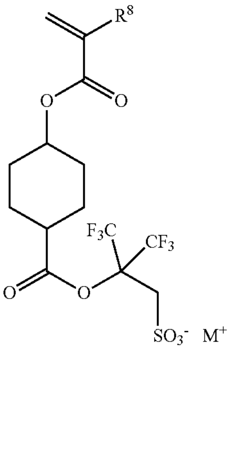
-continued
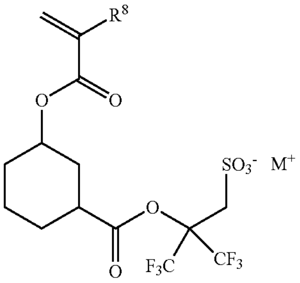
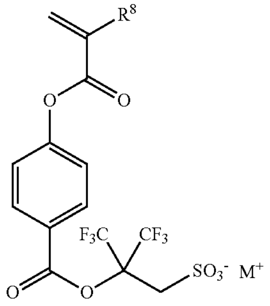
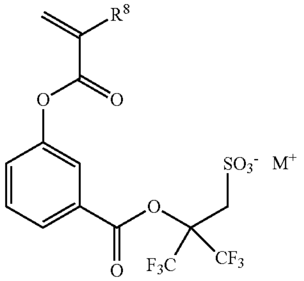
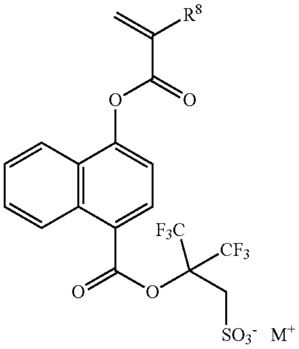
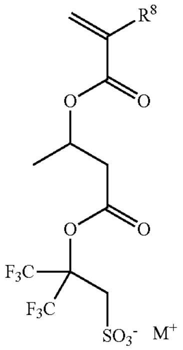
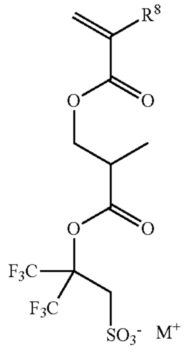
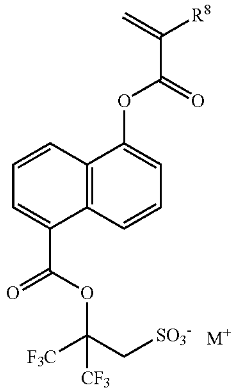

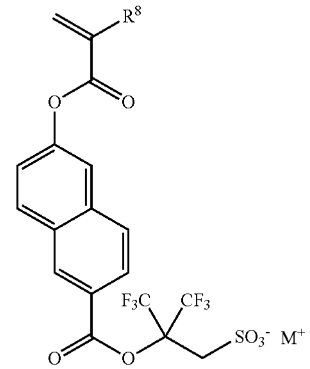
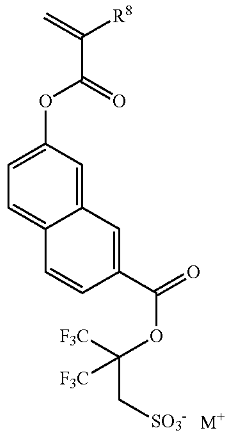
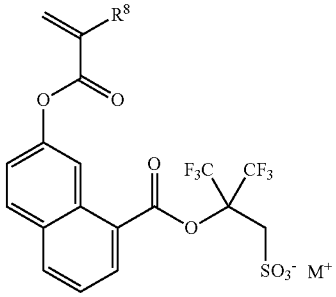
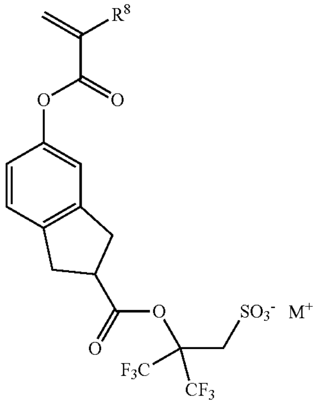
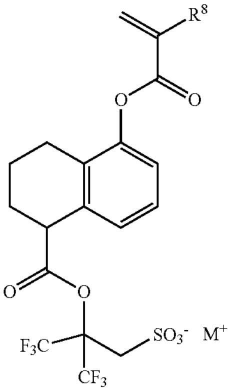
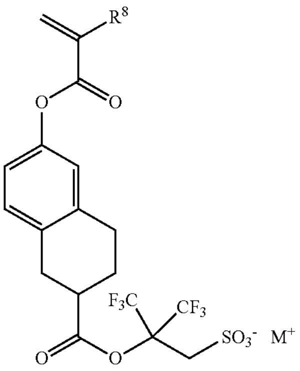
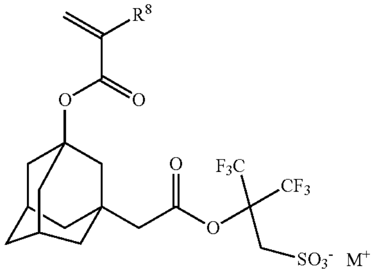
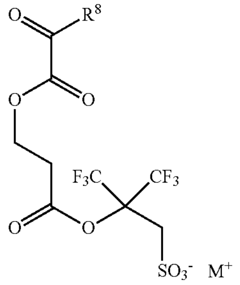
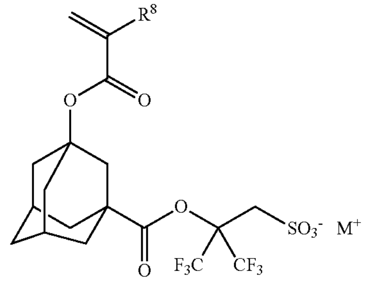
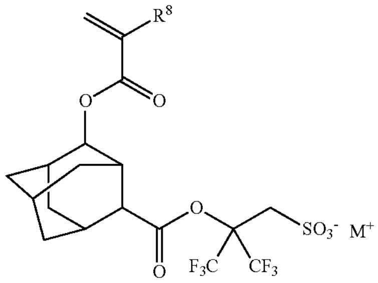
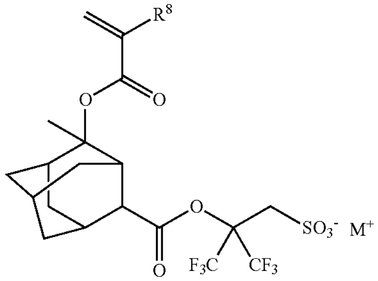
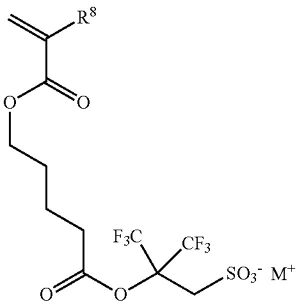

-continued
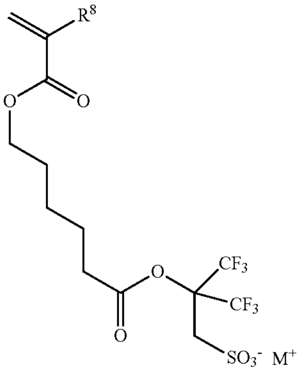
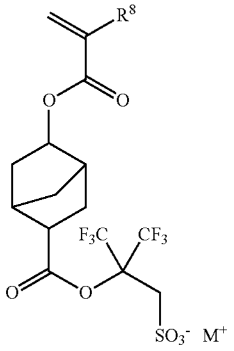
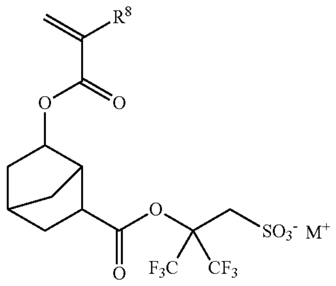
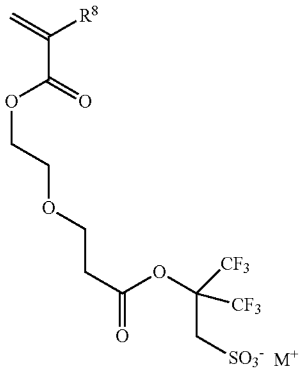
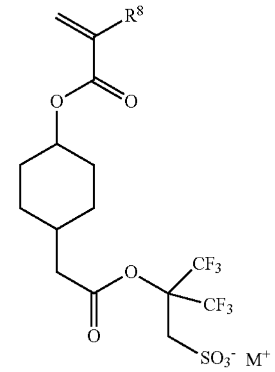
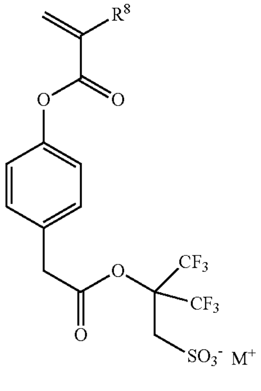
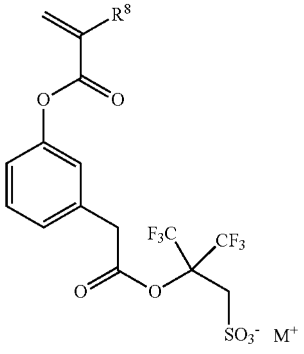
-continued
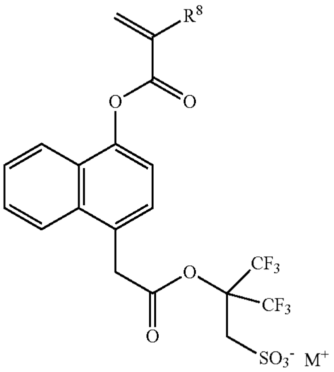
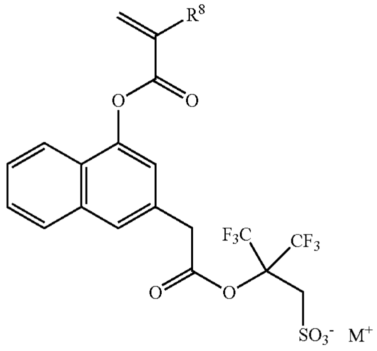
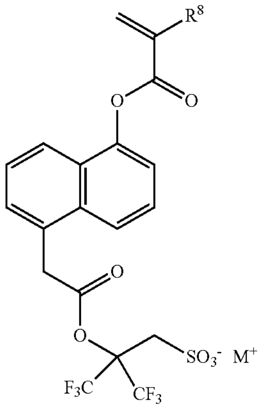
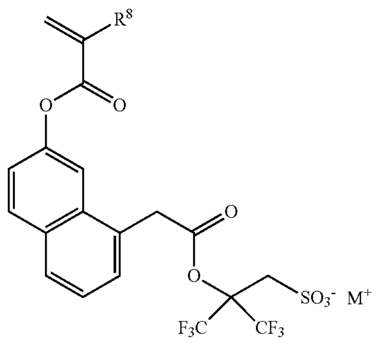

-continued
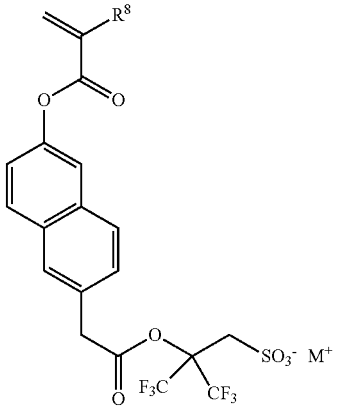
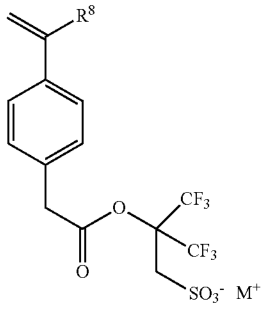
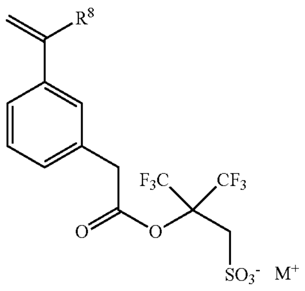
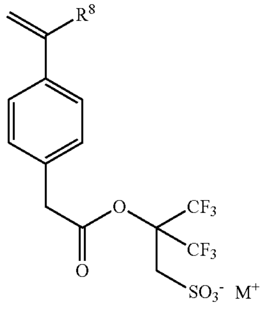
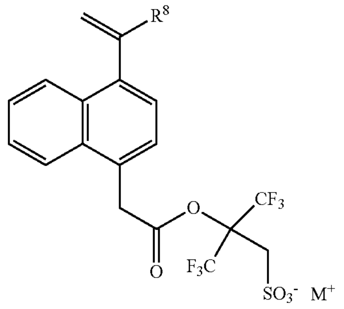
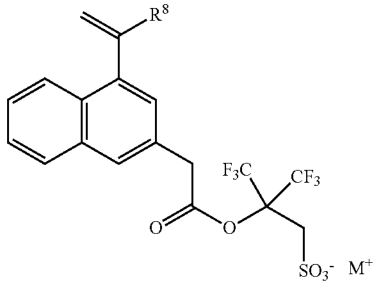
-continued
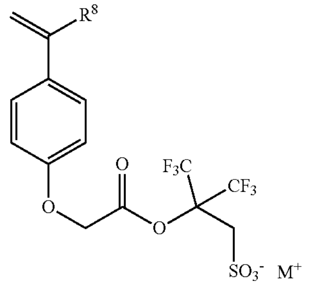
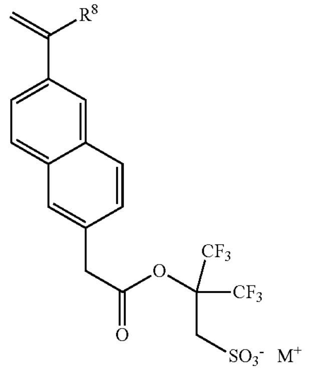
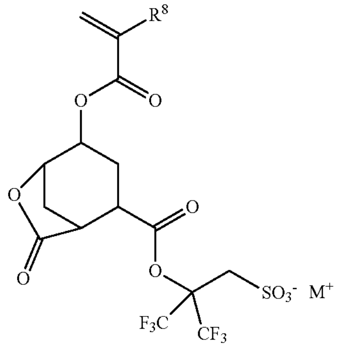
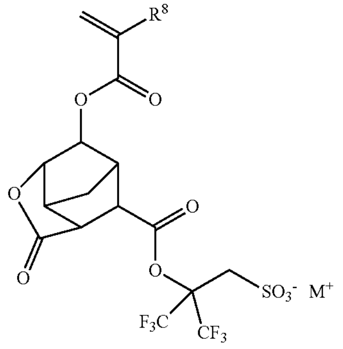
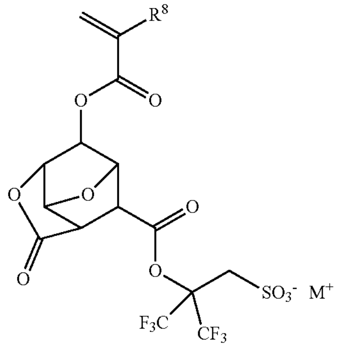

-continued
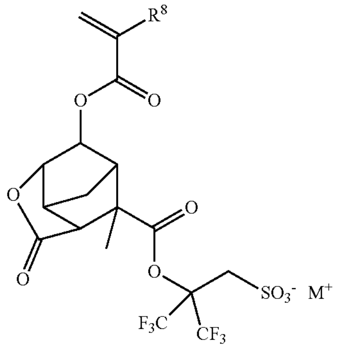
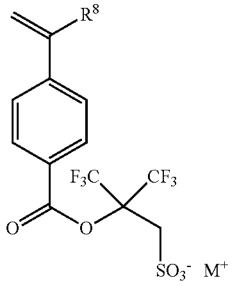
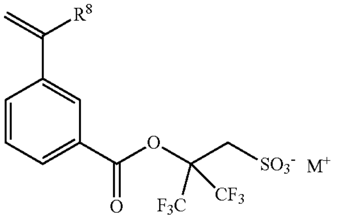
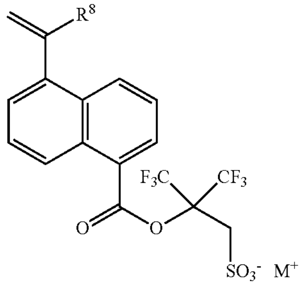
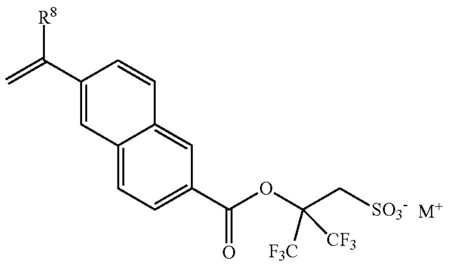
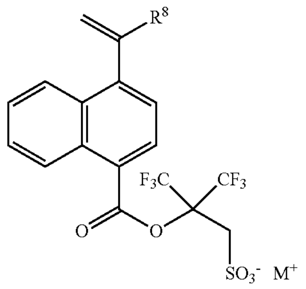
-continued
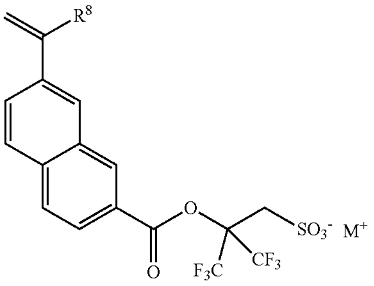
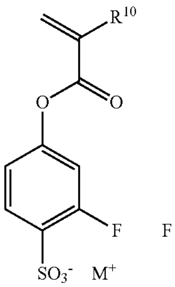
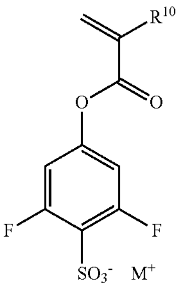
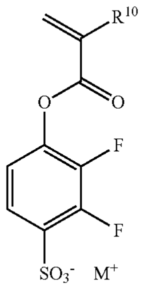
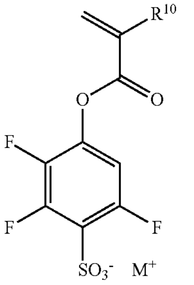
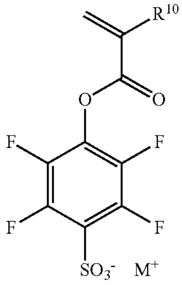
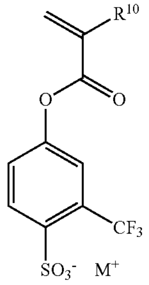
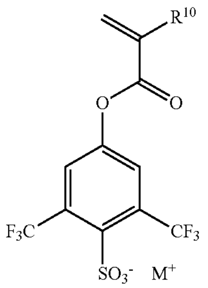
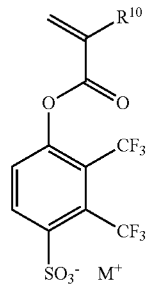
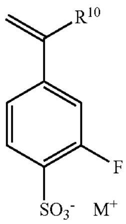
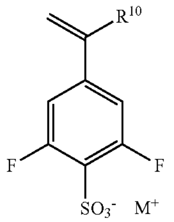
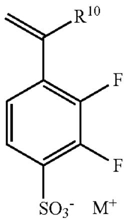
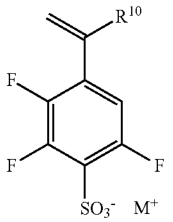
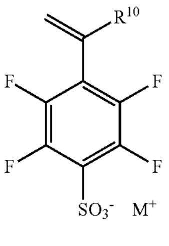
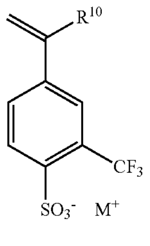
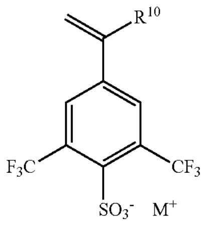

-continued
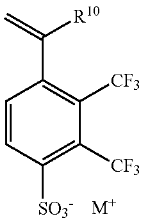
Among the repeating units-A1 to -A7 shown by the general formulae (2), the repeating unit-A6 can be obtained from sulfone imide salt monomer specifically exemplified below.
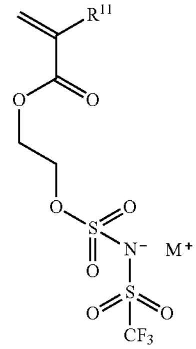
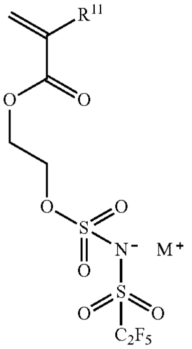
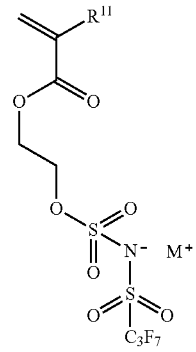
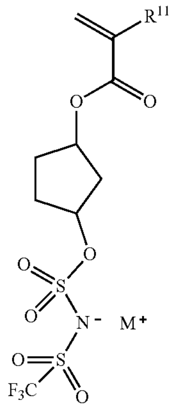
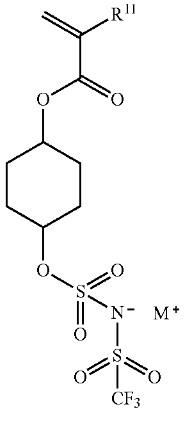
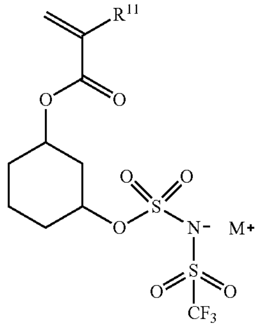
-continued
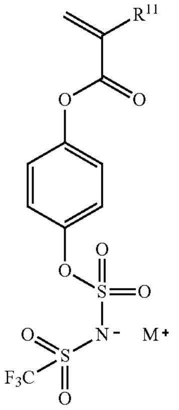
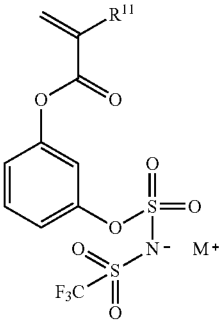
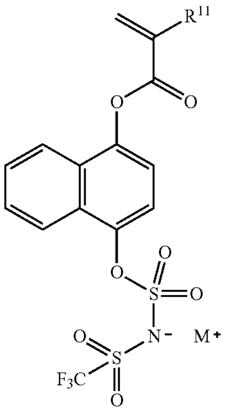
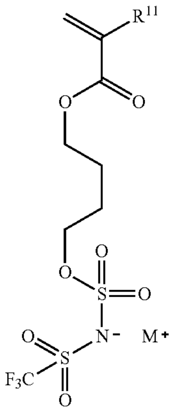
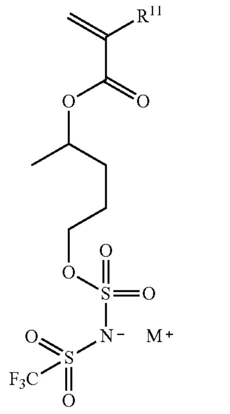
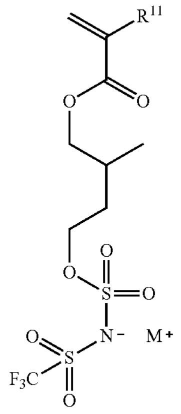
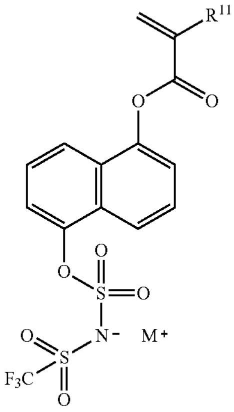
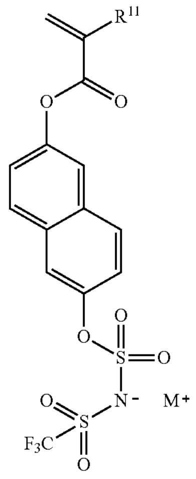

-continued
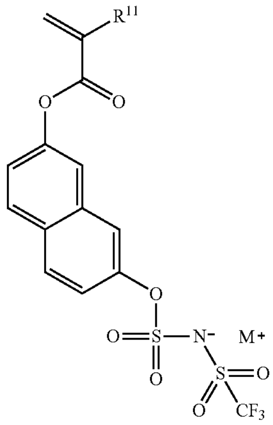
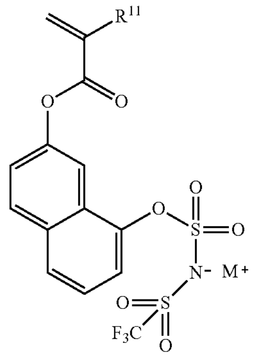
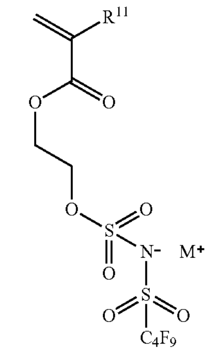
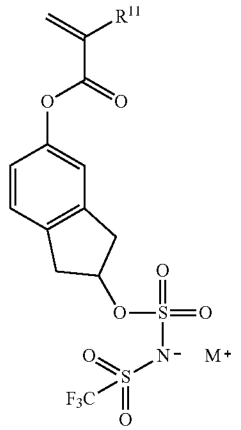
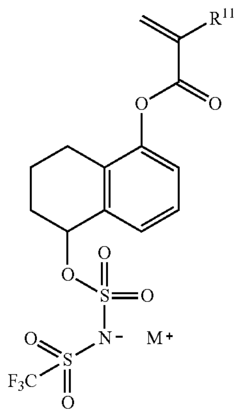
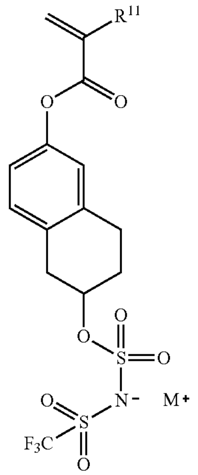
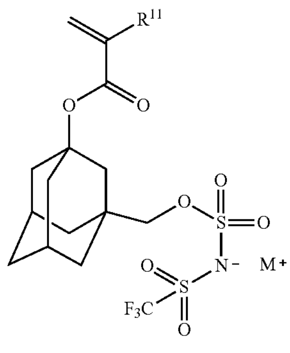
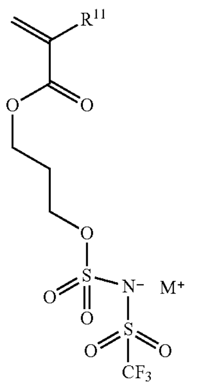
-continued
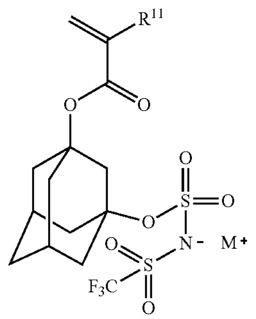
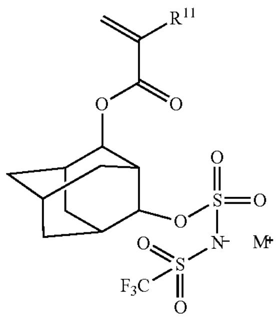
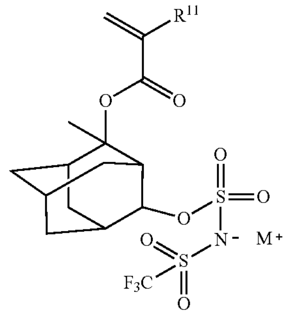
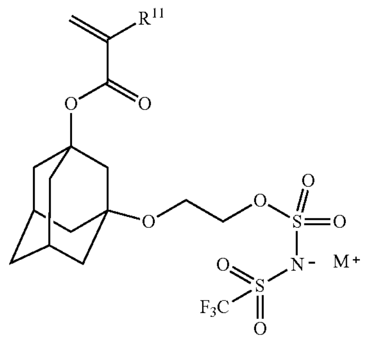
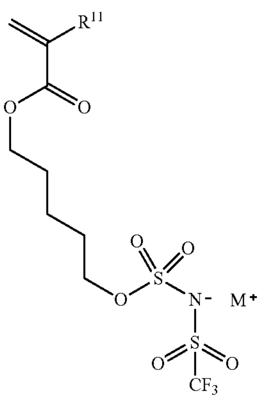
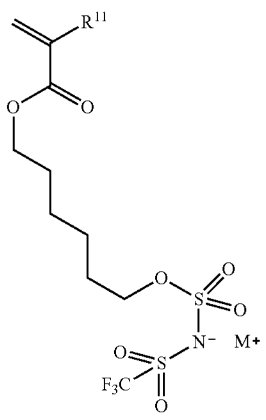

-continued
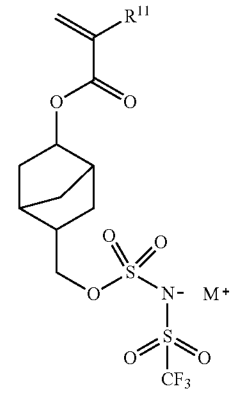
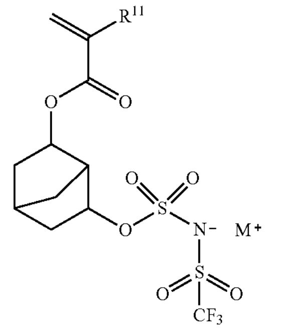
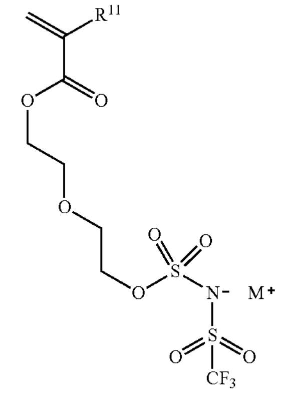
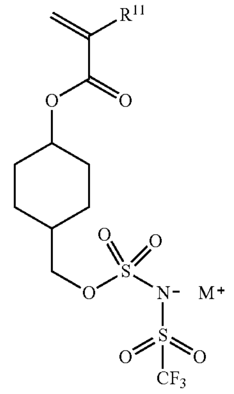
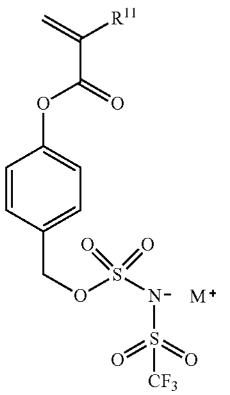
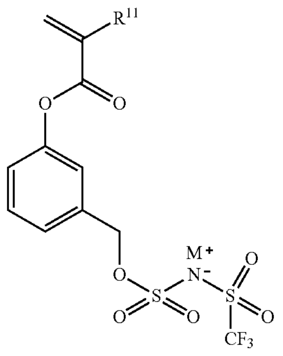
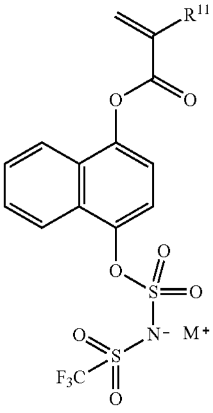
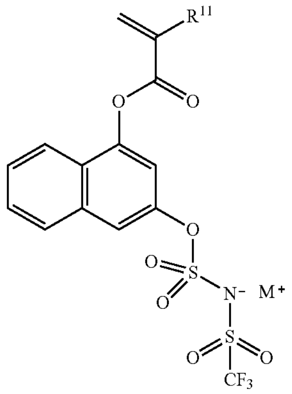
-continued
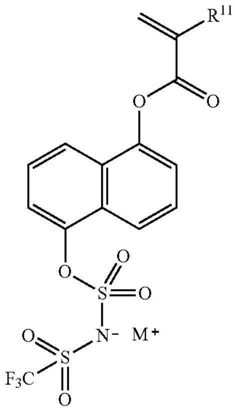
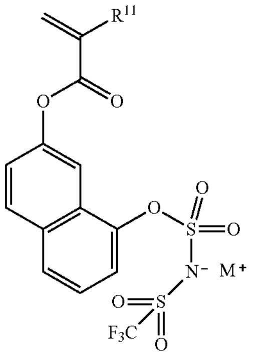
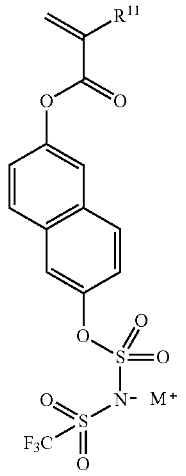
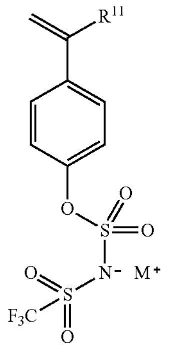
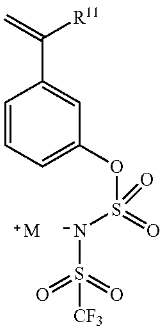
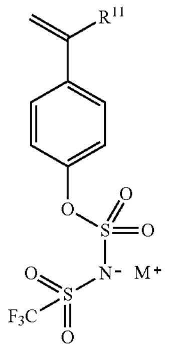
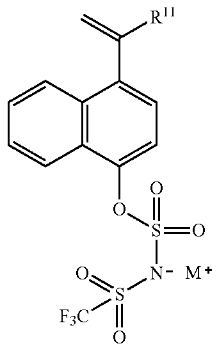
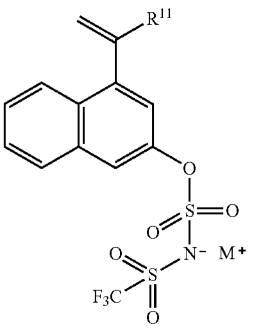

-continued
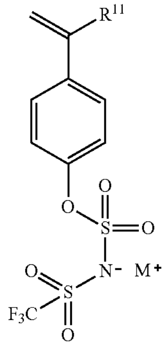
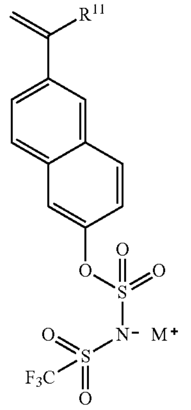
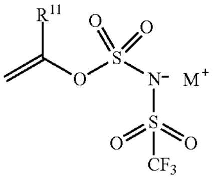
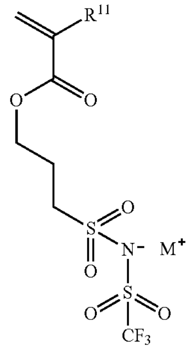
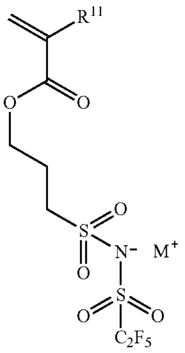
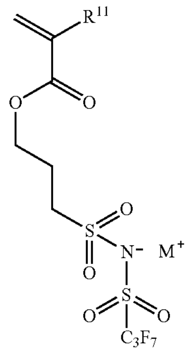
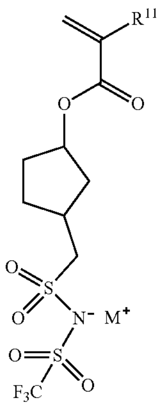
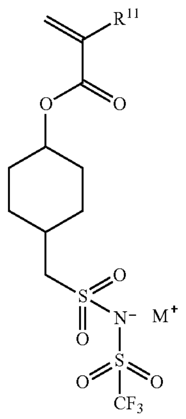
-continued
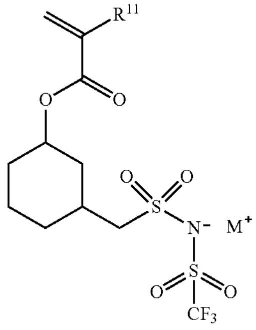
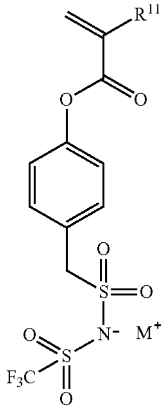
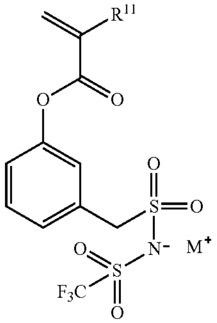
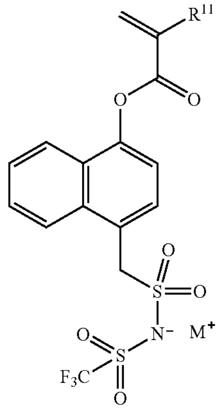
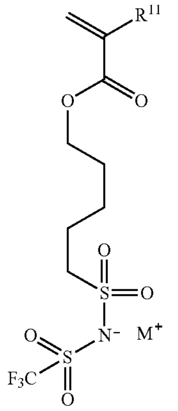
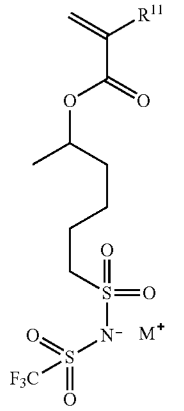
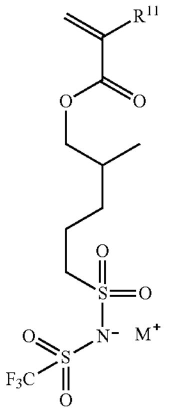
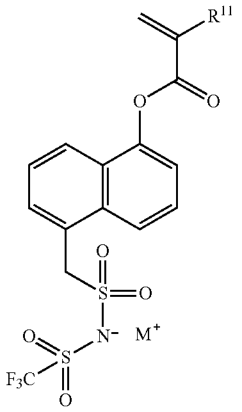

-continued
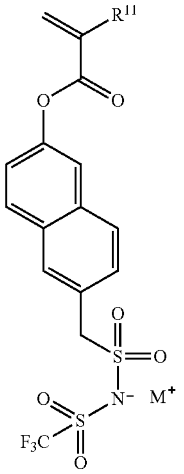
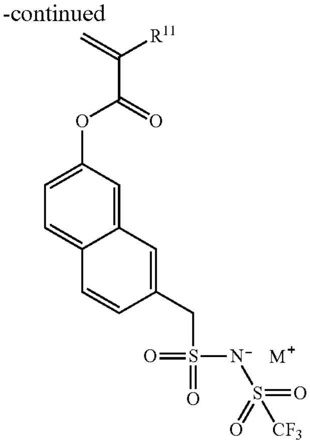
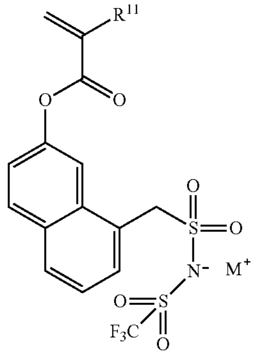
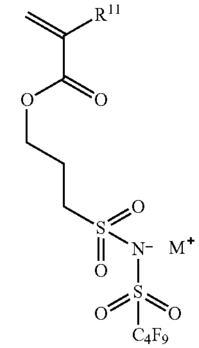
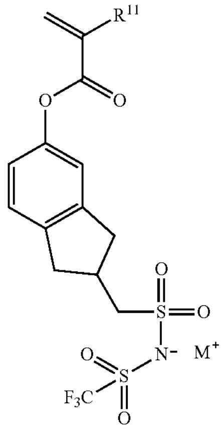
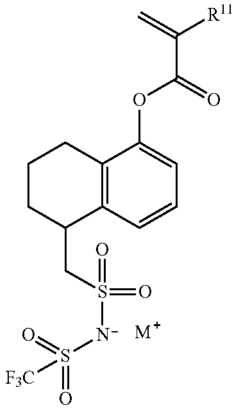
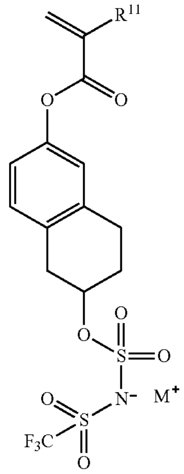
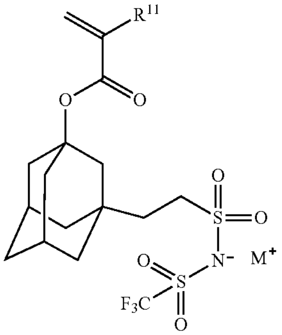
-continued
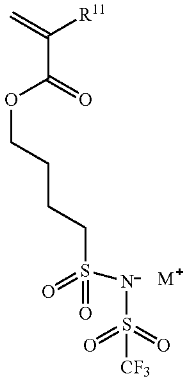
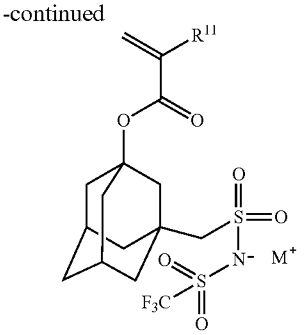
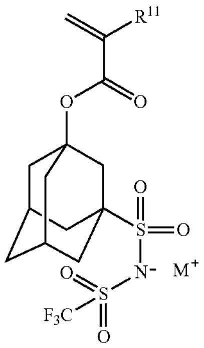
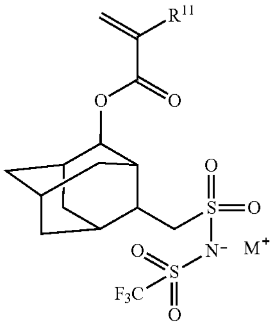
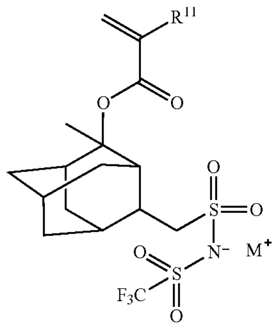
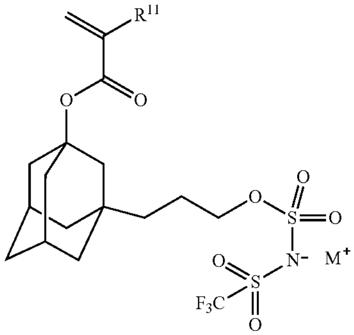

-continued
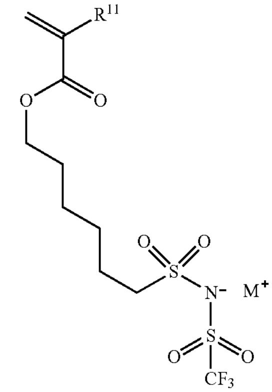
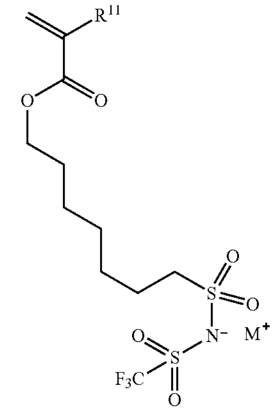
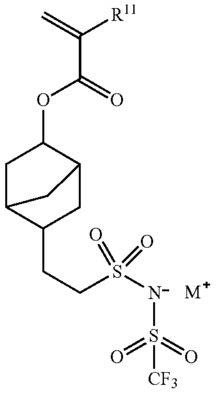
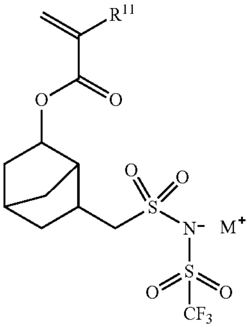
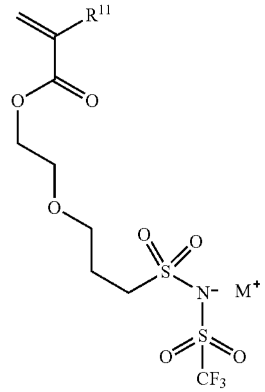
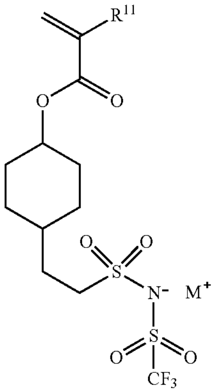
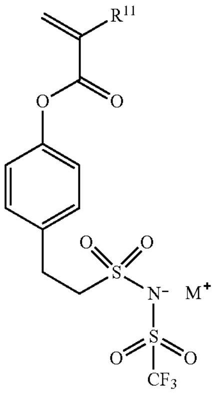
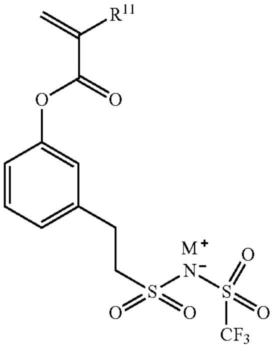
-continued
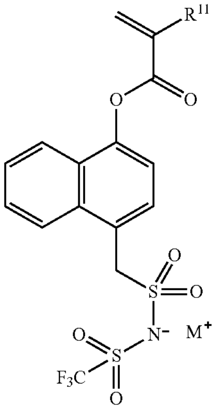
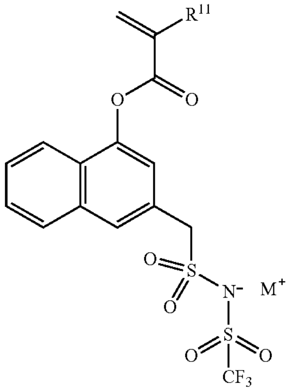
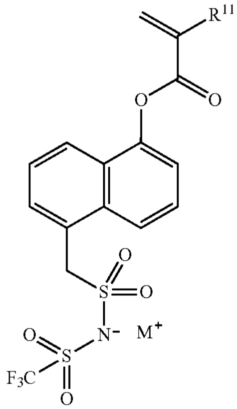
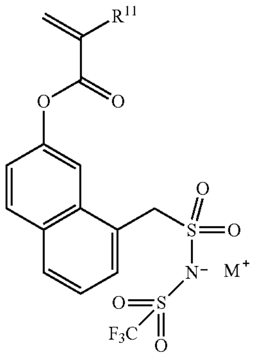
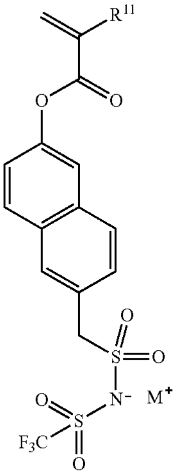
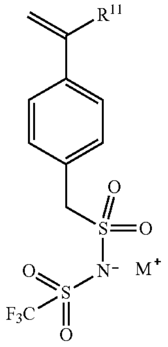
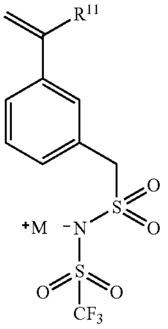
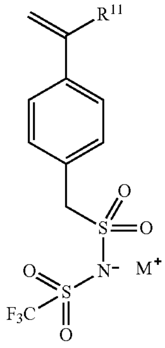

-continued
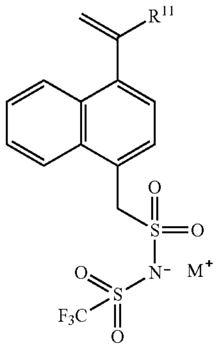
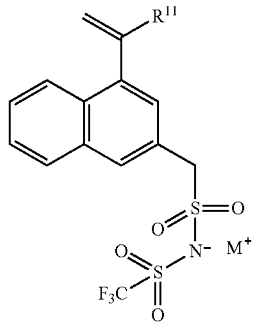
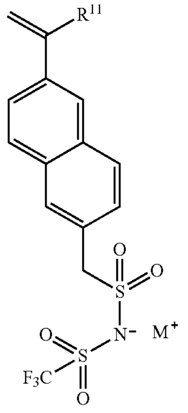
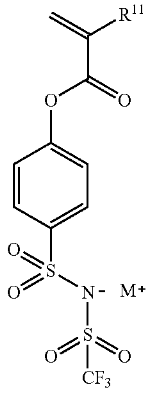
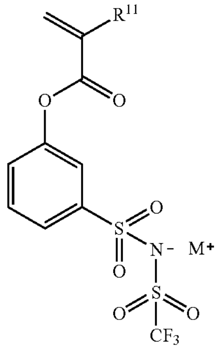
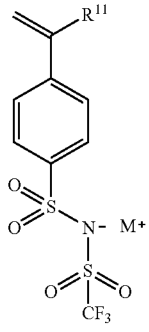
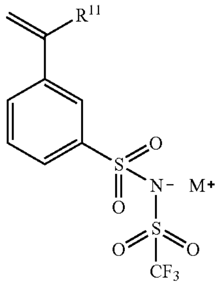
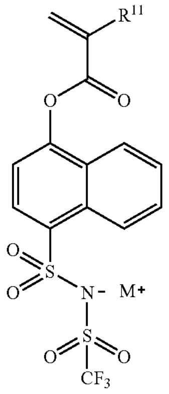
-continued
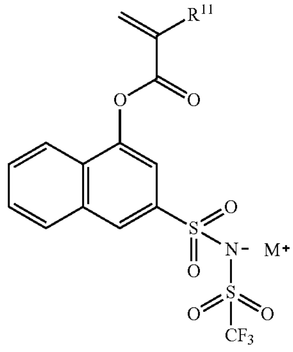
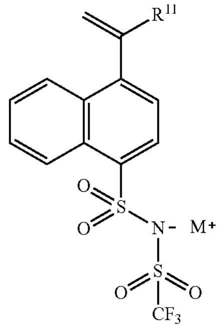
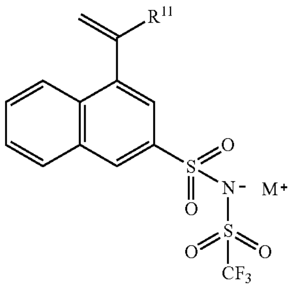
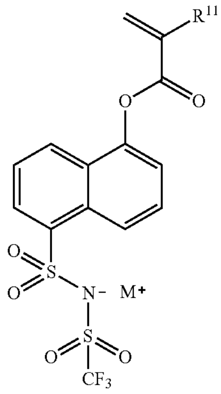
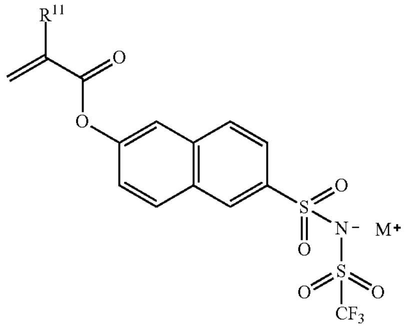
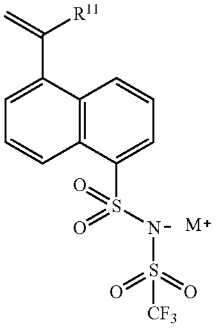
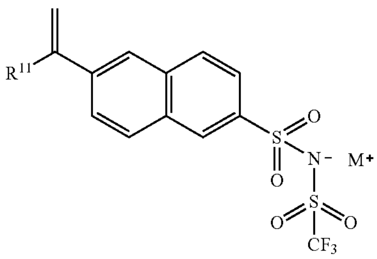

-continued
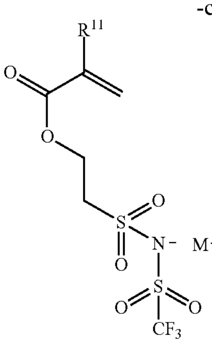
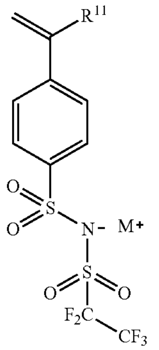
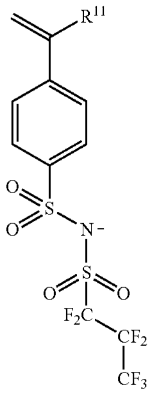
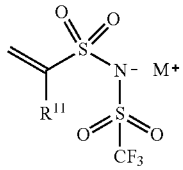
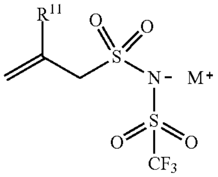
Among the repeating units-A1 to -A7 shown by the general formulae (2), the repeating unit-A7 can be obtained from N-carbonyl-sulfonamide salt monomers specifically exemplified below.
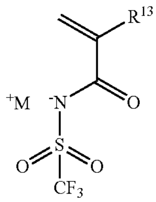
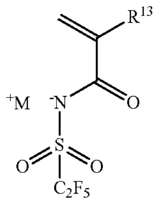
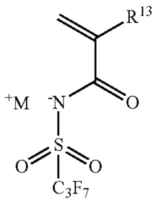
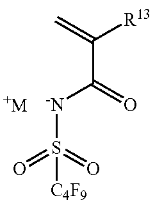
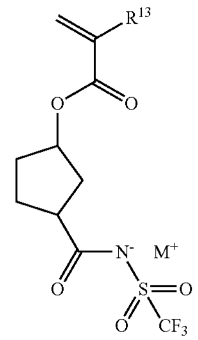
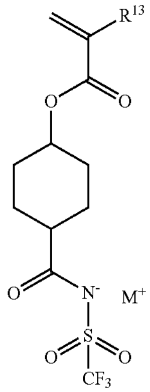
-continued
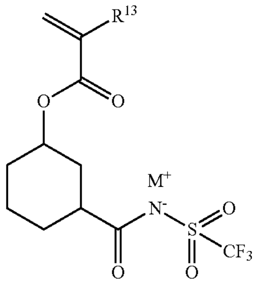
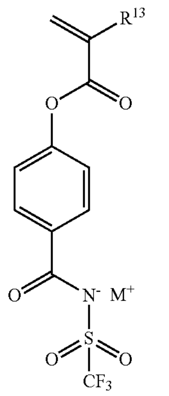
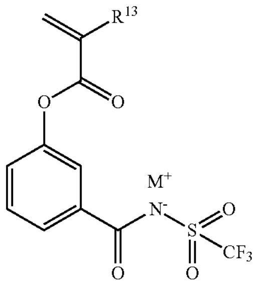
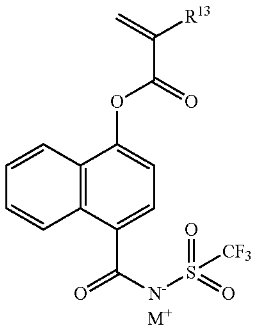
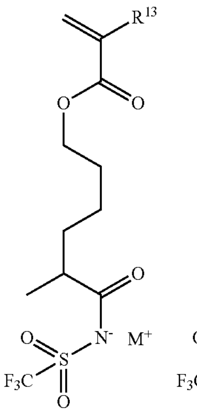
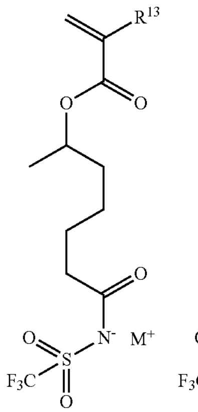
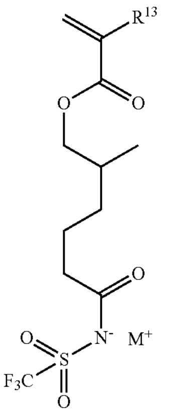
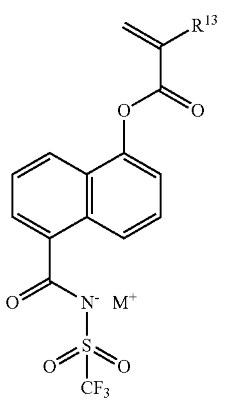
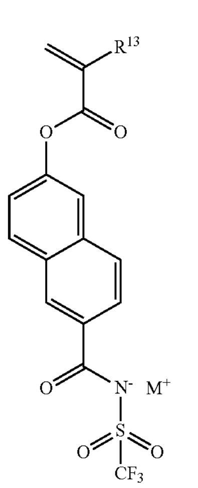

-continued
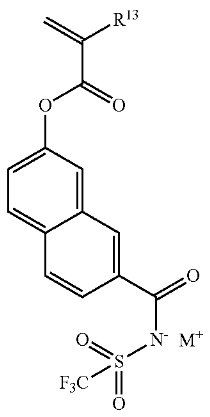
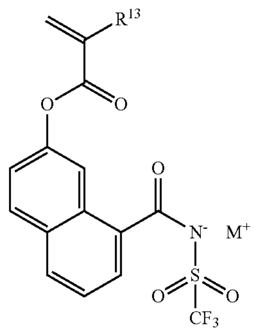
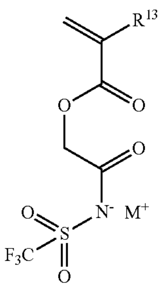
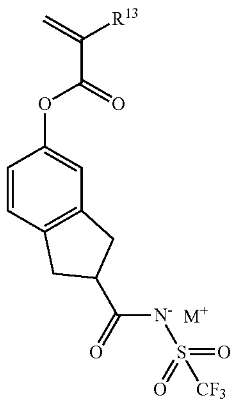
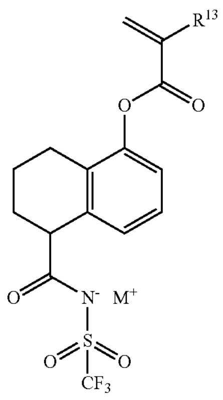
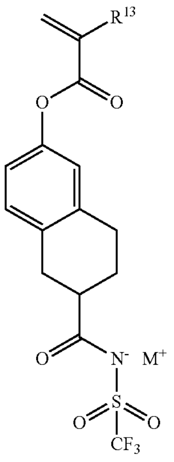
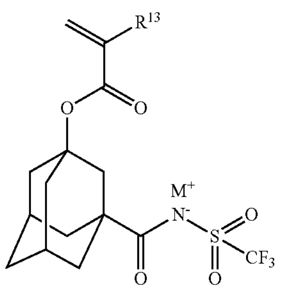
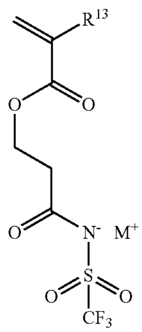
-continued
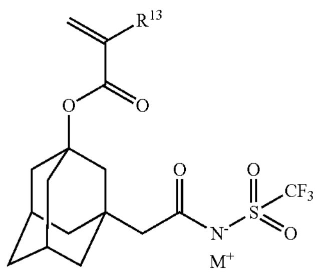
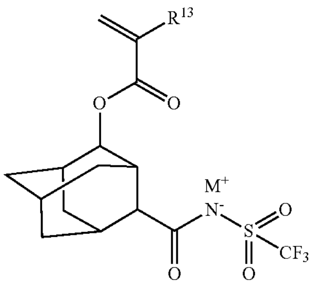
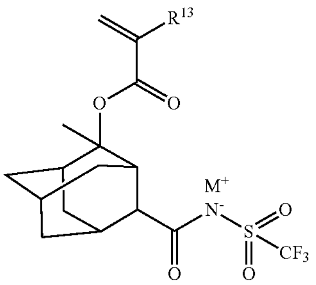
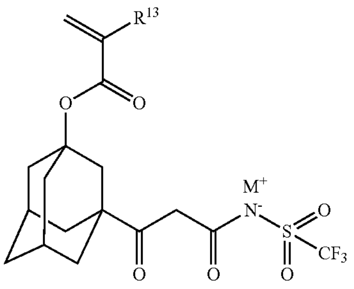
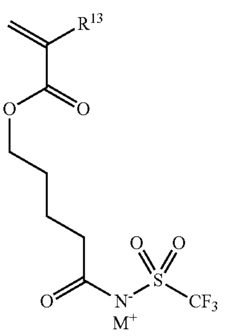
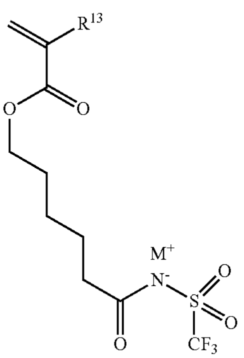

-continued
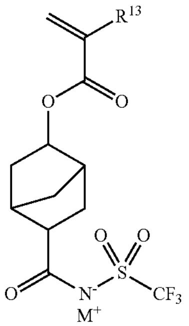
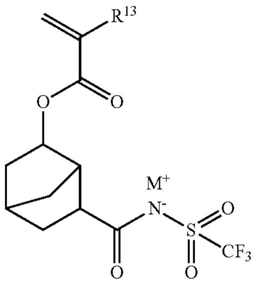
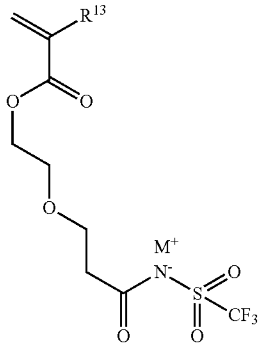
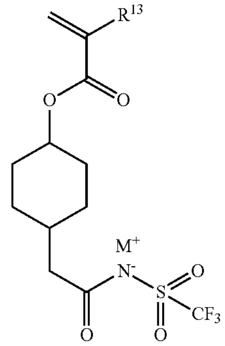
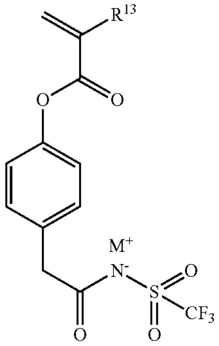
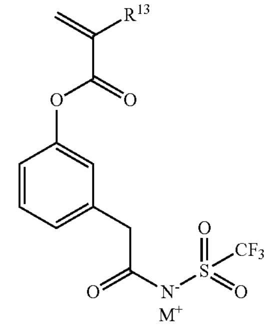
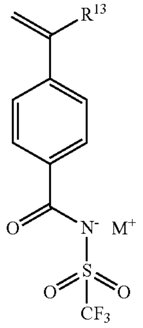
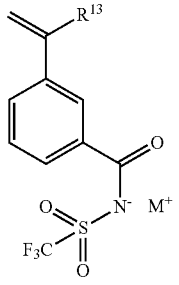
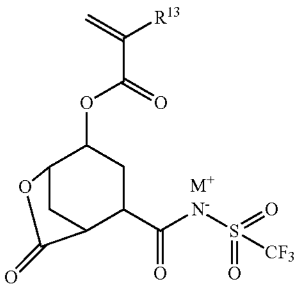
-continued
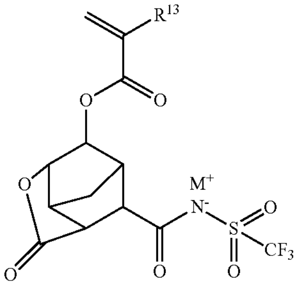
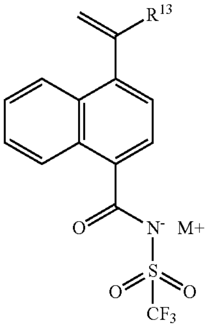
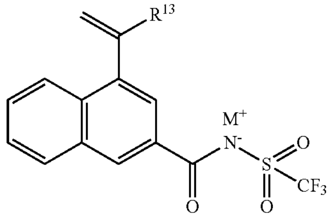
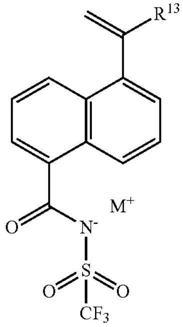
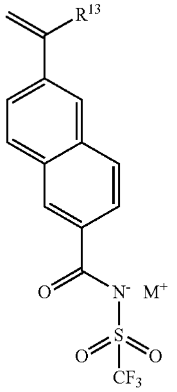
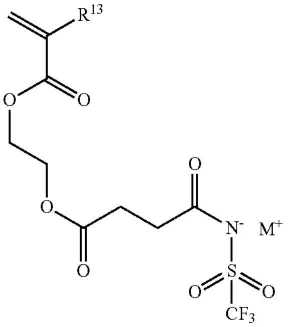
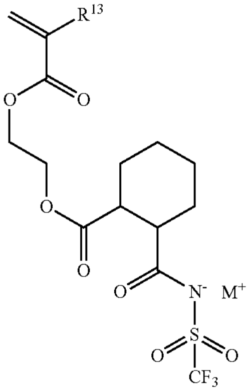

-continued
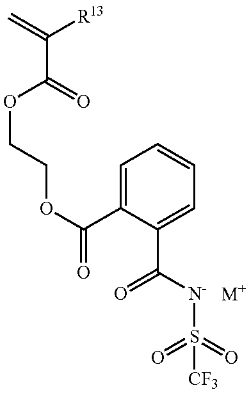
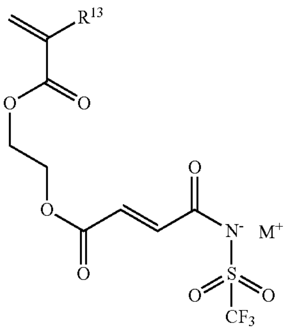
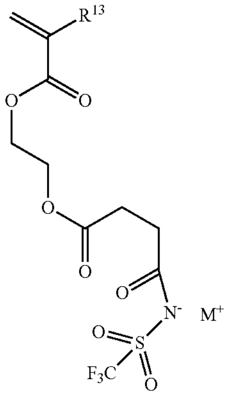
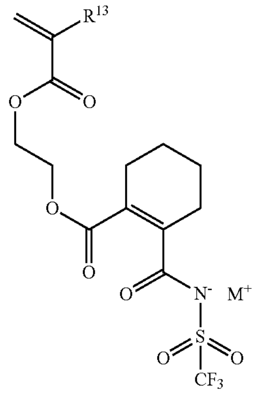
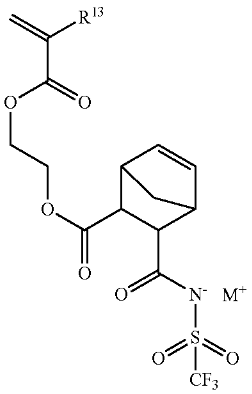
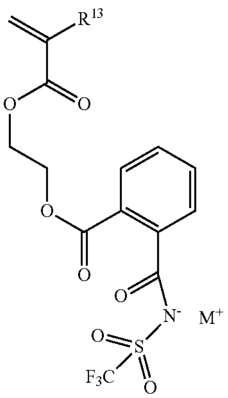
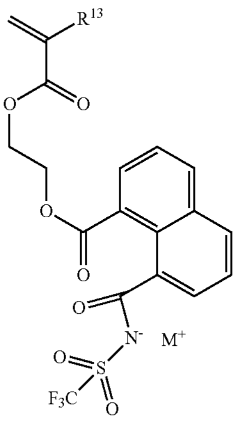
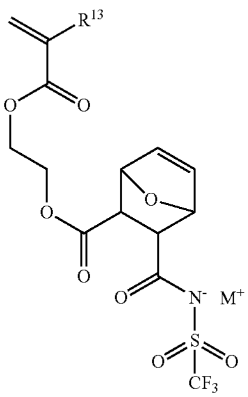
-continued
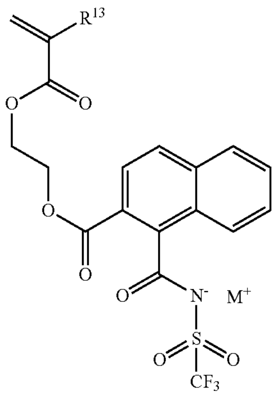
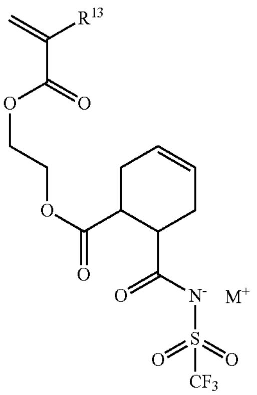
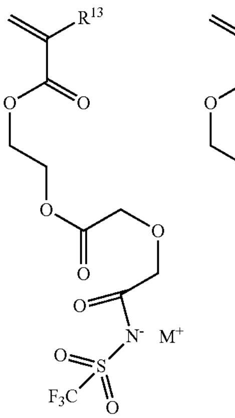
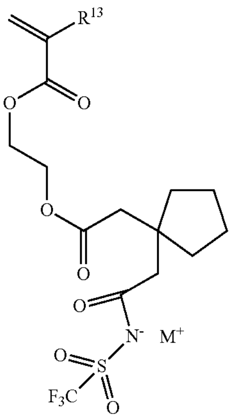
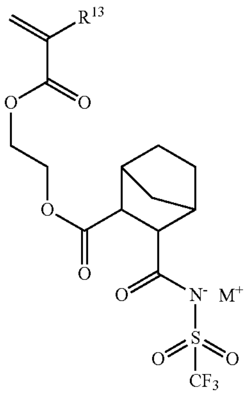
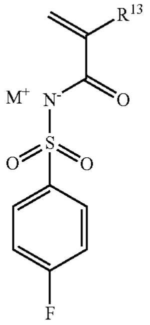
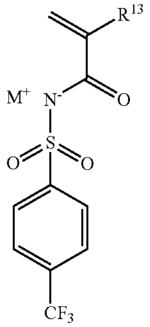
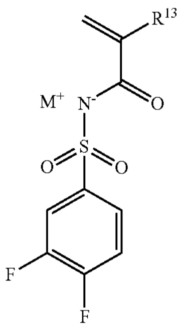
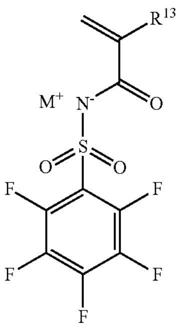

-continued
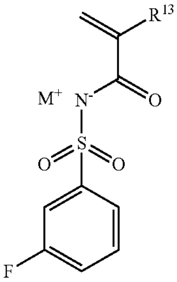
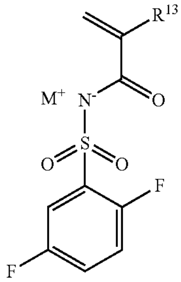
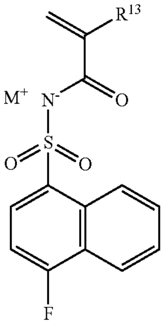
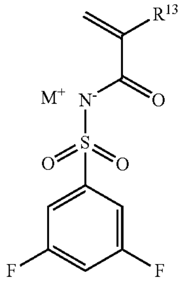
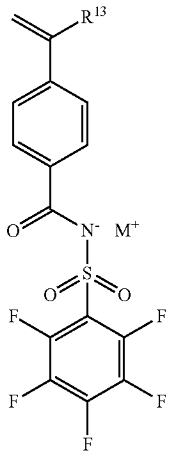
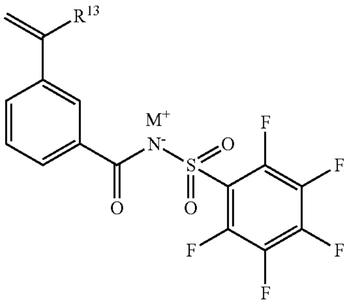
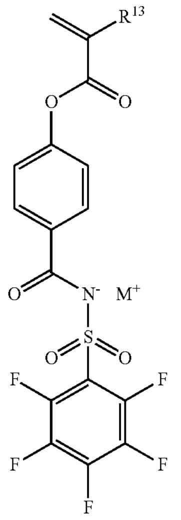
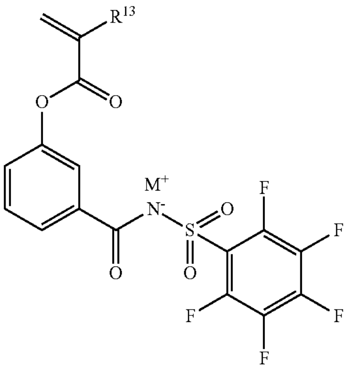
-continued
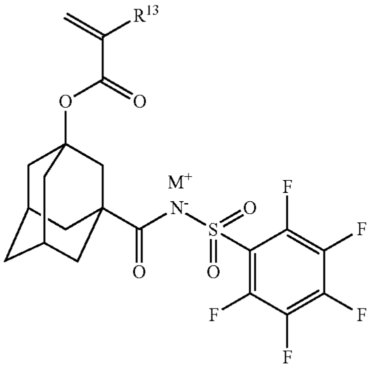
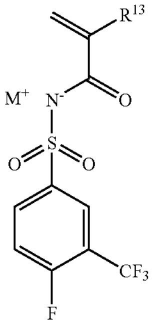
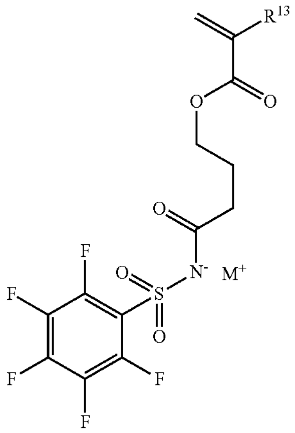
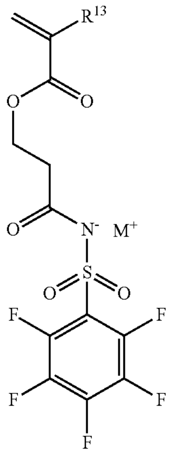
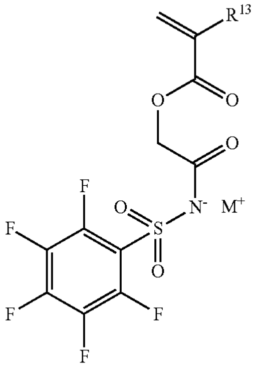
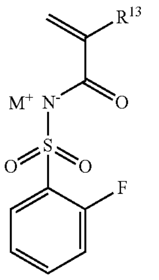
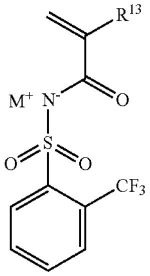
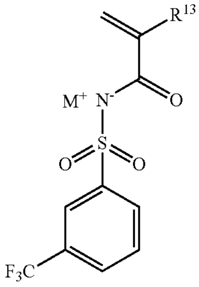

-continued
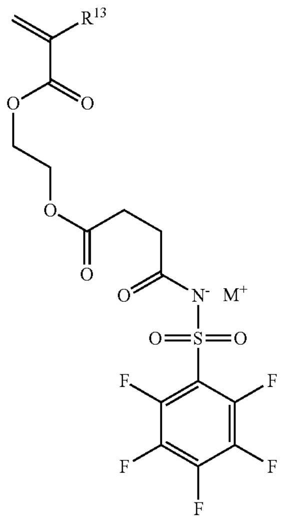
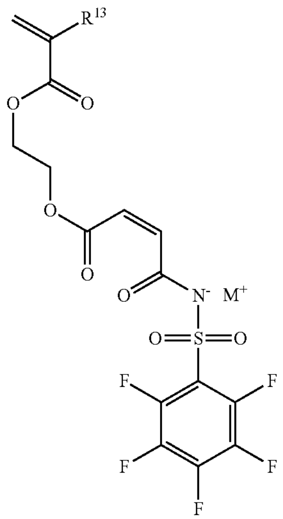
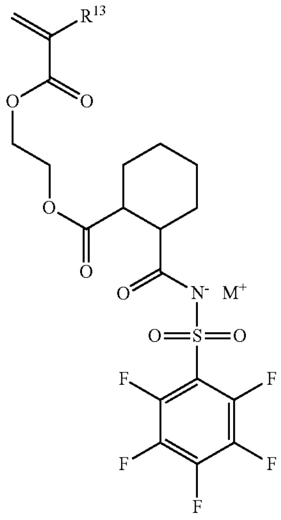
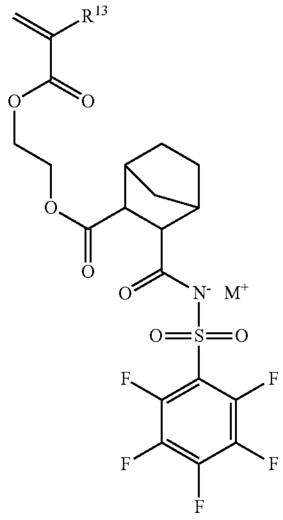
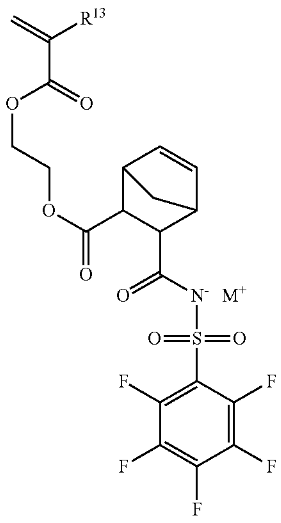
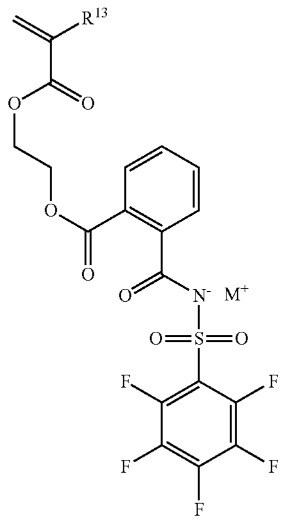
-continued
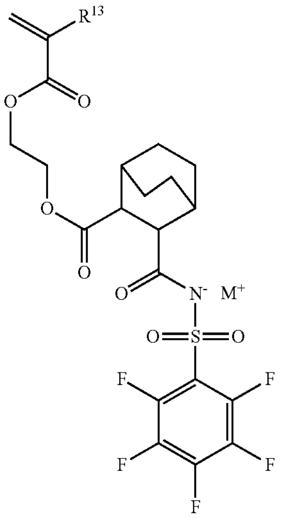
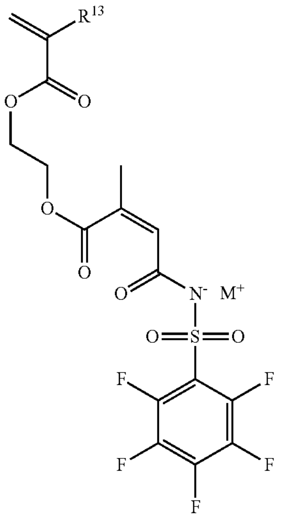
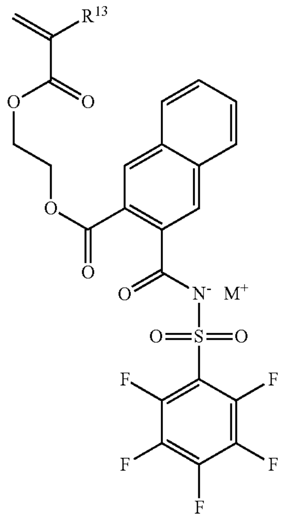
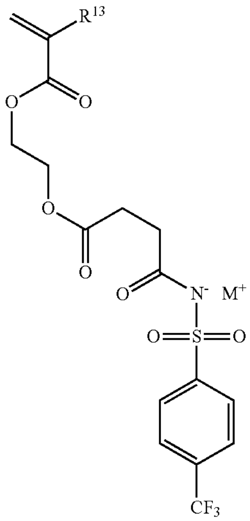
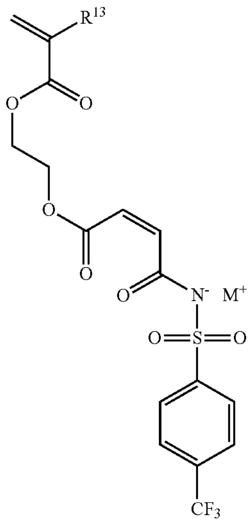
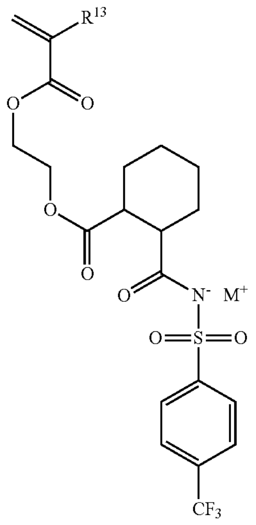

-continued

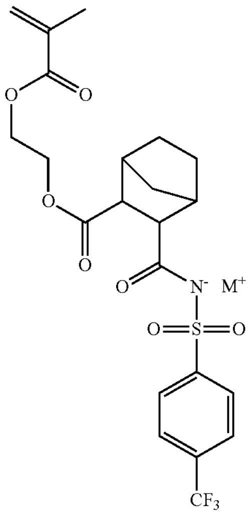
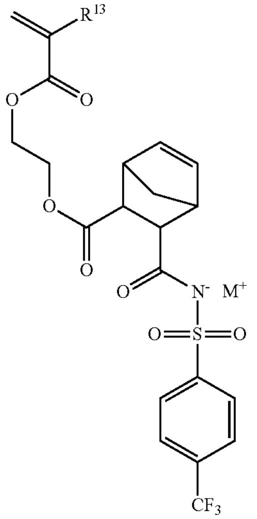
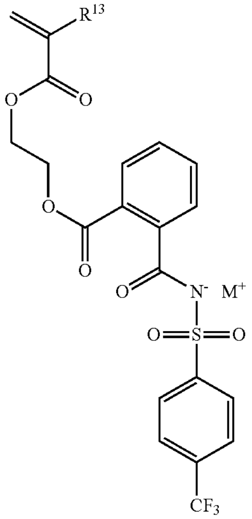
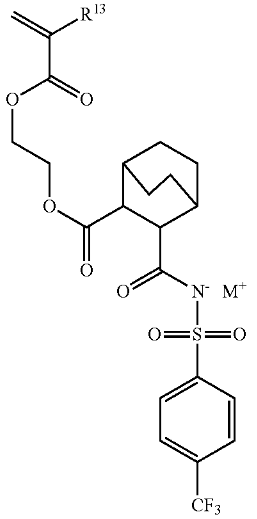
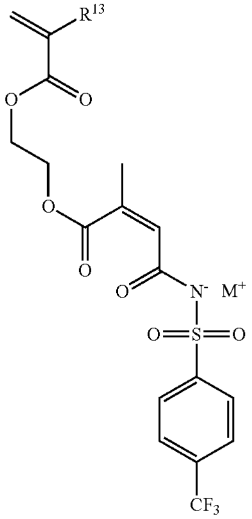
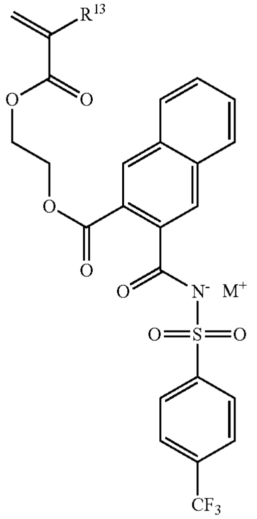

In the formulae, $R^1$, $R^3$, $R^5$, $R^3$, $R^{10}$, $R^{11}$, and $R^{13}$ are as defined above.

(Repeating Unit-b)

For ion polymer components which are materials to form the ion polymer containing layer used for the inventive bio-electrode, in addition to the repeating units-A1 to -A7, a repeating unit-b having a glyme chain can also be copolymerized in order to enhance the ionic conductivity. Specific examples of a monomer to give the repeating unit-b having a glyme chain include the following. The copolymerization with the repeating unit-b having a glyme chain facilitates the movement of ions released from the skin in a dry electrode film, and thus can increase the sensitivity of a dry electrode.

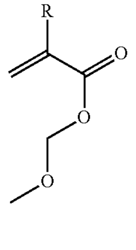
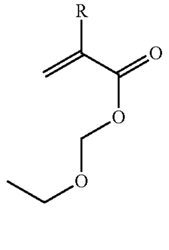
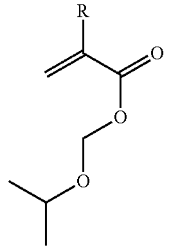
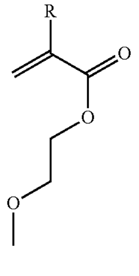
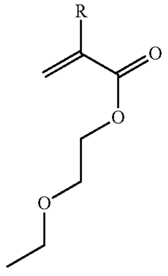
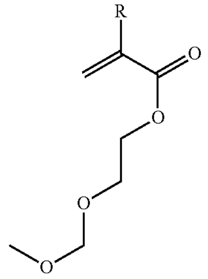
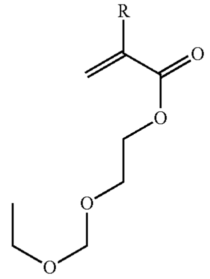
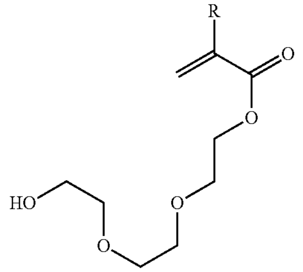
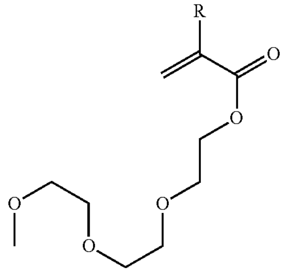
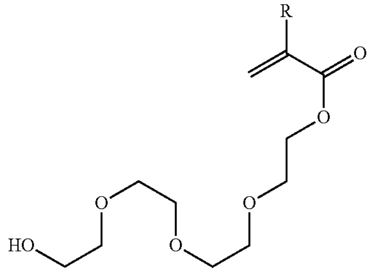

-continued
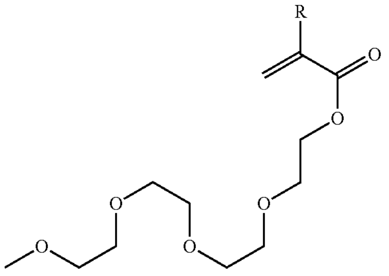
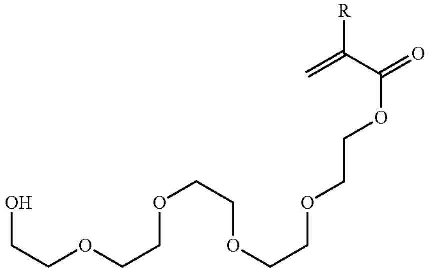
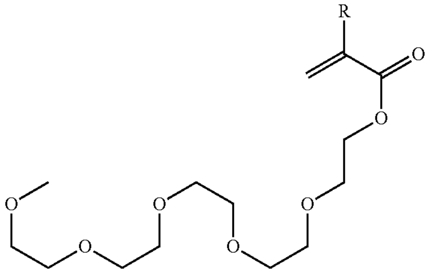
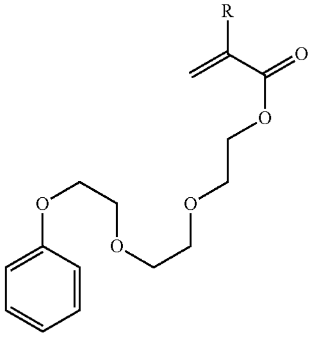
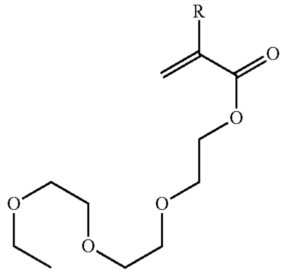
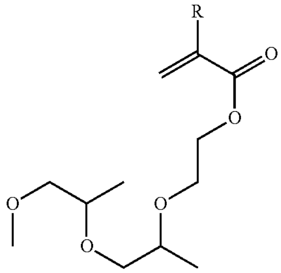
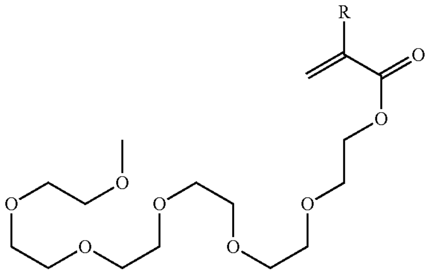
-continued
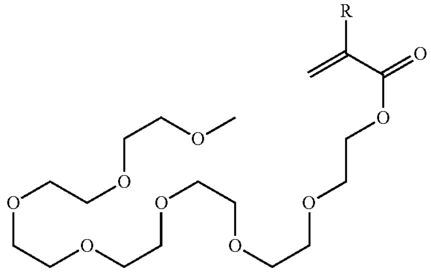
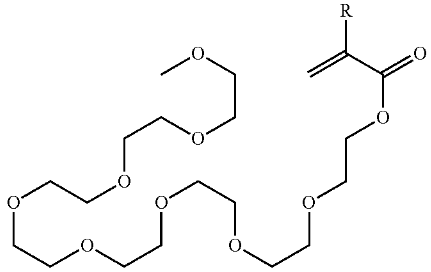
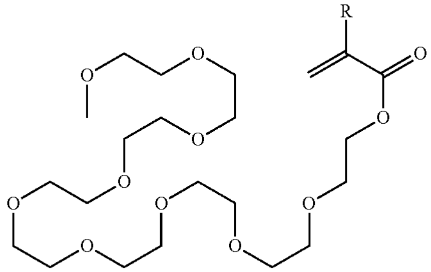
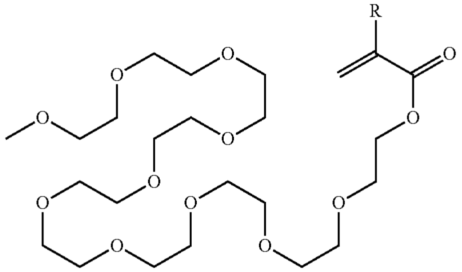
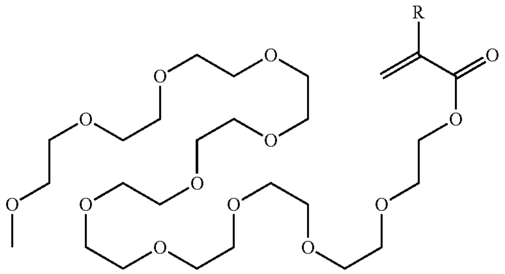
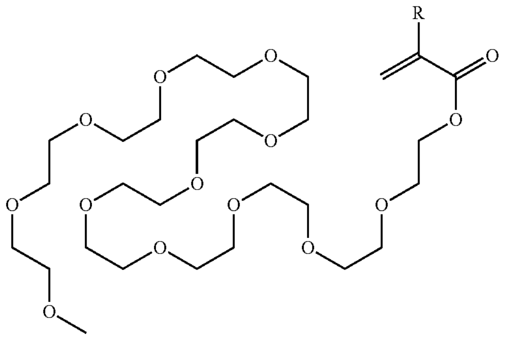

-continued
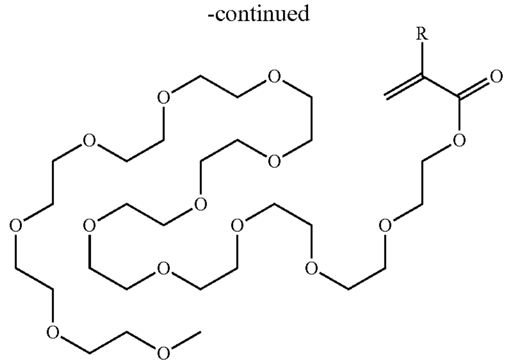
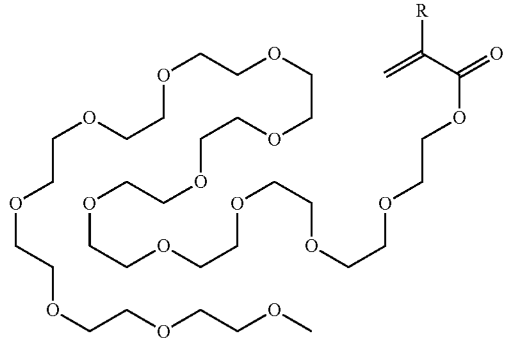
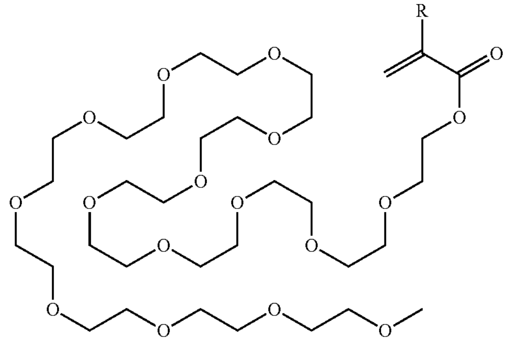
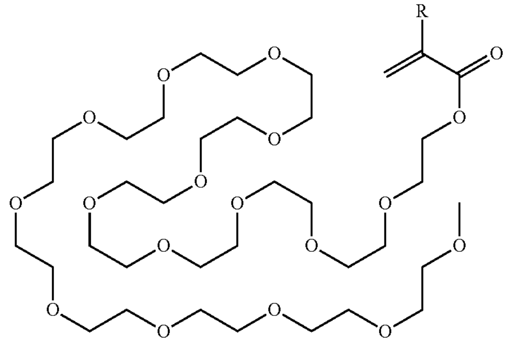
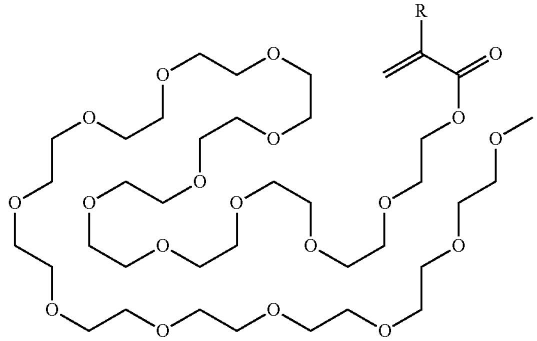
-continued
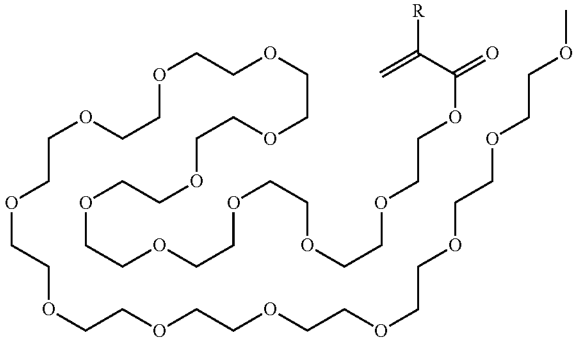
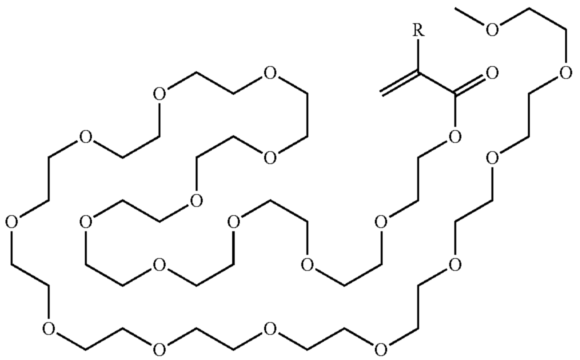
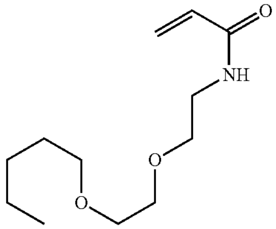
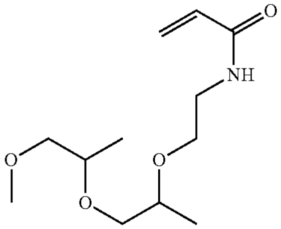
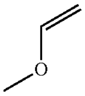
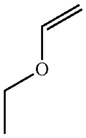
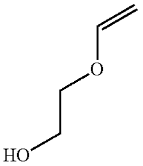
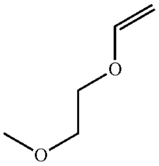
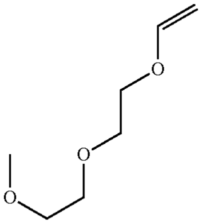
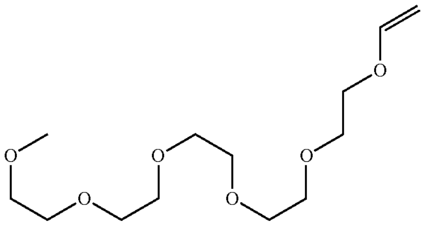

-continued
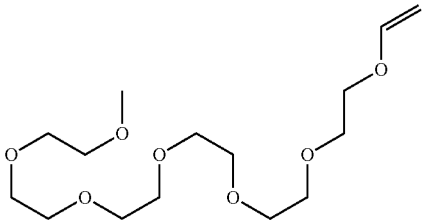
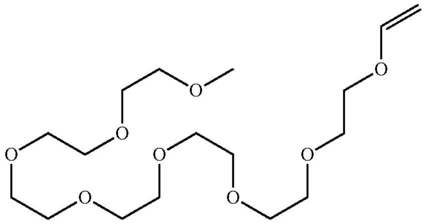
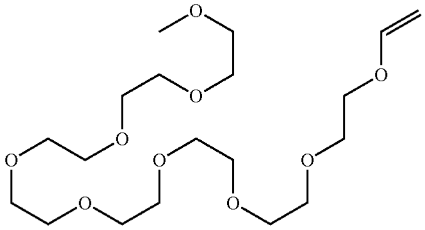
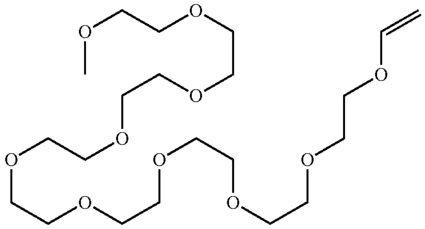
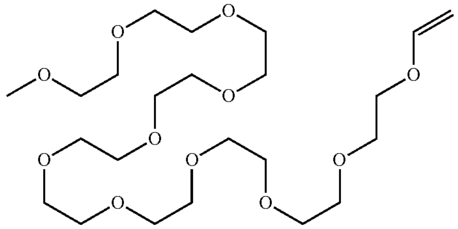
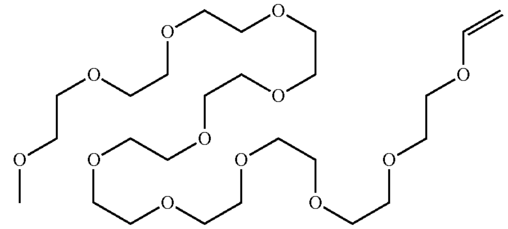
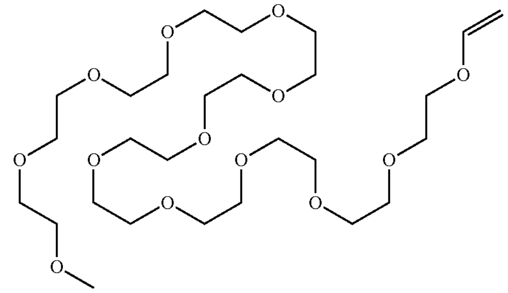
-continued
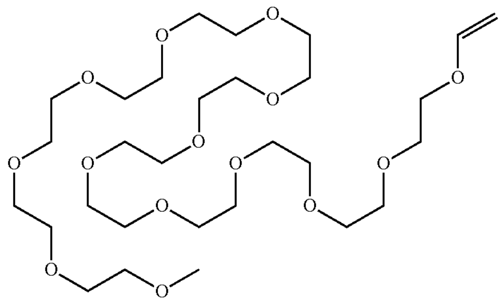
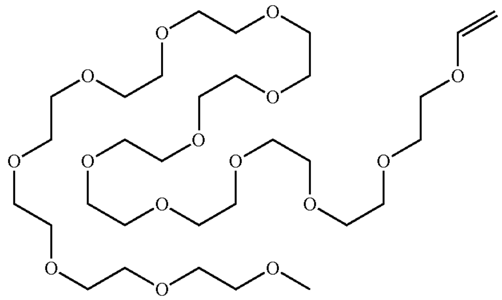
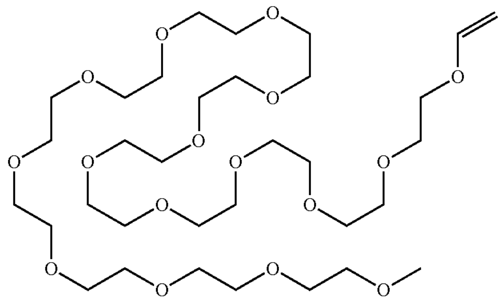
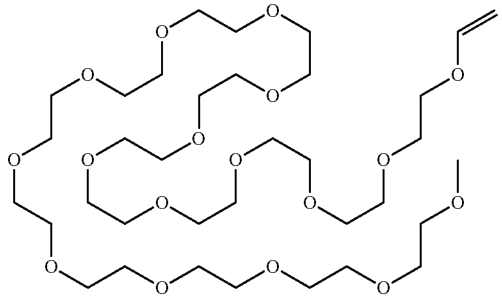
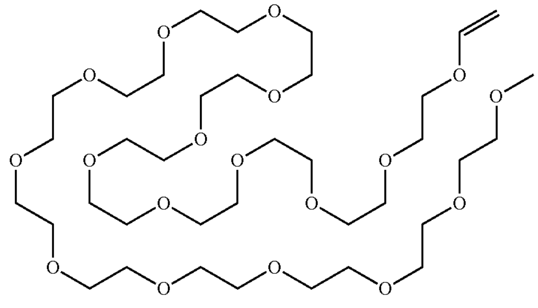

-continued
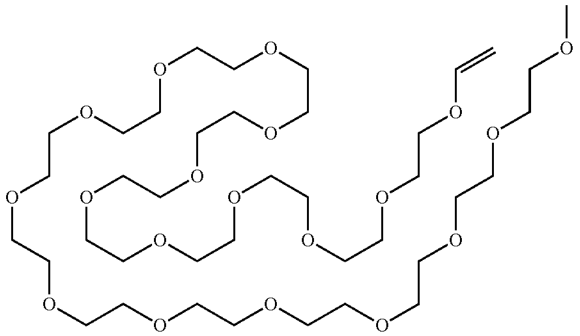
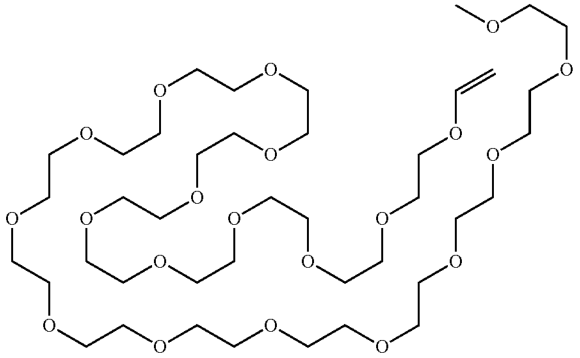
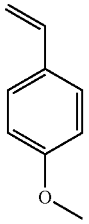
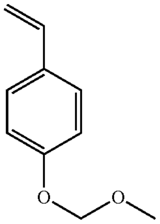
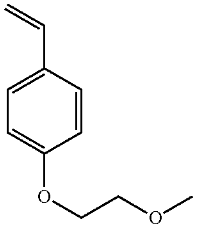
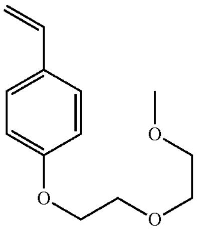
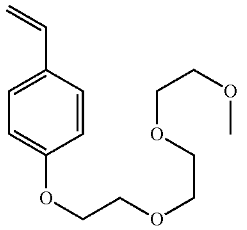
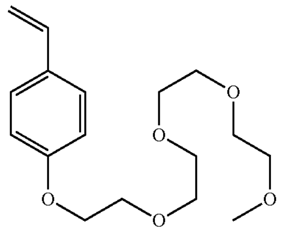
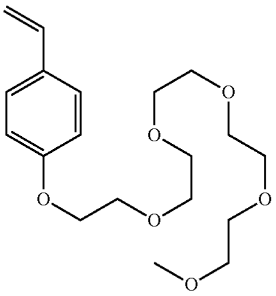
-continued
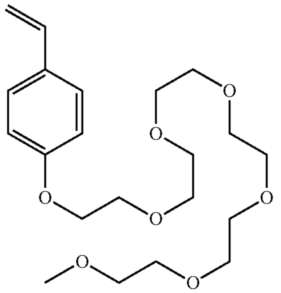
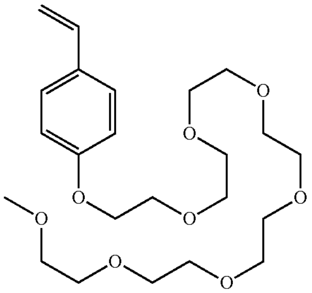
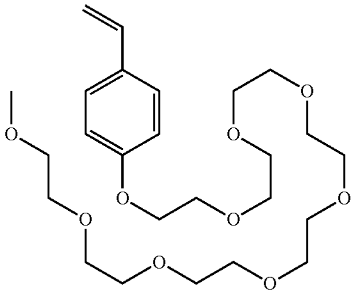
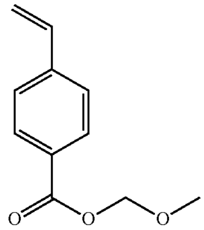
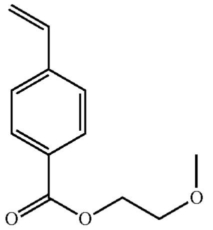
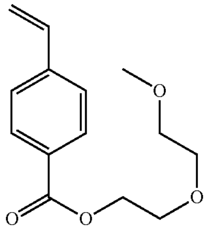
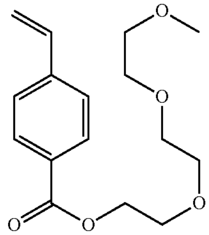
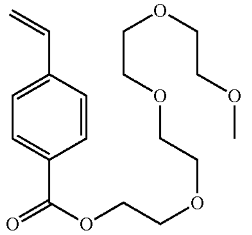
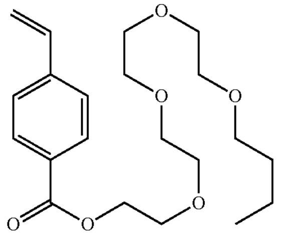

-continued

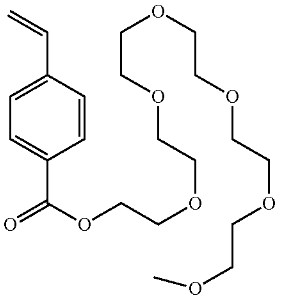

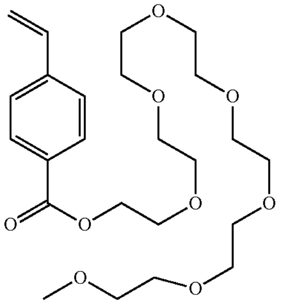

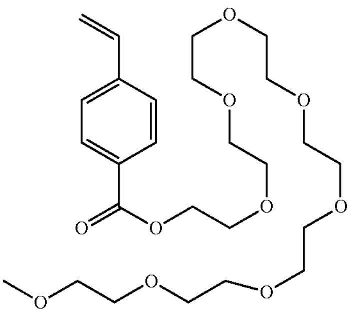

In the formulae, R represents a hydrogen atom or a methyl group.

(Repeating Unit-c)

For ion polymer components which are materials to form the ion polymer containing layer used for the inventive bio-electrode, in addition to the repeating units-A1 to -A7 and -b, it is also possible to copolymerize a hydrophilic repeating unit-c having a hydroxy group, a carboxy group, an ammonium salt, a betaine, an amide group, pyrrolidone, a lactone ring, a lactam ring, a sultone ring, sulfonic acid, a sodium salt of sulfonic acid, or a potassium salt of sulfonic acid in order to enhance electric conductivity. Specific examples of a monomer to give the hydrophilic repeating unit-c include the following. The copolymerization with the repeating unit containing such hydrophilic groups can increase the sensitivity of the dry electrode by increasing the sensitivity to ions released from the skin.

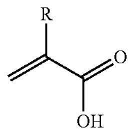

-continued

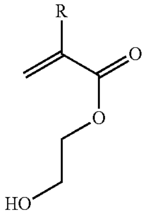

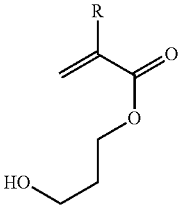

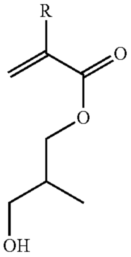

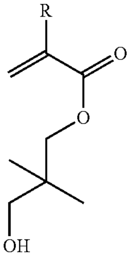

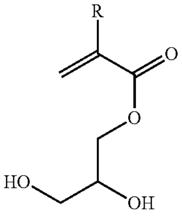

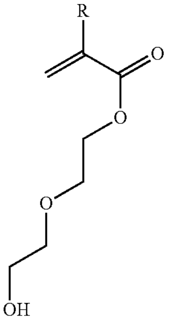

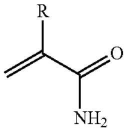

-continued
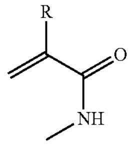
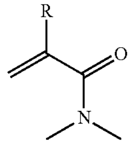
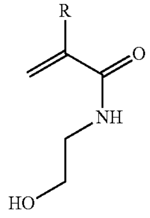
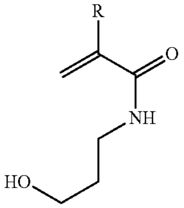
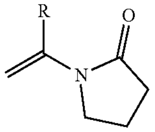
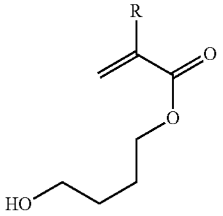
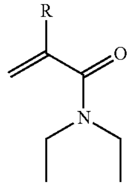
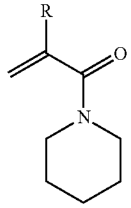
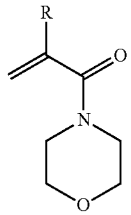
-continued
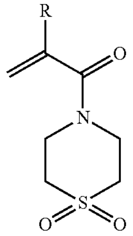
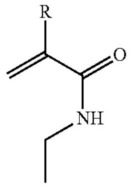
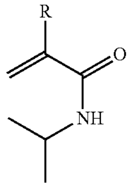
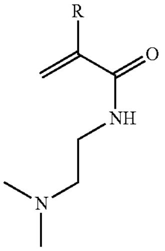
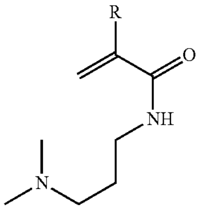
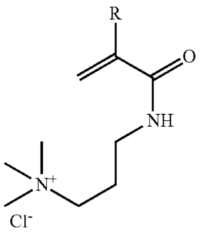
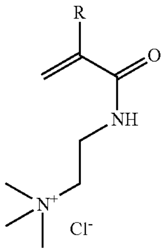

-continued
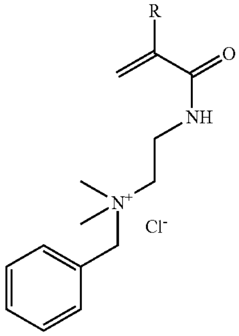
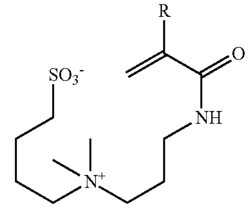
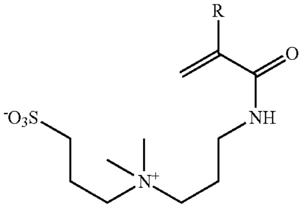
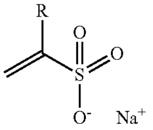
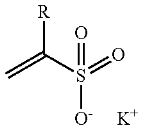
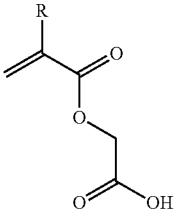
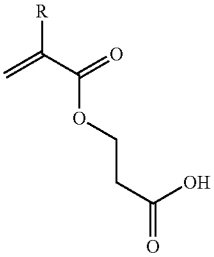
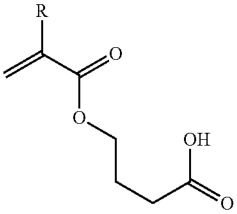
-continued
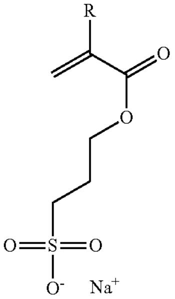
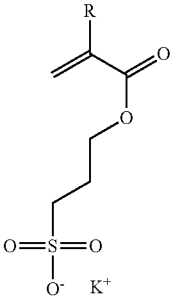
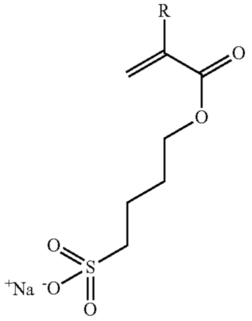
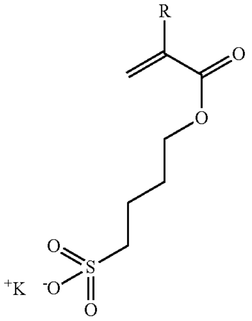
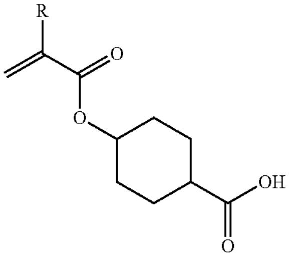
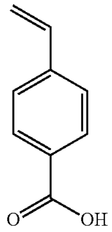

-continued
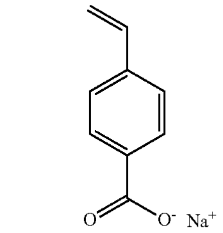
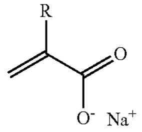
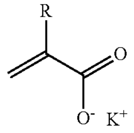
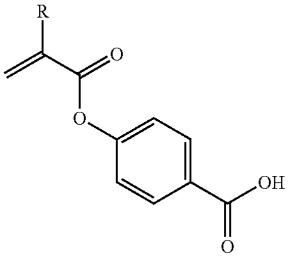
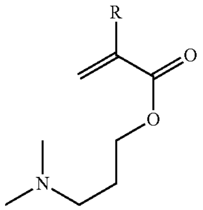
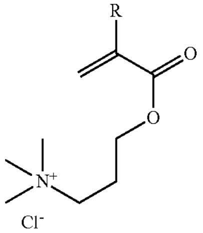
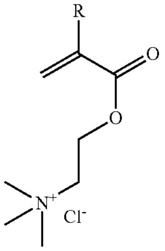
-continued
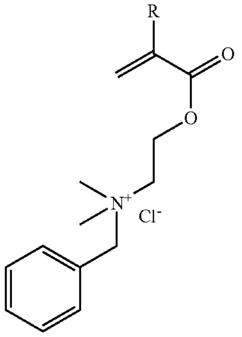
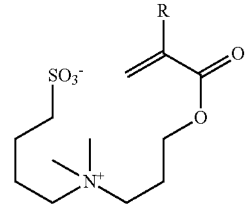
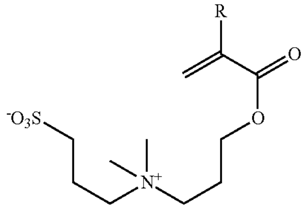
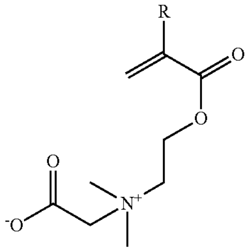
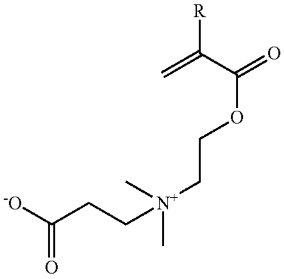
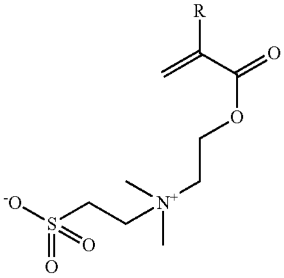

-continued
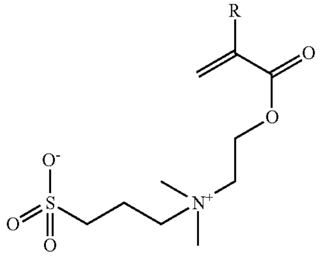
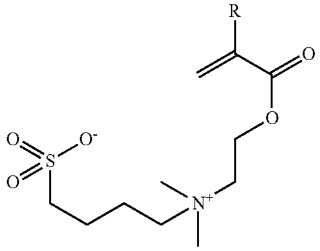
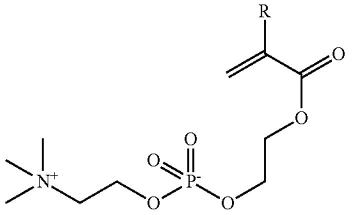
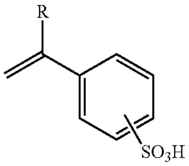
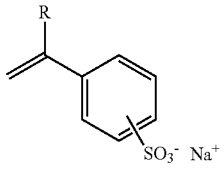
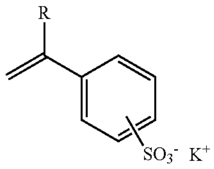
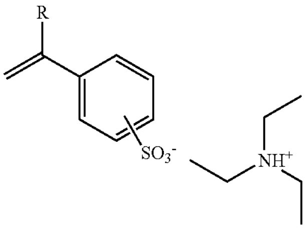
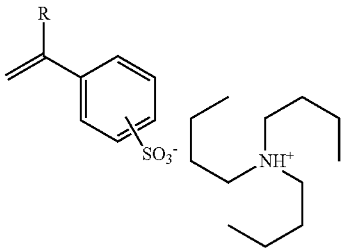
-continued
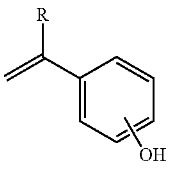
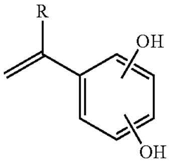
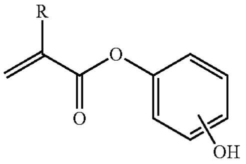
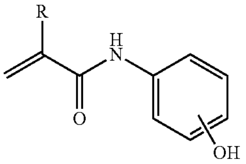
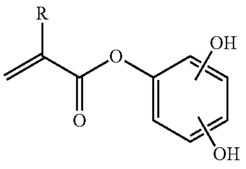
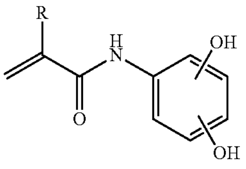
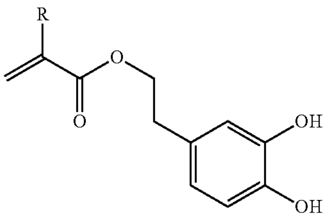
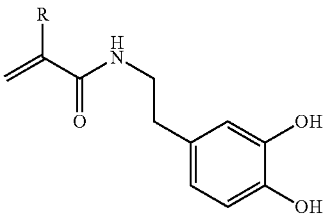
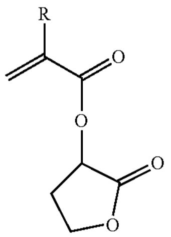

-continued
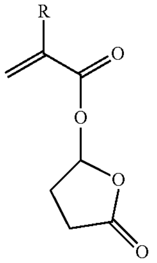
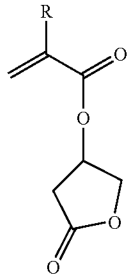
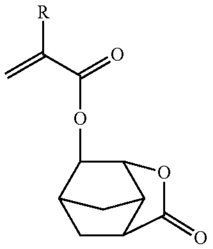
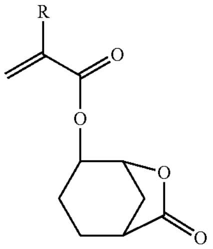
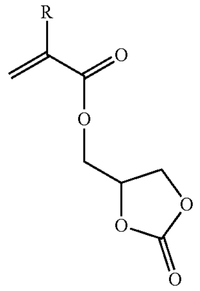
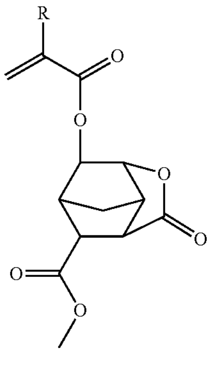
-continued
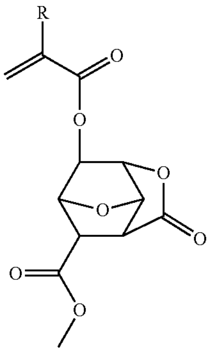
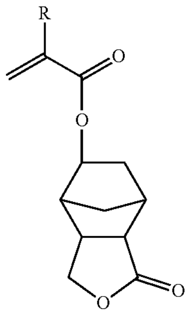
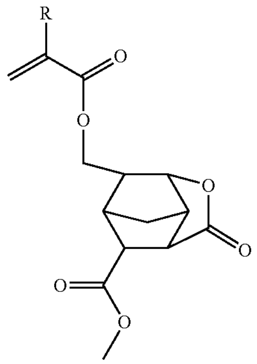
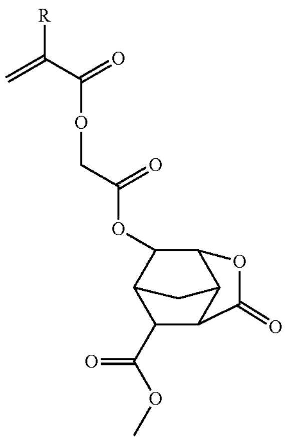

-continued
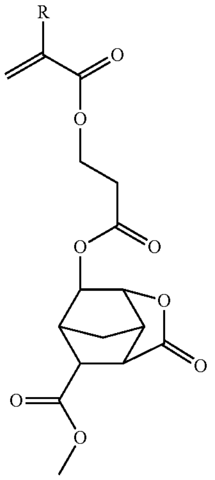
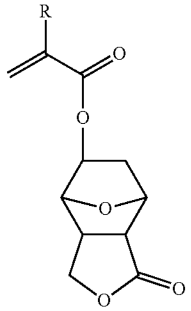
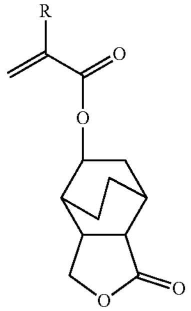
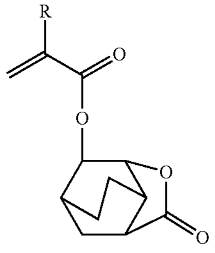
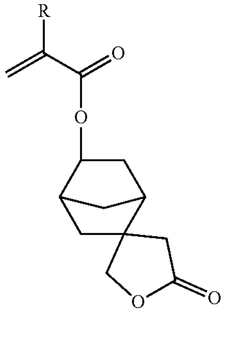
-continued
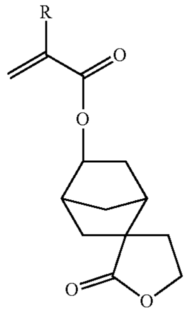
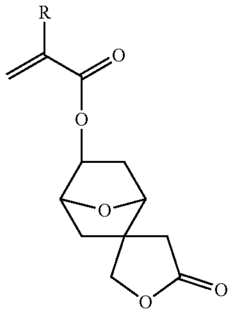
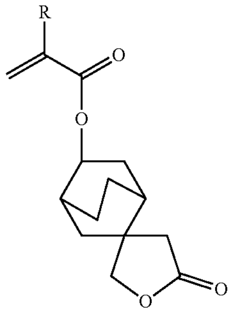
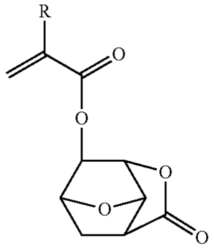
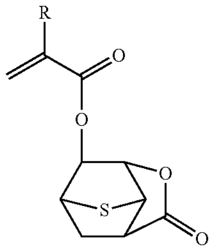

-continued
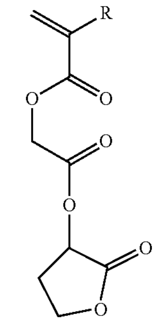
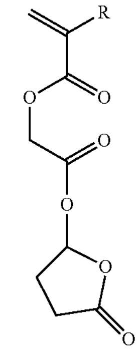
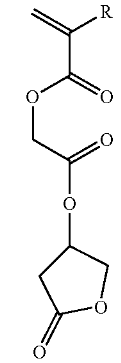
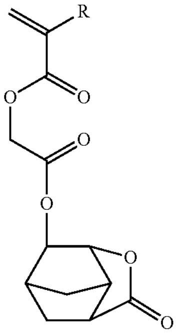
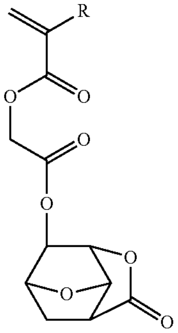
-continued
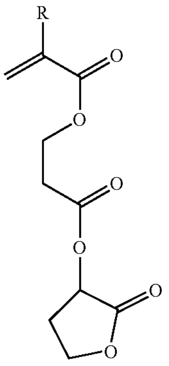
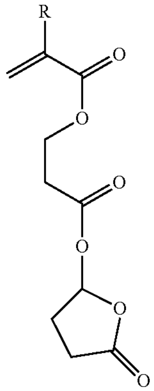
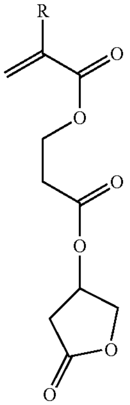
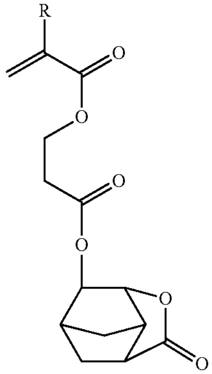

-continued

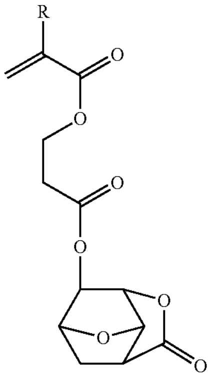

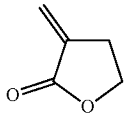

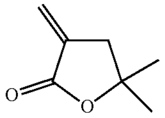

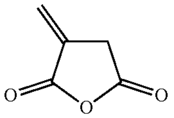

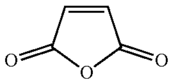

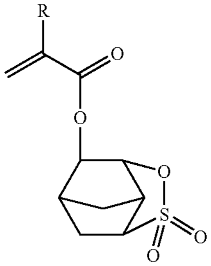

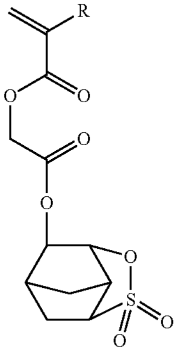

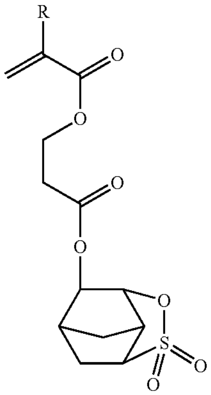

In the formulae, R represents a hydrogen atom or a methyl group.

(Repeating Unit-d)

Ion polymer components which are materials to form the ion polymer containing layer used for the inventive bio-electrode can have a repeating unit-d having fluorine, in addition to the repeating units selected from the above repeating units-A1 to -A7, -b and -c.

The repeating unit-d having fluorine can be obtained from the monomers specifically exemplified below.

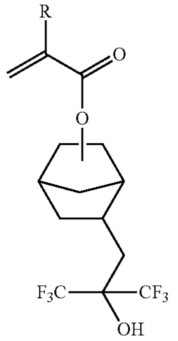

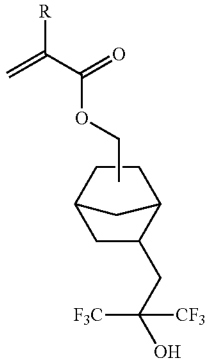

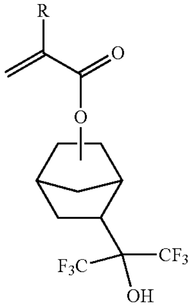

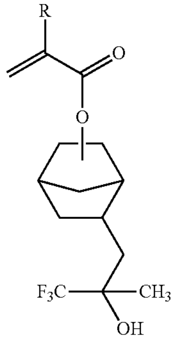

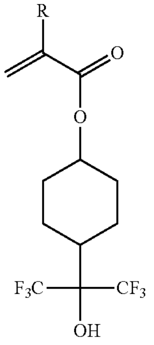

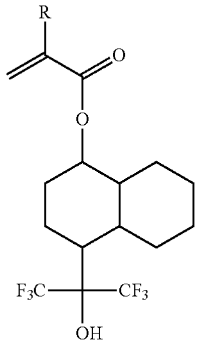

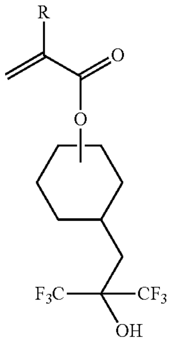

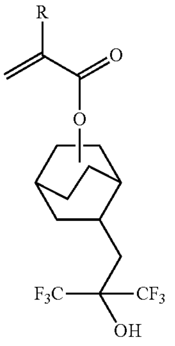

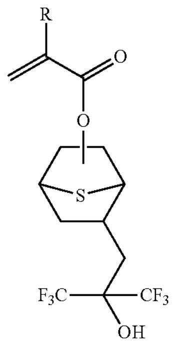

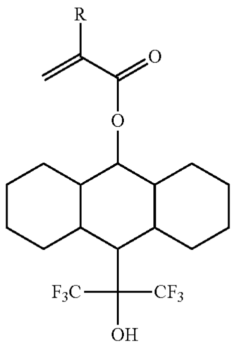

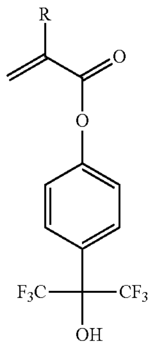

-continued
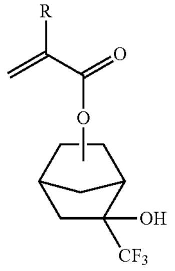
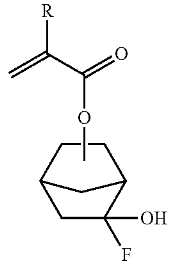
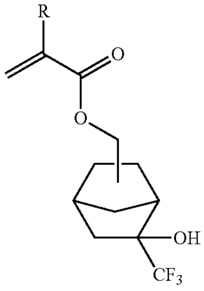
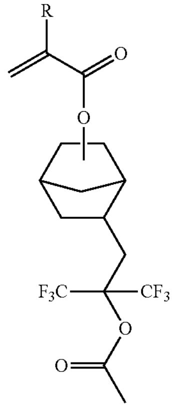
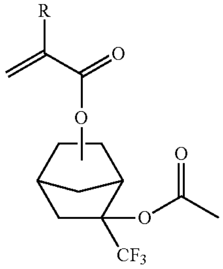
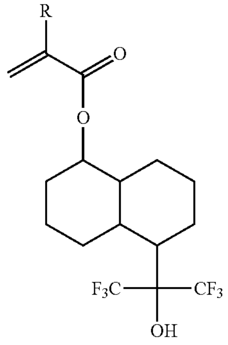
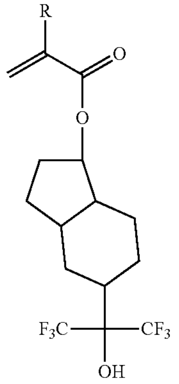
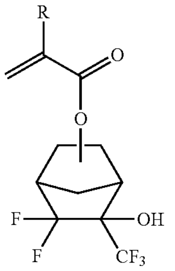
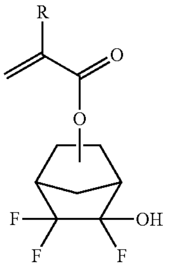
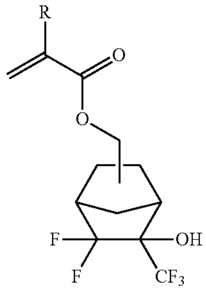
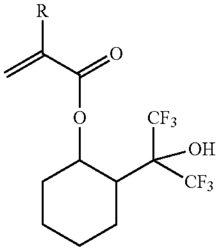
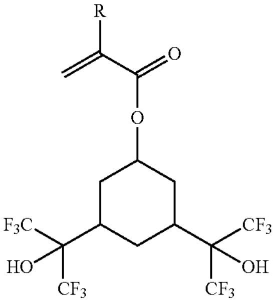
-continued
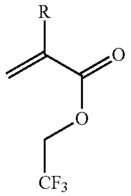
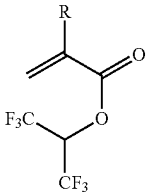
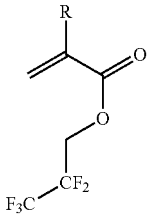
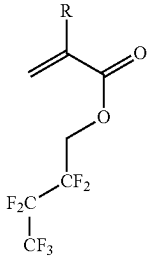
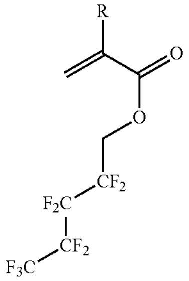
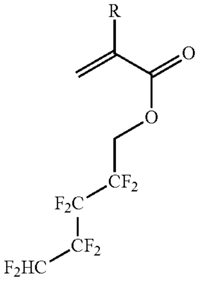
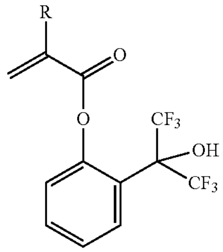
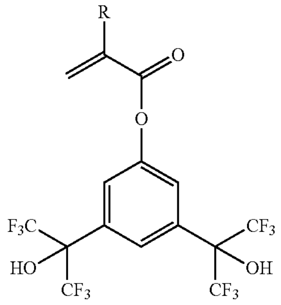
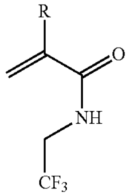
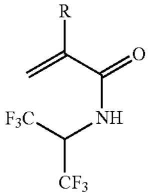
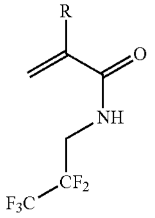
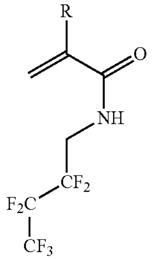
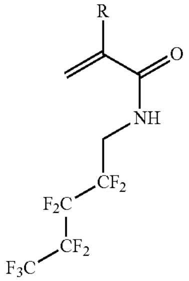
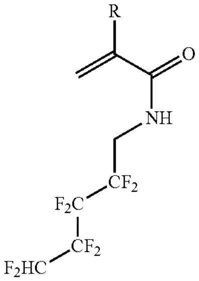
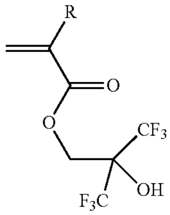
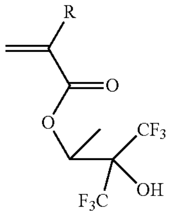
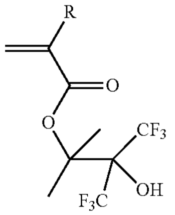

-continued
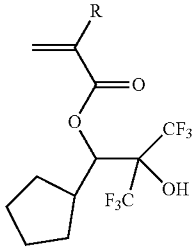
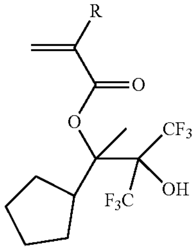
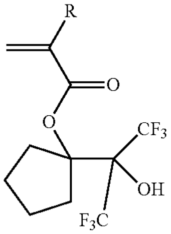
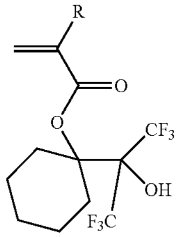
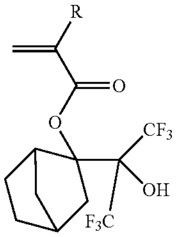
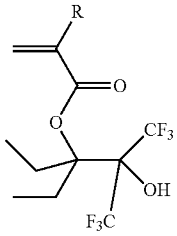
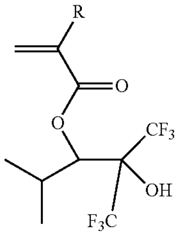
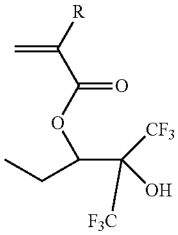
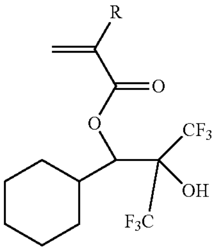
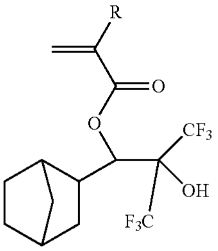
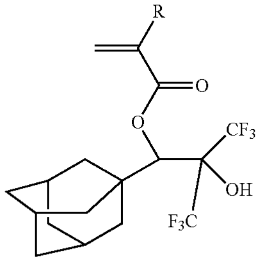
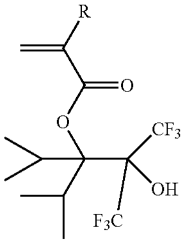
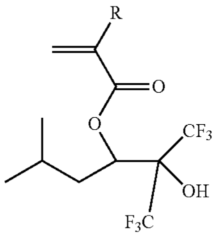
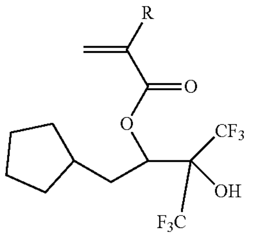
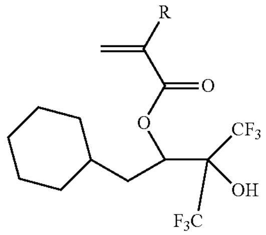
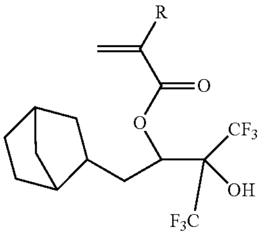
-continued
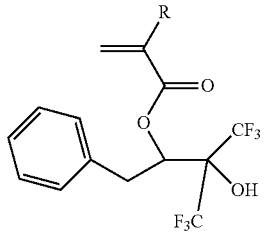
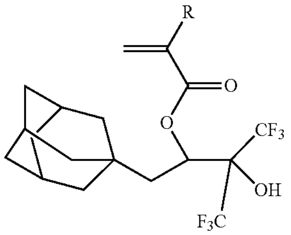
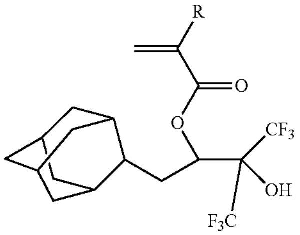
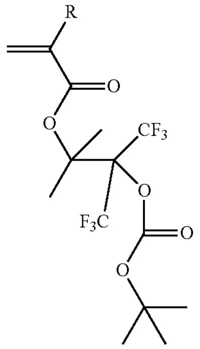
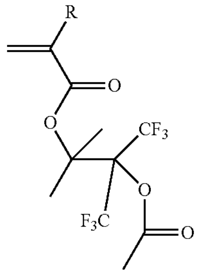
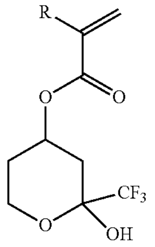
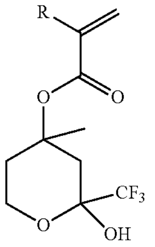
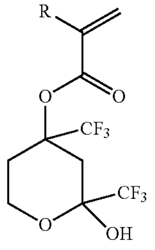
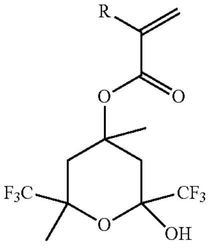
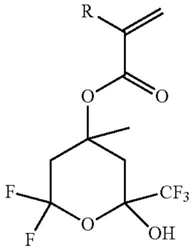
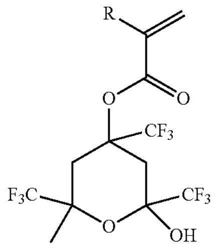
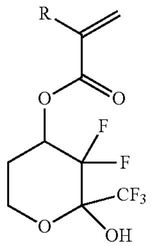
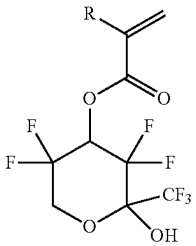
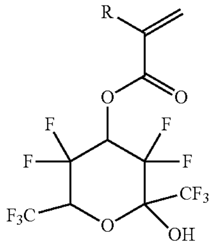
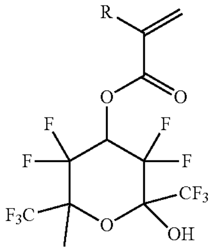

-continued
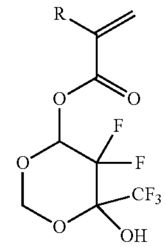
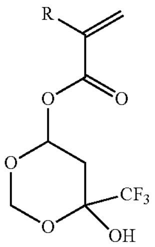
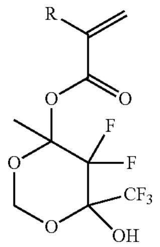
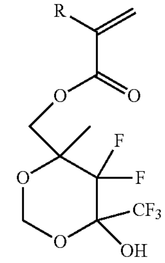
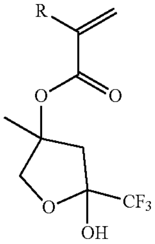
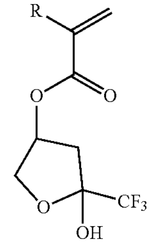
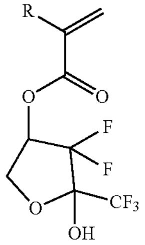
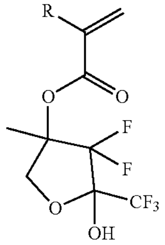
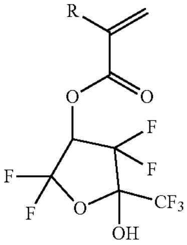
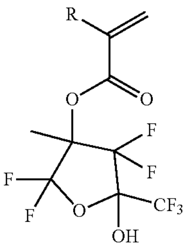
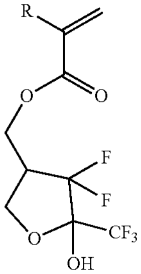
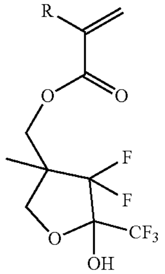
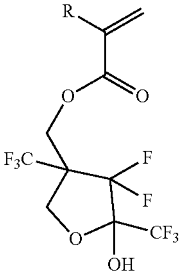
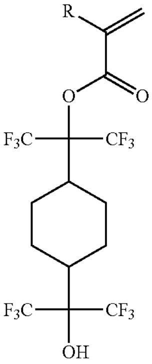
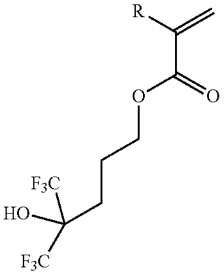
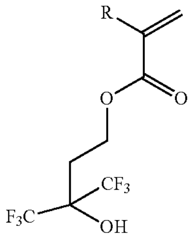
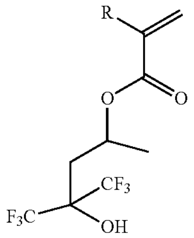
-continued
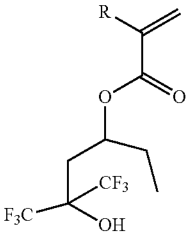
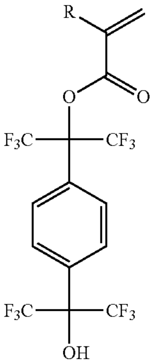
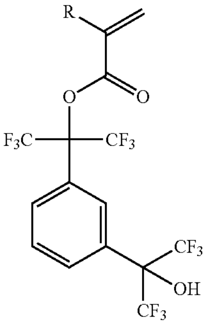
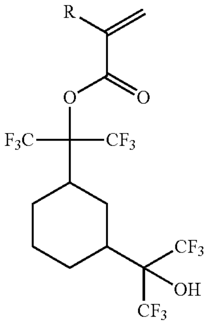
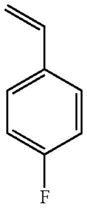
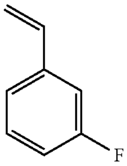
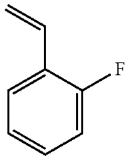
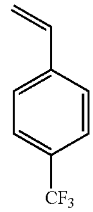
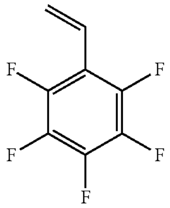
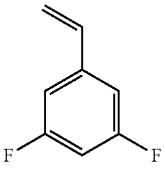
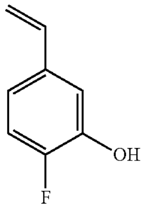
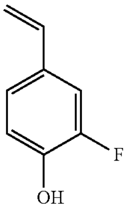
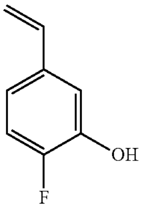
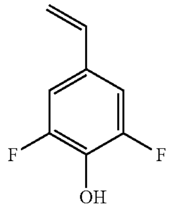
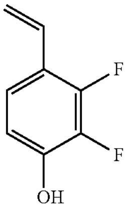
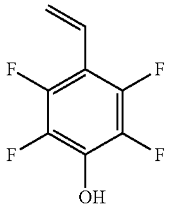
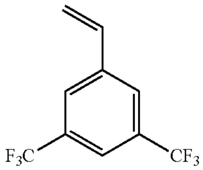
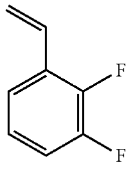
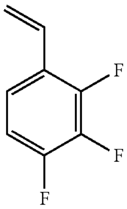

-continued

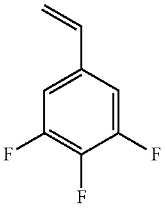
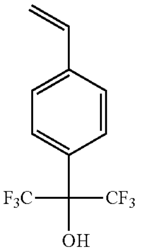
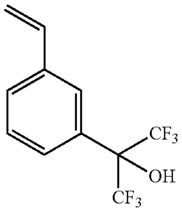
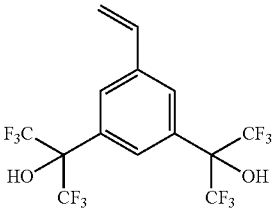
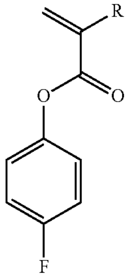
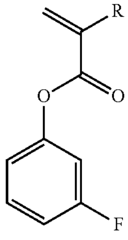
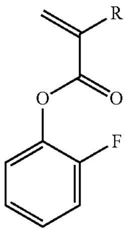
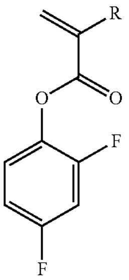
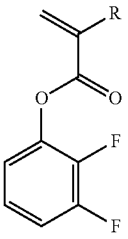
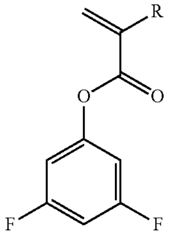
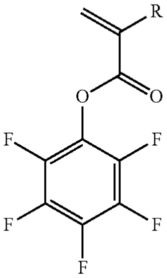
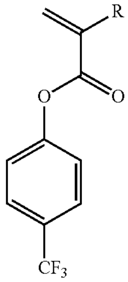
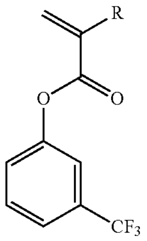
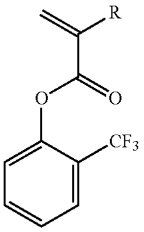
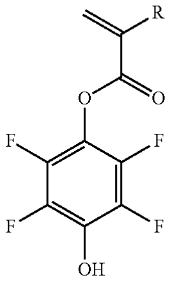
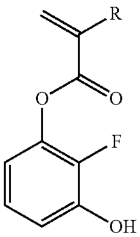
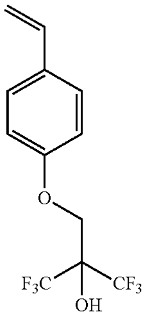
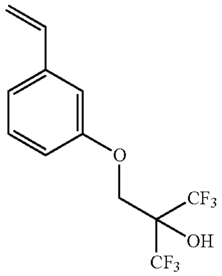

-continued

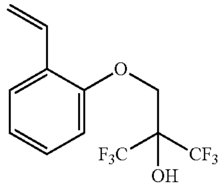
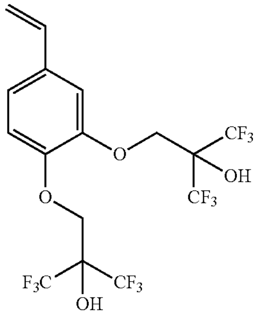
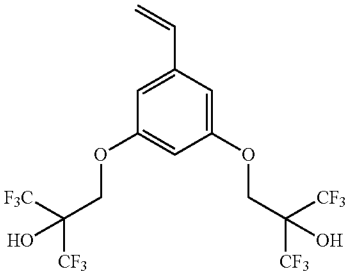
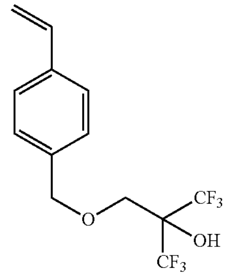
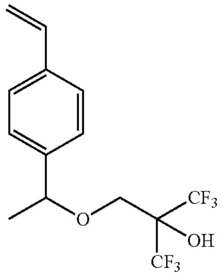
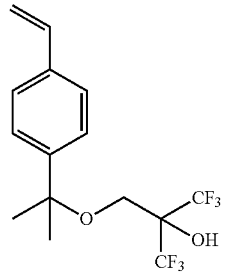
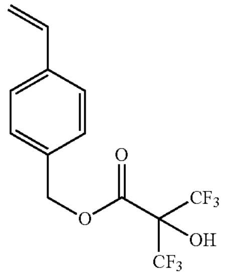
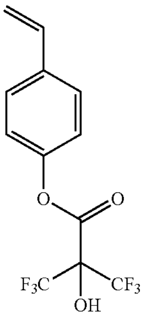

In the formulae, R represents a hydrogen atom or a methyl group.

(Repeating Unit-e)

Ion polymer components which are materials to form the ion polymer containing layer used for the inventive bio-electrode can have a repeating unit-e having a nitro group, in addition to the repeating units selected from the above repeating units-A1 to -A7, -b, -c, and -d.

The repeating unit-e having a nitro group can be obtained from the monomers specifically exemplified below.

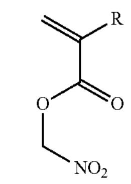
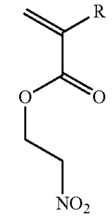
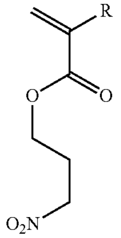
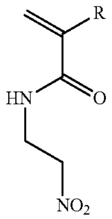
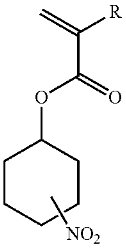
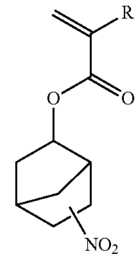
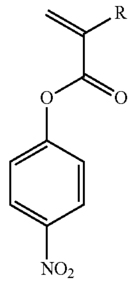
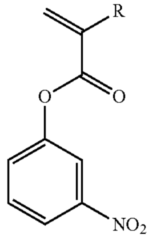
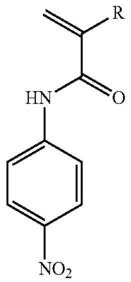
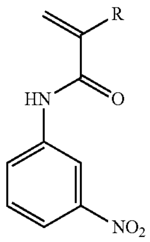
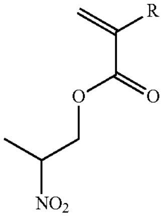
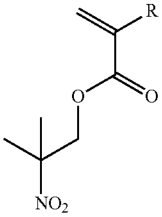
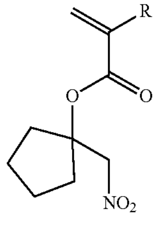
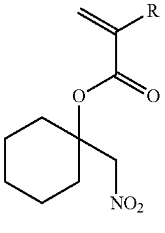
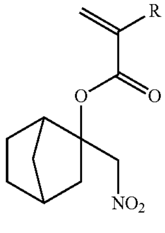
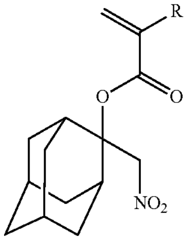
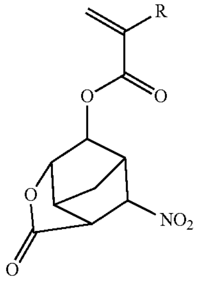
-continued
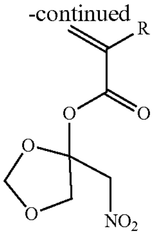
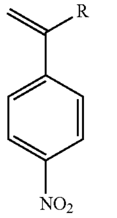
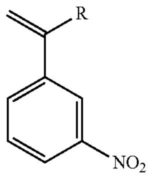
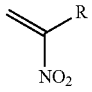
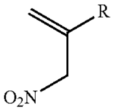
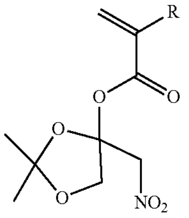
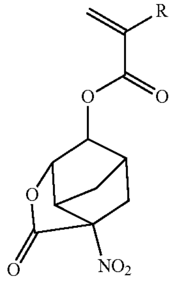
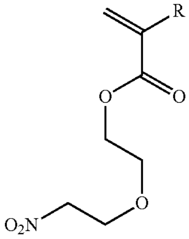
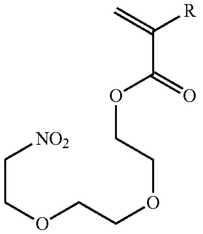
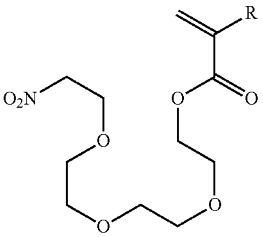
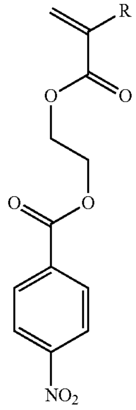
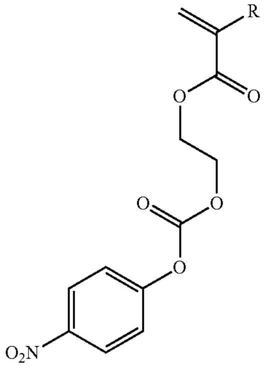
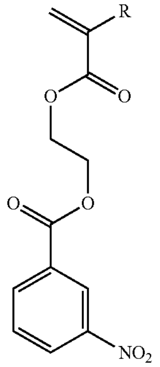

-continued
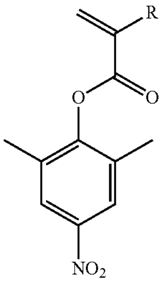
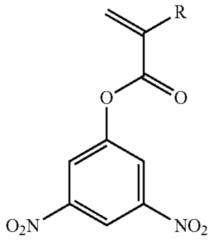
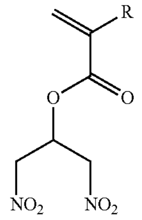
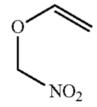
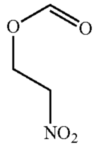
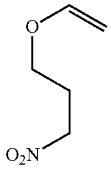
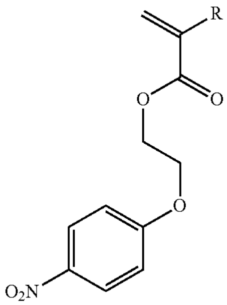
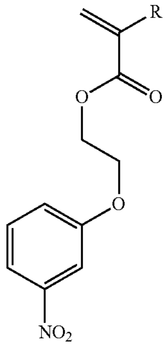
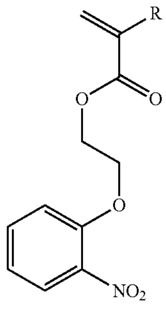
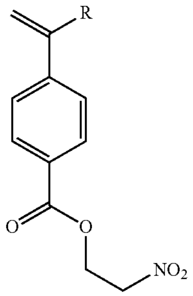
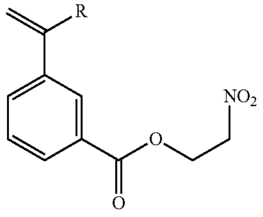
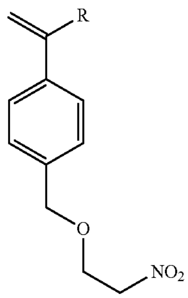
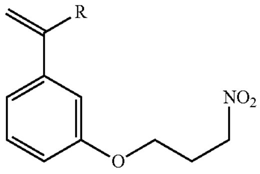
-continued
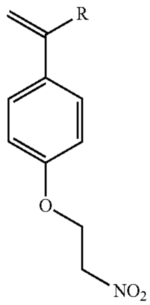
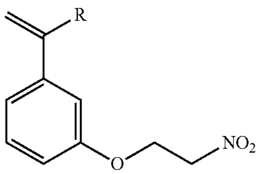
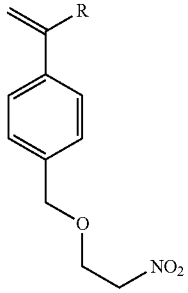
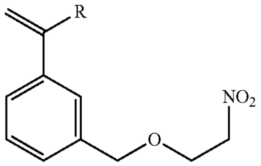
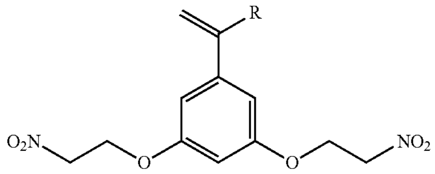
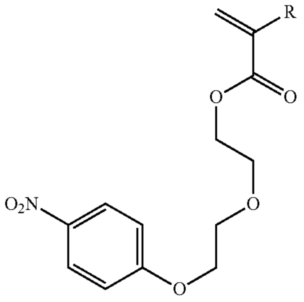
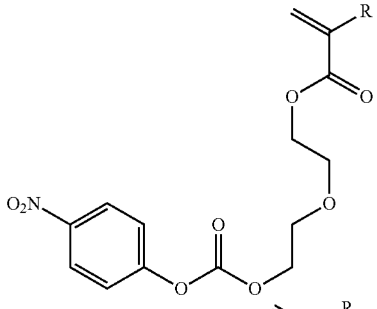
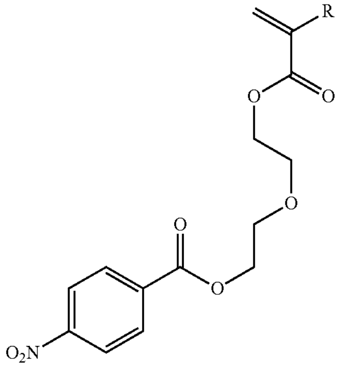

-continued
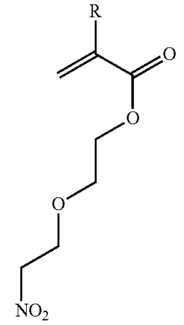
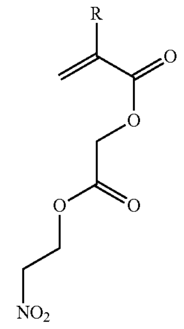
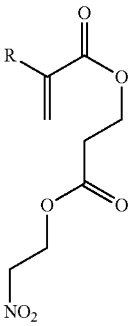
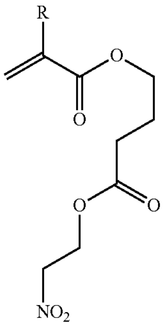
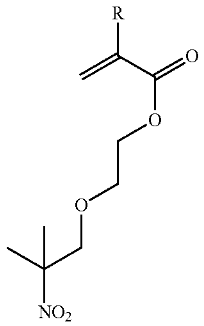
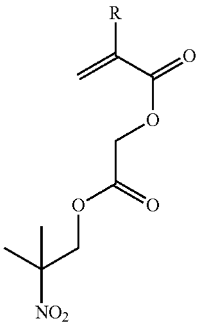
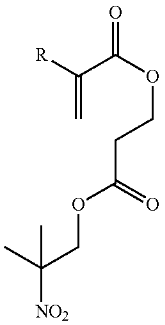
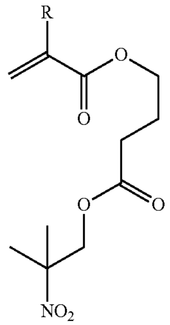
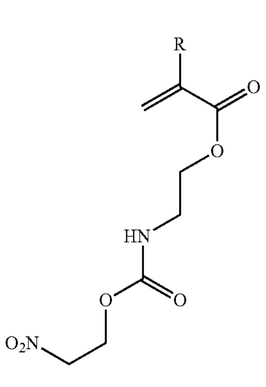
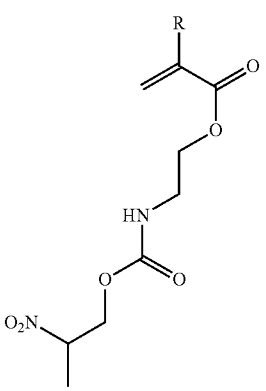
-continued
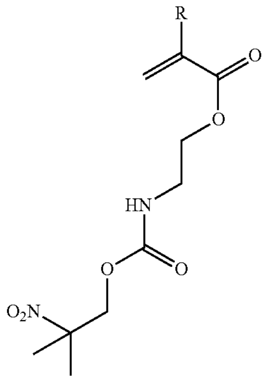
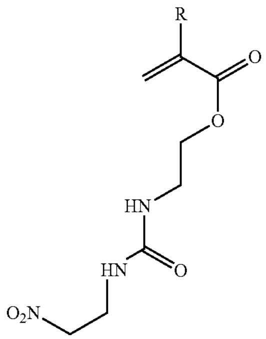
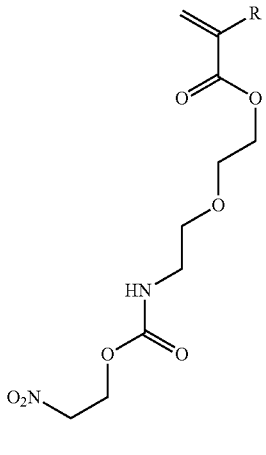
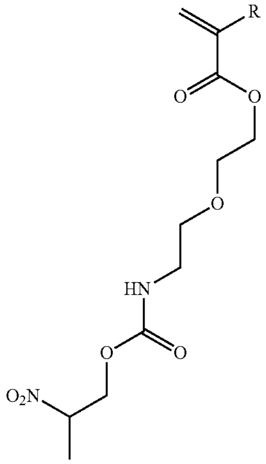
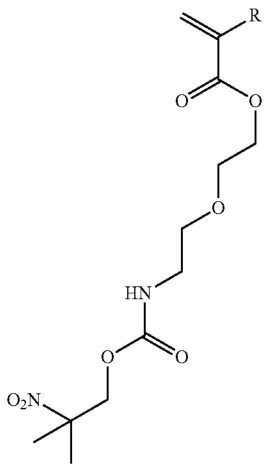
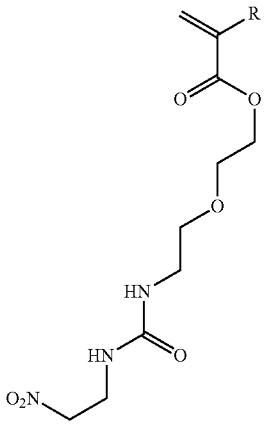
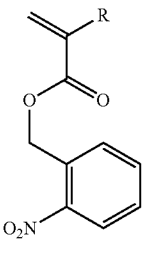
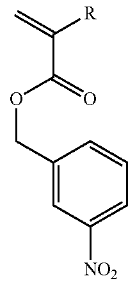
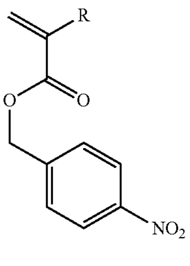

-continued
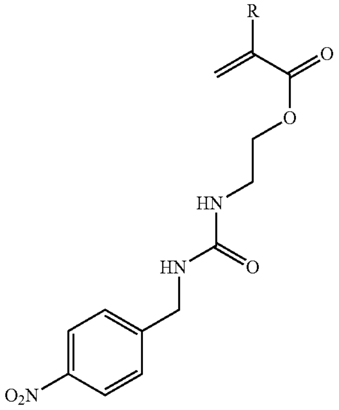
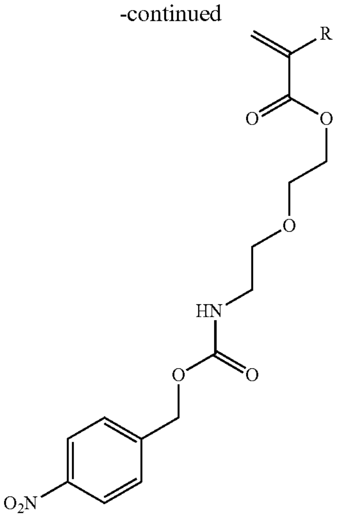
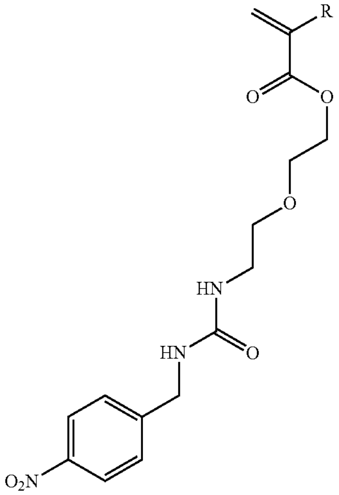
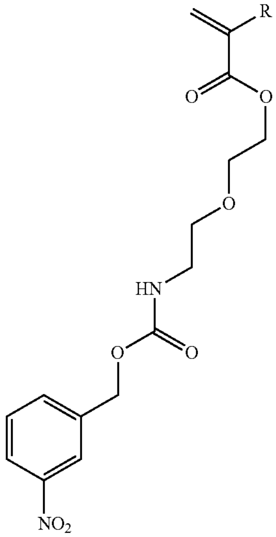
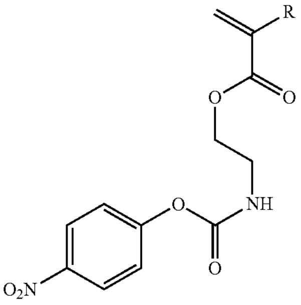
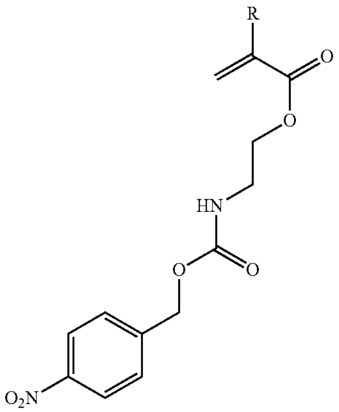
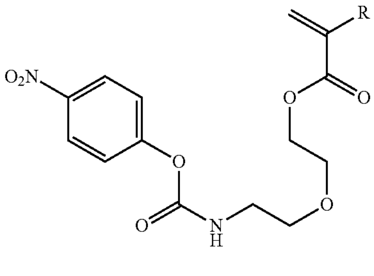

-continued
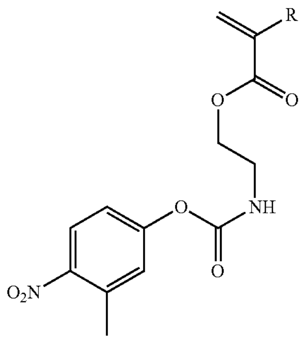
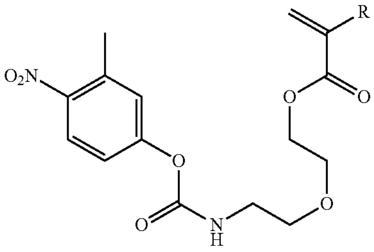
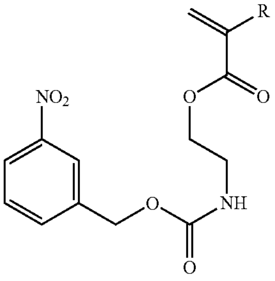
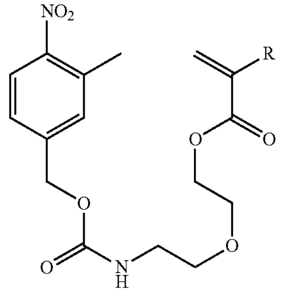
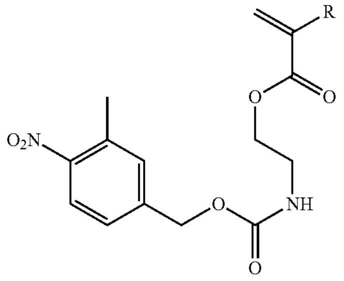
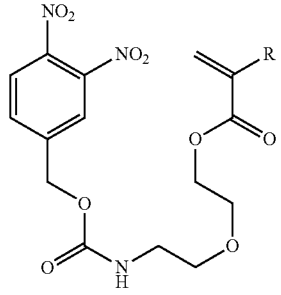
-continued
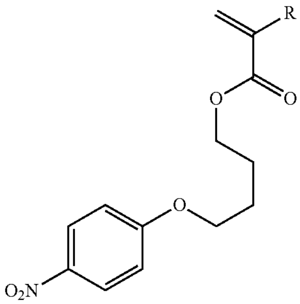
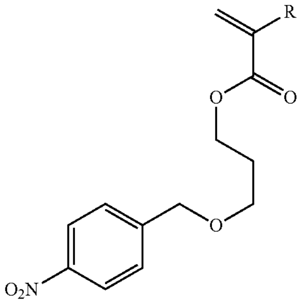
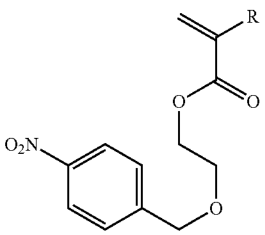
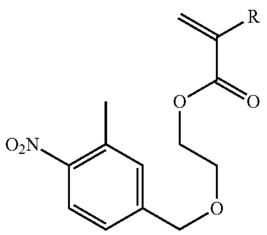
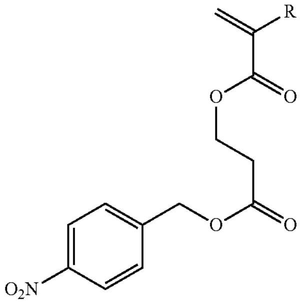
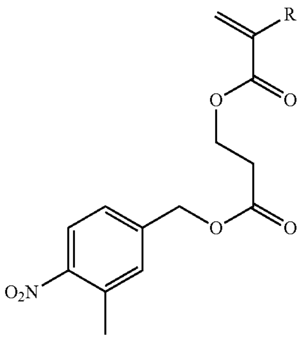

-continued
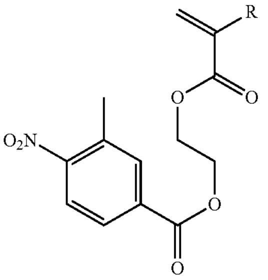
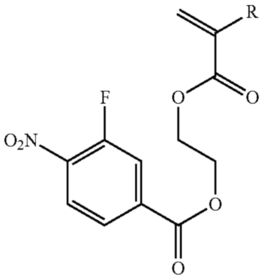
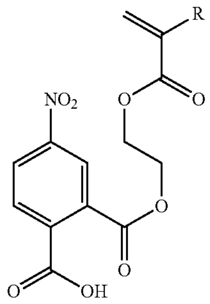
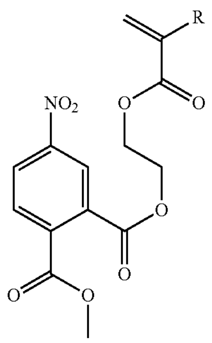
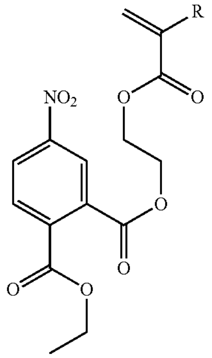
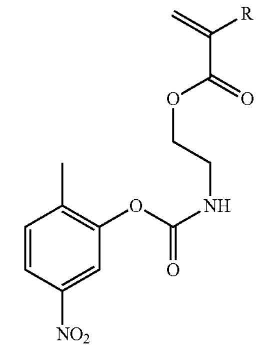
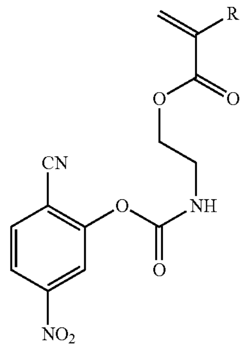
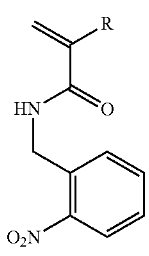
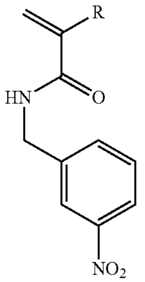
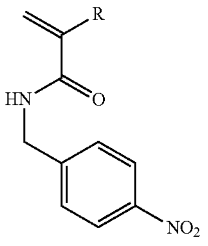
-continued
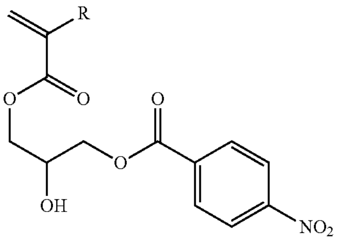
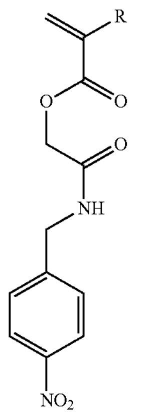
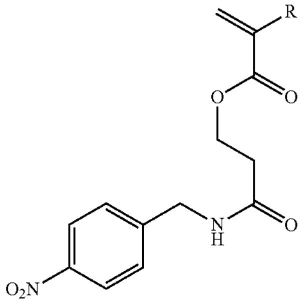
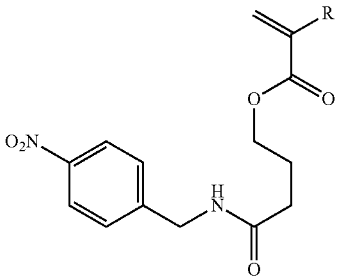
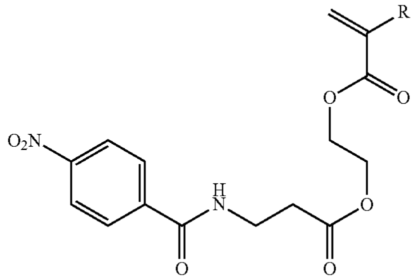
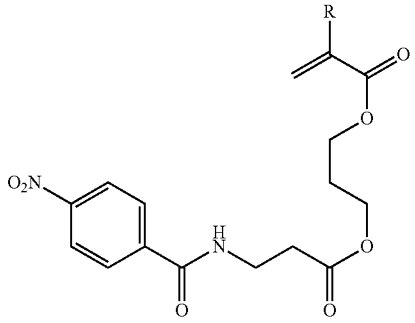

-continued
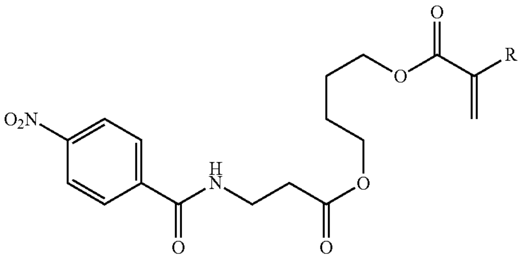
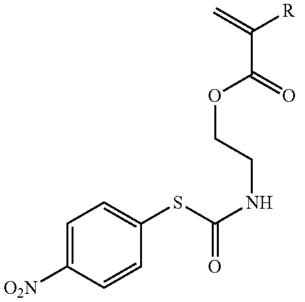
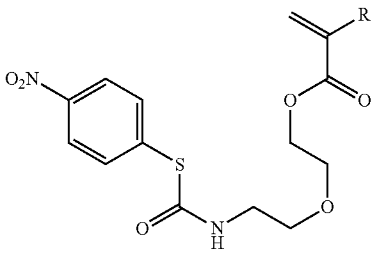
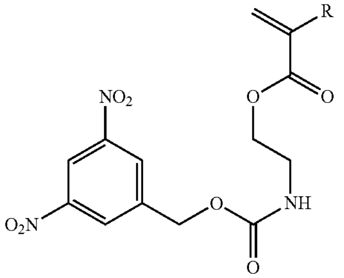
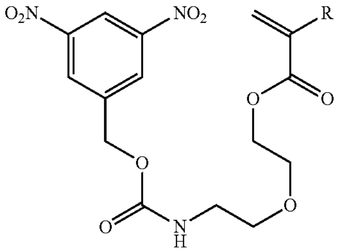
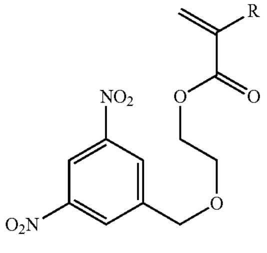
-continued
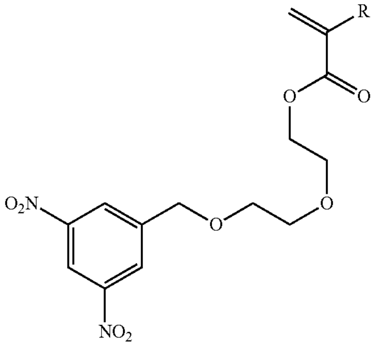
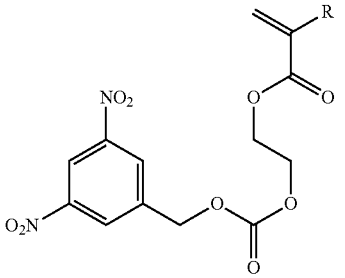
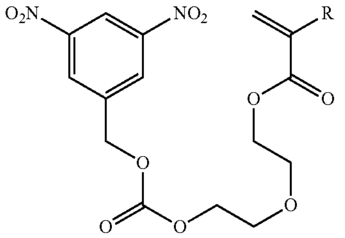
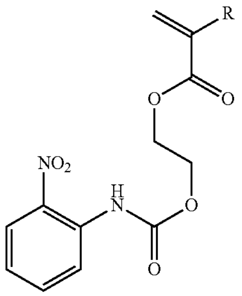
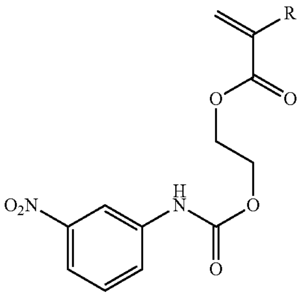
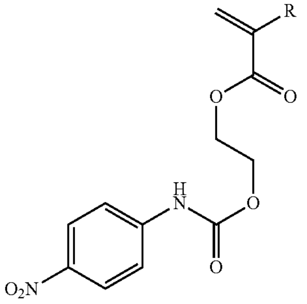

-continued

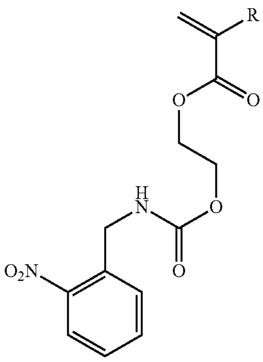

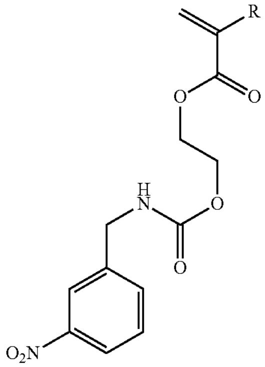

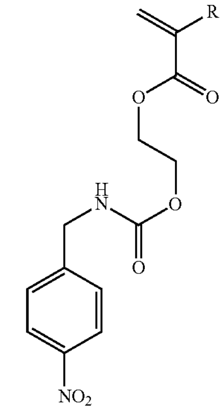

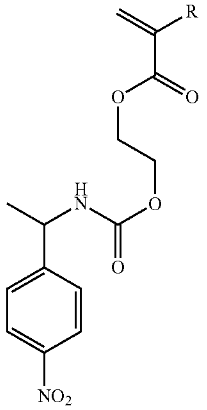

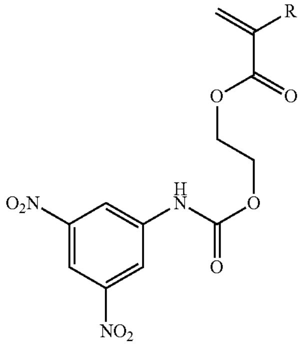

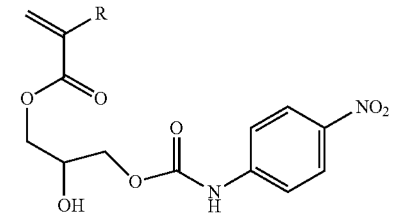

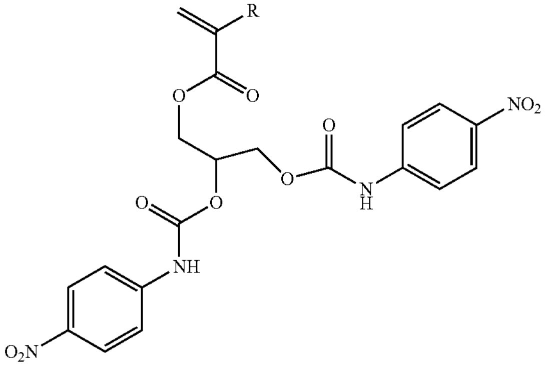

In the formulae, R represents a hydrogen atom or a methyl group.

(Repeating Unit-f)

Ion polymer components which are materials to form the ion polymer containing layer used for the inventive bio-electrode can have a repeating unit-f having a cyano group, in addition to the repeating units selected from the above repeating units-A1 to -A7, -b, -c, -d, and -e.

The repeating unit-f having a cyano group can be obtained from the monomers specifically exemplified below.

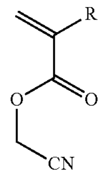

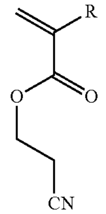

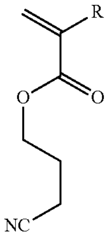

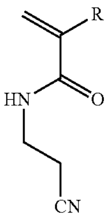

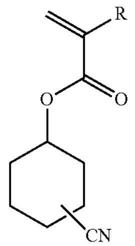

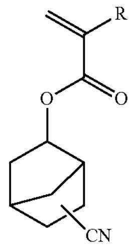

-continued
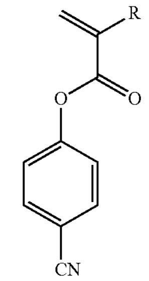
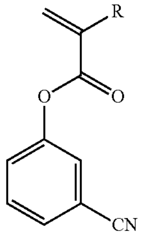
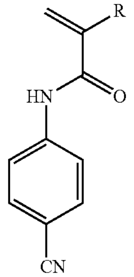
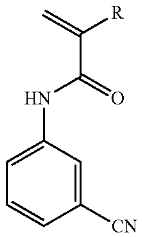
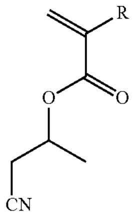
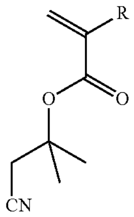
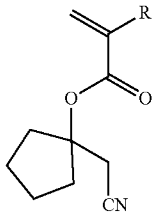
-continued
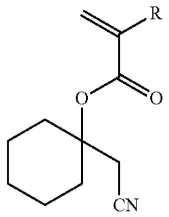
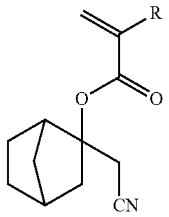
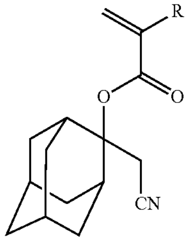
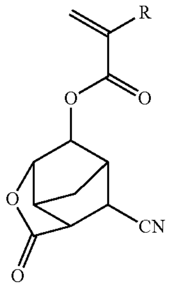
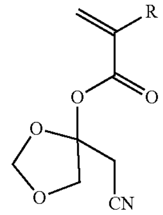
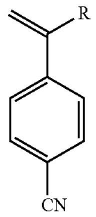
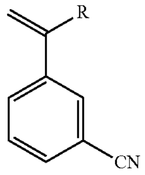
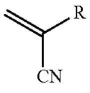

-continued
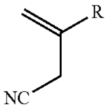
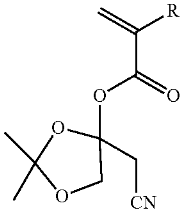
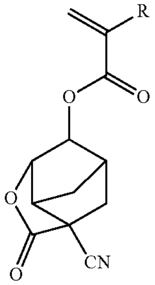
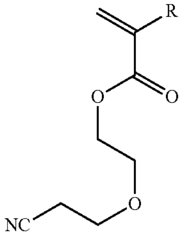
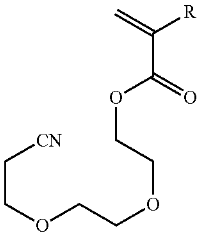
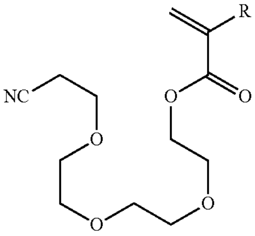
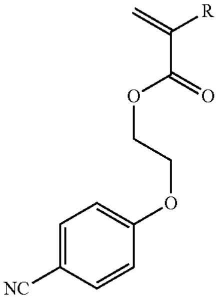
-continued
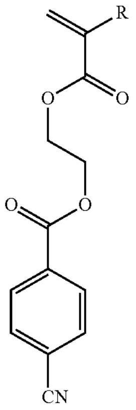
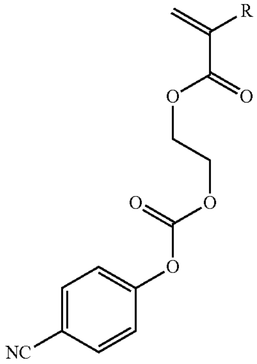
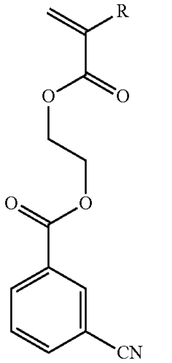
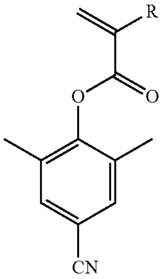
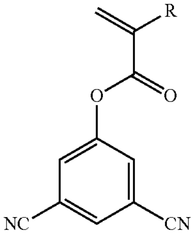

-continued
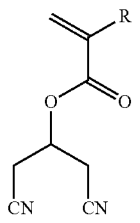
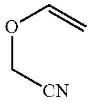
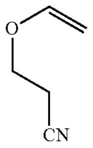
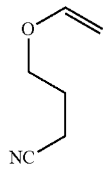
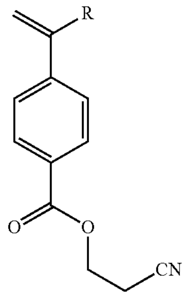
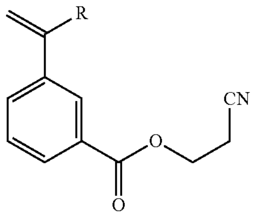
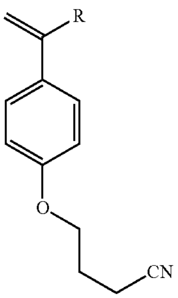
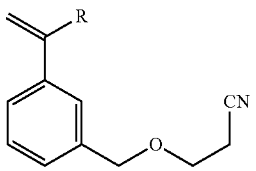
-continued
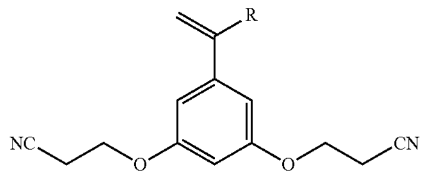
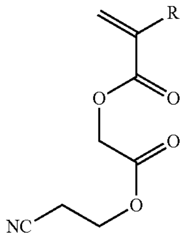
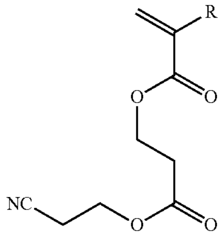
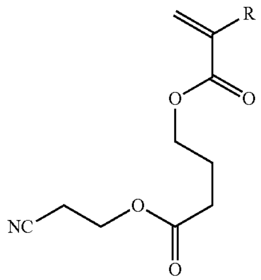
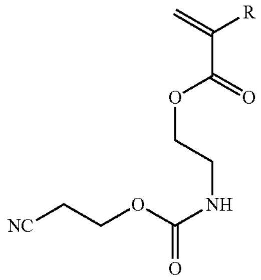
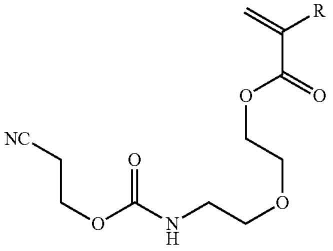
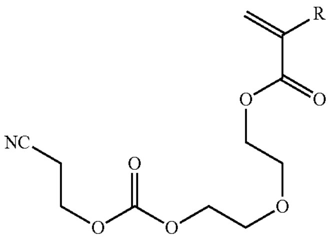

-continued

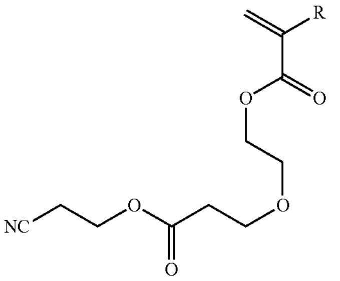

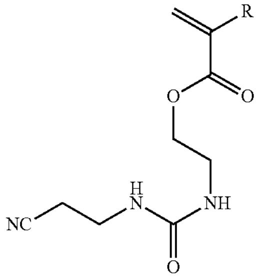

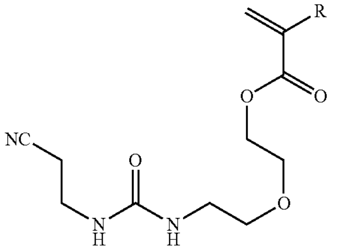

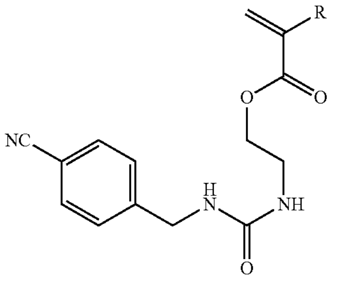

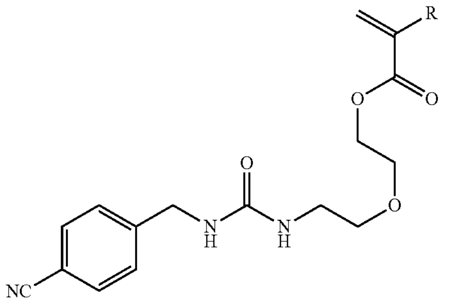

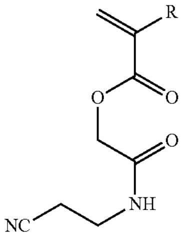

-continued

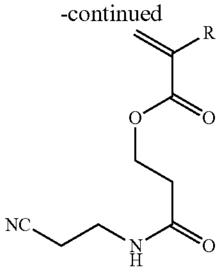

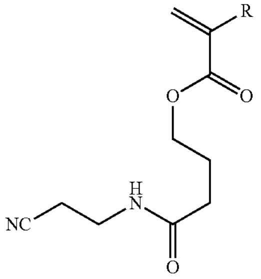

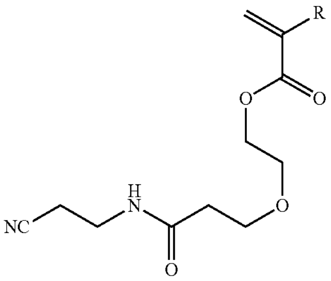

In the formulae, R represents a hydrogen atom or a methyl group.

(Repeating Unit-g)

Ion polymer components which are materials to form the ion polymer containing layer used for the inventive bio-electrode can have a repeating unit-g having an oxirane group or an oxetane group, in addition to the repeating units selected from the above repeating units-A1 to -A7, -b, -c, -d, -e and -f.

The repeating unit-g having an oxirane group or an oxetane group can be obtained from the monomers specifically exemplified below.

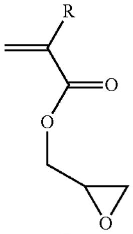

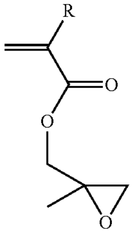

-continued
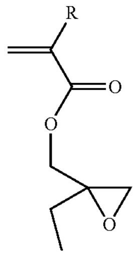
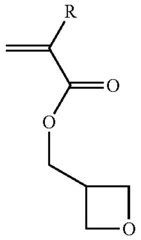
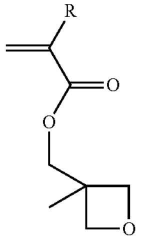
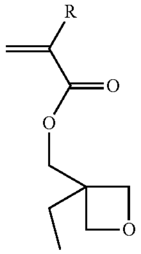
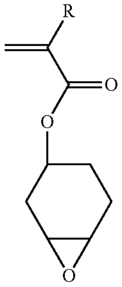
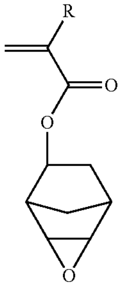
-continued
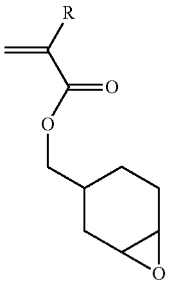
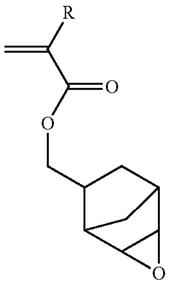
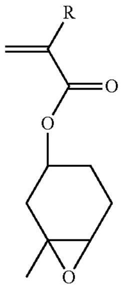
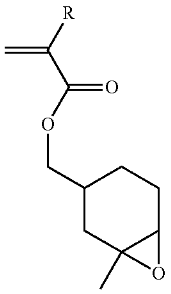
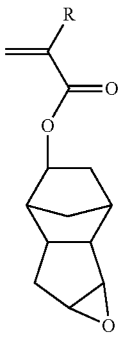

-continued
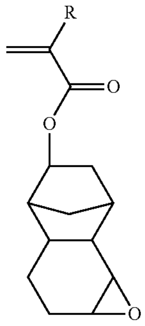
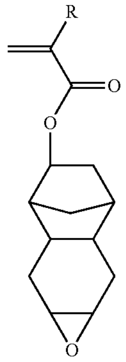
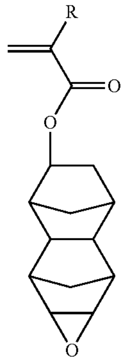
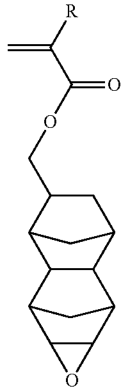
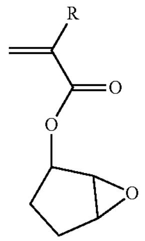
-continued
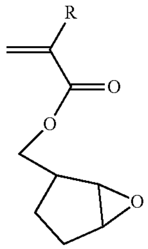
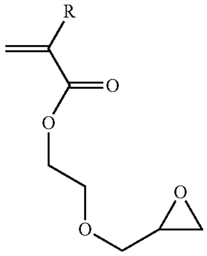
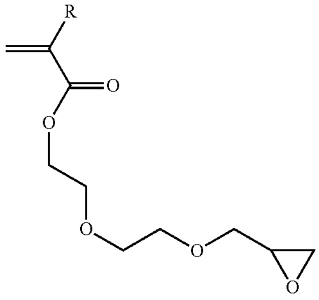
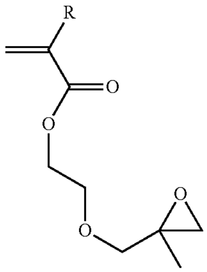
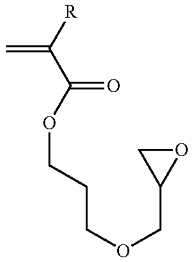
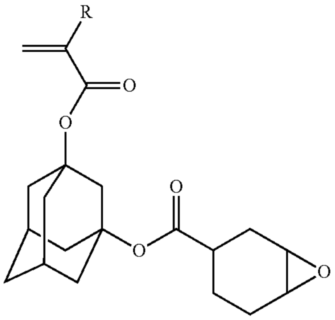

-continued
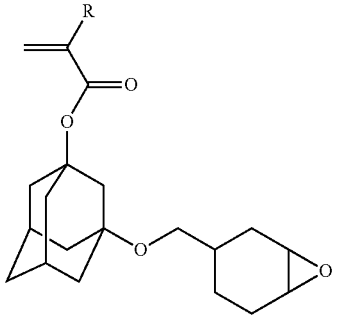
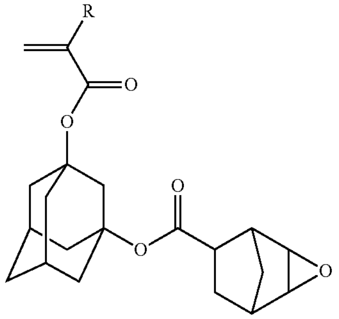
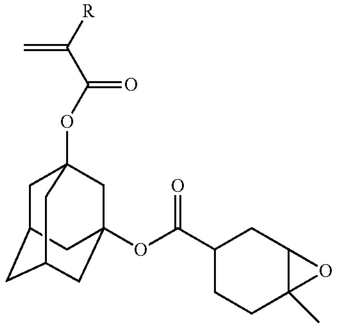
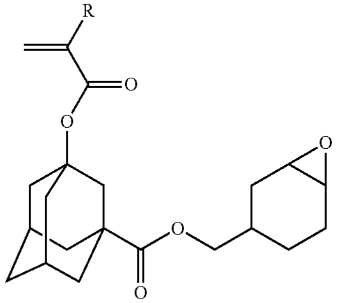
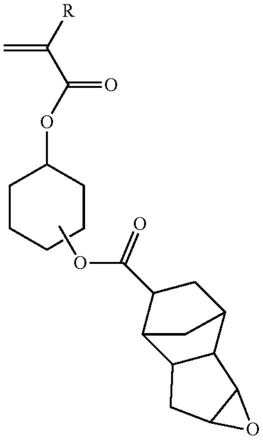
-continued
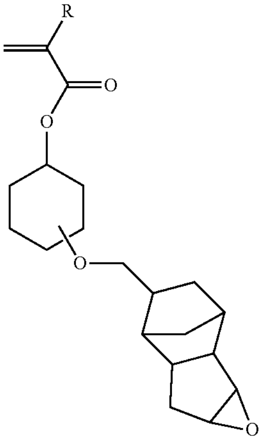
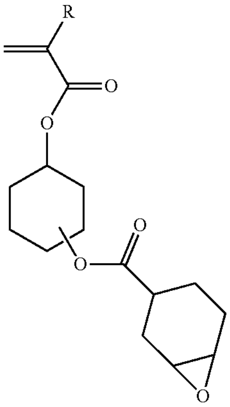
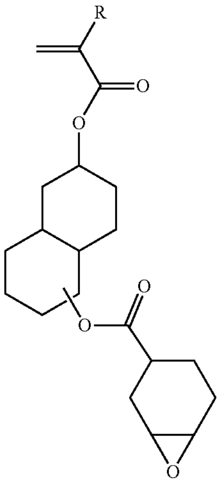

-continued
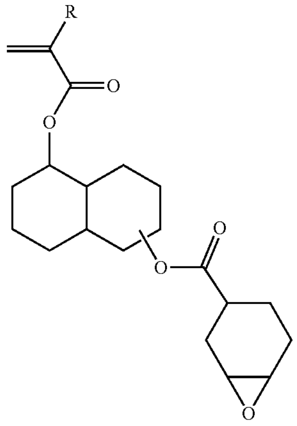
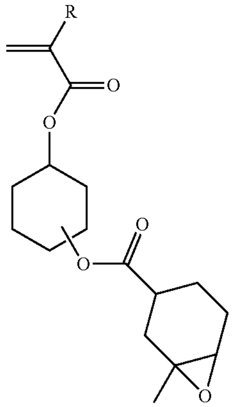
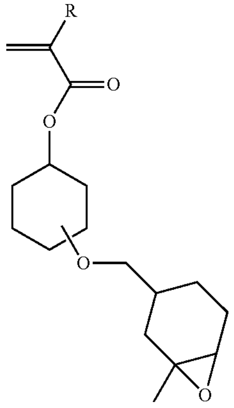
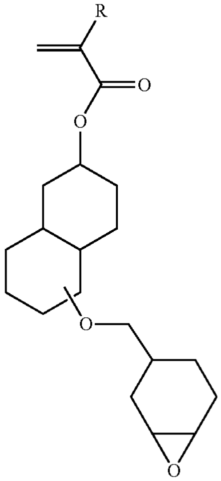
-continued
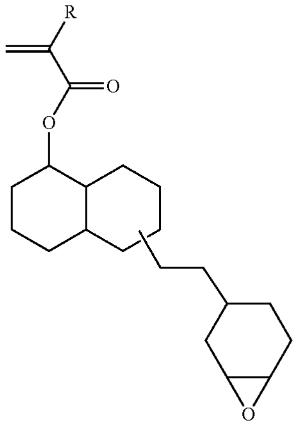
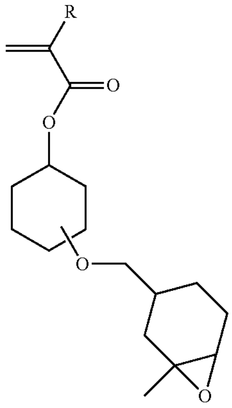
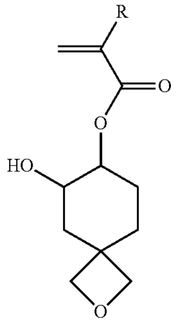
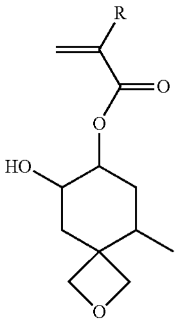

-continued

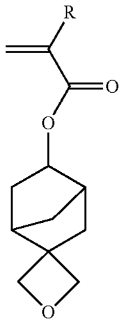
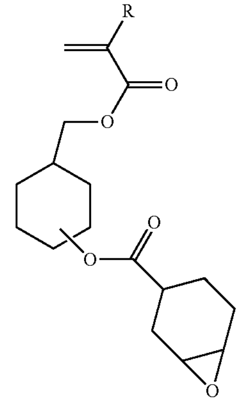
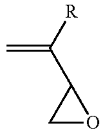
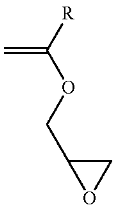
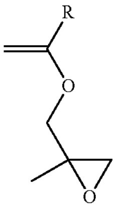
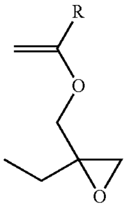
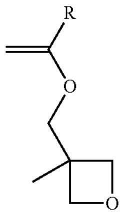

-continued

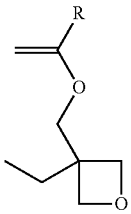

In the formulae, R represents a hydrogen atom or a methyl group.

(Repeating Unit-h)

Ion polymer components which are materials to form the ion polymer containing layer used for the inventive bio-electrode can have a repeating unit-h having an isocyanate group or a blocked isocyanate group, in addition to the repeating units selected from the above repeating units-A1 to -A7, -b, -c, -d, -e, -f and -g.

The repeating unit-h having an isocyanate group or a blocked isocyanate group can be obtained from the monomers specifically exemplified below.

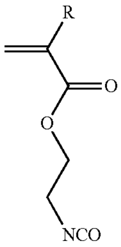
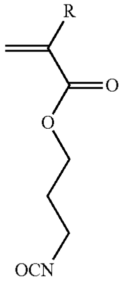
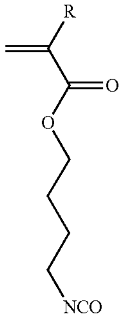
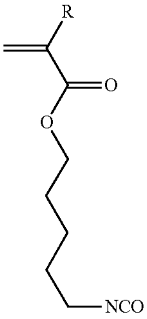
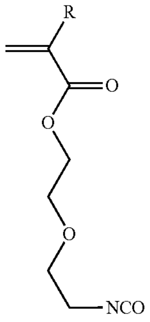
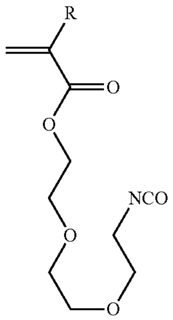
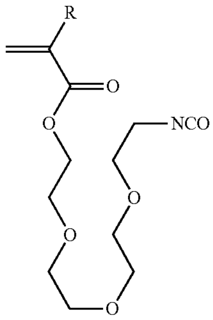
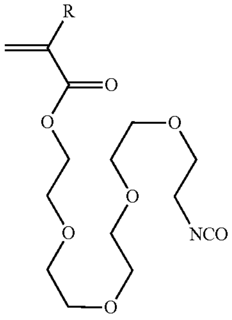

-continued

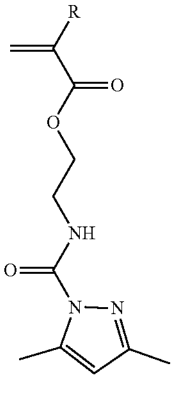

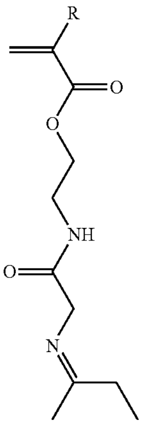

In the formulae, R represents a hydrogen atom or a methyl group.

Further, the ionic repeating unit-a which the ion polymer has preferably includes an ammonium ion (ammonium cation) shown by the following general formula (3) as an ammonium ion for forming an ammonium salt, (3)

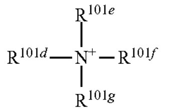

wherein, $R^{101d}$, $R^{101e}$, $R^{101f}$, and $R^{101g}$ each represent a hydrogen atom, a linear, branched, or cyclic alkyl group having 1 to 15 carbon atoms, a linear, branched, or cyclic alkenyl group or alkynyl group having 2 to 12 carbon atoms, or an aromatic group having 4 to 20 carbon atoms, and optionally have one or more selected from the group consisting of an ether group, a carbonyl group, an ester group, a hydroxy group, a carboxy group, an amino group, a nitro group, a sulfonyl group, a sulfinyl group, a halogen atom, and a sulfur atom; and $R^{101d}$ and $R^{101e}$, or $R^{101d}$, $R^{101e}$, and $R^{101f}$, are optionally bonded to each other together with a nitrogen atom bonded therewith to form a ring in which $R^{101d}$ and $R^{101e}$, or $R^{101d}$, $R^{101e}$, and $R^{101f}$, represent an alkylene group having 3 to 10 carbon atoms, or to form a heteroaromatic ring having the nitrogen atom in the general formula (3) within the ring.

The ammonium ion shown by the above general formula (3) is specifically exemplified below.

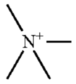

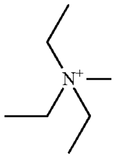

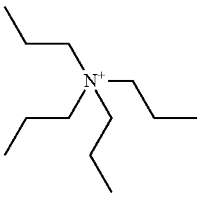

-continued

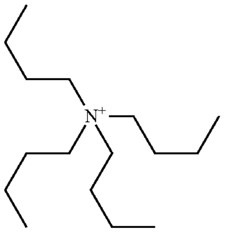

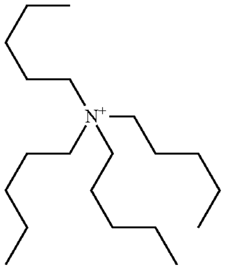

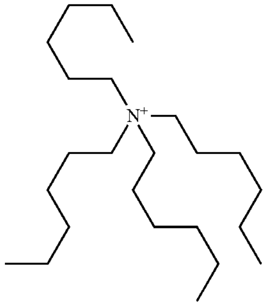

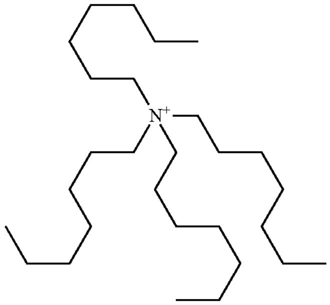

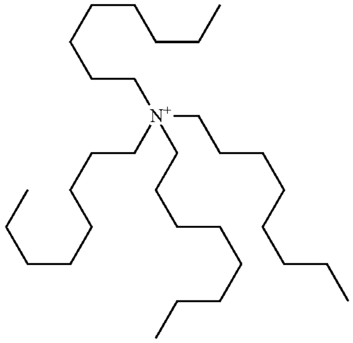

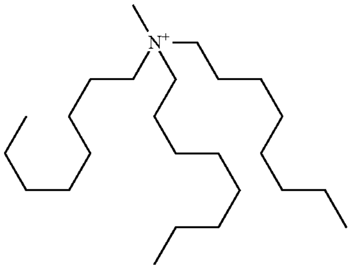

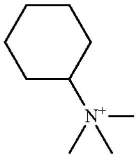

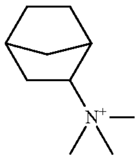

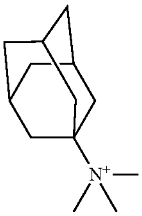

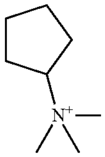

-continued
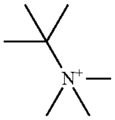
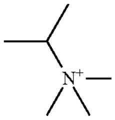
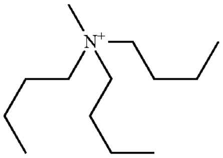
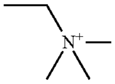
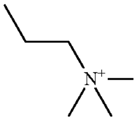
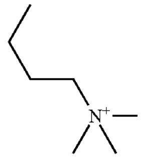
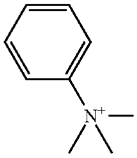
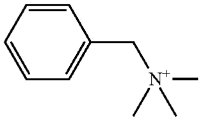
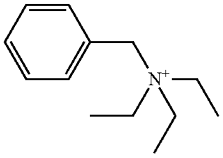
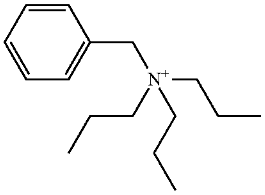
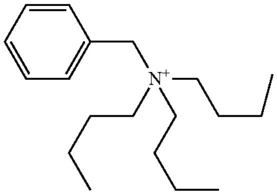
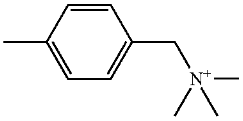
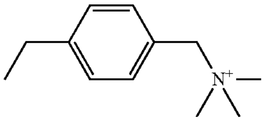
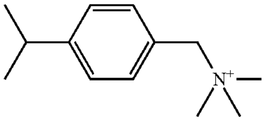
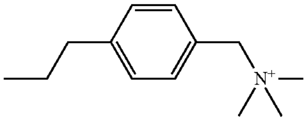
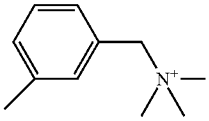
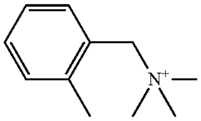
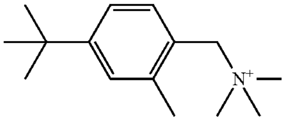
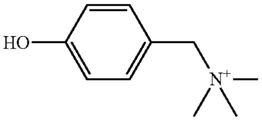
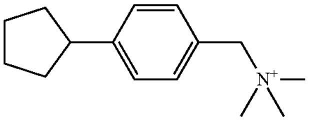
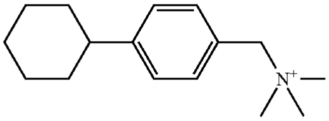
-continued
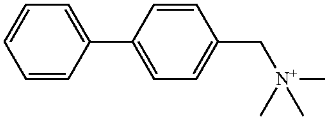
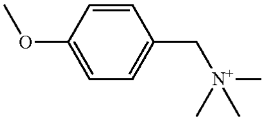
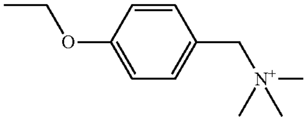
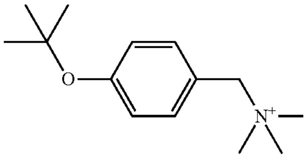
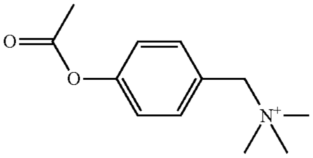
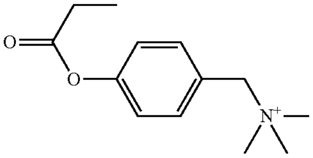
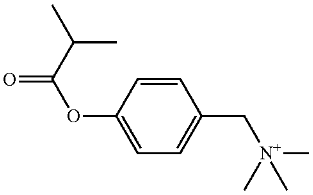
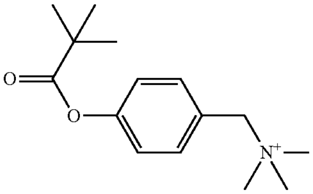
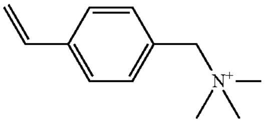
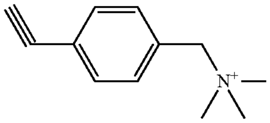
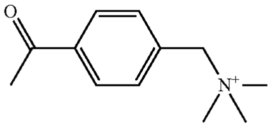

-continued
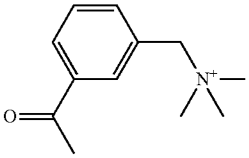
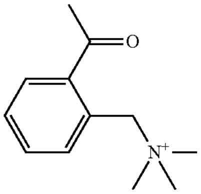
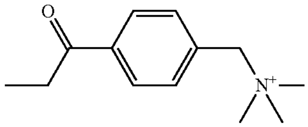
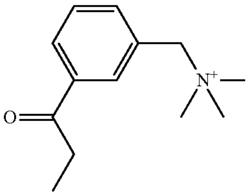
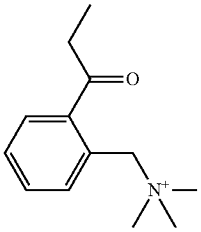
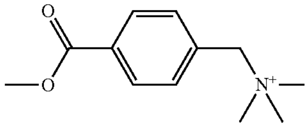
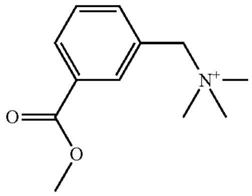
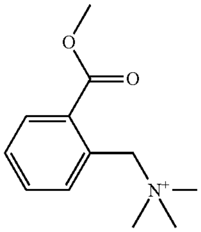
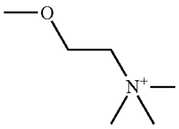
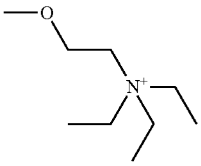
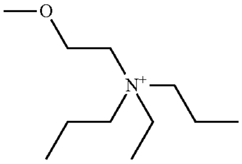
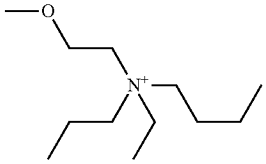
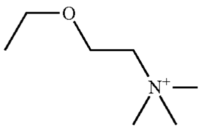
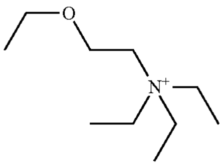
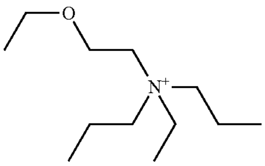
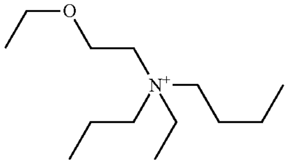
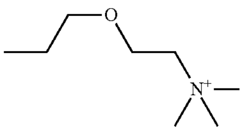
-continued
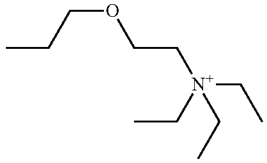
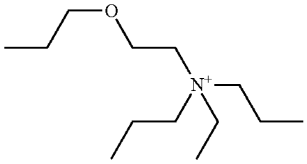
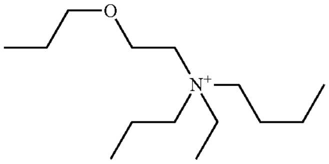
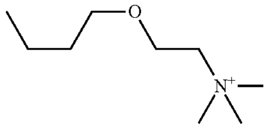
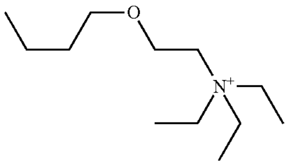
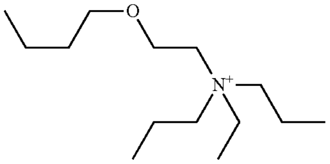
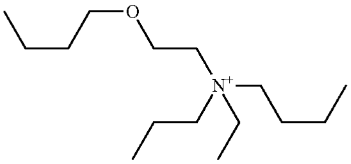
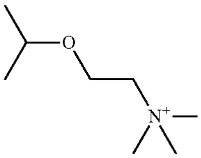
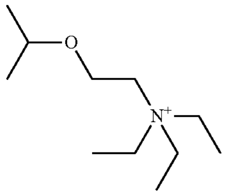
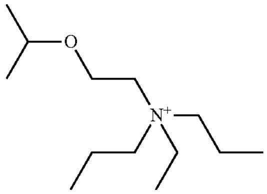
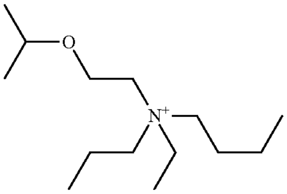
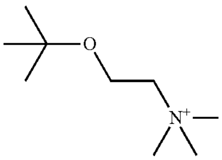

-continued
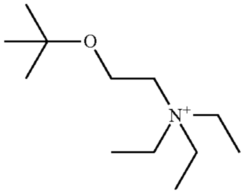
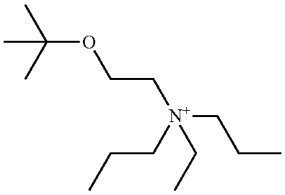
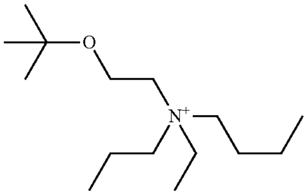
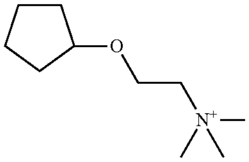
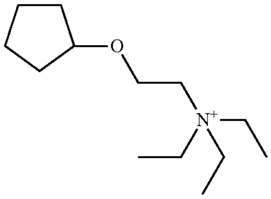
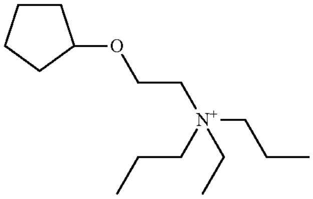
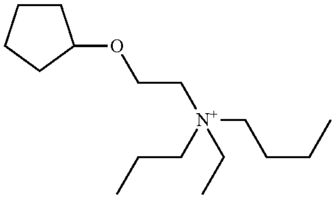
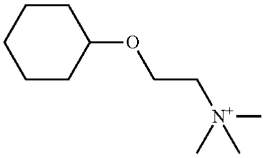
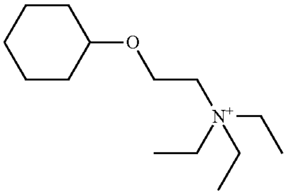
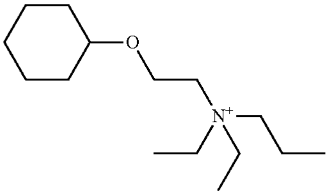
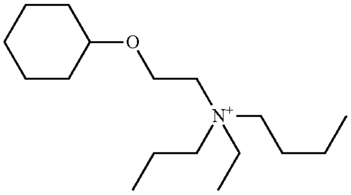
-continued
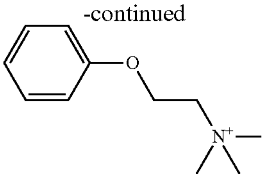
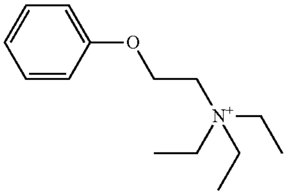
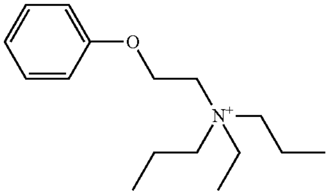
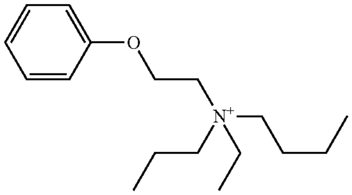
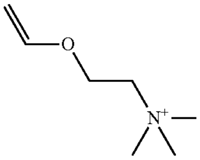
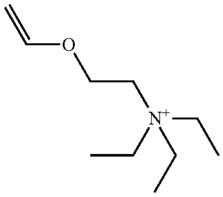
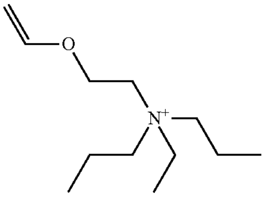
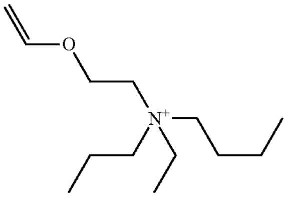
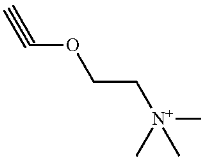
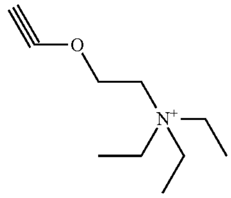
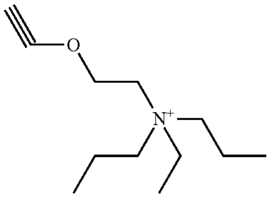
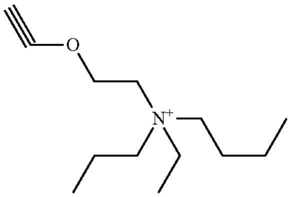
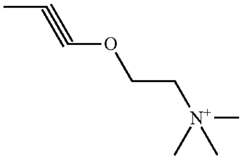

-continued
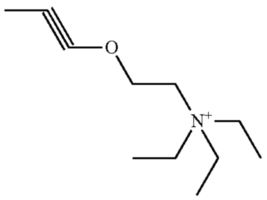
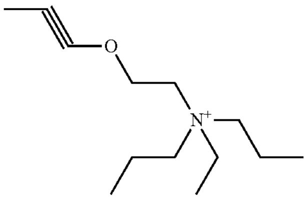
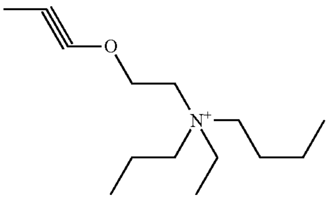
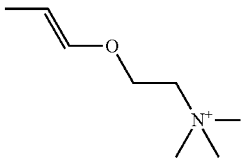
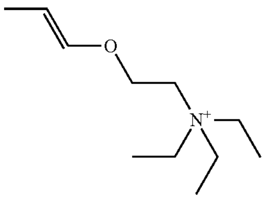
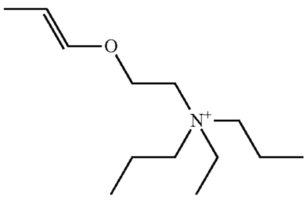
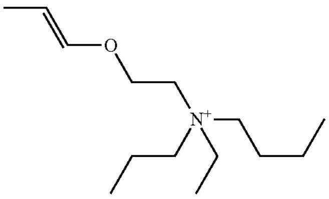
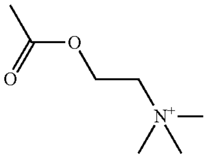
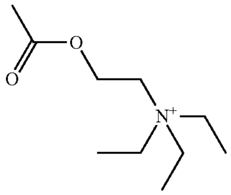
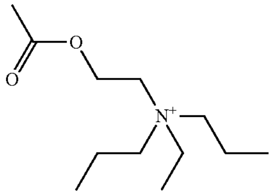
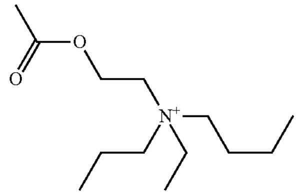
-continued
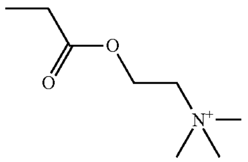
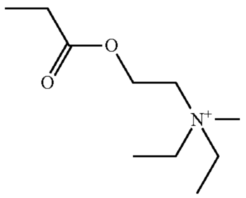
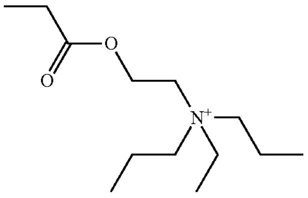
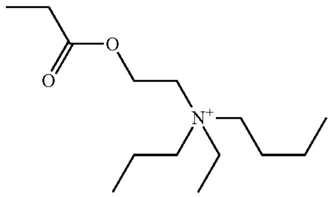
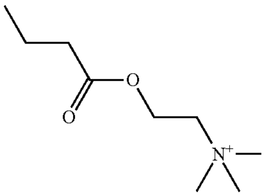
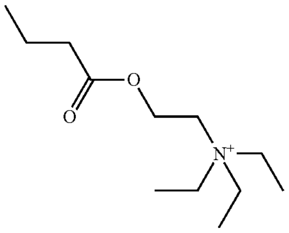
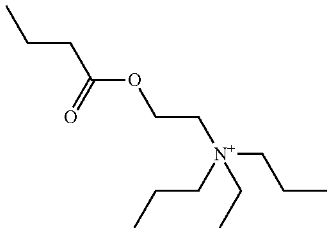
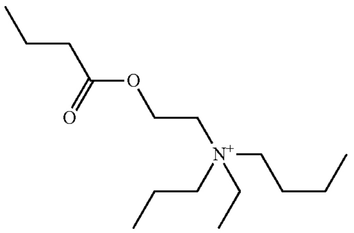
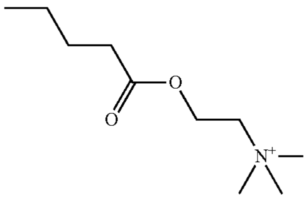

-continued
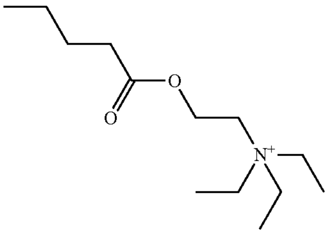
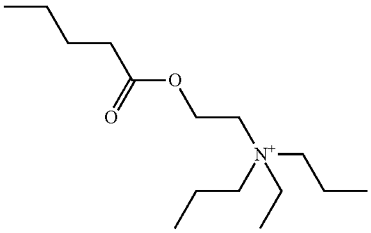
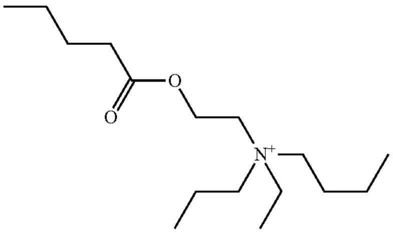
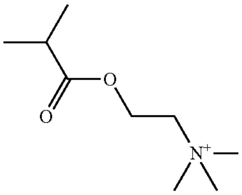
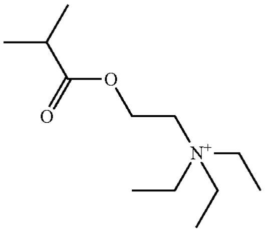
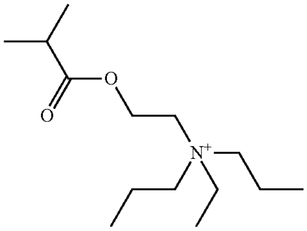
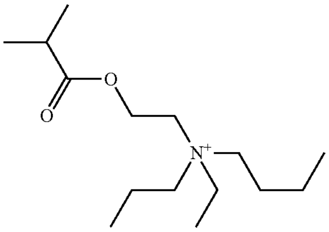
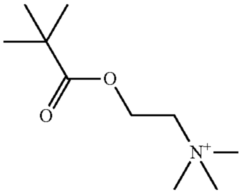
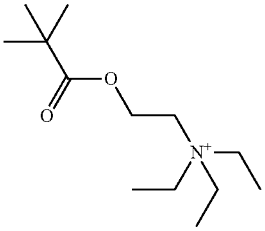
-continued
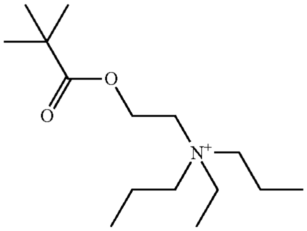
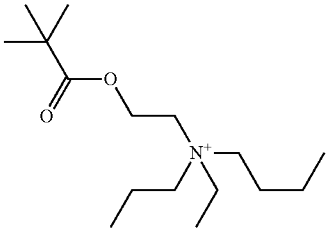
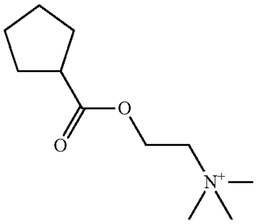
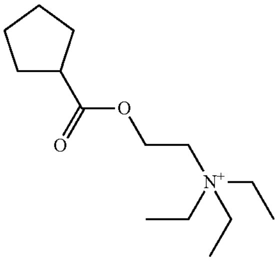
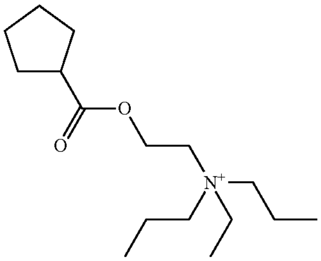
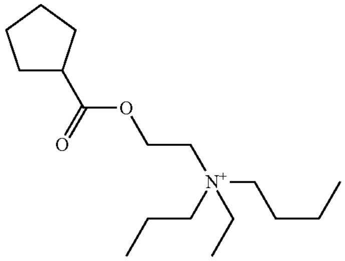
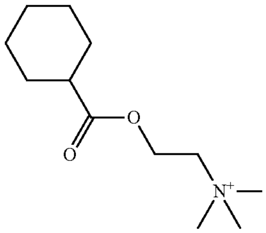
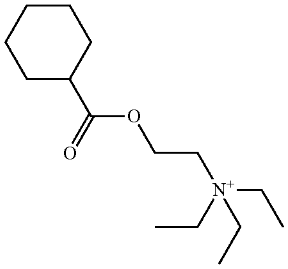

-continued
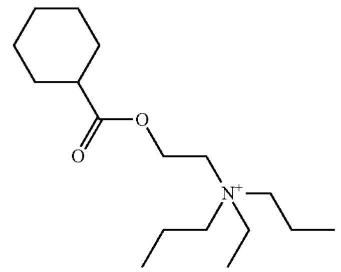
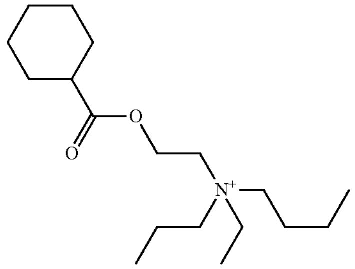
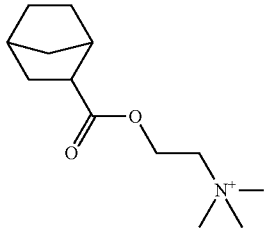
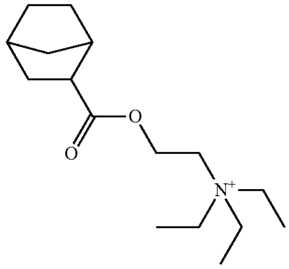
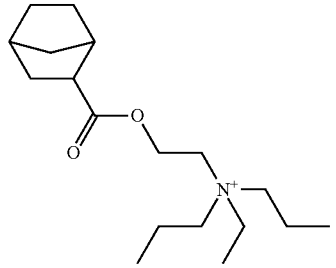
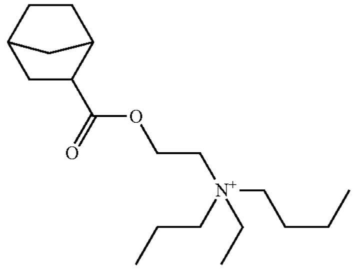
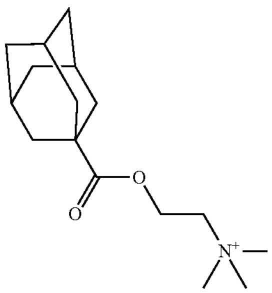
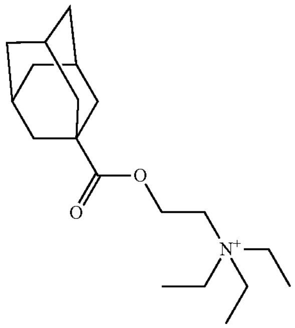
-continued
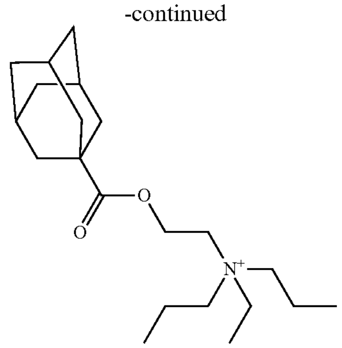
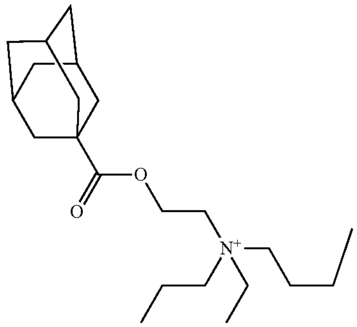
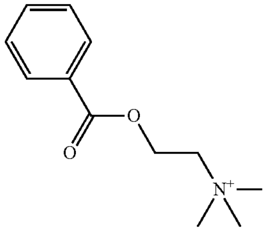
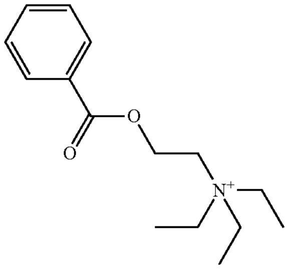
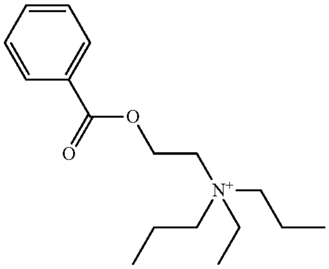
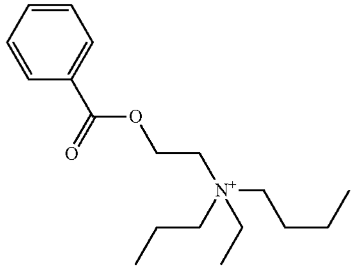
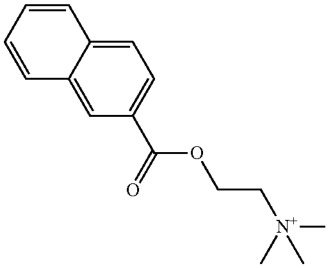

-continued
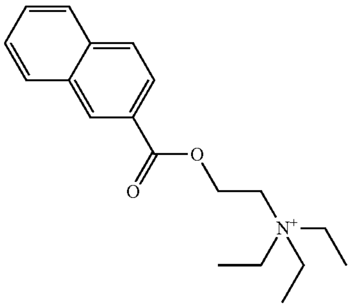
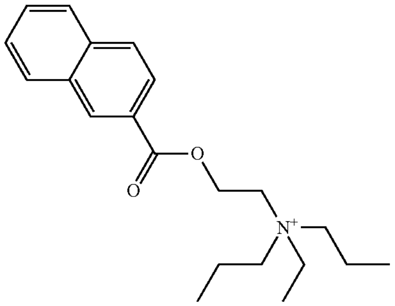
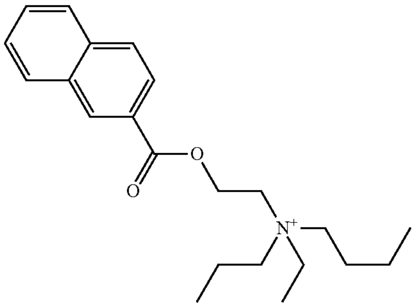
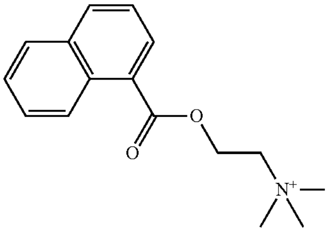
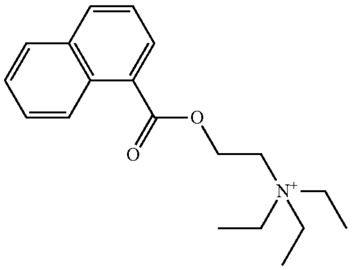
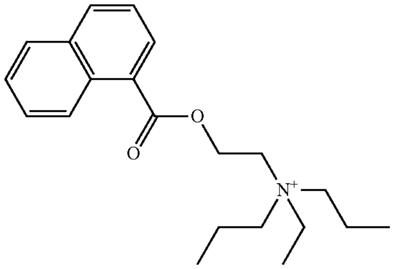
-continued
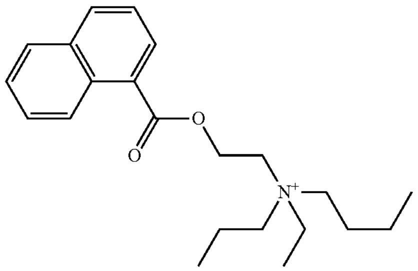
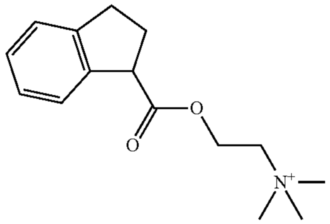
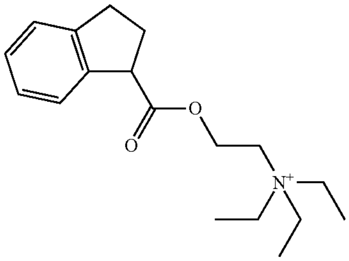
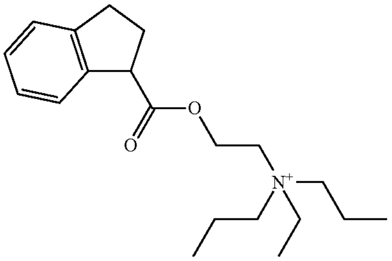
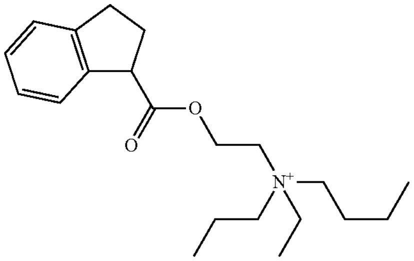
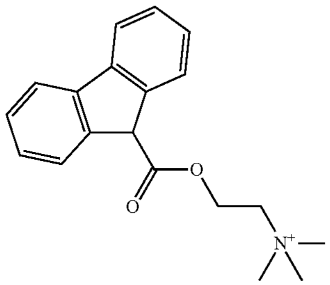

-continued
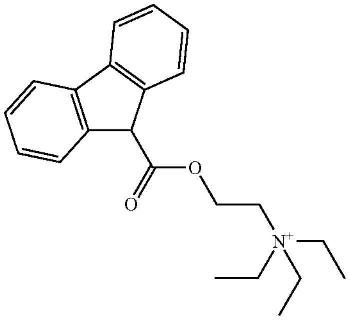
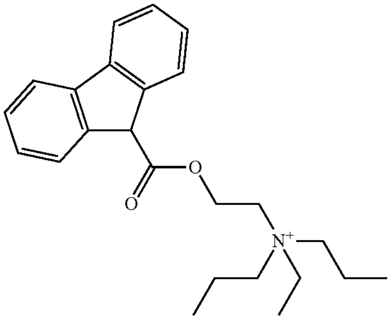
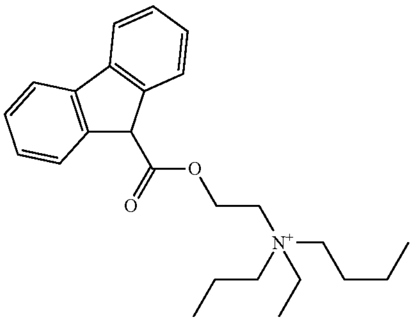
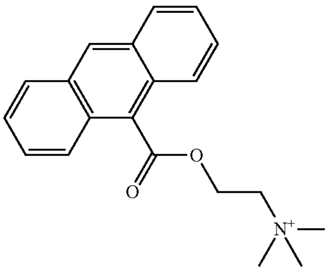
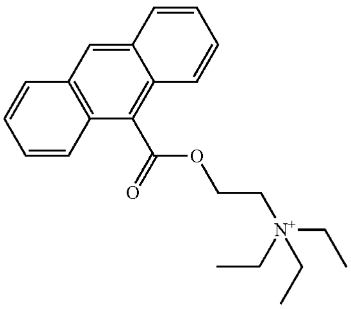
-continued
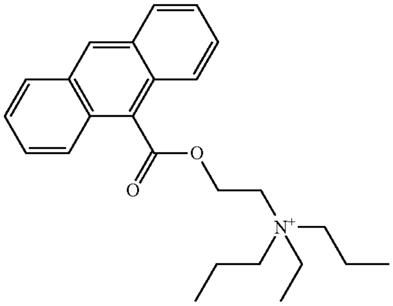
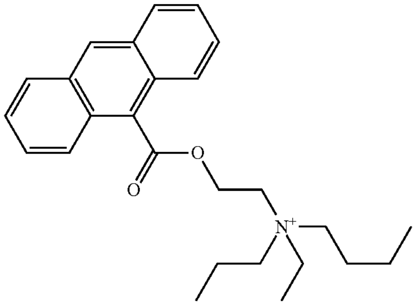
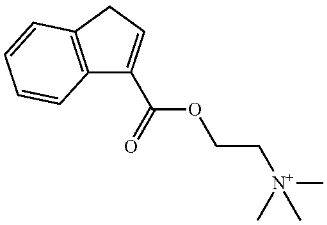
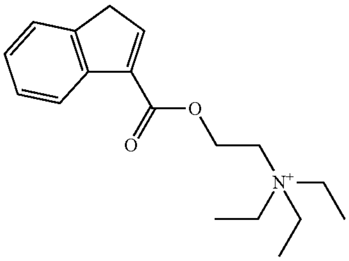
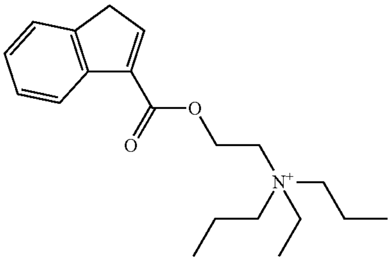
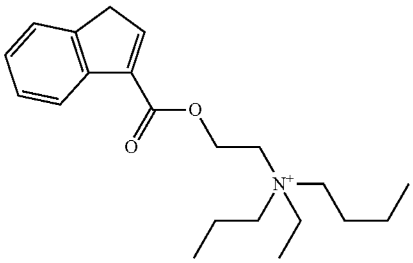

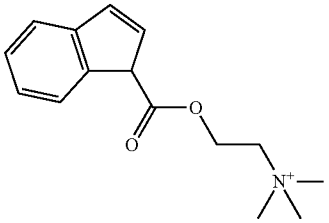
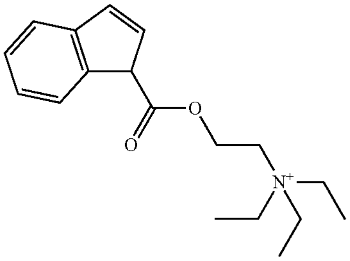
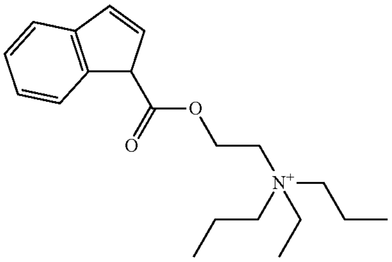
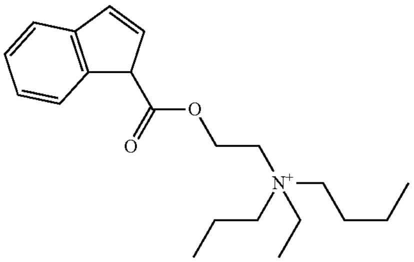
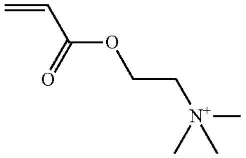
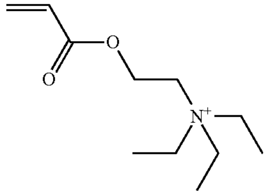
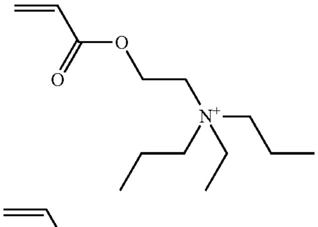
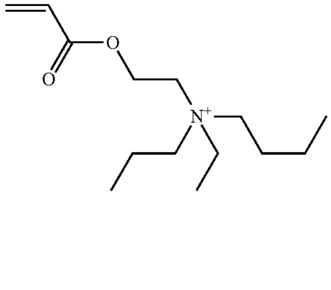
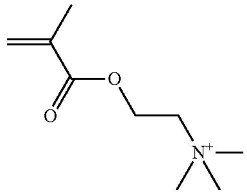
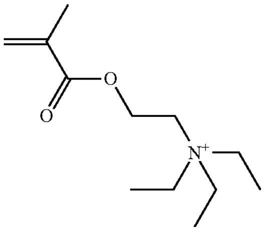
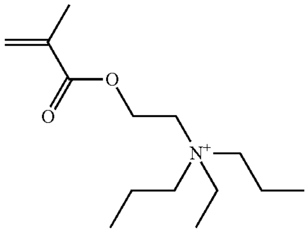
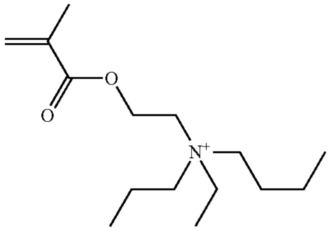
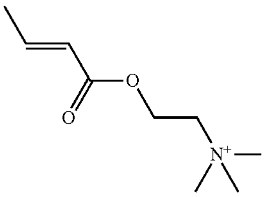
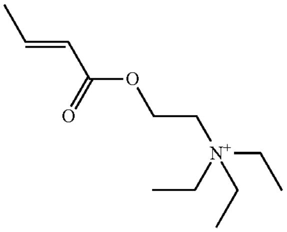
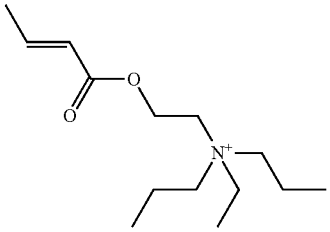
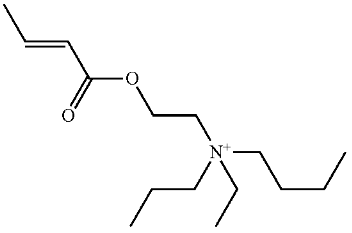
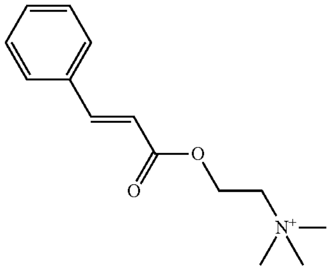

-continued
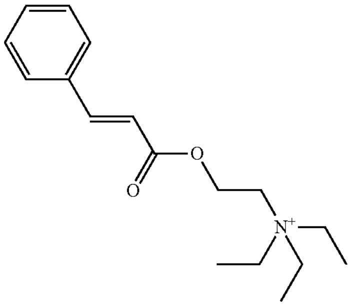
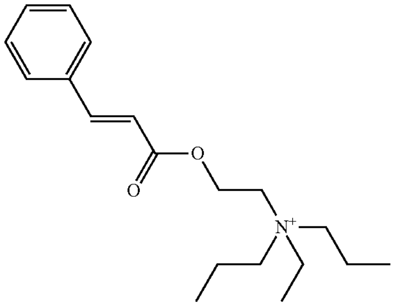
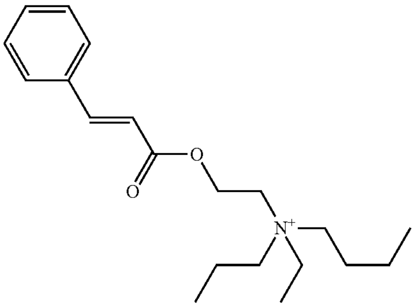
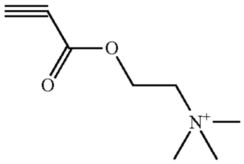
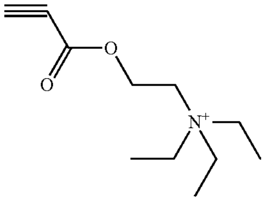
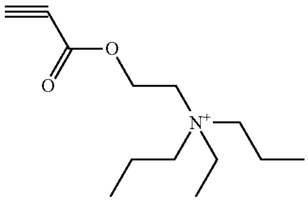
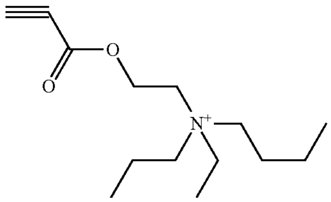
-continued
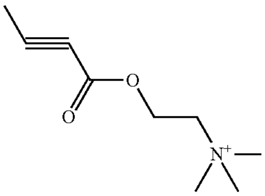
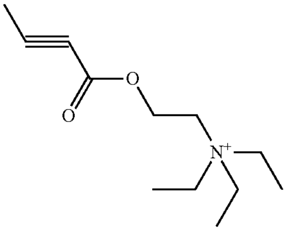
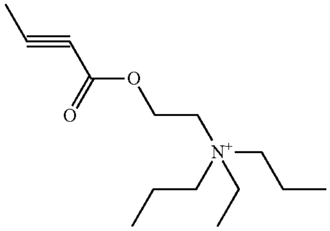
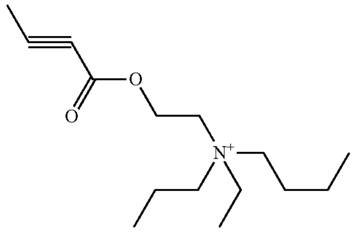
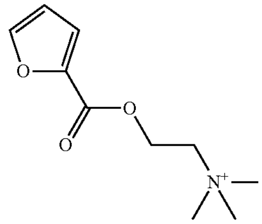
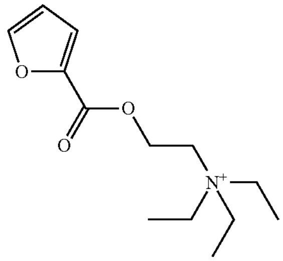
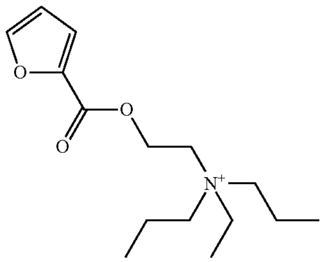
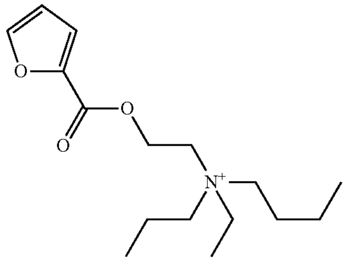

-continued
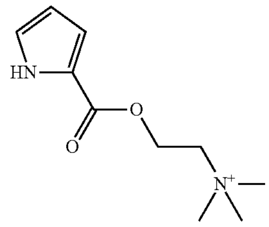
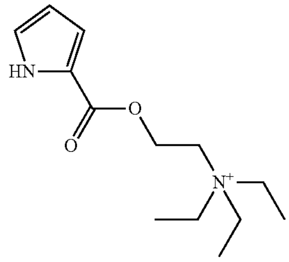
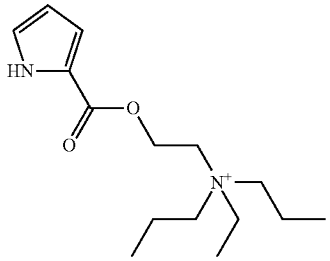
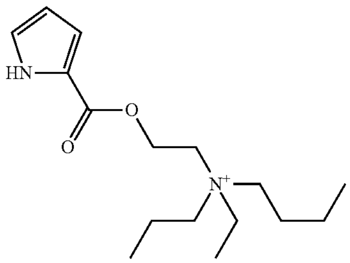
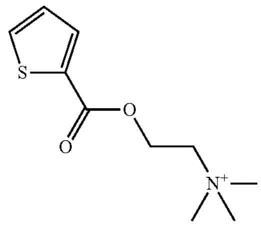
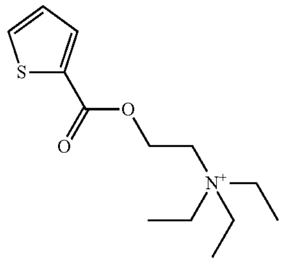
-continued
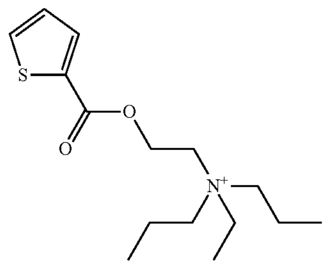
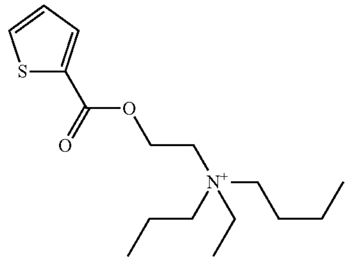
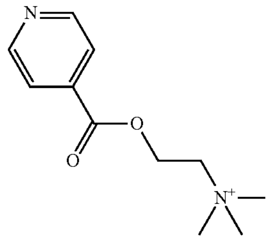
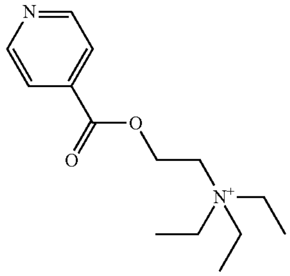
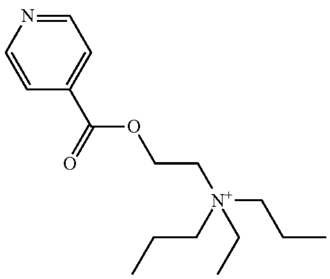
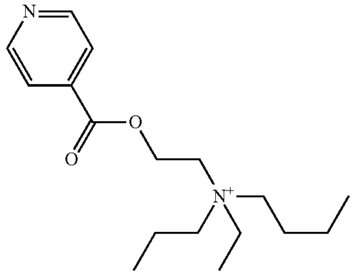

-continued
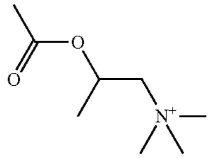
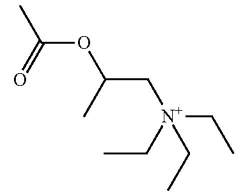
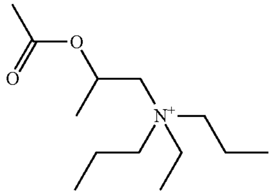
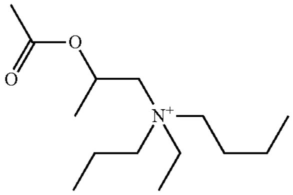
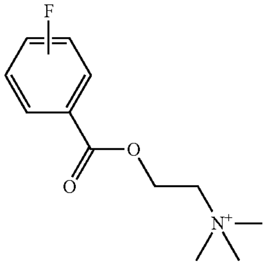
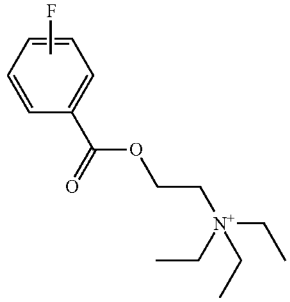
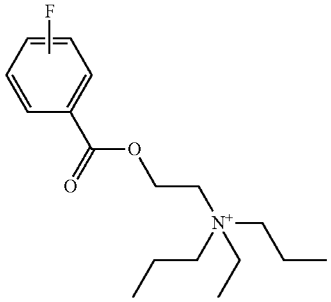
-continued
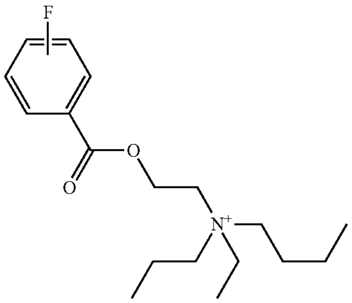
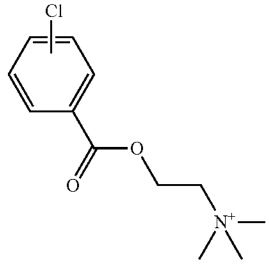
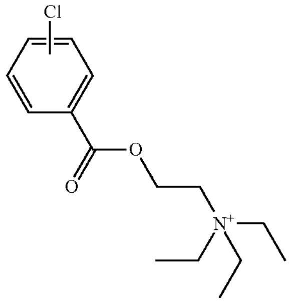
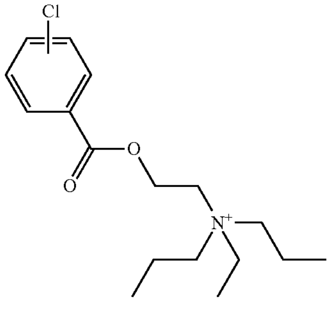
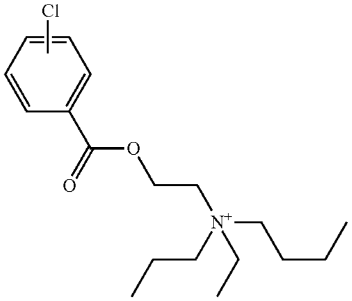

-continued
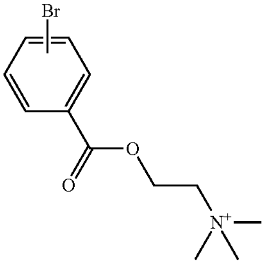
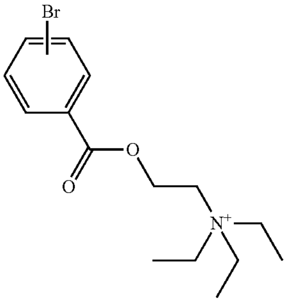
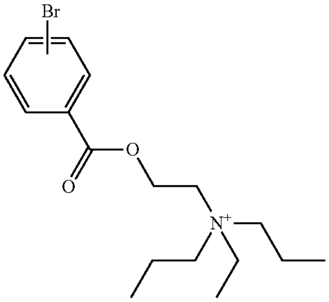
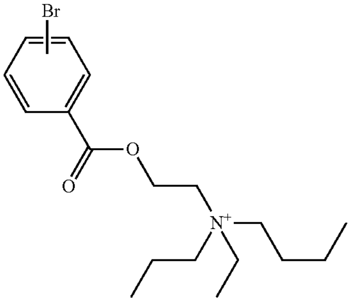
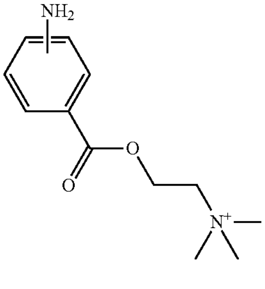
-continued
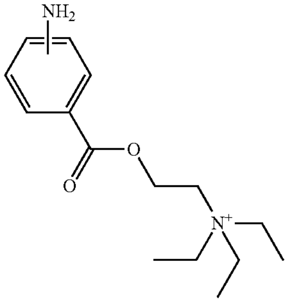
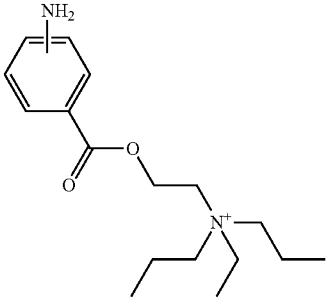
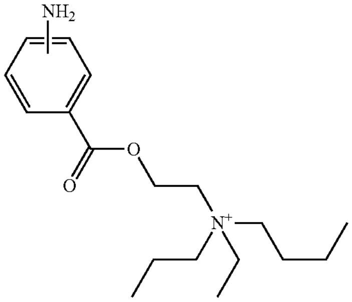
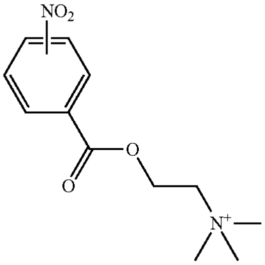
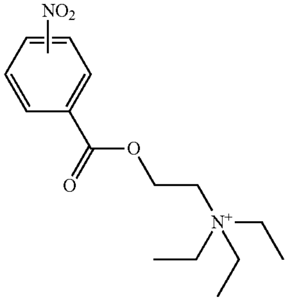

-continued
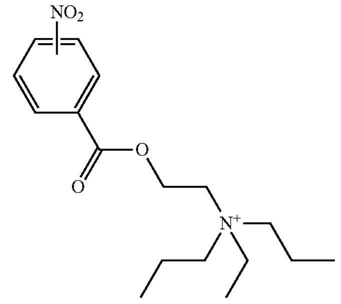
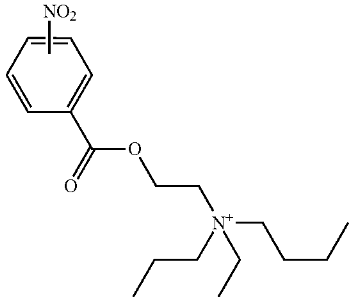
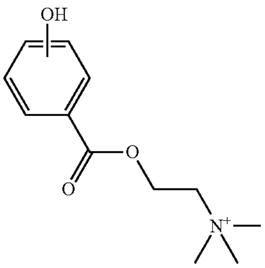
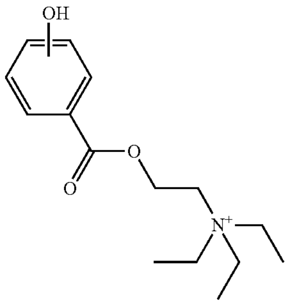
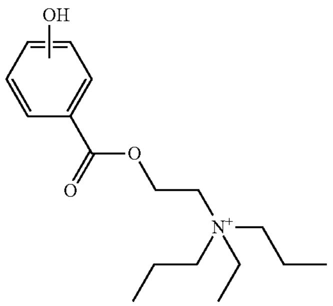
-continued
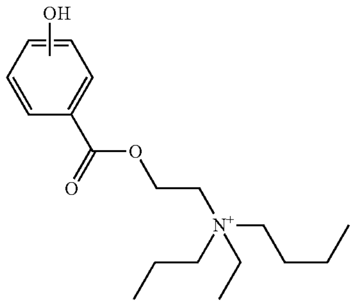
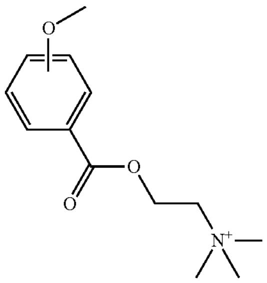
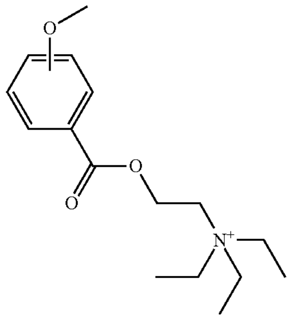
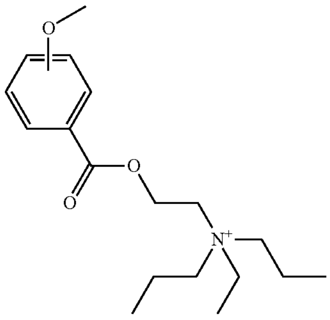
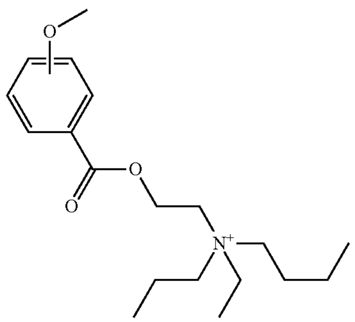

-continued
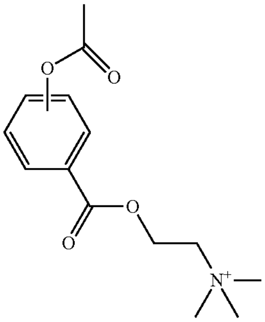
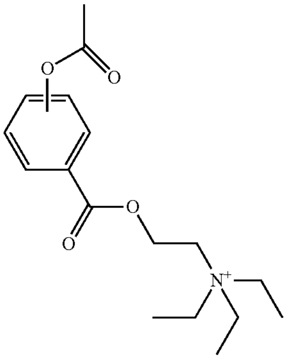
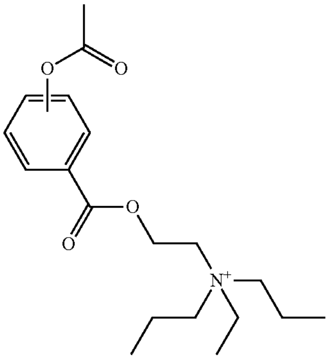
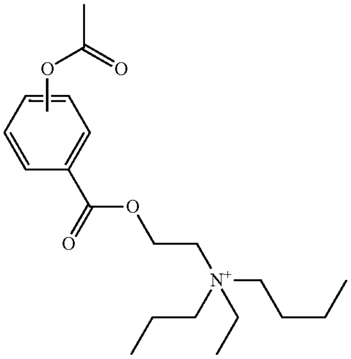
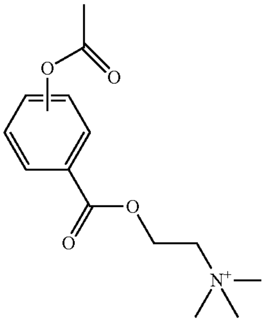
-continued
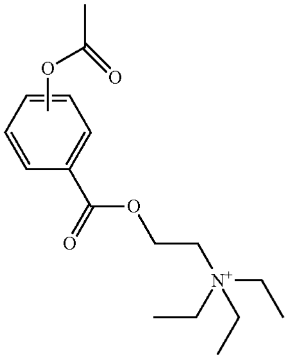
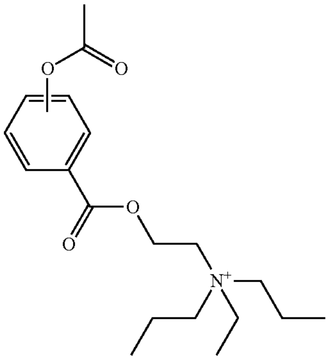
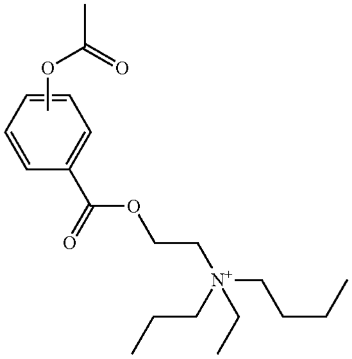
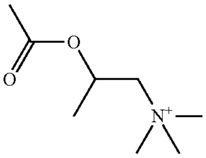
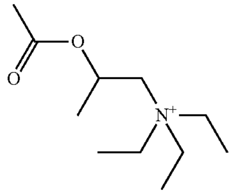
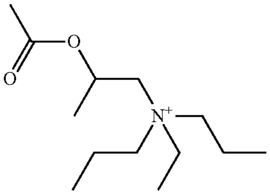
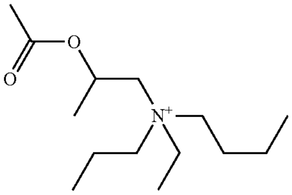

-continued
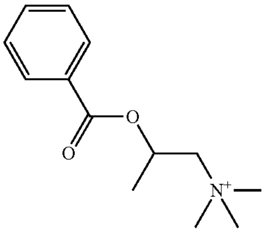
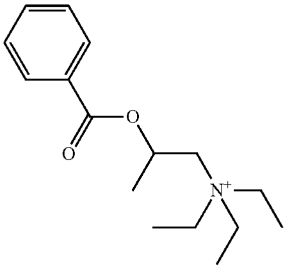
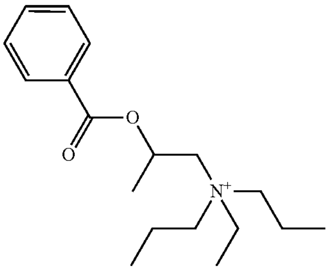
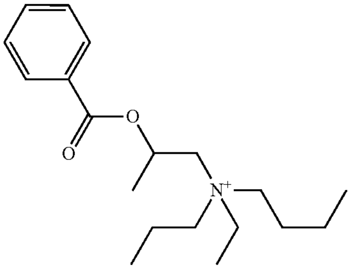
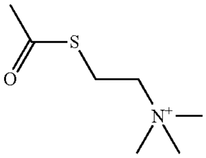
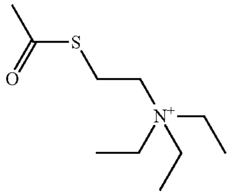
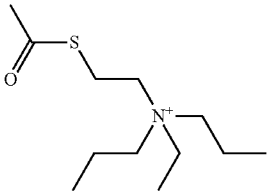
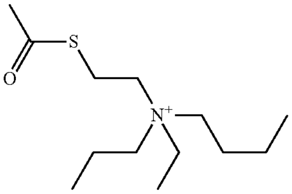
-continued
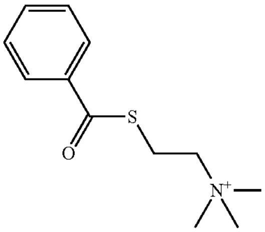
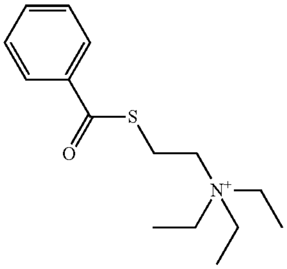
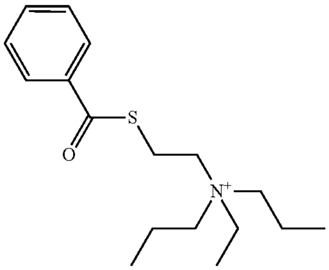
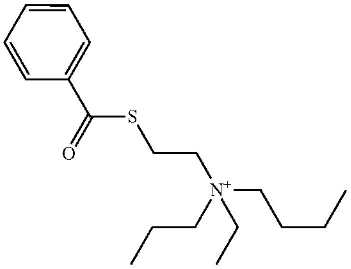
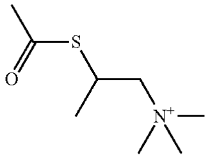
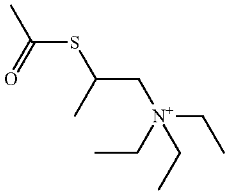
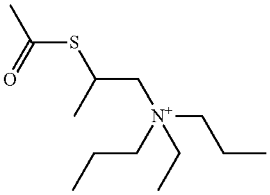
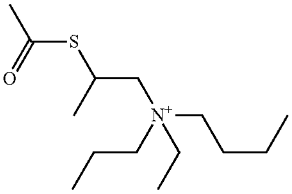

-continued
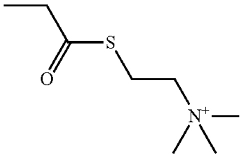
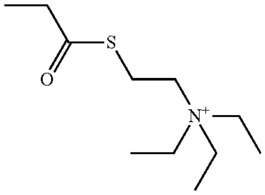
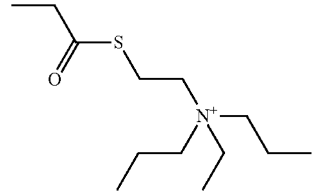
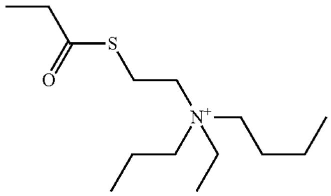
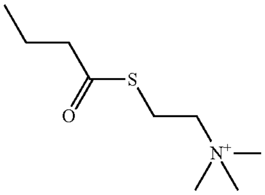
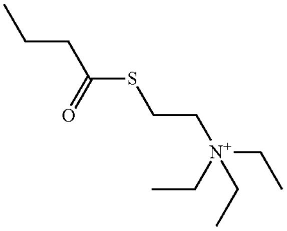
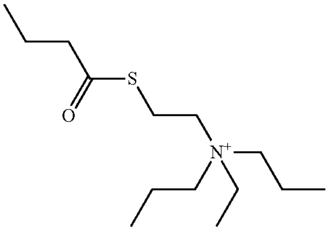
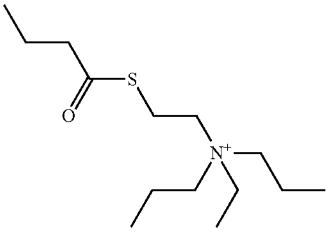
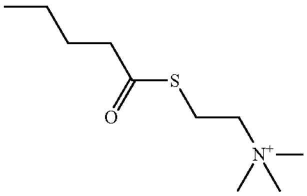
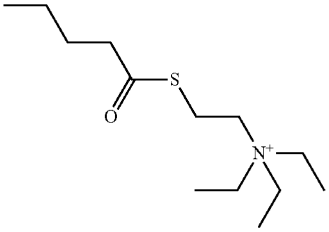
-continued
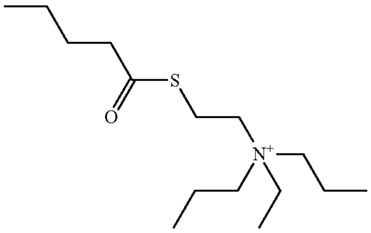
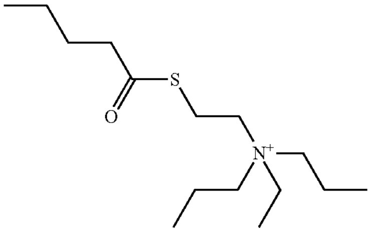
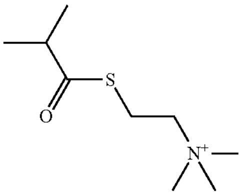
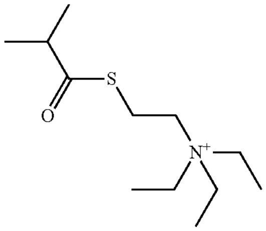
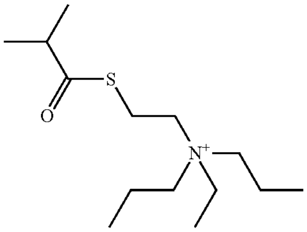
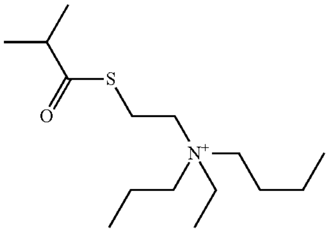
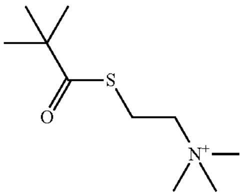
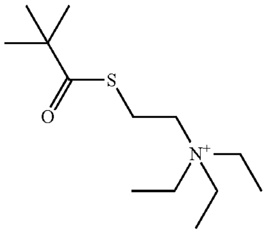
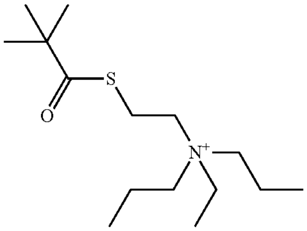

-continued
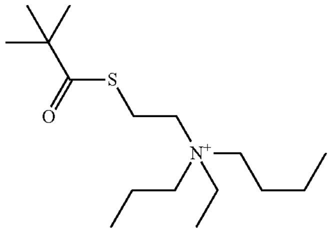
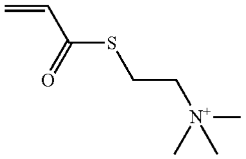
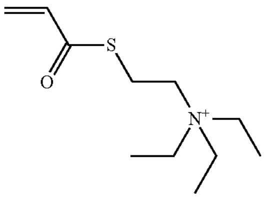
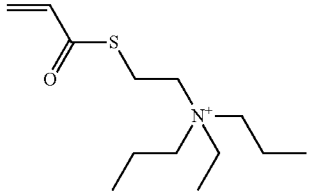
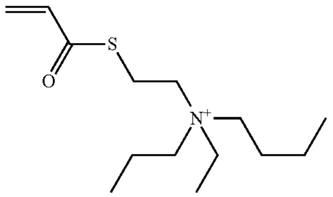
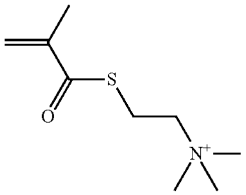
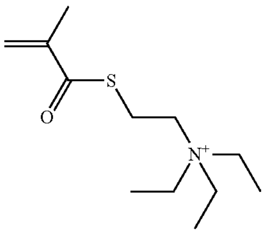
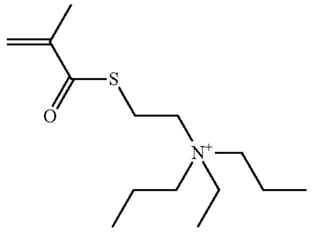
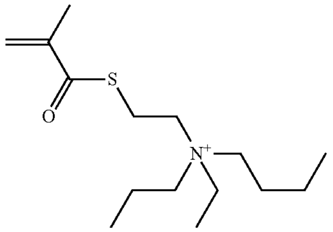
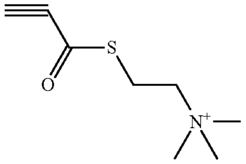
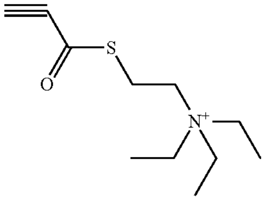
-continued
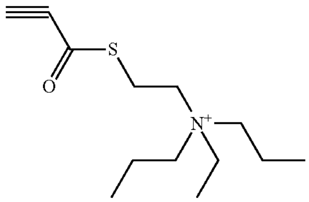
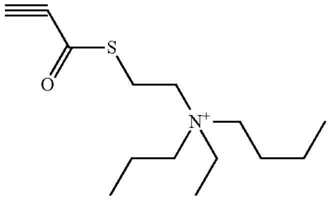
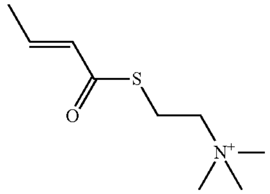
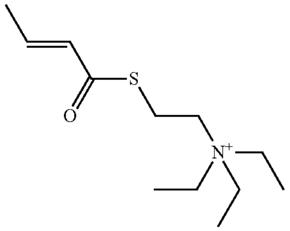
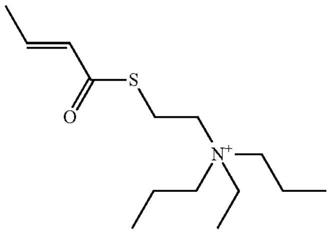
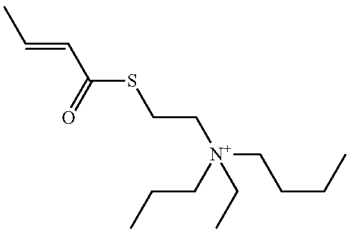
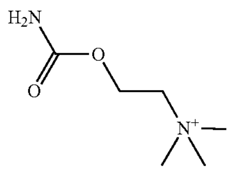
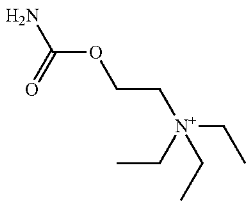
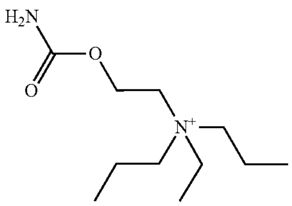

-continued
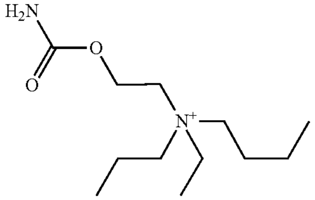
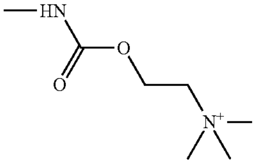
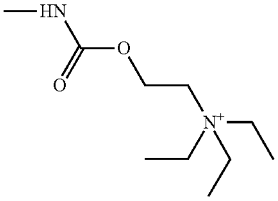
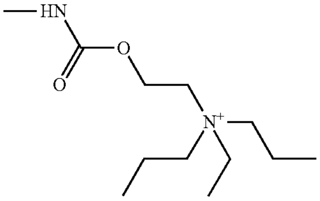
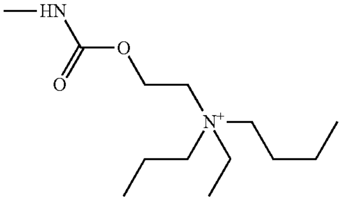
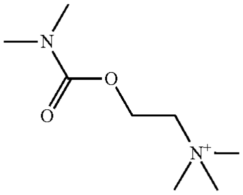
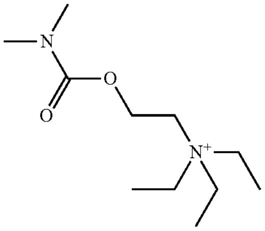
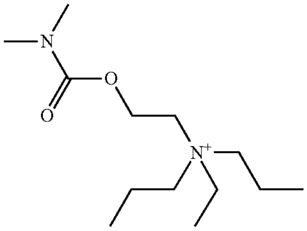
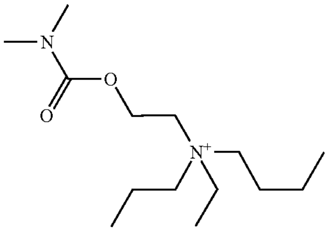
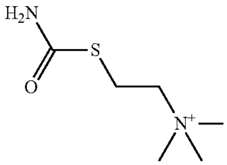
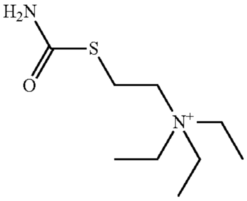
-continued
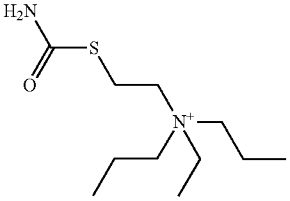
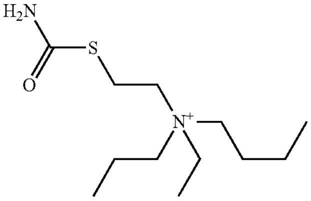
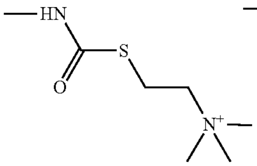
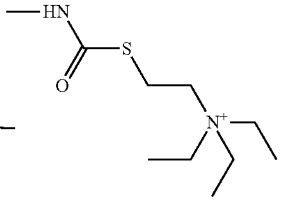
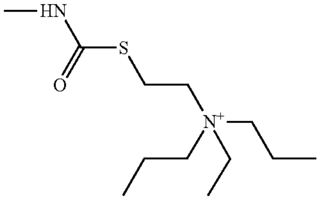
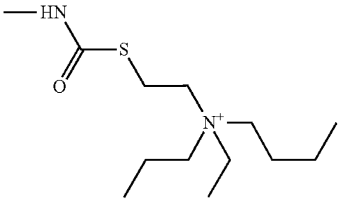
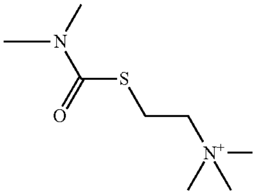
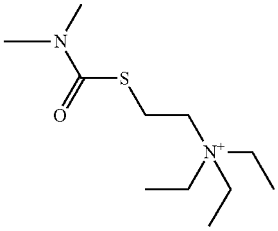
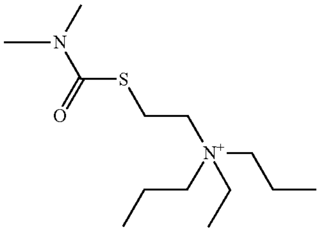
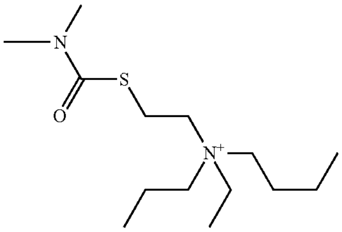
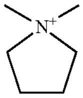
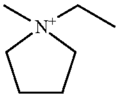

-continued
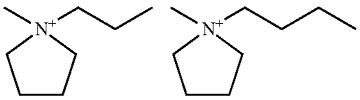
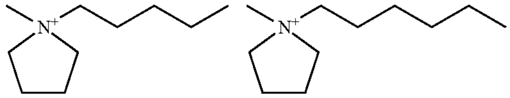
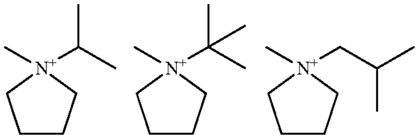
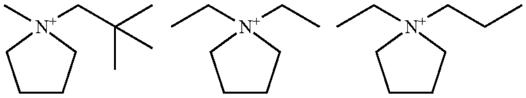
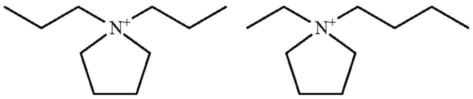
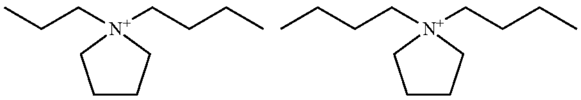
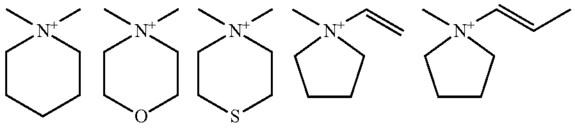
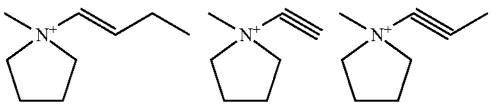
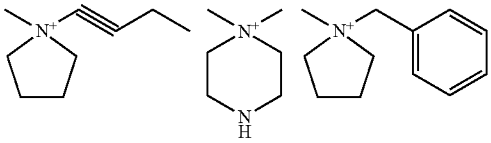
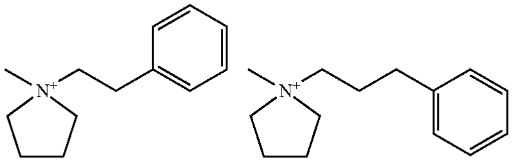
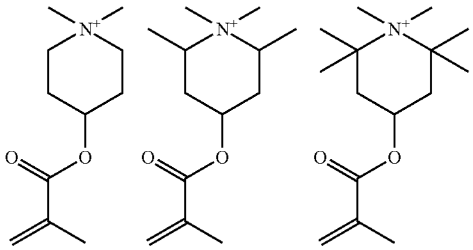
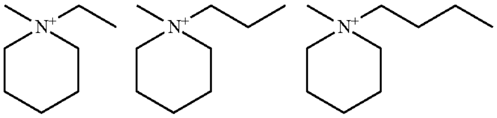
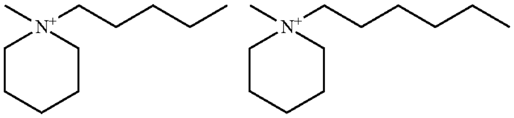
-continued
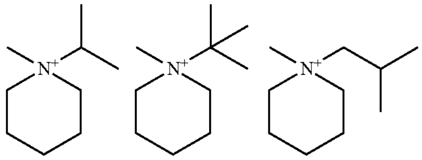
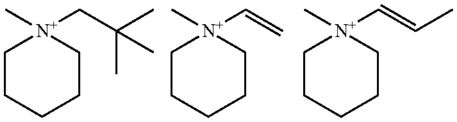
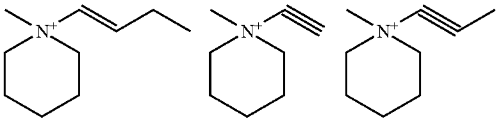
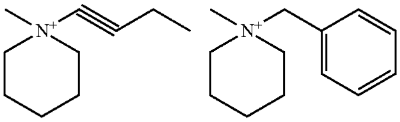
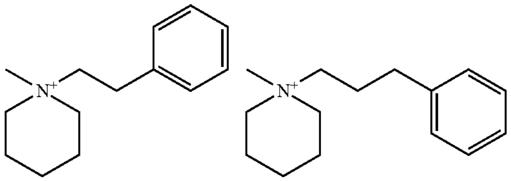
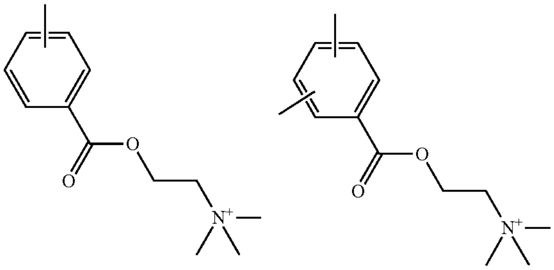
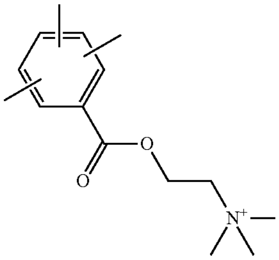
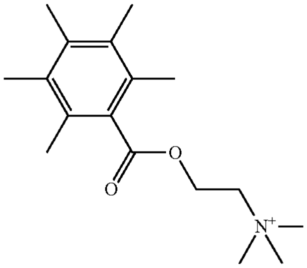

-continued
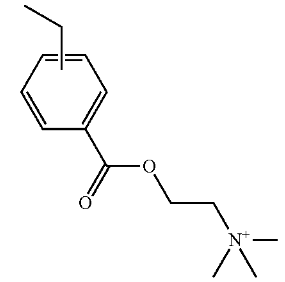
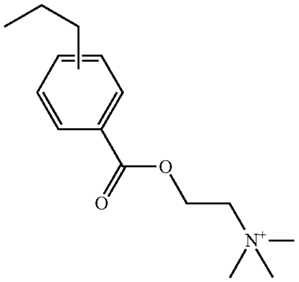
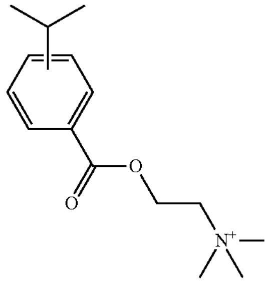
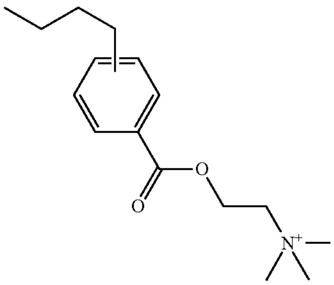
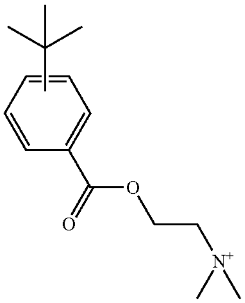
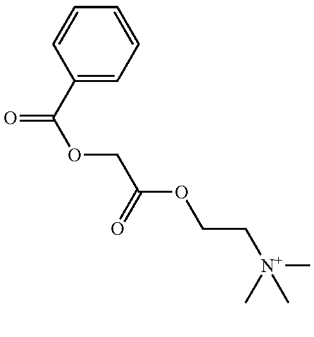
-continued
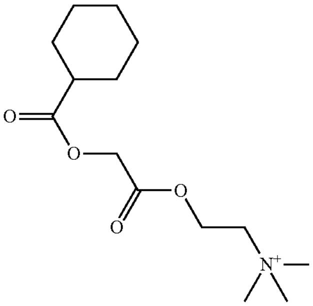
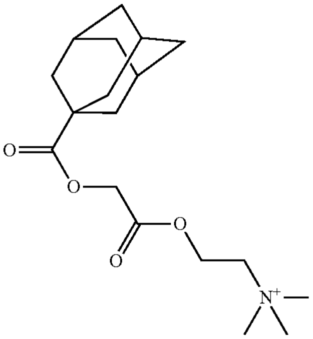
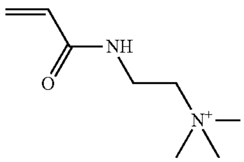
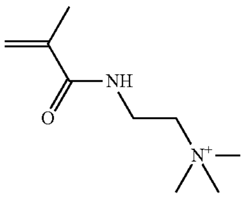
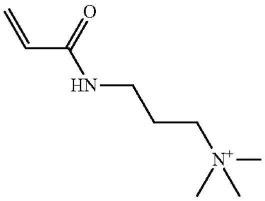
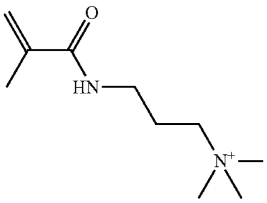
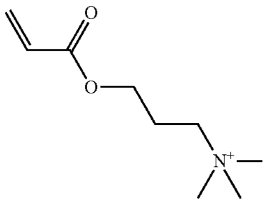
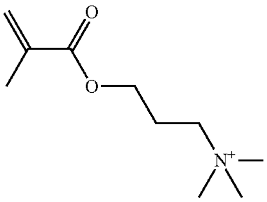
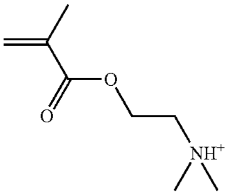
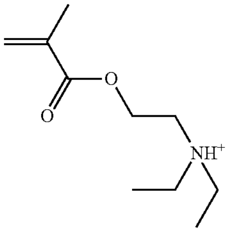
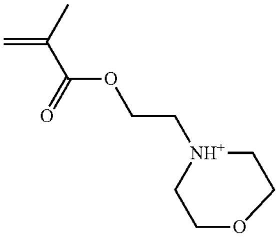
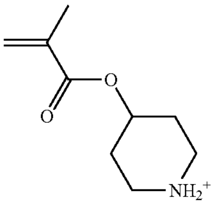
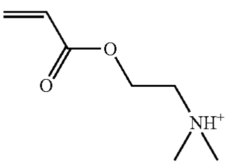

-continued
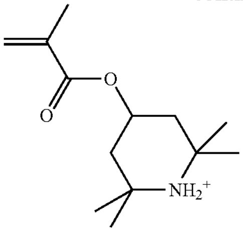
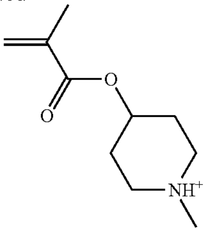
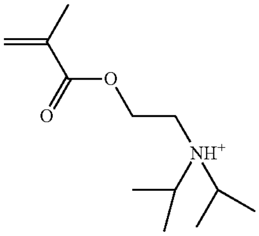
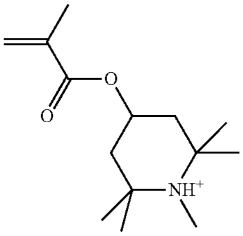
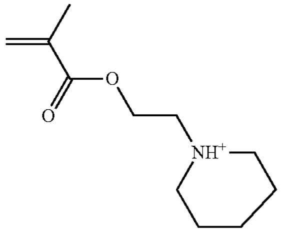
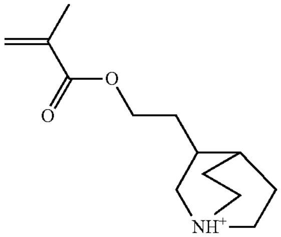
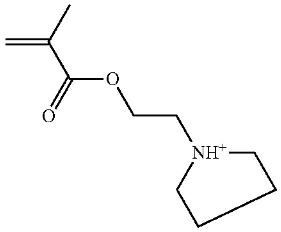
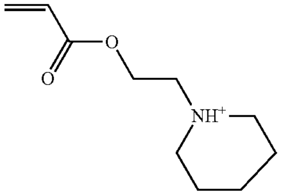
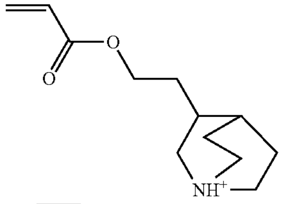
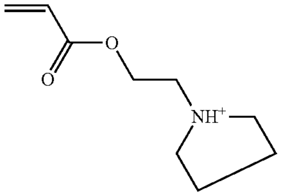
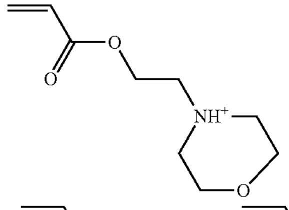
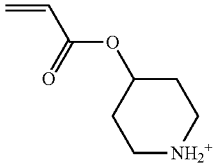
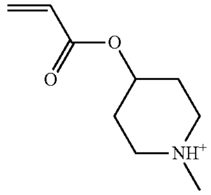
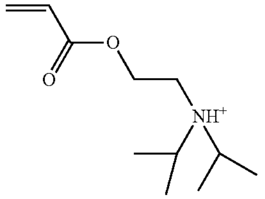
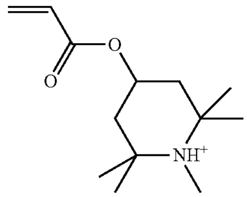
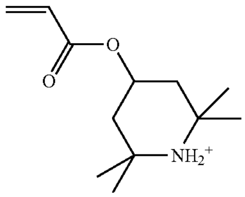
-continued
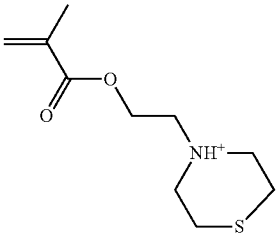
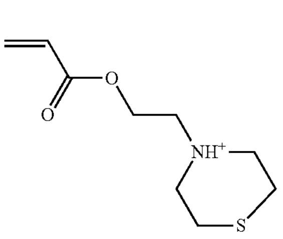
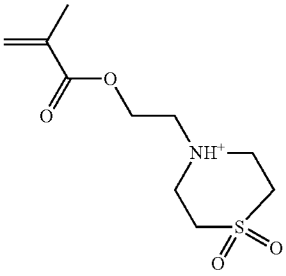
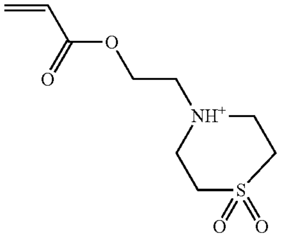
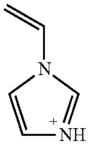
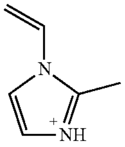
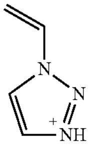
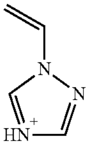
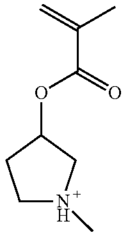
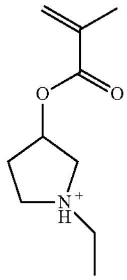
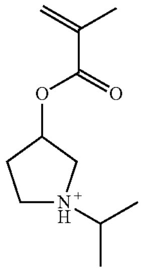
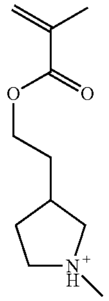
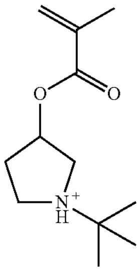
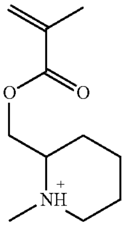
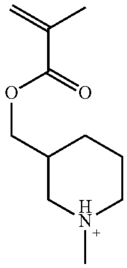
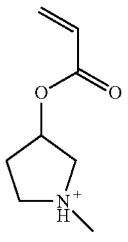
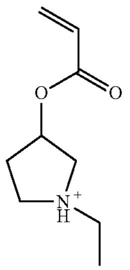
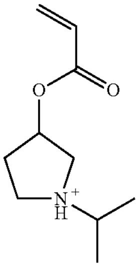
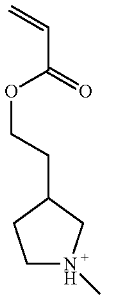
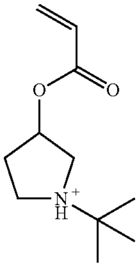
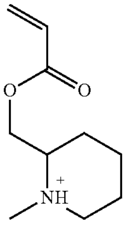

-continued
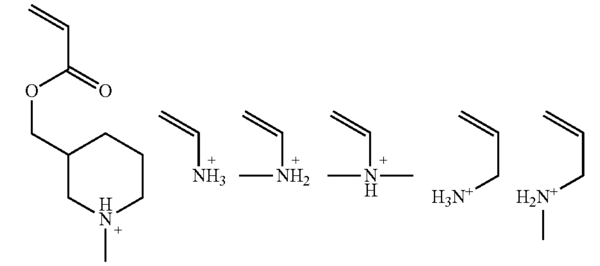
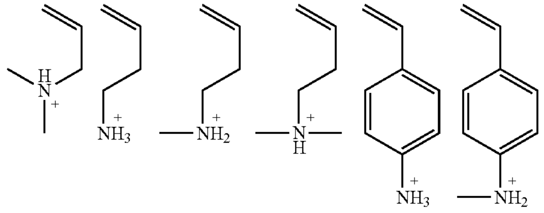
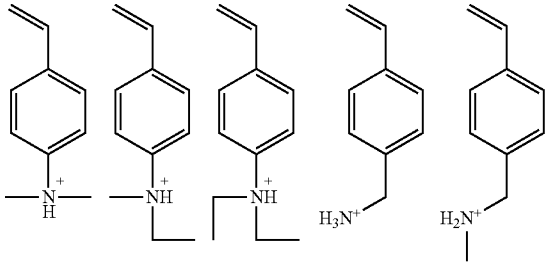
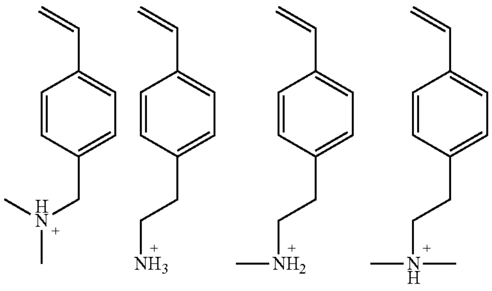
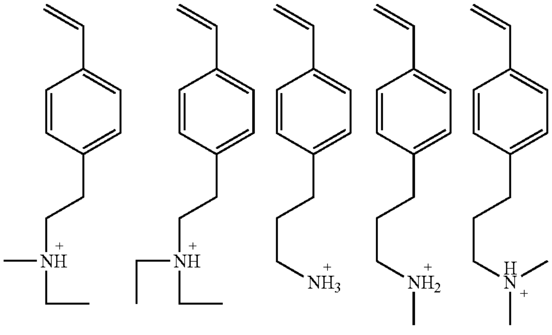
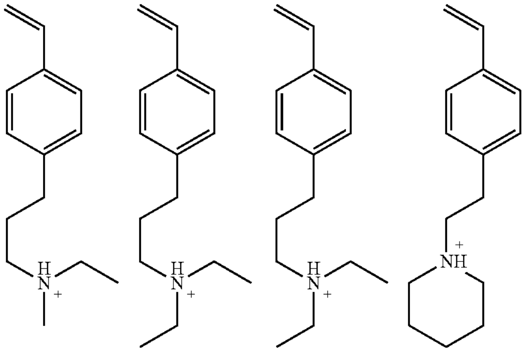
-continued
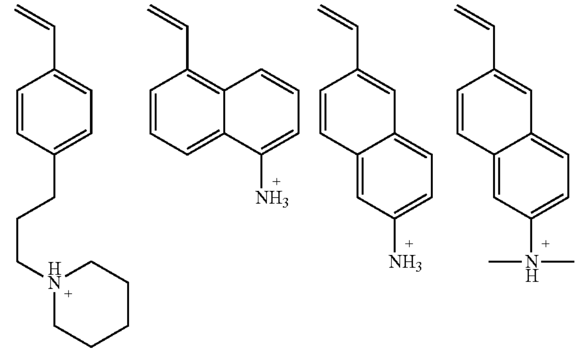
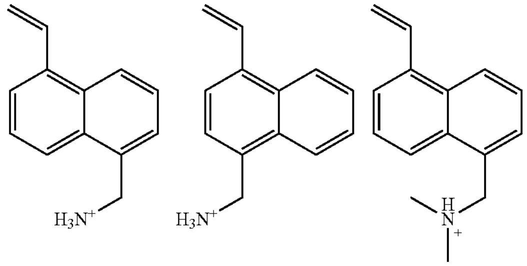
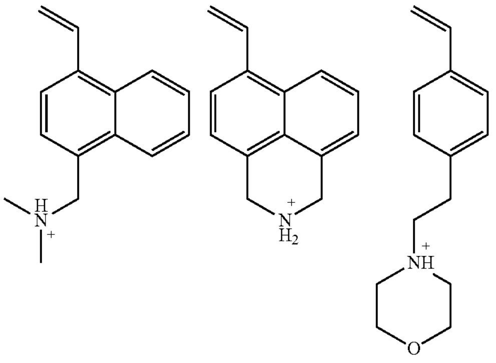
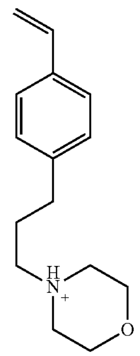
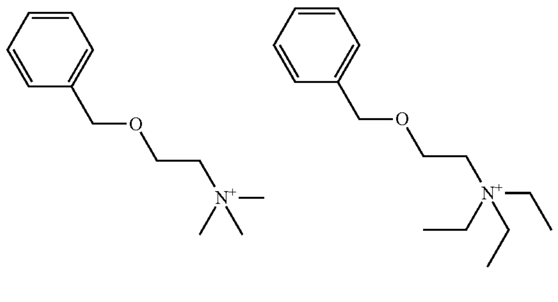

-continued
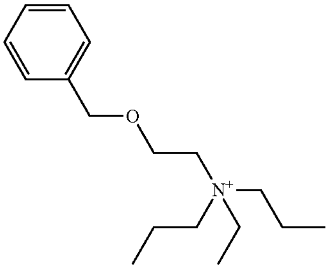
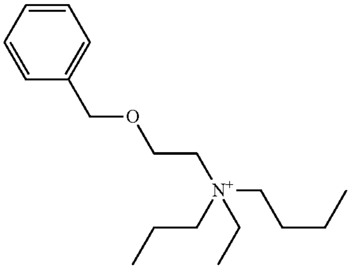
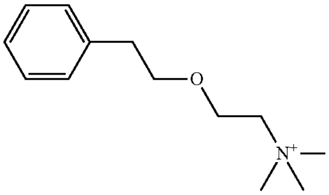
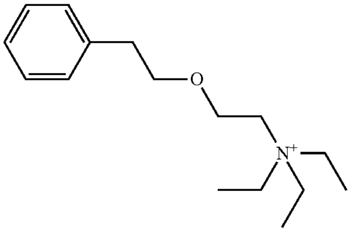
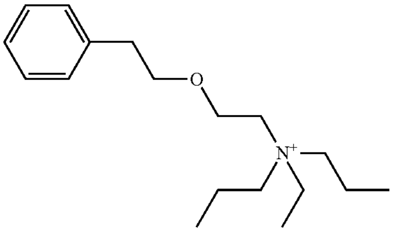
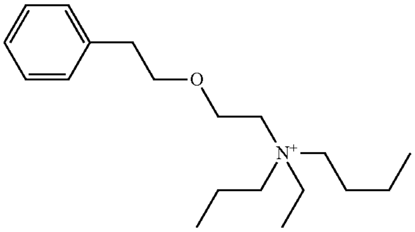
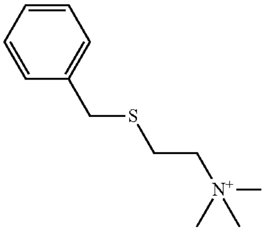
-continued
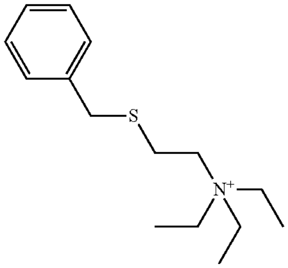
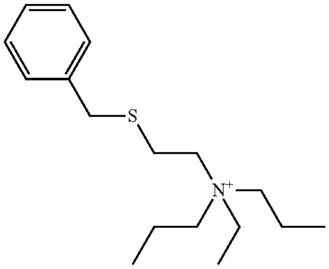
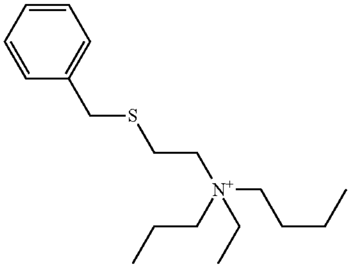
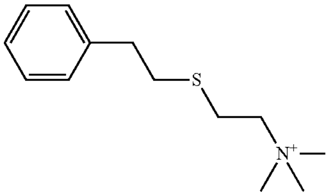
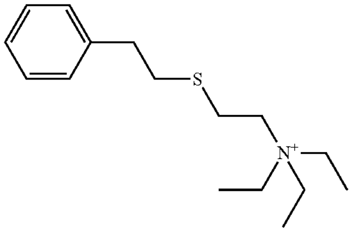
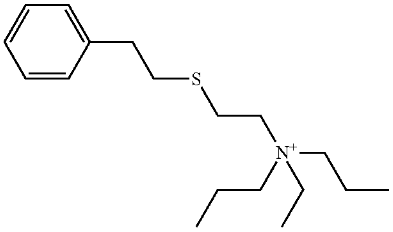
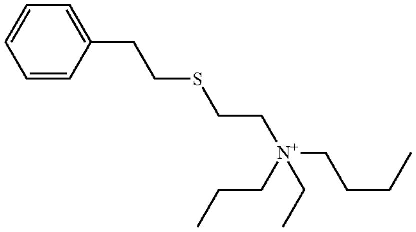

-continued
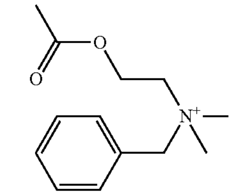
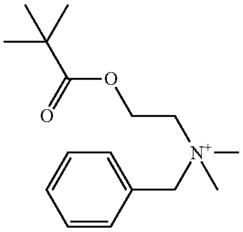
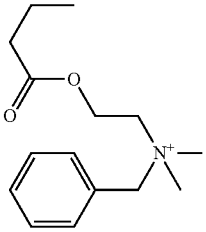
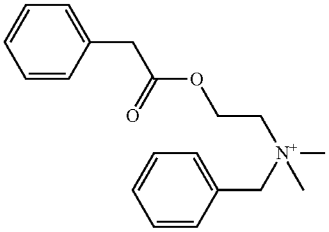
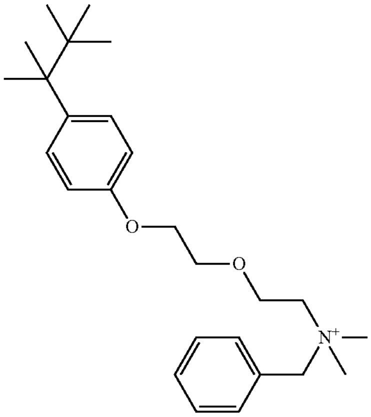
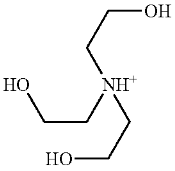
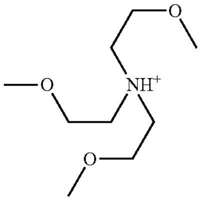
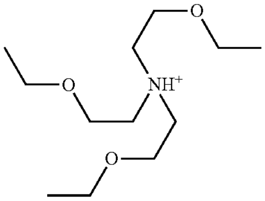
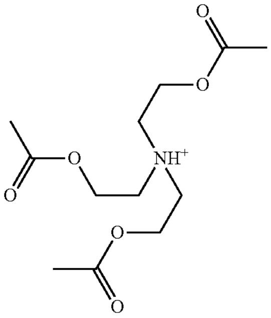
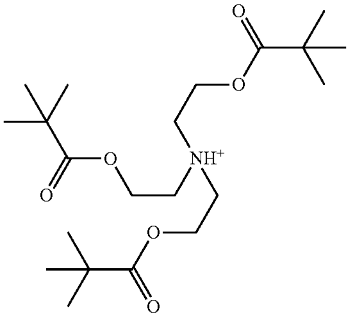
-continued
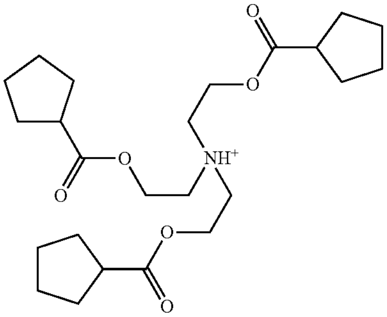
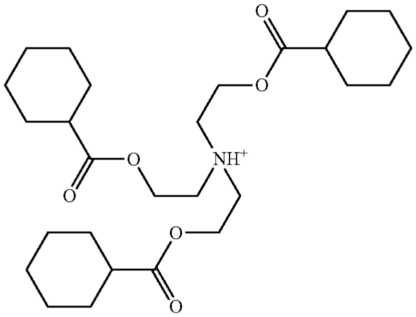
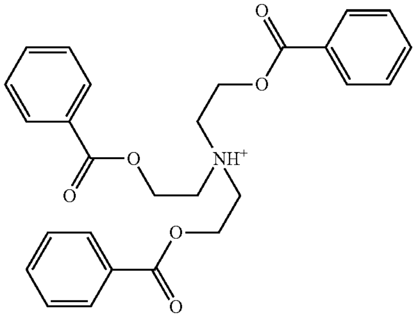
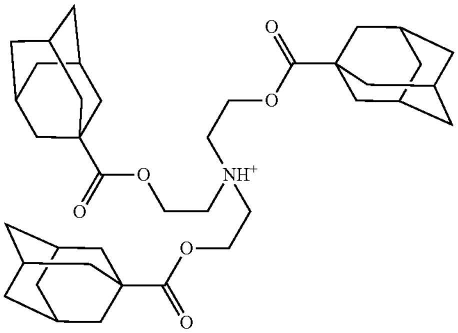
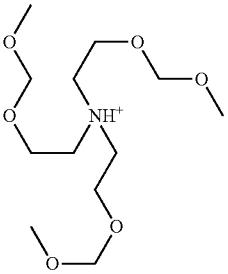
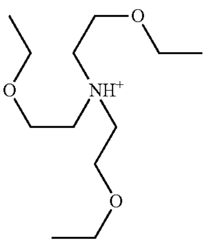

-continued
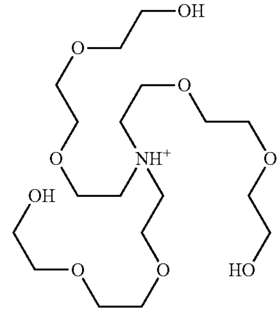
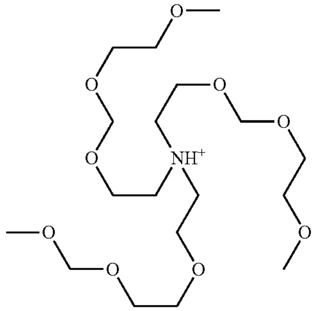
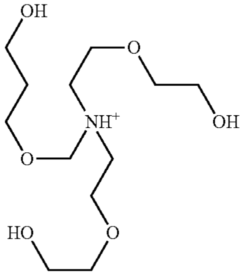
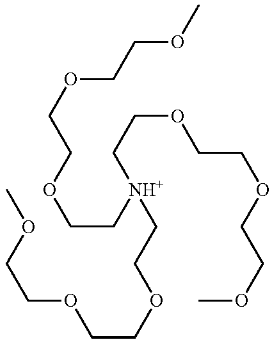
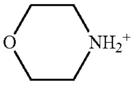
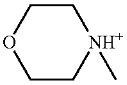
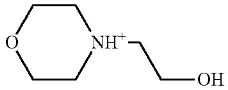
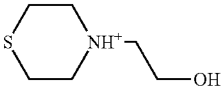
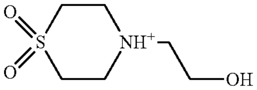
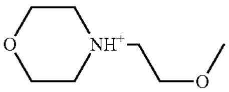
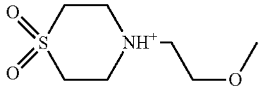
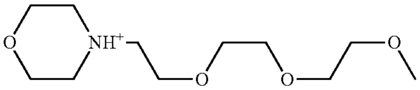
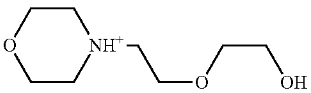
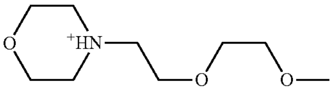
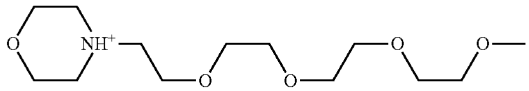
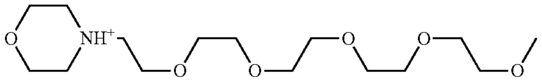
-continued
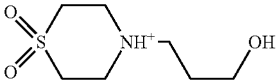
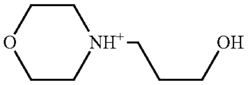
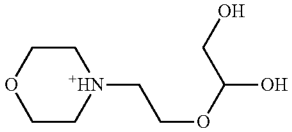
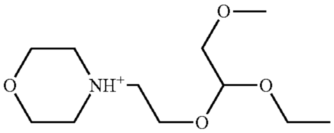
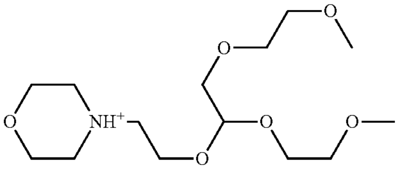
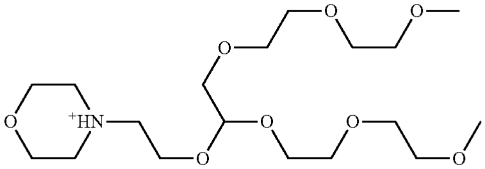
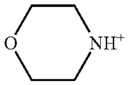
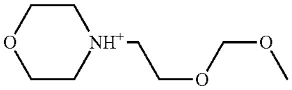
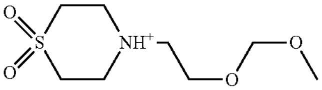
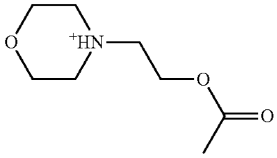
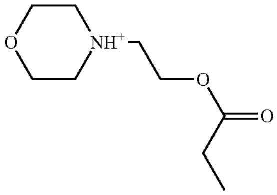
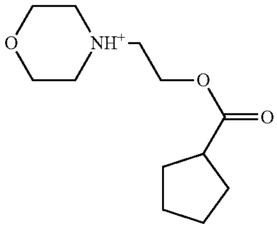
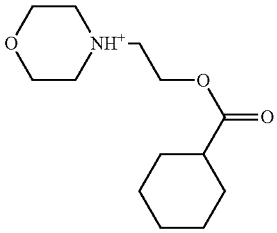

-continued
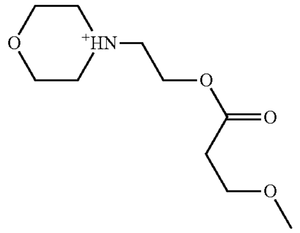
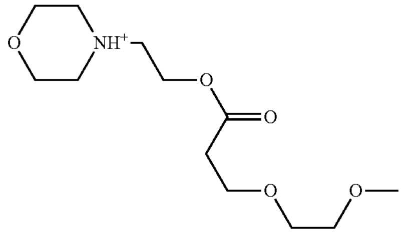
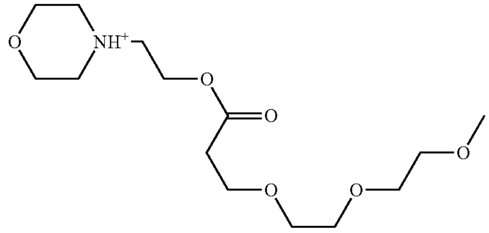
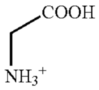
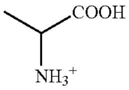
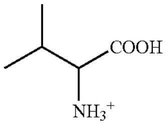
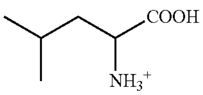
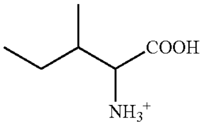
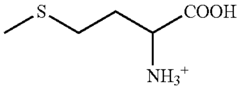
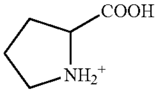
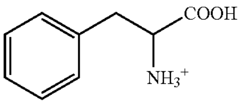
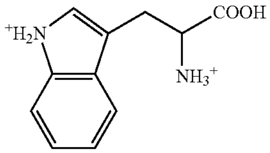
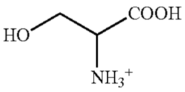
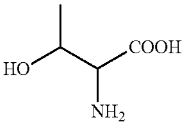
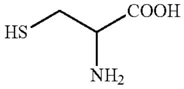
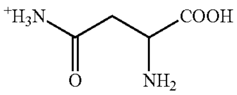
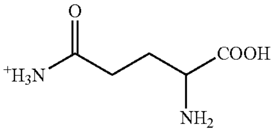
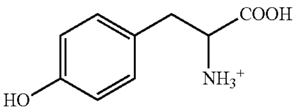
-continued
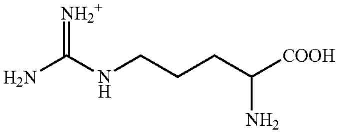
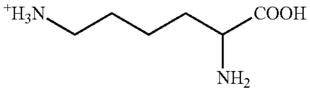
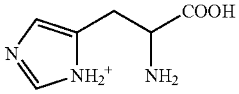
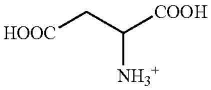
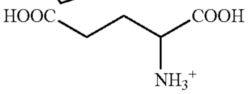
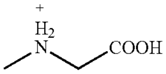
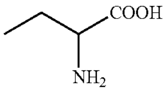
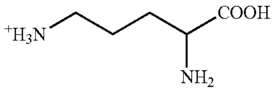
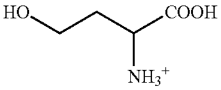
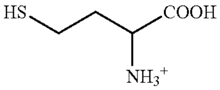
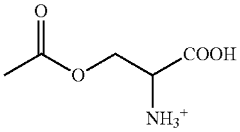
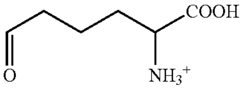
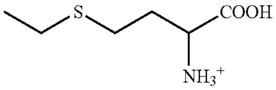
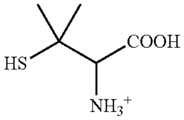
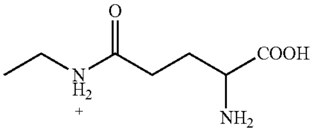
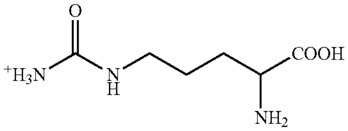
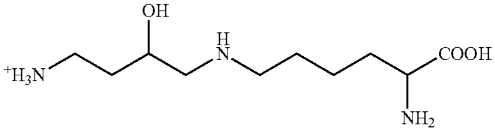
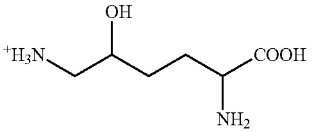
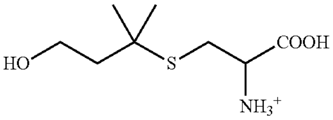
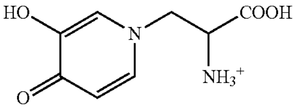
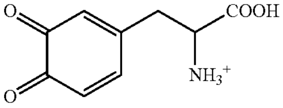

-continued

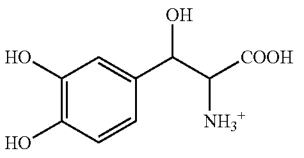
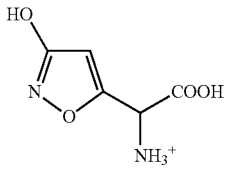
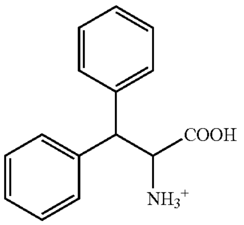
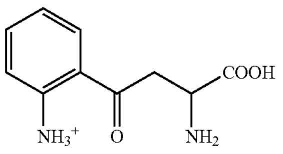
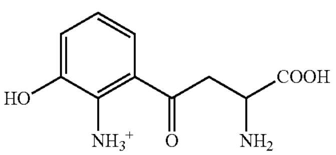
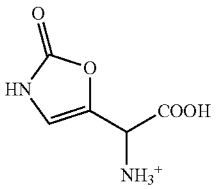
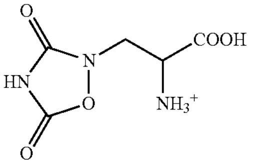
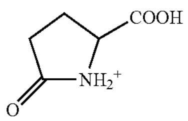
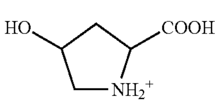
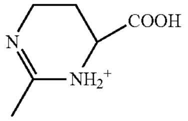
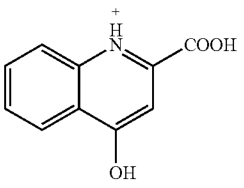
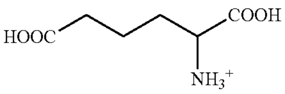
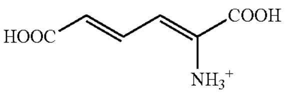
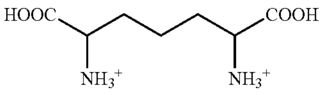
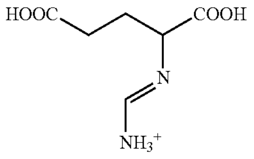

-continued

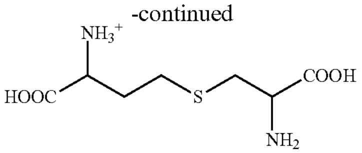
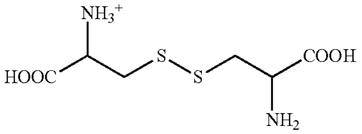
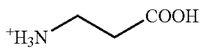
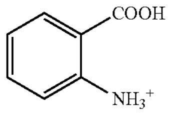
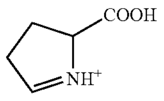
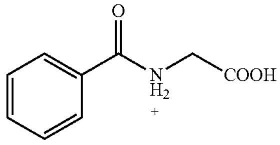
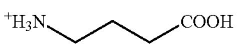
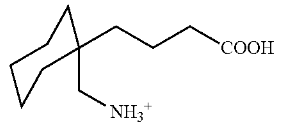
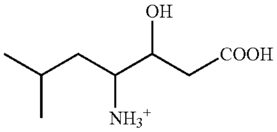
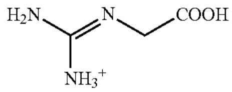
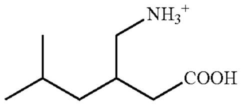
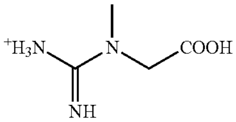
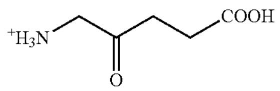

As one method for synthesizing an ion polymer which the layer (B) contains, ion polymer material can be obtained, for example, by a method in which desired monomer(s) among the monomers to give the repeating units-A1 to -A7, -b, -c, -d, -e, -f, -g and -h undergo heat polymerization in an organic solvent to which a radical polymerization initiator is added.

Examples of the organic solvents used in the polymerization include toluene, benzene, tetrahydrofuran, diethyl ether, dioxane, cyclohexane, cyclopentane, methyl ethyl ketone, γ-butyrolactone, etc.

Examples of the radical polymerization initiator include 2,2'-azobisisobutyronitrile (AIBN), 2,2'-azobis(2,4-dimethylvaleronitrile), dimethyl 2,2'-azobis(2-methylpropionate), benzoyl peroxide, lauroyl peroxide, etc.

The reaction temperature is preferably 50 to 80° C., and the reaction time is preferably 2 to 100 hours, more preferably 5 to 20 hours.

In the ion polymer which the layer (B) contains, the number of the monomers which give the repeating units-A1 to -A7 may be one or more.

Further, when two or more kind of monomers which give the repeating units-A1 to -A7 are used, each monomer may be copolymerized at random, or may be in a block basis.

Further, the monomers to give the repeating units-A1 to -A7, -b, -c, -d, -e, -f, -g and -h, may be copolymerized at random, or in a block basis.

In general, the random copolymerization by a radical polymerization is conducted by mixing a monomer to be copolymerized and a radical polymerization initiator, and heating them. In the case where a first monomer starts polymerization under a radical polymerization initiator and then the second monomer was added, the polymer has a polymerized structure of the first monomer in one end and a polymerized structure of the second monomer in another end. However, in this case, the middle portion of the polymer includes both repeating units from the first monomer and from the second monomer, and the structure is different from one of a blocked copolymer. A living radical polymerization technique is preferably used when a blocked copolymer is formed by a radical polymerization.

In living radical polymerization technique called RAFT polymerization (Reversible Addition Fragmentation chain Transfer polymerization), because a radical at the terminal of a polymer is always active, by starting a polymerization using the first monomer and then adding the second monomer at the timing when the first monomer is used up, it is possible to form a diblock copolymer having both a block of a repeating unit of the first monomer and a block of a repeating unit of the second monomer. Further, by starting a polymerization with the first monomer, adding the second monomer at the timing when the first monomer is used up, and then adding the third monomer, it is possible to form a triblock polymer.

The RAFT polymerization has a characteristic of forming a polymer with narrow polydispersity, which means a narrow distribution of molecular weights (polydispersity index). Especially when monomers are added at a time and subjected to RAFT polymerization, a polymer having a narrower distribution of molecular weights is formed.

RAFT polymerization needs a chain transfer agent. Specific examples of the chain transfer agent include 2-cyano-2-propylbenzothioate, 4-cyano-4-phenylcarbonothioylthiopentanoic acid, 2-cyano-2-propyldodecyltrithiocarbonate, 4-cyano-4-[(dodecylsulfanylthiocarbonyl)sulfanyl]pentanoic acid, 2-(dodecylthiocarbonothioylthio)-2-methylpropanoic acid, cyanomethyldodecylthiocarbonate, cyanomethylmethyl(phenyl)carbamothioate, bis(thiobenzoyl)disulfide, and bis(dodecyl sulfanylthiocarbonyl)disulfide. Among these, 2-cyano-2-propylbenzothioate is preferable especially.

A polymer contained in the layer (B) preferably has a weight-average molecular weight in the range of 1,000 to 500,000, more preferably in the range of 2,000 to 200,000. When the weight-average molecular weight is more than 1,000, heat resistance is superior, and a residue does not remain on the skin after being peeling off. Meanwhile, when the weight-average molecular weight is 500,000 or less, its workability is excellent because its viscosity does not increase, and its solubility in organic solvents is excellent.

Note that the weight-average molecular weight (Mw) is a value measured in terms of polyethylene oxide, polyethylene glycol, or polystyrene, by gel permeation chromatography (GPC) using dimethylformamide (DMF) and tetrahydrofuran (THF) as an eluent.

As disclosed in JP 2021-164630 A, it is possible by reactions to introduce a radically reactive group such as (meth)acrylate group, or styrene group into a hydroxy group, a carboxy group, an oxirane group, an oxetane group, or an isocyanate group of the ion polymer after the polymerization.

Here, ratios of repeating units-A1 to -A7, -b, -c, -d, -e, -f, -g, and -h, in an ion polymer contained in the layer (B) are: $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, $0 < a1+a2+a3+a4+a5+a6+a7 \le 1.0$, $0 \le b < 1.0$, $0 \le c < 1.0$, $0 \le d < 1.0$, $0 \le e < 1.0$, $0 \le f < 1.0$, $0 \le g < 1.0$, $0 \le h < 1.0$; preferably $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, $0.1 \le a1+a2+a3+a4+a5+a6+a7 \le 1.0$, $0 \le b \le 0.8$, $0 \le c \le 0.8$, $0 \le d \le 0.8$, $0 \le e \le 0.8$, $0 \le f \le 0.8$, $0 \le g \le 0.8$, $0 \le h \le 0.8$; and more preferably $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, $0.2 \le a1+a2+a3+a4+a5+a6+a7 \le 1.0$, $0 \le b \le 0.7$, $0 \le c \le 0.7$, $0 \le d \le 0.7$, $0 \le e \le 0.7$, $0 \le f \le 0.7$, $0 \le g \le 0.7$, $0 \le h \le 0.7$. a1 to a7, b, c, d, e, f, g, and h, are a ratio of repeating units-A1 to -A7, -b, -c, -d, -e, -f, -g, and -h respectively.

[Other Components]

(Surfactants)

In the present invention, a surfactant may be added in order to increase wettability of a solution containing metal nanowires, an electro-conductive paste containing conductive particles, or a solution containing ion polymer, against a material to be processed such as a substrate. Examples of the surfactant include a nonionic, cationic, and anionic surfactants. Specifically, the examples include nonionic surfactants such as polyoxyethylene alkyl ether, polyoxyethylene alkylphenyl ether, polyoxyethylene carboxylate, sorbitan ester, or polyoxyethylene sorbitan ester; cationic surfactants such as alkyltrimethylammonium chloride, or alkylbenzylammonium chloride; and anionic surfactants such as alkyl or alkylaryl sulfates, alkyl or alkylaryl sulfonates, or dialkyl sulfosuccinate; and amphoteric surfactants such as amino acid type or betaine type, etc. The surfactant is preferably contained in an amount of 50 to 0.1 parts by mass, more preferably 20 to 1 parts by mass, based on 100 parts by mass of the ion polymer.

[Resin (C)]

The resin (C) to be blended in a solution containing an ion polymer used to form the layer (B) of the inventive bio-electrode is a component to prevent elution of the ion polymer and to maintain adhesiveness with the electro-conductive wiring. Components contained in the layer (B) preferably contain at least one resin (C) selected from the group consisting of (meth)acrylate resin, (meth)acrylamide resin, urethane resin, polyurethane (meth)acrylate, polyvinyl alcohol, polyvinylpyrrolidone, polyoxazoline, polyglycerin, polyglycerin-modified silicone, polyglycerin (meth)acrylate, cellulose, polyethylene glycol, and polypropylene glycol. Resin (C) is preferably contained in an amount of 1000 to 5 parts by mass, more preferably 500 to 10 parts by mass, based on 100 parts by mass of the ion polymer.

[Optional Component]

A solution containing ion polymer to form the layer (B) of the inventive bio-electrode can contain optional components such as an ionic additive, a silicone compound having a polyglycerin structure, an organic solvent, etc.

[Ionic Additives]

An ionic additive can be added to a solution containing an ion polymer used to form the layer (B) of the inventive bio-electrode to increase ionic conductivity. In light of biocompatibility, examples of the ionic additives can include sodium chloride, potassium chloride, calcium chloride, saccharin, acesulfame potassium, and salts disclosed in JP 2018-044147 A, JP 2018-059050 A, JP 2018-059052 A, or JP 2018-130534 A.

Ammonium salts of fluorosulfonic acid, fluoroimide acid, and fluoromethide acid are known as ionic liquids. Specifically, it is also possible to add ionic liquids described in Trulove C, Mantz R. 2003. Ionic Liquids in Synthesis, Chapter 3.6: Electrochemical Properties of Ionic Liquids. The ionic additive is preferably contained in an amount of 100 to 1 parts by mass, more preferably 50 to 5 parts by mass, based on 100 parts by mass of the ion polymer.

[Silicone Compound Having a Polyglycerin Structure]

In solution containing an ion polymer used to form the layer (B) of the inventive bio-electrode, in order to improve sensitivity to ion released from the skin and ionic conductivity by improving moisture retaining property, it is possible to add a silicone compound having a polyglycerin structure. The silicone compound having the polyglycerin structure is preferably contained in an amount of 0.01 to 100 parts by mass, more preferably 0.5 to 60 parts by mass, based on 100 parts by mass of the ion polymer. Further, the silicone compound having a polyglycerin structure may be used alone, or in a mixture of 2 or more.

Examples of a silicone compound having a polyglycerin structure include those disclosed in JP 2021-115458 A.

When a silicone compound having such a polyglycerin structure are contained, it is possible to exhibit more excellent moisture retaining property, and consequently to have a solution containing ion polymer to be able to form the ion polymer containing layer having more excellent sensitivity to ion released from the skin.

[Organic Solvent]

Specific examples of the organic solvent include: ketone solvents, such as cyclohexanone, cyclopentanone, 2-octanone, 2-nonanone, 2-heptanone, 3-heptanone, 4-heptanone, 2-hexanone, 3-hexanone, diisobutyl ketone, methylcyclohexanone, and methyl n-pentyl ketone; alcohol solvents, such as 3-methoxybutanol, 3-methyl-3-methoxybutanol, 1-methoxy-2-propanol, and 1-ethoxy-2-propanol; ether solvents, such as propylene glycol monomethyl ether, ethylene glycol monomethyl ether, propylene glycol monoethyl ether, ethylene glycol monoethyl ether, propylene glycol dimethyl ether, diethylene glycol monomethyl ether, diethylene glycol monoethyl ether, diethylene glycol monopropyl ether, diethylene glycol monobutyl ether, diethylene glycol monopentyl ether, diethylene glycol monoheptyl ether, diethylene glycol diethyl ether, diethylene glycol dipropyl ether, diethylene glycol dibutyl ether, diisopropyl ether, diisobutyl ether, diisopentyl ether, di-n-pentyl ether, methyl cyclopentyl ether, methyl cyclohexyl ether, di-n-butyl ether, di-sec-butyl ether, di-sec-pentyl ether, di-tert-amyl ether, di-n-hexyl ether, and anisole; ester solvents, such as propylene glycol monomethyl ether acetate, propylene glycol monoethyl ether acetate, ethyl lactate, ethyl pyruvate, butyl acetate, methyl 3-methoxypropionate, ethyl 3-ethoxypropionate, tert-butyl acetate, tert-butyl propionate, and propylene glycol mono-tert-butyl ether acetate; lactone solvents, such as γ-butyrolactone; etc.

Note that the organic solvent is preferably contained in an amount of 10 to 50,000 parts by mass based on 100 parts by mass of the ion polymer.

When a repeating unit of the ion polymer have an oxirane group or an oxetane group, an amine-based crosslinking agent or an imidazole-based crosslinking catalyst can be added. When a repeating unit of the ion polymer have a carboxy group, amino group, or an imidazole group, a crosslinking agent having an oxirane group or an oxetane group can be added.

For decreasing viscosity of the solution containing ion polymer or crosslinking, a (meth)acrylate monomer can be added. For crosslinking, a monomer preferably contains a plurality of (meth)acrylate in a molecule.

In order to react the (meth)acrylate, a radical generator can be added. The radical generator is a compound which generate a radical by heat or light. Specifically, compounds disclosed in JP 2020-097214 A can be used.

<Electro-Conductive Layer>

The electro-conductive wiring having a width of 200 μm or less, which is contained in the electro-conductive layer, is preferably a printed pattern formed by an electro-conductive paste including a particle of gold, silver, copper, or nickel, or a fusion layer of metal nanowires including gold, silver, copper, nickel, or alloy thereof.

When the electro-conductive wiring having a width of 200 μm or less is formed by printing, electro-conductive paste including a particle of gold, silver, copper, or nickel is preferably used. The electro-conductive paste is preferably mixed with an organic solvent or a resin besides an electro-conductive particle such as a particle of gold, silver, copper, or nickel. Compositions of the electro-conductive paste are disclosed specifically in JP 2022-078861 A.

Hereinafter, the inventive bio-electrode will be described in detail with reference to the drawings, but the present invention is not limited thereto.

FIG. 1 shows a schematic sectional view of the inventive bio-electrode 2, wherein the electro-conductive layer 1-1 is formed on the substrate 1 having the moth-eye typed anti-reflective structure. In this case, the metal nanowires are used for the electro-conductive layer 1-1.

FIG. 2 shows a schematic sectional view of the inventive bio-electrode 2, wherein the ion polymer containing layer 1-2 is formed on the electro-conductive layer 1-1 using the metal nanowires on the substrate 1 having the moth-eye typed anti-reflective structure. The metal nanowires may be covered entirely by the ion polymer containing layer 1-2, or may be partially exposed on the surface.

FIG. 3 shows a schematic sectional view of the inventive bio-electrode 2 attached on the human skin 3. One surface of the ion polymer containing layer 1-2 is in contact with the human skin 3 and another surface is in contact with the electro-conductive layer 1-1.

FIGS. 4 to 6 shows a schematic sectional view of the substrate having the moth-eye typed anti-reflective structure. The moth-eye structure is a thick at a section near the substrate, and becomes thinner as the section goes up. Any cross-sectional shape is acceptable, including triangular, trapezoidal, cylindrical, etc.

FIGS. 7 and 8 shows a schematic top plan view of the moth-eye typed anti-reflective structure. Any shape in top plan view is acceptable, including circular, polygonal, square, triangular, irregular, etc., and the pitch and the depth of the shape or the pattern may be uniform or irregular.

In the present invention, patterns of the electro-conductive wiring are not limited specifically, but exemplified below. FIG. 9 shows a schematic top view (plan view) of the electro-conductive wiring having a width of 200 μm or less, which is formed in the shape of a straight line by printing. The space between the wiring improves transparency and a plurality of wirings improves electric conductivity.

FIG. 10 shows a schematic top view of the electro-conductive wiring having a width of 200 μm or less, which is formed in the shape of zigzag line by printing. When the electro-conductive wiring is extended or contracted in a horizontal direction, the wiring in a zigzag pattern has less change in electric conductivity when extended or contracted.

FIG. 11 shows a schematic top view of the electro-conductive wiring having a width of 200 μm or less, which is printed to form the shape of zigzag line having corners rounded (wavy lines). The wiring pattern such a wavy line has less change in electric conductivity when extended or contracted than zigzag wiring patterns having a straight line and a sharp angle.

FIG. 12 shows a schematic top view of electro-conductive wiring having a width of 200 μm or less, which is formed in a combination of two zigzag lines by printing. This wiring pattern has less change in electric conductivity when extended or contracted than one zigzag wiring pattern having a straight line and a sharp angle as shown in FIG. 10.

The direction of a zigzag pattern of the electro-conductive wiring may be not only in horizontal to the substrate as shown in FIGS. 10 to 12, but also in vertical to the substrate as disclosed in JP 2020-107875 A.

The printed pattern of the electro-conductive wiring may be an independent line as shown in FIG. 9 to 12, or may have a wiring to connect neighboring wirings. For example, examples of the patterns can include a reticular pattern (aslant lattice pattern) shown in FIG. 13, a hexagonal pattern shown in FIG. 14, a pattern of connected-circles shown in FIGS. 15 and 16, and a mesh pattern shown in FIG. 17. In addition to these, examples of the patterns can include a Higaki pattern with repeated diagonal rectangles, a Mutsude-no-Manji pattern that combines hexagons, a Kagome pattern that combines equilateral triangles and straight lines, a Bishamon-Kikkou pattern, a Fundo-Tsunagi pattern with curved lines crossing diagonally, a Tokkuri-Ajiro pattern, and a Hoshishippo pattern with circles overlapped (http://www.natubunko.net/wagara/kotoba09g.html).

FIG. 18 shows a schematic top view showing the electro-conductive wiring, which is the fusion layer made by coating a solution containing metal nanowires on substrate and fusing them. Spaces between the metal nanowires improve transparency. Contact between metal nanowires each other improves electric conductivity when the electro-conductive wiring is extended or contracted.

The moth-eye typed anti-reflective structure can be added not only on the upper surface of the substrate but also on back surface. FIG. 19 shows the inventive bio-electrode 2, when the electro-conductive layer 1-1 is formed on the moth-eye typed anti-reflective structure on the back surface of the substrate 1' and the ion polymer containing layer 1-2 are formed thereon. When the electro-conductive layer is formed on a moth-eye substrate having a concave and convex surface, there is also an advantage of excellent stretchability because the zig-zag patter is formed in vertical direction as disclosed in JP 2020-107875 A.

The thickness of the bio-electrode which is a combination of the Layer (A), Layer (B), and the substrate having the anti-reflective structure for light is preferably 1 nm or more and 1 mm or less, more preferably 2 nm or more and 0.5 mm or less.

<Method for Manufacturing Bio-Electrode>

The present invention provides a method for manufacturing the bio-electrode, wherein the electro-conductive layer is formed on the substrate and the ion polymer containing layer is formed thereon on the side to be in contact with the skin. That is, the present invention provides the method for manufacturing the bio-electrode, which includes forming the layer (A), on the opposite side from the side having the anti-reflective structure of the substrate having the anti-reflective structure for light on at least one side, by applying a solution containing metal nanowires, or by printing an electro-conductive paste containing conductive particles.

A substrate preferably has flexibility and stretchability, and transparent. A thin film glass has flexibility and highly transparent, but a resin which cannot be broken is preferable because the skin is hurt when the glass is broken while attached on the skin. Examples of resins which can be used as a substrate can include poly(meth)acrylate (PMMA), polyurethane, silicone, PEEK, polyimide, polyolefin, styrene-butadiene rubber, polycarbonate, PET, PEN, PVC, polystyrene, polyethylene, polypropylene, polymethylpentene, Teflon (registered trademark).

A method to form the electro-conductive layer on a substrate can include: printing an electro-conductive paste containing conductive particles, a resin, and a solvent as an electro-conductive pattern having a width of 200 μm or less; and coating ink (solution) containing metal nanowires.

A method to form the ion polymer containing layer on the electro-conductive layer can include coating a solution containing an ion polymer.

A method to coat a solution containing the ion polymer on the electro-conductive layer is not specifically limited, but includes direct coating and transferring what is coated on another substrate. In either method, the preferable methods are, for example, dip coating, spray coating, spin coating, roll coating, flow coating, doctor coating, screen printing, flexo printing, gravure printing, inkjet printing, etc.

The same methods as one for coating a solution containing the ion polymer are used for: printing the electro-conductive paste containing an electro-conductive particle, a resin, and a solvent, as an electro-conductive pattern having a width of 200 μm or less; and coating an ink containing metal nanowires.

After coating an electro-conductive paste, an ink containing metal nanowires, or a solution containing an ion polymer, heating is conducted to evaporate a solvent and cure the layer.

Note that a temperature in heating after coating a solution containing an ion polymer is not particularly limited and, for example, temperature around a range of 50 to 250° C. is preferable.

In the case of using silver nanowires etc., the heating temperature after coating the ink containing the electro-conductive paste or metal nanowires is in the range of 200 to 600° C., in order to fuse silver each other. At this time, to prevent thermal decomposition of the substrate, it is possible to use a a flash lamp anneal method which radiates intense UV in a short time.

Further, In the case where heating and radiation of light are combined, these may be conducted at the same time, the heating may be conducted after the light radiation, or vice versa. Furthermore, air-dry may be conducted to evaporate a solvent before heating after coating.

By putting a waterdrop or spraying steam or mist on a surface of the cured ion polymer containing layer, compatibility with the skin is improved, and biological signals can be obtained promptly. To make a size of waterdrop of the steam or the mist fine, it is also possible to use a water mixed with alcohol. It is also possible to wet surfaces of films or the skin, by having the surfaces touched with absorbent cotton or cloth containing water.

The water to wet the surface of the cured ion polymer containing layer may contain salt. A water-soluble salt to be mixed with water is preferably selected from the group consisting of a sodium salt, a potassium salt, a calcium salt, a magnesium salt, and a betaine.

The water-soluble salt can be salts specifically selected from the group consisting of sodium chloride, potassium chloride, calcium chloride, magnesium chloride, saccharin sodium salt, acesulfame potassium, sodium carboxylate, potassium carboxylate, calcium carboxylate, sodium sulfonate, potassium sulfonate, calcium sulfonate, sodium phosphate, potassium phosphate, calcium phosphate, magnesium phosphate, and betaine. Note that the ion polymer is not included in the water-soluble salts.

More specifically, in addition to the above, the examples of water-soluble salts can include sodium acetate, sodium propionate, sodium pivalate, sodium glycolate, sodium butyrate, sodium valerate, sodium caproate, sodium enanthate, sodium caprylate, sodium pelargonate, sodium caprate, sodium undecylate, sodium laurate, sodium tridecylate, sodium myristate, sodium pentadecylate, sodium palmitate, sodium margarate, sodium stearate, sodium benzoate, disodium adipate, disodium maleate, disodium phthalate, sodium 2-hydroxybutyrate, 3-sodium hydroxybutyrate, sodium 2-oxobutyrate, sodium gluconate, sodium methanesulfonate, sodium 1-nonanesulfonate, sodium 1-decanesulfonate, sodium 1-dodecanesulfonate, sodium 1-undecanesulfonate, sodium cocoyl isethionate, sodium lauroylmethylalanine, sodium methyl cocoyl taurine, sodium cocoyl glutamate, sodium cocoyl sarcosine, sodium lauroylmethyltaurate, laumidopropyl betaine, potassium isobutyrate, potassium propionate, potassium pivalate, potassium glycolate, potassium gluconate, potassium methanesulfonate, calcium stearate, calcium glycolate, calcium gluconate, calcium 3-methyl-2-oxobutyrate, calcium methanesulfonate. Betaine is a generic term for internal salts, specifically compounds in which three methyl groups are added to an amino group of an amino acid, more specifically it includes trimethylglycine, carnitine and proline betaine.

The water-soluble salts can further contain monohydric or polyhydric alcohols having 1 to 4 carbon atoms, and the alcohol is preferably selected from the group consisting of ethanol, isopropyl alcohol, ethylene glycol, diethylene glycol, triethylene glycol, glycerin, polyethylene glycol, polypropylene glycol, polyglycerin, diglycerin, and a silicone compound having a polyglycerin structure.

As for a preprocessing process using solution containing a salt, the cured electro-conductive layer can be wetted by atomization method, waterdrop dispensing method, etc. It is also possible to wet the layer in hot, humid conditions like in a sauna. The wet layer can be covered by a sheet to prevent it from drying after getting wet. Because the sheet has to be removed immediately before attaching the bio-electrode on the skin, the sheet coated by a release agent or a removable fluororesin film is used. The dry electrode covered by a removable sheet are sealed in a bag covered with aluminum, etc. for long-term storage. In order to prevent drying in the bag covered by aluminum, it is preferable to seal water in the bag.

It is effective for the purpose of humidifying the skin surface and obtaining biological signals with high sensitivity and high accuracy in a shorter time, to wipe the skin where the bio-electrode is attached with fabric containing water or water-contained alcohol such as ethanol, glycerin, etc., or to spray them onto the skin, immediately before attaching the bio-electrodes. Wiping with fabric containing water is effective not only for humidifying the skin but also for removing oil on the skin surface, and also for improving sensitivity to biological signals.

As has been described above, the inventive method for manufacturing the bio-electrode makes it possible to manufacture the inventive bio-electrode easily at low cost, which is thin, highly transparent, highly sensitive to biological signals, excellent in the electric conductivity and the biocompatibility, light-weight, capable of preventing significant reduction in electric conductivity when wetted with water or dried, and comfortable without itching, reddening, nor rash of the skin.

Example

Hereinafter, the present invention will be specifically described with reference to Examples and Comparative Examples. However, the present invention is not limited thereto.

Ionic polymers 1 to 25, which were blended as ionic materials (conductive materials) in bio-electrode solutions, were synthesized as follows. First, 30 mass % cyclopentanone solutions of respective monomers were introduced into a reaction vessel and mixed. The reaction vessel was cooled to −70° C. under a nitrogen atmosphere, and vacuum degassing and nitrogen blowing were repeated three times. After raising the temperature to room temperature, 0.01 mol of azobisisobutyronitrile (AIBN) was added as a polymerization initiator based on 1 mol of the entire monomer, and the mixture was reacted for 15 hours after raising the temperature to 60° C. After drying the solvent, the composition of the resulting polymer was identified by $^{1}$H-NMR. The molecular weight (Mw) and the dispersity (Mw/Mn) of the obtained polymer were determined by gel permeation chromatography (GPC) using tetrahydrofuran (THF) as a solvent. In the case of Ionic polymer 10, 2-(dimethylamino) ethyl methacrylate was added for neutralization, after copolymerization of a monomer having sulfonic acid. In the case of Ionic polymer 16, after copolymerizing a monomer having an isocyanate group, a polymer having acrylic group as a pendant was synthesized by reacting a polymerization solution with hydroxyethyl acrylate to form urethane bonds. In the case of Ionic polymer 17, after copolymerizing a monomer having a carboxy group, glycidyl acrylate was added to the polymerization solution to open the oxirane ring to synthesize a polymer having acrylic groups as a pendant. The solvent was evaporated to obtain a powder. The synthesized Ionic polymers 1 to 25 in the above manner are shown below.

Ionic Polymer 1

Mw=35,100

Mw/Mn=1.81

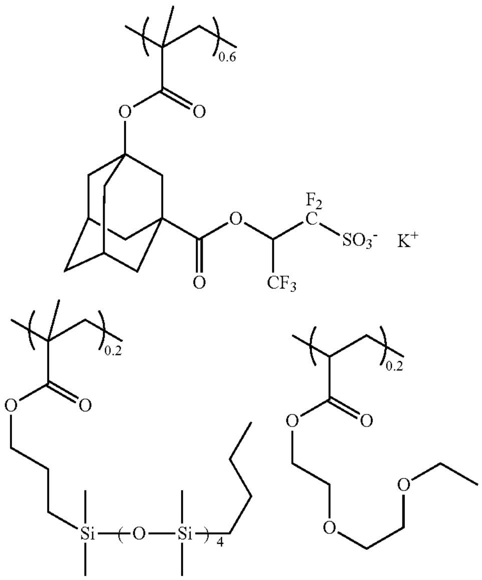

The repeating number in formula shows the average value.

Ionic Polymer 2
Mw=33, 500
Mw/Mn=1.79
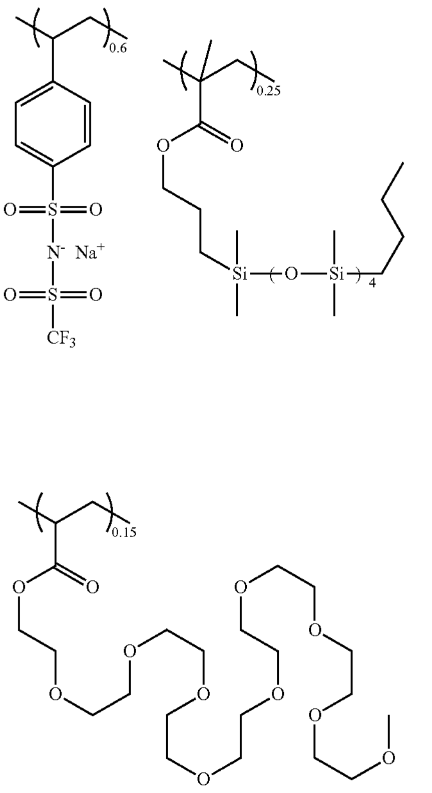
The repeating number in formula shows the average value.
Ionic Polymer 3
Mw=39, 600
Mw/Mn=1.82
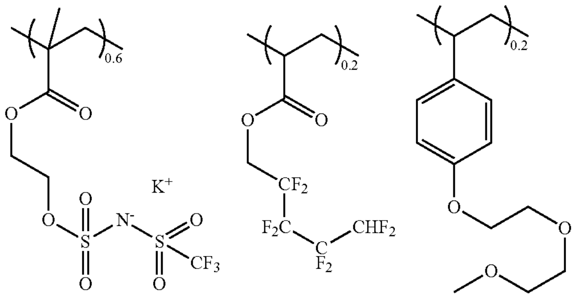
Ionic Polymer 4
Mw=44, 100
Mw/Mn=1.91
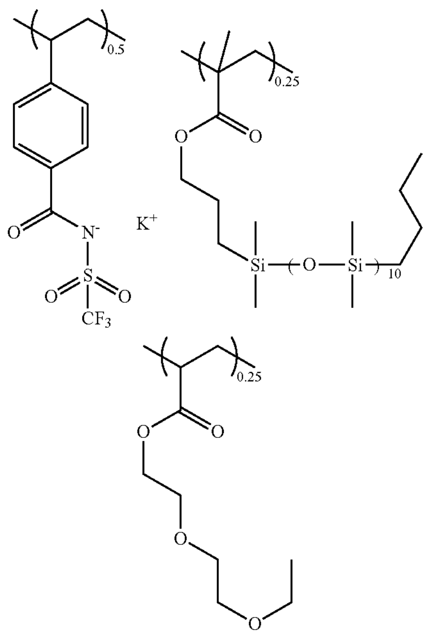
The repeating number in formula shows the average value.
Ionic Polymer 5
Mw=41, 600
Mw/Mn=1.83
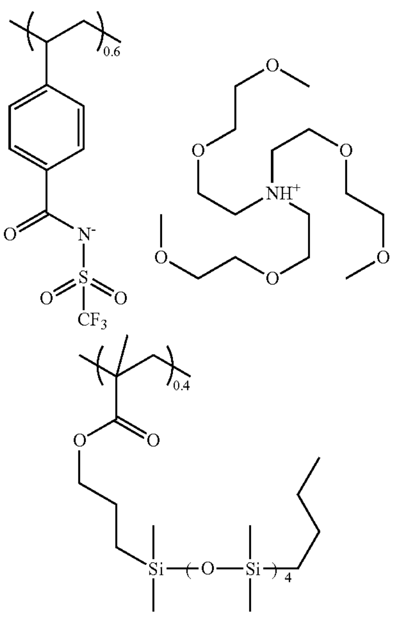
The repeating number in formula shows the average value.
Ionic Polymer 6
Mw=41,000
Mw/Mn=1.75

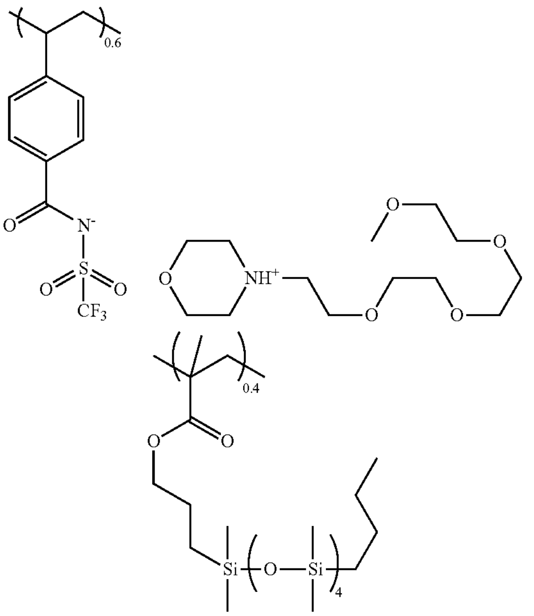
The repeating number in formula shows the average value.
Ionic Polymer 7
Mw=46, 500
Mw/Mn=1.97
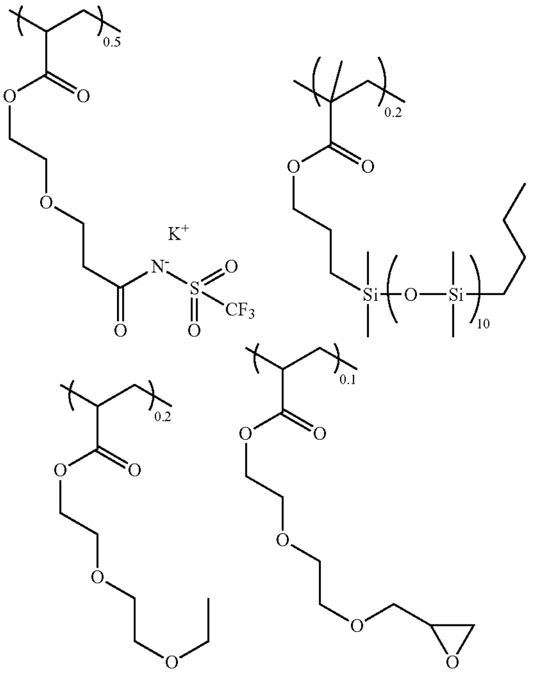
The repeating number in formula shows the average value.
Ionic Polymer 8
Mw=50, 600
Mw/Mn=2.11
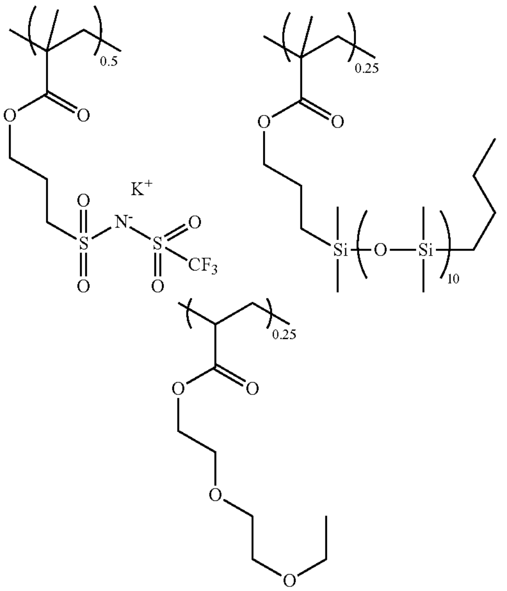
The repeating number in formula shows the average value.
Ionic Polymer 9
Mw=45, 700
Mw/Mn=2.01
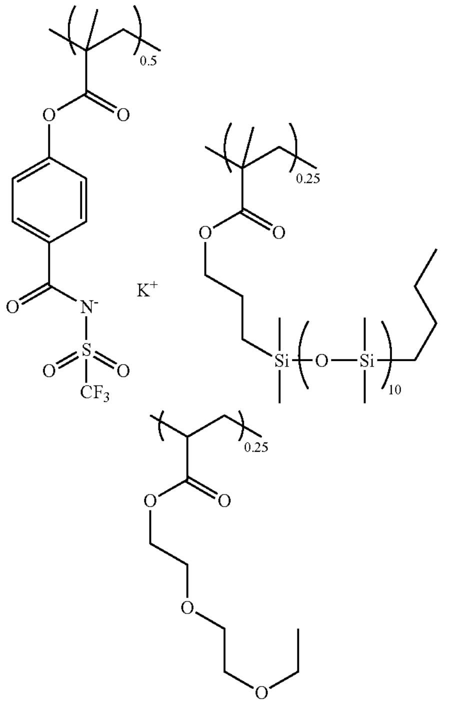
The repeating number in formula shows the average value.
Ionic Polymer 10
Mw=11, 300
Mw/Mn=1.63

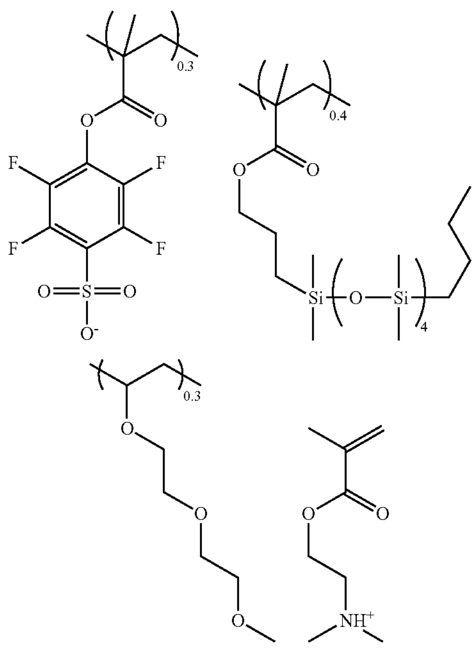
The repeating number in formula shows the average value.
Ionic Polymer 11
Mw=45, 100
Mw/Mn=1.97
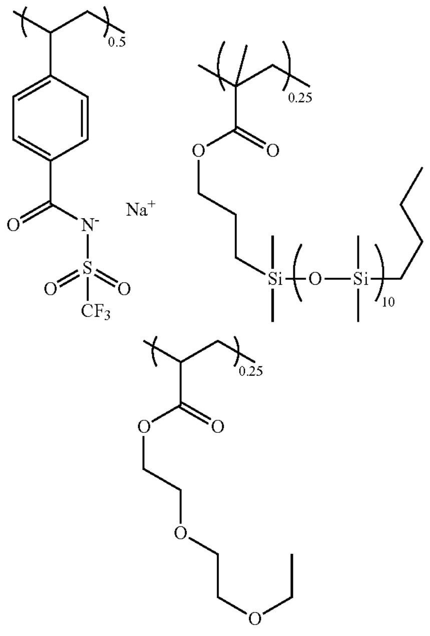
The repeating number in formula shows the average value.
Ionic Polymer 12
Mw=63,100
Mw/Mn=2.04
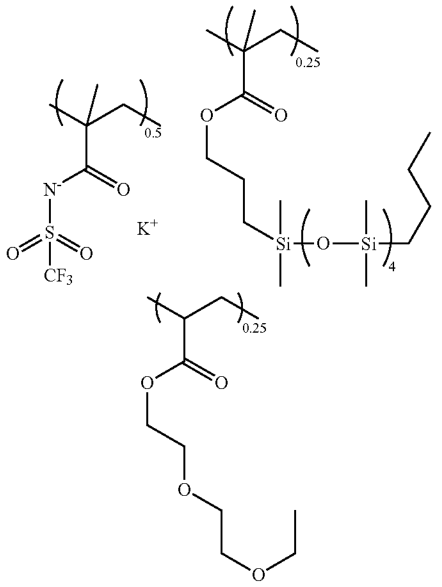
The repeating number in formula shows the average value.
Ionic Polymer 13
Mw=44, 300
Mw/Mn=1.95
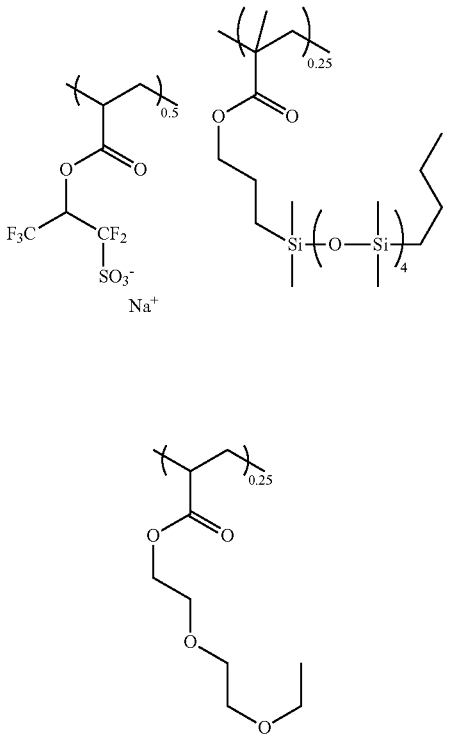
The repeating number in formula shows the average value.
Ionic Polymer 14
Mw=41, 300
Mw/Mn=1.86

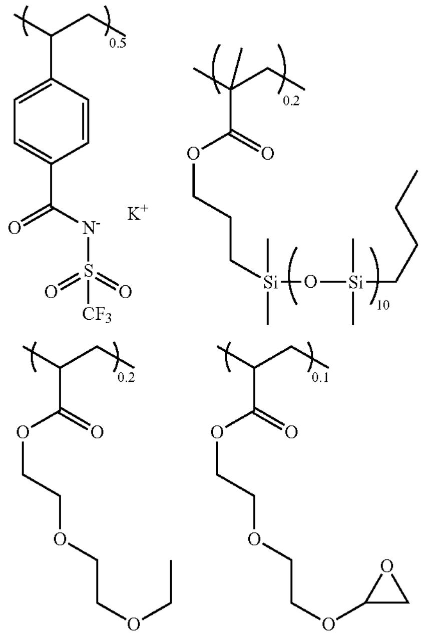
The repeating number in formula shows the average value.
Ionic Polymer 15
Mw=24, 100
Mw/Mn=1.83
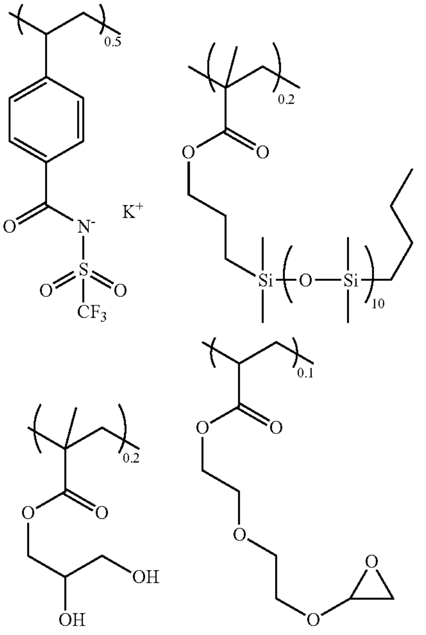
The repeating number in formula shows the average value.
Ionic Polymer 16
Mw=23, 400
Mw/Mn=1.77
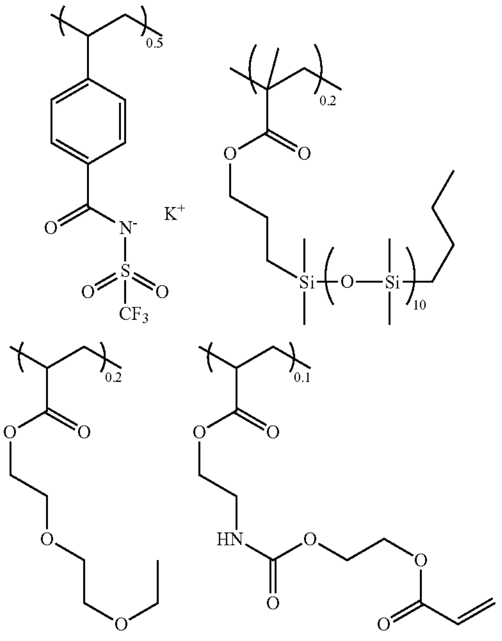
The repeating number in formula shows the average value.
Ionic Polymer 17
Mw=21, 100
Mw/Mn=1.79
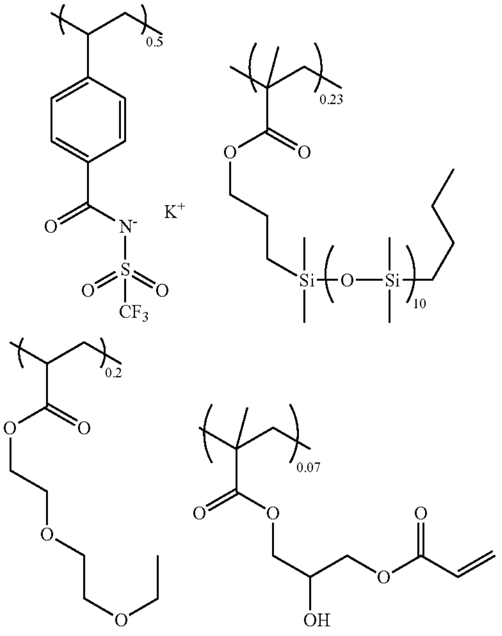
The repeating number in formula shows the average value.
Ionic Polymer 18
Mw=22, 900
Mw/Mn=1.86

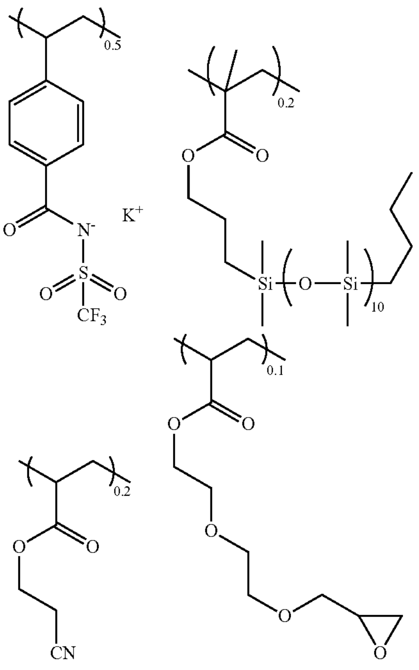
The repeating number in formula shows the average value.
Ionic Polymer 19
Mw=22, 900
Mw/Mn=1.86
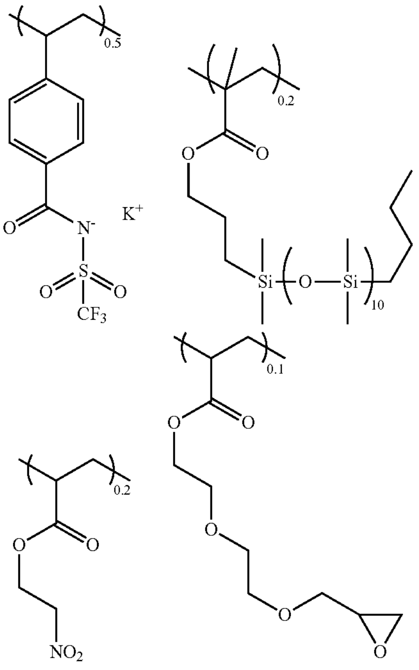
The repeating number in formula shows the average value.
Ionic Polymer 20
Mw=22,100
Mw/Mn=1.82
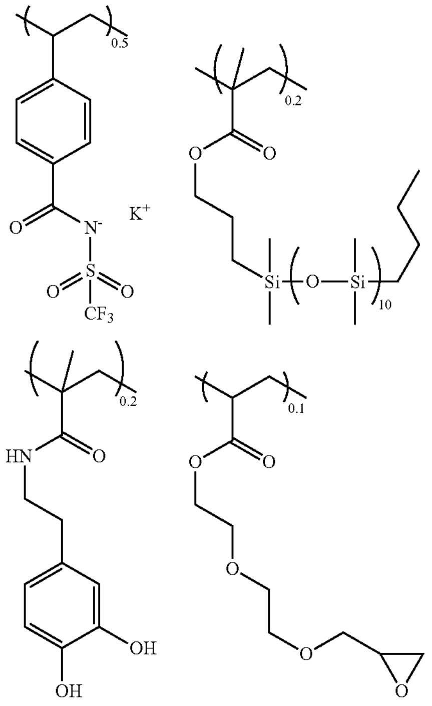
The repeating number in formula shows the average value.
Ionic Polymer 21
Mw=31, 900
Mw/Mn=1.98
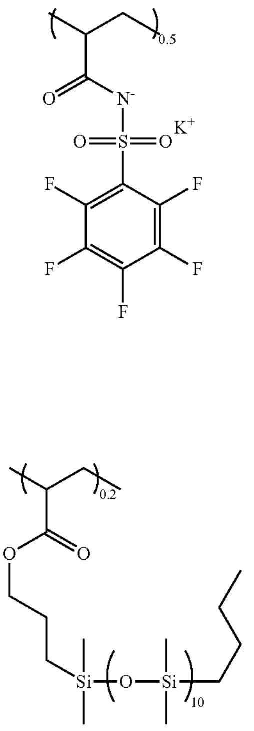

-continued
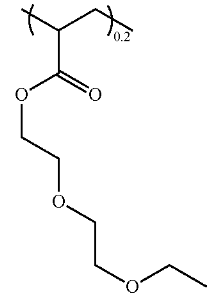
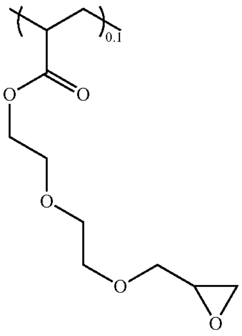
The repeating number in formula shows the average value.
Ionic Polymer 22
Mw=31, 300
Mw/Mn=1.94
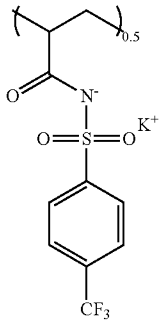
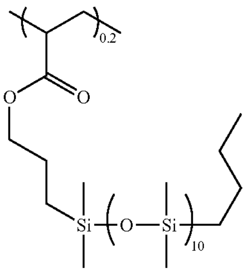
-continued
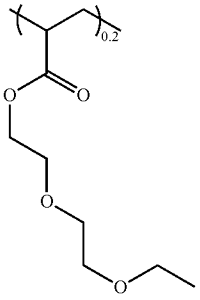
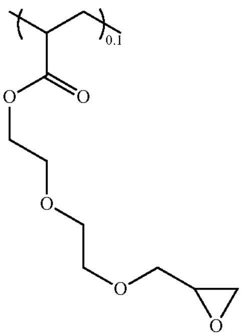
The repeating number in formula shows the average value.
Ionic Polymer 23
Mw=48, 100
Mw/Mn=2.18
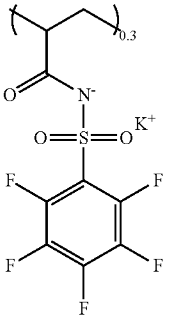
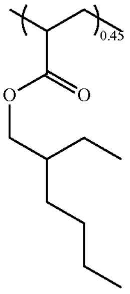

-continued
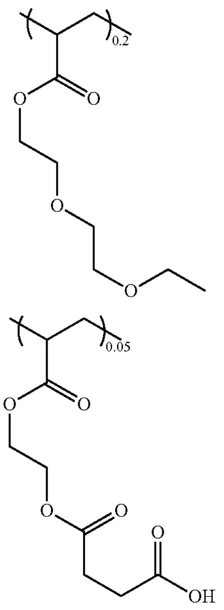
Ionic Polymer 24
Mw=39, 600
Mw/Mn=2.02
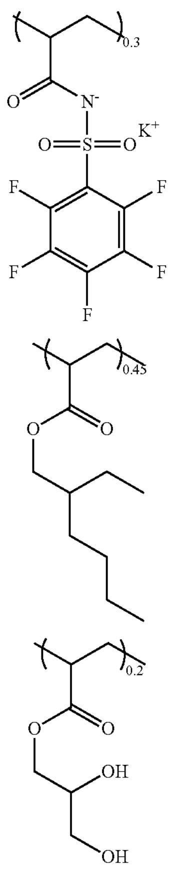
-continued
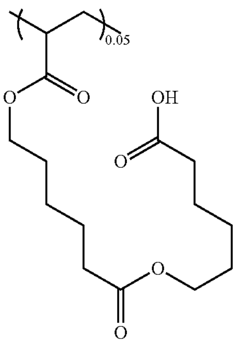
Ionic Polymer 25
Mw=31, 200
Mw/Mn=1.95
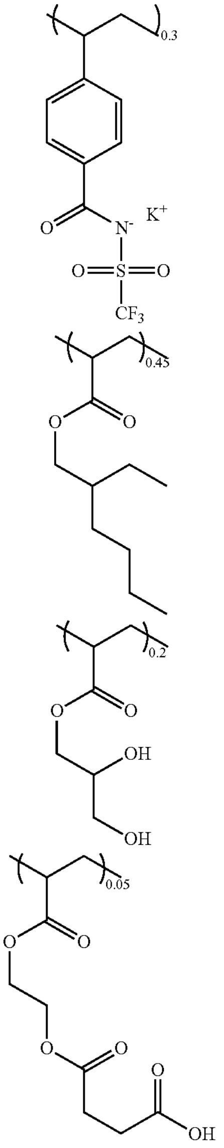

(Measurement of Thickness of Ion Polymer Containing Layer)

Ion polymer solutions shown in Tables 1 and 2 were mixed, applied to a Si substrate by spin coating, baked on a hot plate at 120° C. for 10 minutes, and the film thickness was measured using an optical film thickness meter. The results are shown in Tables 1 and 2.

(Preparation of Electro-Conductive Substrate)

A polyimide film having a thickness of 25 μm was coated with Dotite FA-333, an electro-conductive paste manufactured by Fujikura Kasei, by screen printing, and baked in an oven at 120° C. for 10 minutes to produce a conductive substrate X having 100 printed straight lines as shown in FIG. 9, which is 4 cm in length, 40 μm in width, and 160 μm in line spacing.

Silver nanowire aqueous solution (diameter 60 nm, length 40 μm, concentration 5 mg/mL) manufactured by Sigma-Aldrich was diluted 6 times with pure water, was coated by spin coating on a silicon wafer on which a 25 μm thick polyimide film was placed, and was baked on a hot plate at 250° C. for 10 minutes, to fuse silver nanowires each other to produce a conductive substrate Y.

A fluororesin tape with an adhesive was attached partly on the electro-conductive wiring on the electro-conductive substrates X and Y, and an ion polymer solution were spin-coated thereon and baked on a hot plate at 120° C. for 10 minutes. After the baking, the fluororesin tape with an adhesive was removed.

Further, in the case of ion polymer solutions 5 to 10, 12, 16, and 17, the ion polymer containing layers were cured by light irradiating of 500 mJ/$cm^2$ using a 1,000 W xenon lamp in a nitrogen atmosphere.

In Examples, a 20 μm thick PET film, which has moth-eye typed anti-reflective structure in triangular shapes having 100 μm depth and 200 nm pitch on one side and adhesive on the other side, was attached on entire surface of the opposite side from the side of the polyimide film on which the electro-conductive wiring was formed. In Comparative Example, such a moth-eye film was not attached.

(Measurement of Biological Signals)

Conductive substrate on which the ion polymer containing layer 6 was formed was cut so that both a contact area to the skin and a masked area 5 should be a 2 cm square, as shown in FIG. 20, to produce a bio-electrode.

A cellophane adhesive tape was attached on the back side of the bio-electrode, and the bio-electrodes were attached to the locations on the arm shown in FIG. 21, which were treated with absorbent cotton moistened with water. The exposed electro-conductive wiring in the masked area was sandwiched by a metal clip, and the metal clip were connected to the ECG measurement device using electro-conductive wiring.

NeXus10 MARKII manufactured by Kissei Comtec Co., Ltd. was used for ECG measuring device. In FIG. 21, 11 is the positive electrode, 12 is the negative electrode, and 13 is ground. Table 3 shows the results.

(Measurement of Transparency)

A side which having the electro-conductive layer A and the ion polymer containing layer B of the bio-electrode was placed to face a light receiving surface of a transmissometer, and its transmittance at a wavelength of 600 nm was measured. Additionally, transmittance of the area where the electro-conductive layer and the ion polymer containing layer were not formed was measured. Difference of measured values between them was defined as transmittance of the bio-electrode. Table 3 shows the results.

Silicone (meth)acrylate 1

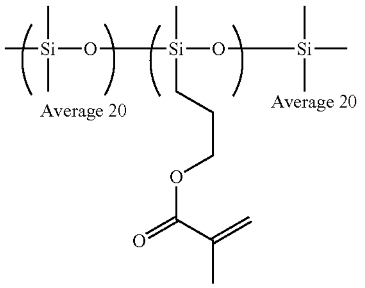

Silicone (meth)acrylate 2

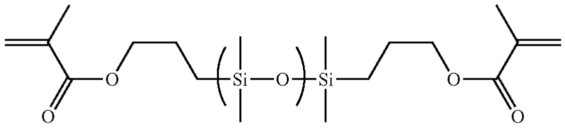

Average 20

-continued
Silicone urethane (meth)acrylate 1
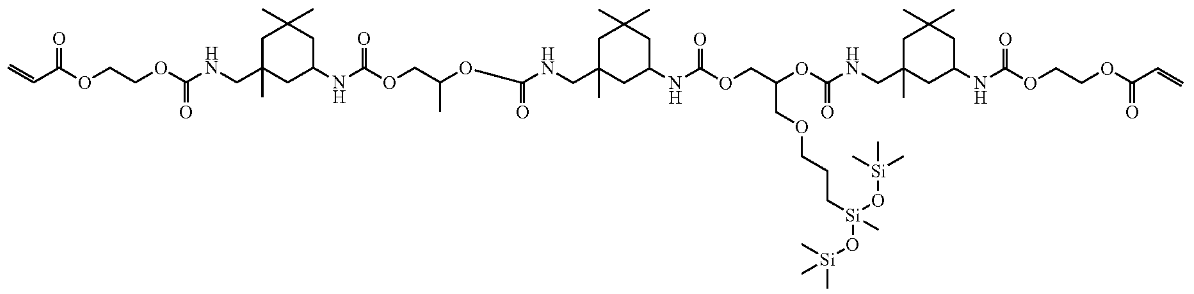
Average 80
Silicone urethane (meth)acrylate 2
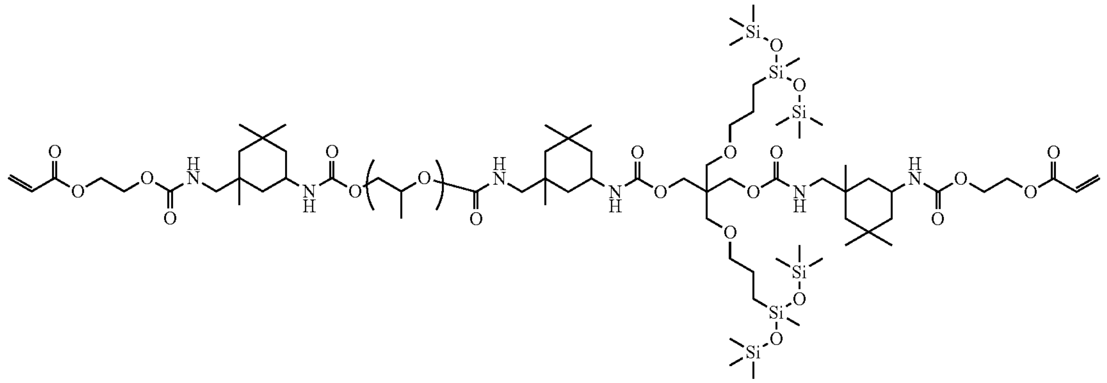
Average 80
Polyglycerin acrylate: SYntechSA-TE6 (Manufactured by Sakamoto Yakuhin kogyo Co., Ltd.)
Acrylate Compound 1
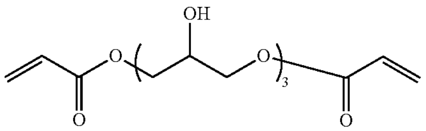
Acrylate Compound 2
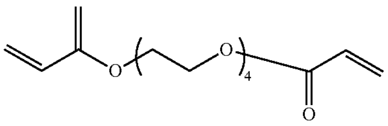
[Additive]
Polyglycerin silicone 1
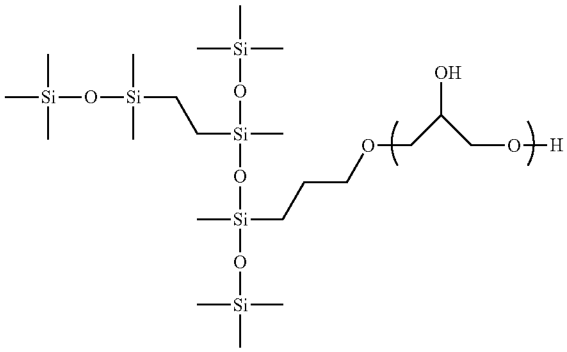

-continued

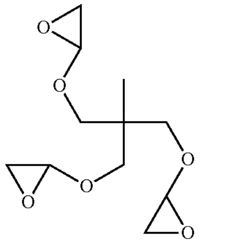

Crosslinking agent 1

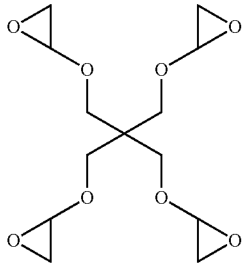

Crosslinking agent 2

-continued

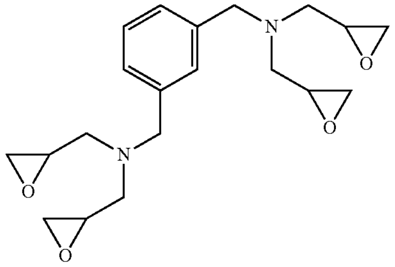

Crosslinking agent 3

Iragacure TPO
2-ethyl-4-imidasol

[Solvent]

PGEE: Propylene glycol monoethyl ether
BE: diethylene glycol monobutyl ether
GBL: Gamma butyrlactone
cyclopentanone
2-heptanone

TABLE 1

| Ion polymer solution | Ionic polymer (parts by mass) | Resin (parts by mass) | Solvent (parts by mass) | Additive (parts by mass) | Layer (B) Thickness (μm) |
|---|---|---|---|---|---|
| Ion polymer solution 1 | Ionic polymer 1 (100) | Silicone (meth) acrylate 1 (10) | Cyclopentanone (100) | Polyglycerin silicone 1 (20) Irgacure TPO (1) | 14 |
| Ion polymer solution 2 | Ionic polymer 2 (100) | Silicone (meth) acrylate 2 (10) | Cyclopentanone (100) | Polyglycerin silicone 1 (15) Irgacure TPO (1) | 16 |
| Ion polymer solution 3 | Ionic polymer 3 (100) | Silicone urethane(meth) acrylate 1 (10) | PGEE (100) | Polyglycerin silicone 1 (15) Irgacure TPO (1) | 28 |
| Ion polymer solution 4 | Ionic polymer 4 (100) | — | Cyclopentanone (100) | — | 16 |
| Ion polymer solution 5 | Ionic polymer 5 (100) | Silicone urethane(meth) acrylate 2 (10) | Cyclopentanone (50) 2-Heptanone (50) | Irgacure TPO (1) | 31 |
| Ion polymer solution 6 | Ionic polymer 6 (100) | Polyglycerin acrylate (10) | Cyclopentanone (95) BE (5) | Irgacure TPO (1) | 16 |
| Ion polymer solution 7 | Ionic polymer 7 (100) | Polyglycerin acrylate (10) | Cyclopentanone (100) | 2-Ethyl-4-imidazole (2) Irgacure TPO (1) | 18 |
| Ion polymer solution 8 | Ionic polymer 8 (100) | Acrylate compound 1 (5) | Cyclopentanone (90) GBL (10) | Irgacure TPO (1) | 21 |
| Ion polymer solution 9 | Ionic polymer 9 (100) | Acrylate compound 2 (5) | Cyclopentanone (100) | Polyglycerin silicone 1 (5) Irgacure TPO (1) | 16 |
| Ion polymer solution 10 | Ionic polymer 10 (100) | — | Cyclopentanone (100) | Polyglycerin silicone 1 (5) Irgacure TPO (1) | 13 |
| Ion polymer solution 11 | Ionic polymer 11 (100) | — | Cyclopentanone (100) | Polyglycerin silicone 1 (2) | 18 |
| Ion polymer solution 12 | Ionic polymer 12 (100) | — | Cyclopentanone (100) | — | 12 |
| Ion polymer solution 13 | Ionic polymer 13 (100) | — | Cyclopentanone (100) | Polyglycerin silicone 1 (4) | 12 |
| Ion polymer solution 14 | Ionic polymer 14 (100) | — | Cyclopentanone (100) | 2-Ethyl-4-imidazole (2) | 13 |

TABLE 1-continued

| Ion polymer solution | Ionic polymer (parts by mass) | Resin (parts by mass) | Solvent (parts by mass) | Additive (parts by mass) | Layer (B) Thickness (μm) |
|---|---|---|---|---|---|
| Ion polymer solution 15 | Ionic polymer 15 (100) | — | Cyclopentanone (100) | 2-Ethyl-4-imidazole (2) | 15 |

TABLE 2

| Ion polymer solution | Ionic polymer (parts by mass) | Resin (parts by mass) | Solvent (parts by mass) | Additive (parts by mass) | Layer (B) Thickness (μm) |
|---|---|---|---|---|---|
| Ion polymer solution 16 | Ionic polymer 16 (100) | — | Cyclopentanone (100) | Polyglycerin silicone 1 (4) Irgacure TPO (1) | 21 |
| Ion polymer solution 17 | Ionic polymer 17 (100) | — | Cyclopentanone (100) | Polyglycerin silicone 1 (4) Irgacure TPO (1) | 22 |
| Ion polymer solution 18 | Ionic polymer 18 (100) | — | Cyclopentanone (100) | Polyglycerin silicone 1 (4) 2-Ethyl-4-imidasol (2) | 26 |
| Ion polymer solution 19 | Ionic polymer 19 (100) | — | Cyclopentanone (100) | Polyglycerin silicone 1 (4) 2-Ethyl-4-imidasol (2) | 20 |
| Ion polymer solution 20 | Ionic polymer 20 (100) | — | Cyclopentanone (100) | Polyglycerin silicone 1 (4) 2-Ethyl-4-imidasol (2) | 29 |
| Ion polymer solution 21 | Ionic polymer 21 (100) | — | Cyclopentanone (100) | Polyglycerin silicone 1 (4) 2-Ethyl-4-imidasol (2) | 33 |
| Ion polymer solution 22 | Ionic polymer 22 (100) | — | Cyclopentanone (100) | Polyglycerin silicone 1 (4) 2-Ethyl-4-imidasol (2) | 35 |
| Ion polymer solution 23 | Ionic polymer 23 (100) | — | Cyclopentanone (100) | Polyglycerin silicone 1 (4) Crosslinking agent 1 (0.5) | 36 |
| Ion polymer solution 24 | Ionic polymer 24 (100) | — | Cyclopentanone (100) | Crosslinking agent 2 (0.03) | 32 |
| Ion polymer solution 25 | Ionic polymer 25 (100) | — | Cyclopentanone (100) | Crosslinking agent 3 (0.2) | 31 |

TABLE 3

| Example/ Comparative example | Ion polymer solution | Surface structure of substrate | Conductive substrate | Transmit-tance at 600 nm (%) | ECG signal |
|---|---|---|---|---|---|
| Example 1 | Ion polymer solution 1 | Moth-eye | Conductive substrate X | 76 | Good |
| Example 2 | Ion polymer solution 2 | Moth-eye | Conductive substrate X | 79 | Good |
| Example 3 | Ion polymer solution 3 | Moth-eye | Conductive substrate X | 75 | Good |
| Example 4 | Ion polymer solution 4 | Moth-eye | Conductive substrate X | 78 | Good |
| Example 5 | Ion polymer solution 5 | Moth-eye | Conductive substrate X | 77 | Good |
| Example 6 | Ion polymer solution 6 | Moth-eye | Conductive substrate X | 77 | Good |
| Example 7 | Ion polymer solution 7 | Moth-eye | Conductive substrate X | 76 | Good |

TABLE 3-continued

| Example/ Comparative example | Ion polymer solution | Surface structure of substrate | Conductive substrate | Transmit-tance at 600 nm (%) | ECG signal |
|---|---|---|---|---|---|
| Example 8 | Ion polymer solution 8 | Moth-eye | Conductive substrate X | 77 | Good |
| Example 9 | Ion polymer solution 9 | Moth-eye | Conductive substrate X | 77 | Good |
| Example 10 | Ion polymer solution 10 | Moth-eye | Conductive substrate X | 76 | Good |
| Example 11 | Ion polymer solution 11 | Moth-eye | Conductive substrate X | 75 | Good |
| Example 12 | Ion polymer solution 12 | Moth-eye | Conductive substrate X | 76 | Good |
| Example 13 | Ion polymer solution 13 | Moth-eye | Conductive substrate X | 77 | Good |
| Example 14 | Ion polymer solution 14 | Moth-eye | Conductive substrate X | 76 | Good |

TABLE 3-continued

| Example/ Comparative example | Ion polymer solution | Surface structure of substrate | Conductive substrate | Transmit-tance at 600 nm (%) | ECG signal |
|---|---|---|---|---|---|
| Example 15 | Ion polymer solution 15 | Moth-eye | Conductive substrate X | 75 | Good |
| Example 16 | Ion polymer solution 16 | Moth-eye | Conductive substrate X | 76 | Good |
| Example 17 | Ion polymer solution 17 | Moth-eye | Conductive substrate X | 77 | Good |
| Example 18 | Ion polymer solution 18 | Moth-eye | Conductive substrate X | 76 | Good |
| Example 19 | Ion polymer solution 19 | Moth-eye | Conductive substrate X | 76 | Good |
| Example 20 | Ion polymer solution 20 | Moth-eye | Conductive substrate X | 74 | Good |
| Example 21 | Ion polymer solution 19 | Moth-eye | Conductive substrate Y | 94 | Good |
| Example 22 | Ion polymer solution 21 | Moth-eye | Conductive substrate X | 74 | Good |
| Example 23 | Ion polymer solution 22 | Moth-eye | Conductive substrate X | 74 | Good |
| Example 24 | Ion polymer solution 23 | Moth-eye | Conductive substrate X | 75 | Good |
| Example 25 | Ion polymer solution 24 | Moth-eye | Conductive substrate X | 76 | Good |
| Example 26 | Ion polymer solution 25 | Moth-eye | Conductive substrate X | 75 | Good |
| Comparative example 1 | Ion polymer solution 1 | Flat | Conductive substrate X | 65 | Good |

ECG signal was determined as "Good" when waves PQRST of ECs signals were observed, and was determined as "Bad" when waves PQRST of ECG signals were not observed.

From the results shown in Table 3, Examples 1 to 26 using the inventive bio-electrode had a good transmittance of 70% or more at a wavelength of 600 nm, and the waves PQRST of the ECG signals was observed. From these, the inventive bio-electrode is thin, highly transparent, highly sensitive to biological signals, excellent in the biocompatibility, light-weight, capable to be manufactured at low cost, capable of preventing significant reduction in the sensitivity to biological signals even when attached on the skin for a long time and when wetted with water or dried, and comfortable without itching, reddening, nor rash of the skin.

On the other hand, in the case of Comparable Example 1 which used a substrate not having anti-reflective structure, the transmittance at 600 nm of wavelength was poor.

The present description includes the following embodiments.

[1]: A bio-electrode including:

a substrate having anti-reflective structure for light on at least one side; and (A) an electro-conductive layer having electro-conductive wiring on the opposite side from the side having the anti-reflective structure of the substrate.

[2]: The bio-electrode of the above [1], wherein the anti-reflective structure for light is based on moth-eye structure.

[3]: The bio-electrode of the above [2], wherein the moth-eye structure has a pitch of 1000 nm or less and a depth of 10 nm or more.

[4]: The bio-electrode any one of the above [1] to [3], which includes an ion polymer containing layer (B) on the electro-conductive layer (A).

[5]: The bio-electrode of the above [4], wherein the electro-conductive wiring has a width of 200 μm or less, and a laminate film, being a combination of the layer (A) and the layer (B), has a visible light transmittance of 50% or more.

[6]: The bio-electrode of the above [5], wherein the electro-conductive wiring having a width of 200 μm or less is: a printed pattern using an electro-conductive paste including a particle of gold, silver, copper, or nickel; or a fusion layer of metal nanowires including gold, silver, copper, nickel, or alloy thereof.

[7]: The bio-electrode any one of the above [4] to [6], wherein the ion polymer containing layer includes a polymer including a repeating unit-a having at least one selected from the group consisting of fluorosulfonic acid, fluorosulfonimide, and N-carbonyl-fluorosulfonamide, and having the weight-average molecular weight in a range of 1,000 to 500,000.

[8]: The bio-electrode of the above [7], wherein the repeating unit-a has a partial structure shown by any of the following general formulae (1)-1 to (1)-4, (1)-1

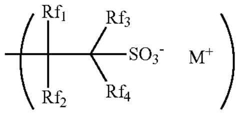

(1)-2

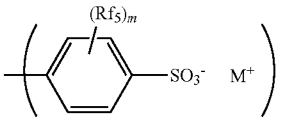

(1)-3

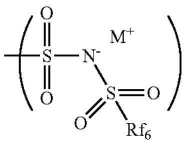

(1)-4

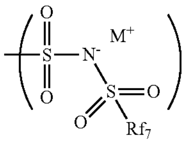

wherein $Rf_1$ and $Rf_2$ each represent a hydrogen atom, a fluorine atom, an oxygen atom, a methyl group, or a trifluoromethyl group, provided that when $Rf_1$ and $Rf_2$ represent an oxygen atom, the single oxygen atom represented by $Rf_1$ and $Rf_2$ bonds to a single carbon atom to form a carbonyl group; $Rf_3$ and $Rf_4$ each represent a hydrogen atom, a fluorine atom, or a trifluoromethyl group, and at least one of $Rf_1$ to $Rf_4$ is a fluorine atom or a trifluoromethyl group; $Rf_5$, $Rf_6$, and $Rf_7$ each represent a fluorine atom, a trifluoromethyl group, a linear or branched alkyl group having 1 to 4 carbon atoms, or an aryl group having 6 to 10 carbon atoms, and have at least one fluorine atom or trifluoromethyl group; and $M^+$ represents an ion selected from the group consisting of an ammonium ion, a sodium ion, and a potassium ion; "m" represents an integer of 1 to 4.

[9]: The bio-electrode of the above [8], wherein the repeating unit-a includes at least one selected from the group consisting of repeating units-A1 to -A7 shown by the following general formulae (2), (2)

A1

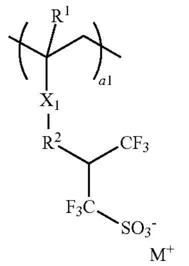

A2

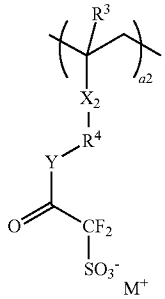

A3

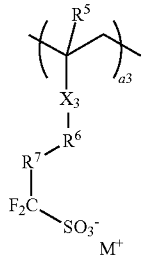

A4

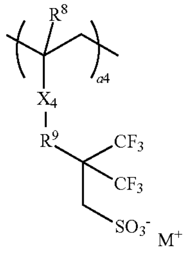

A5

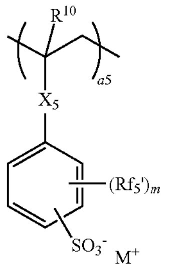

-continued

A6

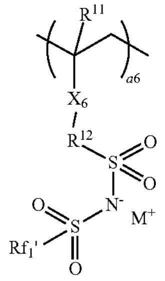

A7

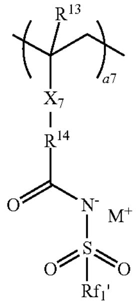

wherein, $R^1$, $R^3$, $R^5$, $R^8$, $R^{10}$, $R^{11}$, and $R^{13}$ each independently represent a hydrogen atom or a methyl group; $R^2$, $R^4$, $R^6$, $R^9$, $R^{12}$, and $R^{14}$ each independently represent a single bond or a linear, branched, or cyclic hydrocarbon group having 1 to 13 carbon atoms, the hydrocarbon group optionally having either or both of an ester group and an ether group; $R^7$ represents a linear or branched alkylene group having 1 to 4 carbon atoms, and one or two hydrogen atoms in $R^7$ are optionally substituted with a fluorine atom; $X_1$, $X_2$, $X_3$, $X_4$, $X_6$, and $X_7$ each independently represent any of a single bond, a phenylene group, a naphthylene group, an ether group, an ester group, and an amide group; $X_5$ represents any of a single bond, an ether group, and an ester group; Y represents an oxygen atom or a —$NR^{19}$— group; $R^{19}$ represents any of a hydrogen atom, a linear, branched, or cyclic alkyl group having 1 to 12 carbon atoms, and phenyl group, optionally includes one or more group selected from the group consisting of ether group, carbonyl group, ester group, and amide group; and Y forms a ring together with $R^4$; $Rf_1'$ and $Rf_5'$ each represent a fluorine atom, a trifluoromethyl group, or a linear or branched alkyl group having 1 to 4 carbon atoms, and have at least one fluorine atom; "m" represents an integer of 1 to 4; a1, a2, a3, a4, a5, a6, and a7 satisfy $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, and $0 < a1+a2+a3+a4+a5+a6+a7 \le 1.0$; and $M^+$ represents an ion selected from the group consisting of an ammonium ion, a sodium ion, and a potassium ion.

[10]: The bio-electrode of the above [9], wherein the repeating unit-a includes an ammonium ion shown by the following general formula (3) as an ammonium ion for forming an ammonium salt, (3)

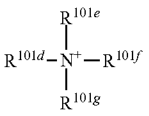

wherein, $R^{101d}$, $R^{101e}$, $R^{101f}$, and $R^{101g}$ each represent a hydrogen atom, a linear, branched, or cyclic alkyl group having 1 to 15 carbon atoms, a linear, branched, or cyclic alkenyl group or alkynyl group having 2 to 12 carbon atoms, or an aromatic group having 4 to 20 carbon atoms, and optionally have one or more selected from the group consisting of an ether group, a carbonyl group, an ester group, a hydroxy group, a carboxy group, an amino group, a nitro group, a sulfonyl group, a sulfinyl group, a halogen atom, and a sulfur atom; and $R^{101d}$ and $R^{101e}$, or $R^{101d}$, $R^{101e}$, and $R^{101f}$, are optionally bonded to each other together with a nitrogen atom bonded therewith to form a ring in which $R^{101d}$ and $R^{101e}$, or $R^{101d}$, $R^{101e}$, and $R^{101f}$, represent an alkylene group having 3 to 10 carbon atoms, or to form a heteroaromatic ring having the nitrogen atom in the general formula (3) within the ring.

[11]: The bio-electrode any one of the above [4] to [10], further including one or more resin (C) selected from the group consisting of (meth)acrylate resin, (meth)acrylamide resin, urethane resin, polyurethane (meth)acrylate, polyvinyl alcohol, polyvinylpyrrolidone, polyoxazoline, polyglycerin, polyglycerin-modified silicone, polyglycerin(meth)acrylate, cellulose, polyethylene glycol, and polypropylene glycol, as a component of the layer (B).

[12]: A method for manufacturing the bio-electrode any one of the above [1] to [11], the method including forming the layer (A), on the opposite side from the side having the anti-reflective structure of the substrate having the anti-reflective structure for light on at least one side, by applying a solution including metal nanowires, or by printing an electro-conductive paste containing conductive particles.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A bio-electrode comprising:

a substrate having an anti-reflective structure for light on at least one side;

(A) an electro-conductive layer having an electro-conductive wiring on the opposite side from the side having the anti-reflective structure of the substrate; and (B) an ion polymer containing layer on the electro-conductive layer (A).

2. The bio-electrode according to claim 1, wherein the anti-reflective structure for light is based on a moth-eye structure.

3. The bio-electrode according to claim 2, wherein the moth-eye structure has a pitch of 1000 nm or less and a depth of 10 nm or more.

4. The bio-electrode according to claim 1, wherein the electro-conductive wiring has a width of 200 μm or less, and a laminate film, being a combination of the layer (A) and the layer (B), has a visible light transmittance of 50% or more.

5. The bio-electrode according to claim 4, wherein the electro-conductive wiring having a width of 200 μm or less and is: a printed pattern using an electro-conductive paste comprising a particle of gold, silver, copper, or nickel; or a fusion layer of metal nanowires comprising gold, silver, copper, nickel, or alloy thereof.

6. The bio-electrode according to claim 1, wherein the ion polymer containing layer comprises a polymer comprising a repeating unit-a having at least one selected from the group consisting of fluorosulfonic acid, fluorosulfonimide, and N-carbonyl-fluorosulfonamide, and having the weight-average molecular weight in a range of 1,000 to 500,000.

7. The bio-electrode according to claim 6, wherein the repeating unit-a has a partial structure shown by any of the following general formulae (1)-1 to (1)-4, (1)-1

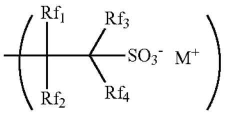

(1)-2

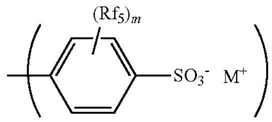

(1)-3

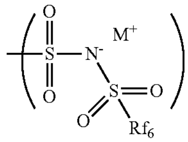

(1)-4

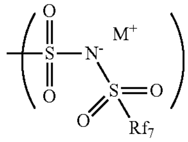

wherein $Rf_1$ and $Rf_2$ each represent a hydrogen atom, a fluorine atom, an oxygen atom, a methyl group, or a trifluoromethyl group, provided that when $Rf_1$ and $Rf_2$ represent an oxygen atom, the single oxygen atom represented by $Rf_1$ and $Rf_2$ bonds to a single carbon atom to form a carbonyl group; $Rf_5$ and $Rf_4$ each represent a hydrogen atom, a fluorine atom, or a trifluoromethyl group, and at least one of $Rf_1$ to $Rf_4$ is a fluorine atom or a trifluoromethyl group; $Rf_5$, $Rf_6$, and $Rf_7$ each represent a fluorine atom, a trifluoromethyl group, a linear or branched alkyl group having 1 to 4 carbon atoms, or an aryl group having 6 to 10 carbon atoms, and have at least one fluorine atom or trifluoromethyl group; and $M^+$ represents an ion selected from the group consisting of an ammonium ion, a sodium ion, and a potassium ion; "m" represents an integer of 1 to 4.

8. The bio-electrode according to claim 7, wherein the repeating unit-a comprises at least one selected from the group consisting of repeating units-A1 to -A7 shown by the following general formulae (2), (2)

A1

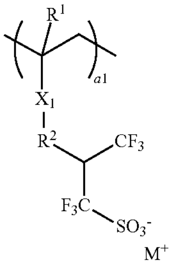

-continued

A2

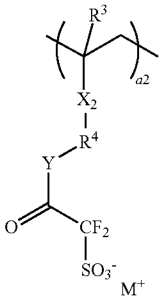

A3

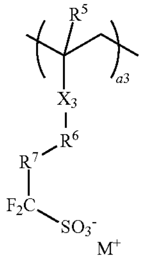

A4

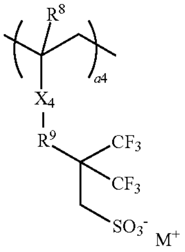

A5

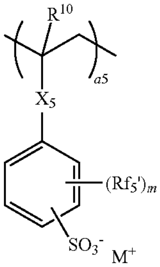

A6

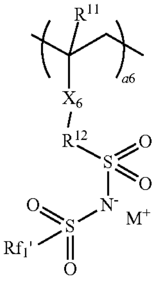

-continued

A7

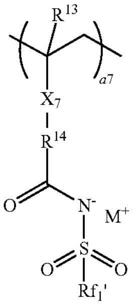

wherein, $R^1$, $R^3$, $R^5$, $R^8$, $R^{10}$, $R^{11}$, and $R^{13}$ each independently represent a hydrogen atom or a methyl group; $R^2$, $R^4$, $R^6$, $R^9$, $R^{12}$, and $R^{14}$ each independently represent a single bond or a linear, branched, or cyclic hydrocarbon group having 1 to 13 carbon atoms, the hydrocarbon group optionally having either or both of an ester group and an ether group; $R^7$ represents a linear or branched alkylene group having 1 to 4 carbon atoms, and one or two hydrogen atoms in $R^7$ are optionally substituted with a fluorine atom; $X_1$, $X_2$, $X_3$, $X_4$, $X_6$, and $X_7$ each independently represent any of a single bond, a phenylene group, a naphthylene group, an ether group, an ester group, and an amide group; $X_5$ represents any of a single bond, an ether group, and an ester group; Y represents an oxygen atom or a —$NR^{19}$— group; $R^{19}$ represents any of a hydrogen atom, a linear, branched, or cyclic alkyl group having 1 to 12 carbon atoms, and phenyl group, optionally comprise one or more group selected from the group consisting of ether group, carbonyl group, ester group, and amide group; and Y forms a ring together with $R^4$; $Rf_1'$ and $Rf_5'$ each represent a fluorine atom, a trifluoromethyl group, or a linear or branched alkyl group having 1 to 4 carbon atoms, and have at least one fluorine atom; "m" represents an integer of 1 to 4; a1, a2, a3, a4, a5, a6, and a7 satisfy $0 \le a1 \le 1.0$, $0 \le a2 \le 1.0$, $0 \le a3 \le 1.0$, $0 \le a4 \le 1.0$, $0 \le a5 \le 1.0$, $0 \le a6 \le 1.0$, $0 \le a7 \le 1.0$, and $0 < a1+a2+a3+a4+a5+a6+a7 \le 1.0$; and $M^+$ represents an ion selected from the group consisting of an ammonium ion, a sodium ion, and a potassium ion.

9. The bio-electrode according to claim 8, wherein the repeating unit-a comprises an ammonium ion shown by the following general formula (3) as an ammonium ion for forming an ammonium salt, (3)

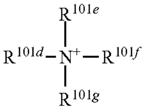

wherein, $R^{101d}$, $R^{101e}$, $R^{101f}$, and $R^{101g}$ each represent a hydrogen atom, a linear, branched, or cyclic alkyl group having 1 to 15 carbon atoms, a linear, branched, or cyclic alkenyl group or alkynyl group having 2 to 12 carbon atoms, or an aromatic group having 4 to 20 carbon atoms, and optionally have one or more selected from the group consisting of an ether group, a carbonyl group, an ester group, a hydroxy group, a carboxy group, an amino group, a nitro group, a sulfonyl group, a sulfinyl group, a halogen atom, and a sulfur atom; and $R^{101d}$ and $R^{101e}$, or $R^{101d}$, $R^{101e}$, and $R^{101f}$, are optionally bonded to each other together with a nitrogen atom bonded therewith to form a ring in which $R^{101d}$ and $R^{101e}$, or $R^{101d}$, $R^{101e}$, and $R^{101f}$, represent an alkylene group having 3 to 10 carbon atoms, or to form a heteroaromatic ring having the nitrogen atom in the general formula (3) within the ring.

10. The bio-electrode according to claim 1, further comprising one or more resin (C) selected from the group consisting of (meth)acrylate resin, (meth)acrylamide resin, urethane resin, polyurethane (meth)acrylate, polyvinyl alcohol, polyvinylpyrrolidone, polyoxazoline, polyglycerin, polyglycerin-modified silicone, polyglycerin(meth)acrylate, cellulose, polyethylene glycol, and polypropylene glycol, as a component of the layer (B).

11. A method for manufacturing the bio-electrode according to claim 1, the method comprising forming the layer (A) on the opposite side of the substrate from the side having the anti-reflective structure, by applying a solution comprising metal nanowires, or by printing an electro-conductive paste containing conductive particles thereon.

* * * * *